US009172915B2

(12) United States Patent
Nicholas et al.

(10) Patent No.: US 9,172,915 B2
(45) Date of Patent: Oct. 27, 2015

(54) METHOD OF OPERATING A CHANNEL RECOMMENDATION SYSTEM

(75) Inventors: Frank C. Nicholas, Glenview, IL (US); Ian B. Carswell, Chicago, IL (US)

(73) Assignee: Dizpersion Corporation, Evanston, IL (US)

( * ) Notice: Subject to any disclaimer, the term of this patent is extended or adjusted under 35 U.S.C. 154(b) by 2640 days.

(21) Appl. No.: 11/744,127

(22) Filed: May 3, 2007

(65) Prior Publication Data
US 2007/0204308 A1 Aug. 30, 2007

Related U.S. Application Data

(63) Continuation-in-part of application No. PCT/US2005/027659, filed on Aug. 4, 2005, and a continuation-in-part of application No. 11/465,735, filed on Aug. 18, 2006, application No. 11/744,127, which is a continuation-in-part of application No. 11/353,920, filed on Feb. 13, 2006, now Pat. No. 7,762,878.

(60) Provisional application No. 60/598,641, filed on Aug. 4, 2004, provisional application No. 60/710,030, filed on Aug. 18, 2005.

(51) Int. Cl.
| | |
|---|---|
| *G06Q 30/00* | (2012.01) |
| *H04N 7/173* | (2011.01) |
| *G06Q 30/02* | (2012.01) |
| *H04N 21/222* | (2011.01) |
| *H04N 21/254* | (2011.01) |
| *H04N 21/2547* | (2011.01) |
| *H04N 21/258* | (2011.01) |
| *H04N 21/442* | (2011.01) |
| *H04N 21/482* | (2011.01) |
| *H04N 21/81* | (2011.01) |
| *H04L 29/08* | (2006.01) |

(52) U.S. Cl.
CPC ........... *H04N 7/17318* (2013.01); *G06Q 30/02* (2013.01); *H04L 67/306* (2013.01); *H04N 21/222* (2013.01); *H04N 21/254* (2013.01); *H04N 21/2547* (2013.01); *H04N 21/25891* (2013.01); *H04N 21/44222* (2013.01); *H04N 21/4826* (2013.01); *H04N 21/812* (2013.01)

(58) Field of Classification Search
CPC ...................................................... G06Q 30/02
USPC ............................................. 705/14.1–14.73
See application file for complete search history.

(56) References Cited

U.S. PATENT DOCUMENTS 5,794,210 A * 8/1998 Goldhaber et al. ........ 705/14.69
6,859,197 B2 2/2005 Klein et al.
(Continued)

*Primary Examiner* — Arthur Duran
(74) *Attorney, Agent, or Firm* — Cardinal Law Group

(57) ABSTRACT

The invention provides a method of operating a channel recommendation system, including, providing a channel recommendation bid interface, receiving a bid request on the interface, and displaying a recommendation link to the channel on at least one user recommendation display device based on the bid request. Real time viewership information may also be used in the operation of the channel recommendation system. The invention further provides a method of operating a shared information system, including, receiving a recorded clip recommendation request, determining a recipient based on the recommendation request, wherein the recipient is a user different from the recommendation source, determining a recorded video clip based on the recommendation request, determining an ad based on a profile associated with the recipient, and associating the determined clip and the determined ad with the recipient. Real time viewership information may also be used in the operation of the shared information system.

20 Claims, 91 Drawing Sheets

(56) References Cited

U.S. PATENT DOCUMENTS

| | | |
|---|---|---|
| 6,938,101 B2 | 8/2005 | Hayes et al. |
| 7,143,214 B2 | 11/2006 | Hayes et al. |
| 2002/0143805 A1 | 10/2002 | Hayes et al. |
| 2002/0174428 A1 | 11/2002 | Agnihotri et al. |
| 2002/0186867 A1 | 12/2002 | Gutta et al. |
| 2002/0190956 A1 | 12/2002 | Klein et al. |
| 2003/0110497 A1 | 6/2003 | Yassin et al. |
| 2003/0115597 A1 | 6/2003 | Yassin et al. |
| 2003/0131355 A1* | 7/2003 | Berenson et al. ............ 725/46 |
| 2003/0146940 A1 | 8/2003 | Ellis et al. |
| 2005/0080496 A1 | 4/2005 | Hayes et al. |
| 2005/0216606 A1 | 9/2005 | Hayes et al. |
| 2005/0267766 A1* | 12/2005 | Galbreath et al. ............ 705/1 |
| 2006/0190966 A1 | 8/2006 | McKissick et al. |
| 2006/0227761 A1 | 10/2006 | Scott et al. |
| 2006/0265427 A1 | 11/2006 | Cohen et al. |
| 2006/0282856 A1 | 12/2006 | Errico et al. |
| 2007/0074258 A1 | 3/2007 | Wood et al. |

* cited by examiner

```
<?xml version="1.0" encoding="utf-8"?>
<rss version="2.0">
  <channel>
    <title>Evanston Events - Sponsored by the Evanston Chamber</title>
    <link>http://evchamber.publishersplus.com/</link>
    <description>Evanston Events</description>
    <lastBuildDate>Wed, 21 Jul 1004 14:04:03 GMT</lastBuildDate>
    <item>
      <title>July 14th, Executive Women's Forum</title>
      <link>http://evchamber.publishersplus.com/rss/chamber2.asp</link>
      <description>8:00-9:15am, Lower Level Conference Room.  Held at One Rotary Center</description>
    </item>
    <item>
      <title>Weekend Event - Evanston Ethnic Art Festival</title>
      <link>http://evchamber.publishersplus.com/rss/ethnicarts.asp</link>
      <description>July 17th and 18th from 8am-8pm.  Held at Dawes Park on Sheridan Road and Chuch Street</description>
    </item>
    <item>
      <title>July 14th, Home-Based Business Network</title>
      <link>http://evchamber.publishersplus.com/rss/chamber.asp</link>
      <description>John Martin of Total Selling Solutions presents "Break the Rules and Close More Sales" Are you finding your prospects are turning you into an "unpaid
      </description>
    </item>
    <item>
      <title>Whole Foods Wednesday Lunch Special</title>
      <link>http://evchamber.publishersplus.com/rss/wholefoods.asp</link>
      <description>Whole Foods Wednesday Lunch Special $5 for a fresh baked Whole Foods pizza. Call ahead and it will be ready when you get here: 847.733.1800
      </description>
    </item>
  </channel>
</rss>
```

Labels: 101, 102, 103, 104, 105, 106, 107, 108, 109

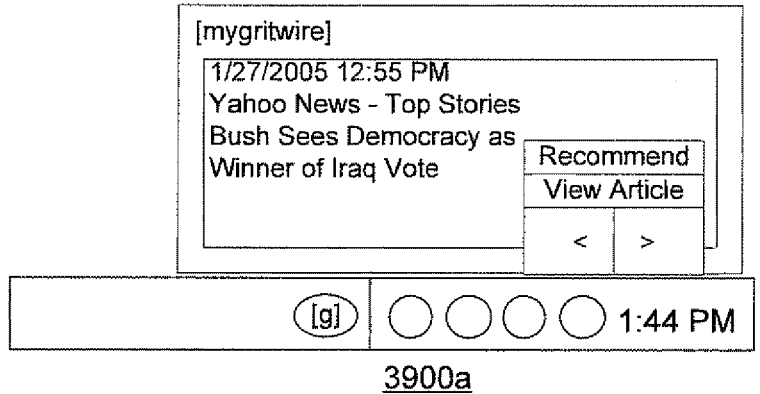
FIG. 39a    3900a
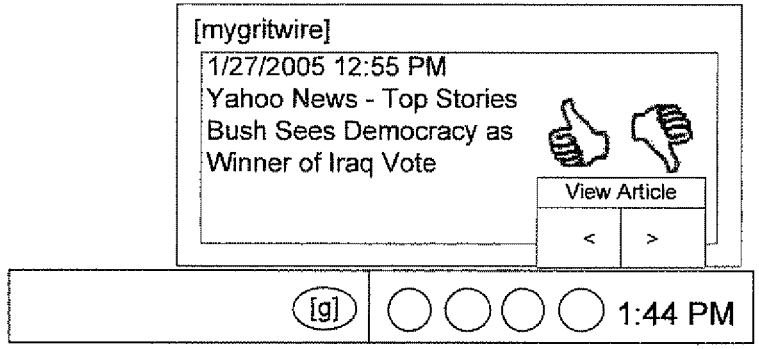
FIG. 39b    3900b
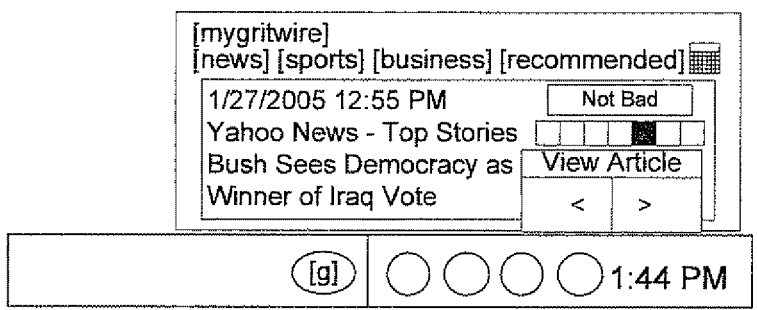
3900c
FIG. 39c

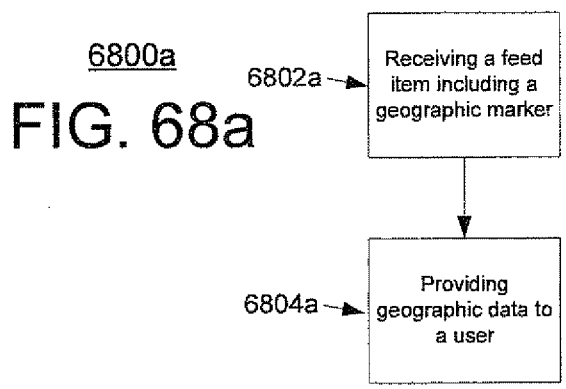
FIG. 68a
```
<item>
<title>$20 Battle of the Bands</title>
<link>http://publishersplus.com/rss/event.asp?eid=2313</link>
<description>$20 Battle of the Bands</description>
<author>info@publishersplus.com</author>
<locationID>468239</locationID>
<pubDate>Tue, 20 Jul 2004 23:43:15 GMT</pubDate>
</item>
```
6800b
FIG. 68b
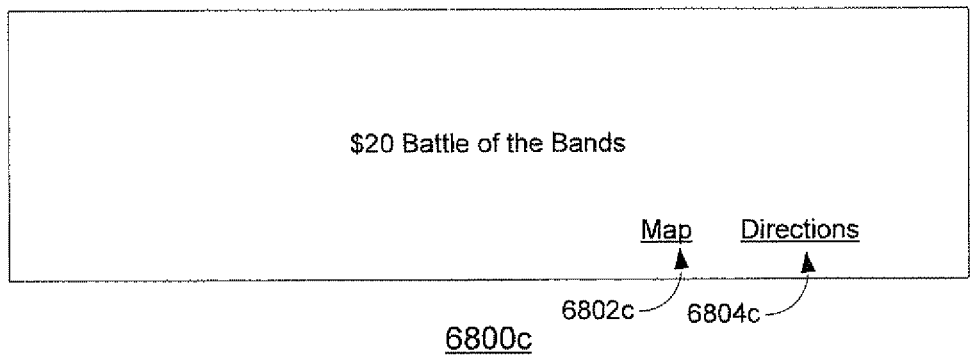
FIG. 68c

METHOD OF OPERATING A CHANNEL RECOMMENDATION SYSTEM

RELATED APPLICATION DATA

This application is a continuation in part application of, and claims priority to, PCT Ser. No. PCT/US2005/027659 filed Aug. 4, 2005 which claims the benefit of U.S. Provisional Patent Application 60/598,641 filed Aug. 4, 2004; U.S. patent application Ser. No. 11/465,735 filed Aug. 18, 2006 which claims the benefit of U.S. Provisional Patent Application 60/710,030 filed Aug. 18, 2005; and U.S. patent application Ser. No. 11/353,920 filed Feb. 13, 2006. The entirety of each application is hereby incorporated by reference.

FIELD OF THE INVENTION

The present invention generally relates to content recommendations. More specifically, the present invention relates to recommending channels.

BACKGROUND OF THE INVENTION

The networked world, particularly the Internet, World Wide Web (WWW), and television service has numerous communication formats and interactions. Some of the most ubiquitous include email, HTML web pages, and television. Over the past several years, there has been an increased interaction between these methods of communication and interfaces including information related to user profiles, various network information sources and feed formatted content.

FIG. 1 shows representative feed formatted content 100. Feed formatted content is structured data, such as for example Electronic Data Interchange (EDI), Extensible Markup Language (XML), or a subset of a general format such as RSS (Rich Site Summary or Really Simple Syndication), a hybrid or extension of some such standard, or the like. Feed formatted content 100 may be accessed through a feed, stored in a local file, or the like. A feed is the data returned when a request for feed formatted content is made. Feed formatted content may include a feed header 101. In one embodiment, feed header 101 includes a header labeling feed formatted content 100 as XML data, and further provides two element wrappers: rss and channel. Feed formatted content 100 often represents multiple items, as is that displayed in FIG. 1. Each feed item 106 may represent one or more news headlines, events, search results, items for sale or any other data. Feed item 106 may contain any number of elements. For example, it may include a title element 107, link element 108, and a description element 109. The term feed formatted content may describe an entire feed, a portion of a feed, a feed item, or a portion of a feed item.

It would be useful to provide a method for channel recommendations and shared communications based on various network information sources.

SUMMARY OF THE INVENTION

One aspect of the invention provides a method of operating a channel recommendation system, including, providing a channel recommendation bid interface, receiving a channel recommendation bid request on the interface, and displaying a recommendation link to the channel on at least one user recommendation display device based on the channel recommendation bid request.

Another aspect of the invention provides method of operating a channel recommendation system, including, providing a channel recommendation bid interface, receiving a channel recommendation bid request via the interface, determining a real-time viewership of at least one channel based on the bid request; and displaying a recommendation link to the channel on at least one user recommendation display device based on the channel recommendation bid request and the determined real-time viewership.

Another aspect of the invention provides a method of operating a shared information system, including, receiving a recorded clip recommendation request from a recommendation source, determining a recipient based on the recommendation request, wherein the recipient is a user different from the recommendation source, determining a recorded video clip based on the recommendation request, determining an ad based on a group or individual profile associated with the determined recipient, and associating the determined clip and the determined ad with the determined recipient.

Another aspect of the invention provides a method of operating a shared information system, including, determining at least one video clip based on real time viewership information, determining at least one subscriber based on a group or individual profile, and associating the determined video clip with the determined subscriber.

Another aspect of the invention includes a method of operating a shared information system, including, determining viewership of a plurality of channels in real time, categorizing the determined viewership by geographic regions, providing a plurality of sponsorship offers based on the geographic categories, receiving at least one sponsorship bid to at least one of the sponsorship offers from at least one advertiser, determining a geographic location of video clip recommendation recipients, determining a sponsorship based on the received bid and the determined geographic location, and associating the determined sponsorship with at least one of the video clip recommendation recipients.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 1 illustrates one embodiment of feed formatted content, as known in the art;

FIG. 39a-c illustrates schematic diagrams of various embodiments of an IAP.

FIG. 68a illustrates a flowchart embodiment of providing a geographically enhanced feed;

FIG. 68b illustrates a geographically enhanced feed item;

FIG. 68c illustrates the IAP display of a geographically enhanced feed item;

DETAILED DESCRIPTION OF A PRESENTLY PREFERRED EMBODIMENT

Figure 2:
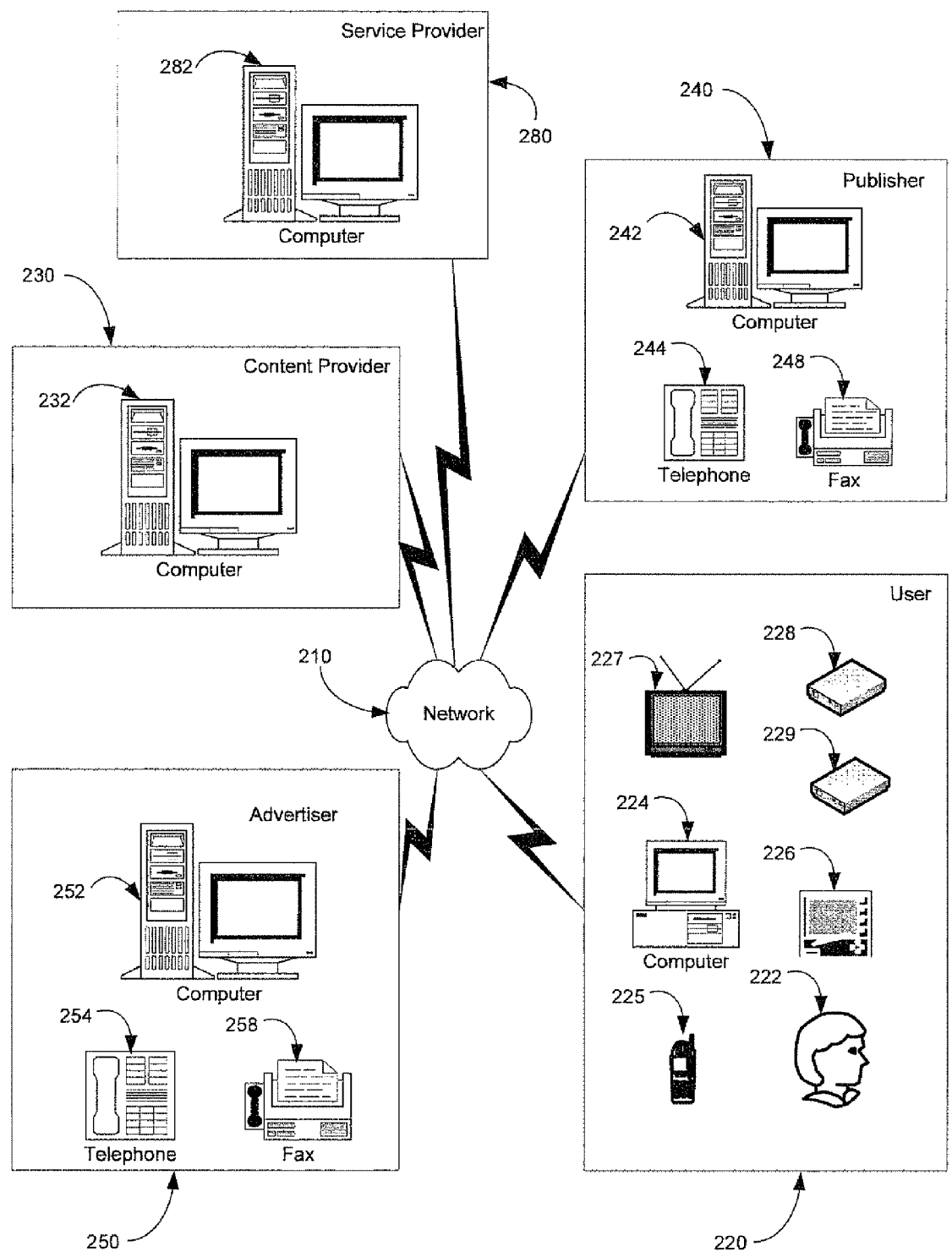
FIG. 2 illustrates a schematic diagram of one embodiment of a telecommunication system of the present invention.

Referring to FIG. 2, a telecommunication system 200 of the present invention is shown. Telecommunication system 200 comprises a network 210 which provides the communications links between the various nodes of telecommunication system 200. Links through network 210 may include permanent connections (e.g., wire or fiber optic cables), temporary connections made through telephone, wireless or satellite communications, or various nodes of telecommunication system 200 may actually be hosted on the same physical hardware platform removing the necessity of a network link altogether. Network 210 may be in the form of public or private connections available over the Internet, an extranet, an intranet, a hard-wired local area network (LAN), a hard-wired wide area network (WAN), a wireless LAN, a wireless WAN, cellular network, satellite network, and/or other forms as would occur to those having ordinary skill in the art.

A user node 220 of telecommunication system 200 operates to facilitate communications of requested information in audio form and/or visual form between a user 222 of user node 220 and one of the other nodes of telecommunication system 200. Devices, apparatuses and systems, such as for example, a cell phone 225, a personal digital assistant 226, and a personal computer 224 as illustrated, or any other user communication devices may be utilized within user node 220 to establish such communications. Other suitable devices may include television 227, set-top box (STB) 228, or gaming console 229. Serviceable apparatuses and systems not illustrated include networked household, office, vehicular or other communications systems such as digital or satellite radio systems, stand-alone terminals, automatic teller machines, elevators, refrigerators, Asynchronous Transfer Mode (ATM) connected devices, and others as would occur to those having ordinary skill in the art.

A content provider node 230 includes one or more servers 232 for communicating with the other nodes of telecommunication system 200. The requested information, pushed information, and generally provided content can be in a variety of forms, such as, for example, a static or dynamic web page (HTML or XML), a radio or video broadcast or narrowcast, wireless application protocol (WAP) content, a short messaging service (SMS) message, or other forms of network information as known in the art. All content may be provided as the entirety of requested or provided content, or as a portion. For example, content provider node 230 may provide an entire web or WAP page or only a segment of a page. Accordingly, content server 232 can include suitable hardware platforms and software modules to operate as a web site server, a radio broadcast server, etc.

Referring again to FIG. 2, publishing node 240 includes one or more servers 242 for communicating with the other nodes of telecommunication system 200. Publishing node 240 may include apparatus and communications devices such as telephone 244, or fax machine 246. In one embodiment, publishing node 240 provides some portion or all of the content for content provider 230. Publishing node 240 may also publish content or advertisements for advertiser node 250. Publishing node 240 may include interfaces for uploading or inputting by some means content that is to be published via network 210.

Advertiser node 250 represents advertisers that may be any of an end advertiser of a product or service, a marketer, a publicist, a politician, any other similar party, or any party acting as an agent of the advertiser such as a media company, public relations company, advertising agency, or traditional publication. Advertiser node 250 may include apparatus and communications devices such as computer 252, telephone 254, or fax machine 256.

Service provider node 260 represents third party service providers, whose services may be incorporated into the present telecommunications system 200. For example, Mapquest or Google Maps may provide mapping functionality and services. Evite may provide event invitation and response management services. Quova may provide IP-to-geography translation services. Gracenote may supply its CDDB product and services. Friendster, MySpace, or the like may provide social network services. Paypal or Verisign may provide payment services. These service providers are only exemplary, and within each service category other service providers may be available, or another node of the system may provide like service. Service providers may also perform advertising or publishing functions. Service providers may operate as independent nodes of telecommunications system 200, or may provide copies of their code, databases, systems and the like for local installation on another node of telecommunications system 200. Service may be provided in the form of data feeds, application program interface (API), web services, or any other form of communication available in telecommunications system 200 as would occur to one skilled in the art.

While the nodes of FIG. 2 are illustrated and described as solely communicating using network 210, this is only to be considered a best mode, and not limiting. Various nodes, where possible, may communicate using other forms of communication including phone, fax, in-person meetings, mail, and other forms known in the art. In addition, each node may consist of more or fewer communications devices, personnel, and apparatus than are illustrated. Further, while the nodes, and further their component make-up (e.g. servers, databases), are described as operating independently and on separate platforms, it should be well understood by one skilled in the art that various functions of the node or functions of the multiple nodes may be performed on the same physical hardware, or spread in different configurations, arrangements and architectures among the various nodes.

User node 220, content provider node 230, publishing node 240, advertising node 250, and service provider node 260 may each provide or receive feed formatted content. Examples herein will typically focus on XML, and specifically RSS, but it should be understood that other feed formatted content may employ like solutions. The term marker shall typically refer to an element, attribute, or group of elements and attributes within feed formatted content, and the terms marker, element, and attribute shall generally be understood to mean formatted information within feed formatted content.

Feeds may be provided in a variety of ways. A feed may be provided from a Primary Content Provider (PCP), or feed source server, which is an original information source, such as, News.com or the New York Times. The feed from a PCP is accessed from a domain and URL maintained by the original source. Portions or all of the feed or feed content may be written or edited through outsourcing, outside software may be used to generate the feed, and interfaces hosted by another entity may be used in the feed generation. However, a PCP maintains all feed data locally. An Outsourced Content Provider (OCP) is a feed provider that provides feeds in an Application Service Provider (ASP) model. Feed data is managed and maintained remote from the original source, however the feed may still be hosted from a domain or URL maintained by the original source through remote data request. In one embodiment, an OCP may be employed by a PCP to manage the creation of feed formatted content, and the OCP may provide the ability, for example through FTP, to publish the feed formatted content at a server maintained by the PCP. An Aggregate Content Provider (ACP) may generate original feed content, but an ACP receives feed content and redistributes it in one or more feeds maintained by the ACP. Both an OCP and an ACP may be referred to as a feed intermediate server. Each node of telecommunication system 100 may act as, or use the services of, one or more PCPs, OCPs, or ACPs.

It should be noted that delivery of feed formatted content does not necessarily imply that an active push is involved. Delivery of feed formatted content may, in one embodiment, allow that the feed formatted content be made available for request. For example, the feed formatted content may be made available at some universal resource identifier (URI), or at some other location available to a user. Similarly, it should be noted that terms sending feed formatted content or providing feed formatted content do not necessarily imply that an active push is involved. Sending a feed formatted content may, in one embodiment, indicate that the feed formatted content is made available for request. For example, the feed formatted content may be made available at some universal resource identifier (URI), or at some other feed location available to a user. However, the delivery, provision, or sending method for the feed formatted content may not be through request of an XML feed, RSS feed, atom feed, or the like, but rather may involve a more active push of the content.

Feed formatted content may include certain enhancement markers, data and/or formatting to provide enhanced feed creation, management, delivery, organization, interaction, accountability, display, and the like. For example, enhanced feed formatted content may include elements additional to those shown in feed 200. Feed aggregation and display tools may ignore additional elements, and may be capable of aggregating and displaying feed items even if they do contain these additional elements. Inclusion of additional elements or markers within feed formatted content therefore may provide additional benefit if the aggregation and display tool is designed to process them, and may not disrupt standard feed formatted content aggregation and display.

Figure 3:
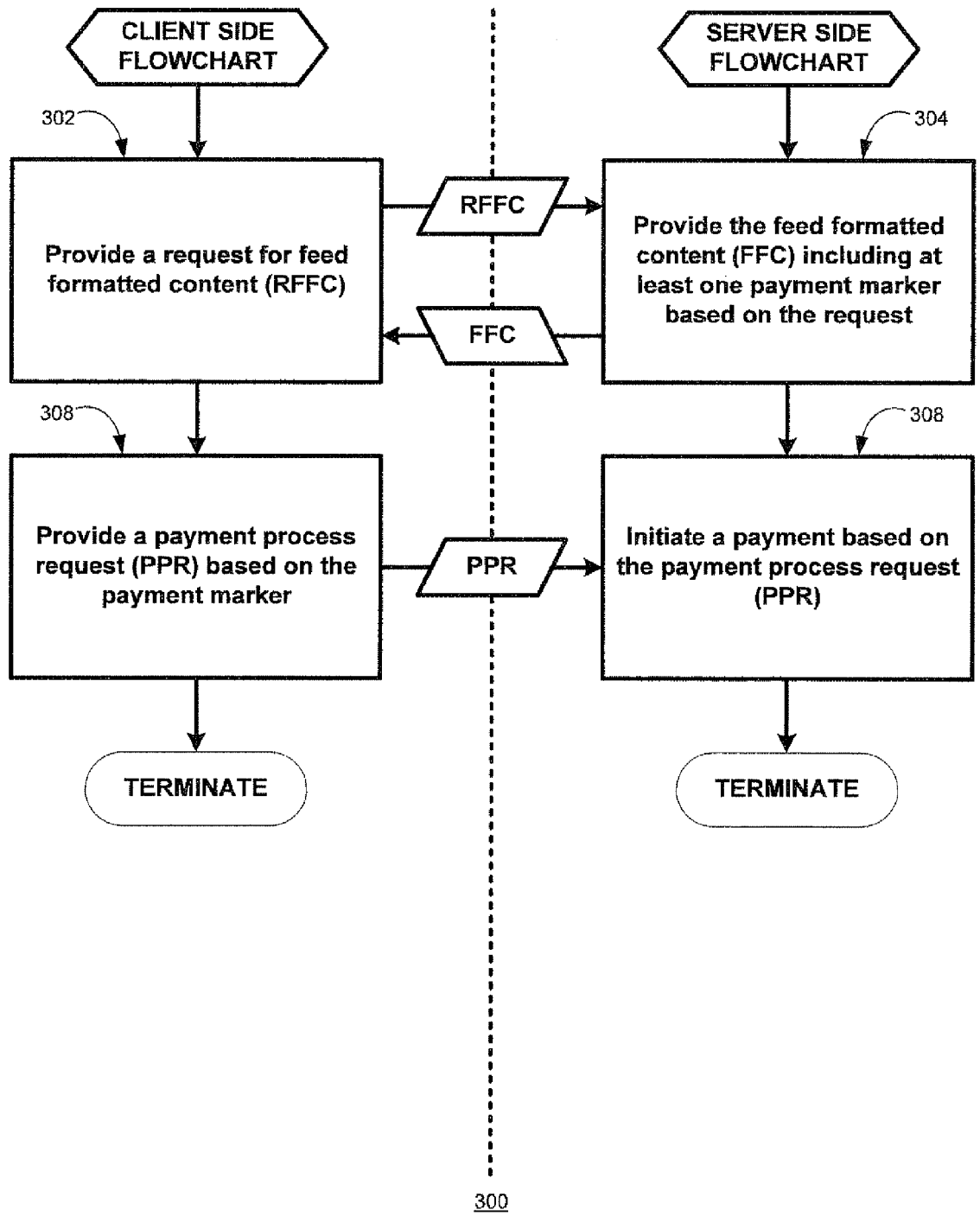
FIG. 3 illustrates a flowchart representative of one embodiment of a method for providing payment marker enhanced feed formatted content.

For example, a feed publisher may publish feed formatted content associated with a product or service available for purchase. The feed formatted content may include a payment marker. FIG. 3 illustrates a flowchart representative of one embodiment of a method for providing payment marker enhanced feed formatted content at 300. A client provides a request for feed formatted content at 302. The request for feed formatted content is received at the server. The server provides feed formatted content including at least one payment marker based on the request at 304. The user then provides a payment process request based on the payment marker at 306. The server initiates a payment based on the payment process request at 308. In one embodiment, the payment may be processed at the server. Alternatively, the payment may be initiated at service provider node 260 in response to the payment process request. In one embodiment, the request for feed formatted content may include product or service specifications as well as geographic area and price preferences. Product or service specifications may include brand names, model names or numbers, product or service descriptions, or the like.

In one embodiment, when a payment marker is present, an interface may display a "buy now" button or link that takes the user to a purchasing page on some other site. Alternatively, instead of directing the user to a site where they may purchase the product, the service receiving the feed formatted content may hold all necessary information regarding the purchase for the user. In one embodiment, the "buy now" button or link causes a form to be submitted to the merchant site including visible or hidden form elements and user info regarding the purchase and payment details. Alternatively, clicking the button may cause a webservice to be called, or some other like communication with an order and/or payment processing service. In one embodiment, the "buy now" button or link may signal the service to process the purchase indicated in the feed formatted content. For example, a user may register for or create a feed that searches Ebay® for a particular type of item at a certain price threshold. When that type of item becomes available on Ebay for a set price under the threshold, a feed item representing that availability may be inserted into the user's feed and it may include a payment marker. In one embodiment, the payment marker may include the price, the user's Ebay login information, the seller's information, an identifier for the particular item up for purchase, or other information relevant to the purchase. The "buy now" button or link displayed on the display interface may submit directly to the Ebay site and process the transaction based on the login information and identifier. Alternatively, the "buy now" button or link may submit to a service provider. The service provider may hold a purchase script for Ebay as well as other ecommerce sites. When the "buy now" submission is received at the service provider, the Ebay purchase script may be executed. The script may include, for example, sending a post request to an Ebay purchase page, sending a post request including user login credentials, and a post request confirming the purchase. In one embodiment, the service provider may communicate the purchase in some other manner such as, for example, electronic business XML (ebXML), a webservices application program interface (API), or some other form of purchase data transfer. One-click purchasing can in many of the above-described embodiments be achieved separate from a central storefront.

Figure 4:
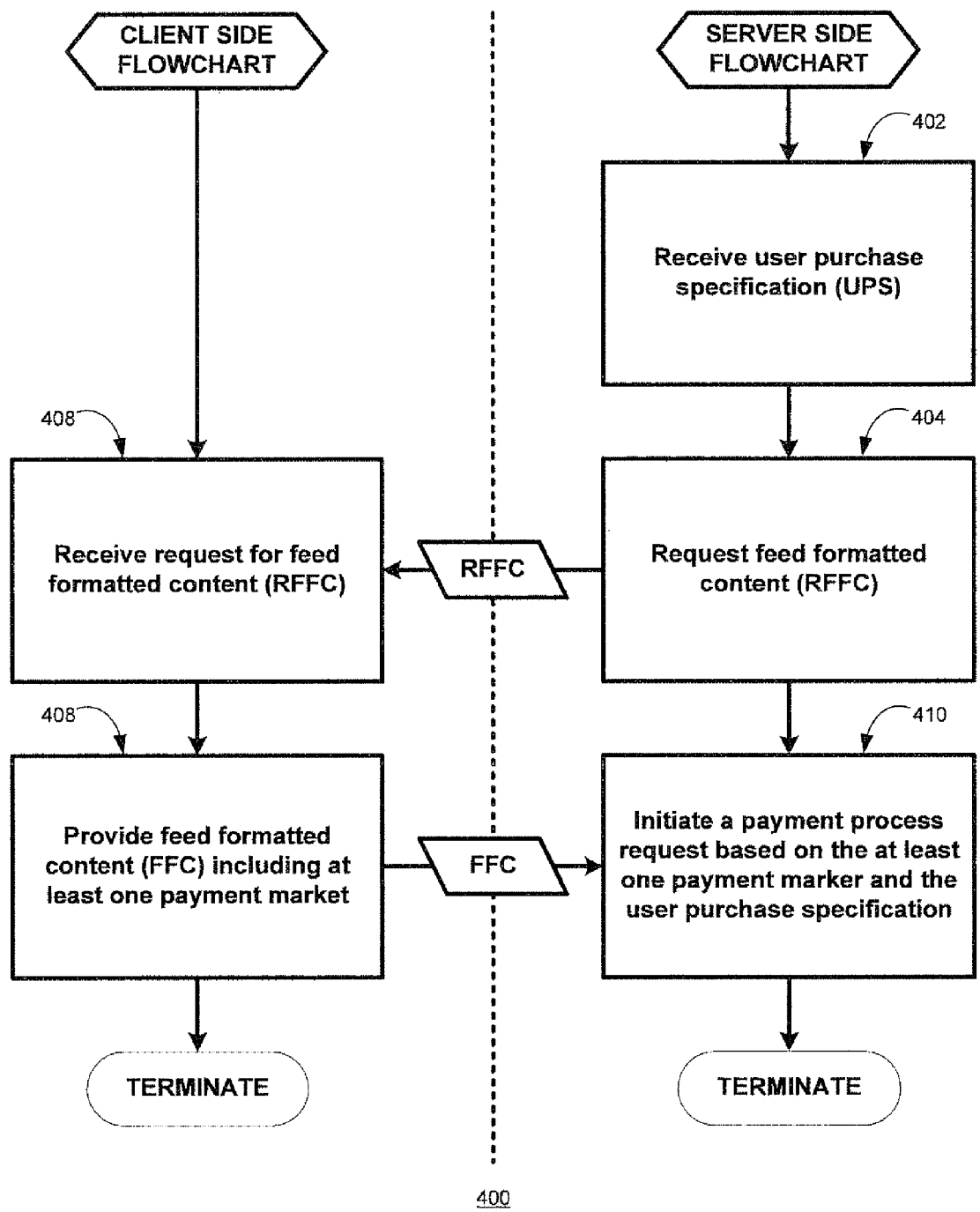
FIG. 4 illustrates a flowchart representative of one embodiment of a method for providing payment marker enhanced feed formatted content.

FIG. 4 illustrates a flowchart representative of one embodiment of a method for providing payment marker enhanced feed formatted content at 400. The server receives a user purchase specification at 402. The server issues a request for feed formatted content at 404. A content publisher receives the request for feed formatted content at 406. The content publisher provides feed formatted content including at least one payment marker at 408. The server initiates a payment process based on the at least one payment marker and the user purchase specification at 410.

By way of another example, a restaurant may publish feed formatted content, such as, for example, regarding a dinner special for a particular night. The restaurant may be enrolled in a rewards program such as the airline miles rewards program managed by Rewards Network Inc., formerly iDine. Users who are enrolled in this program would benefit from knowing that the restaurant is also enrolled, but that information may be superfluous for non-enrolled users. The restaurant feed formatted content may include a reward marker that either includes information about the particular reward deal at that restaurant, links to the reward deal, or simply indicates that the reward is available.

Figure 5:
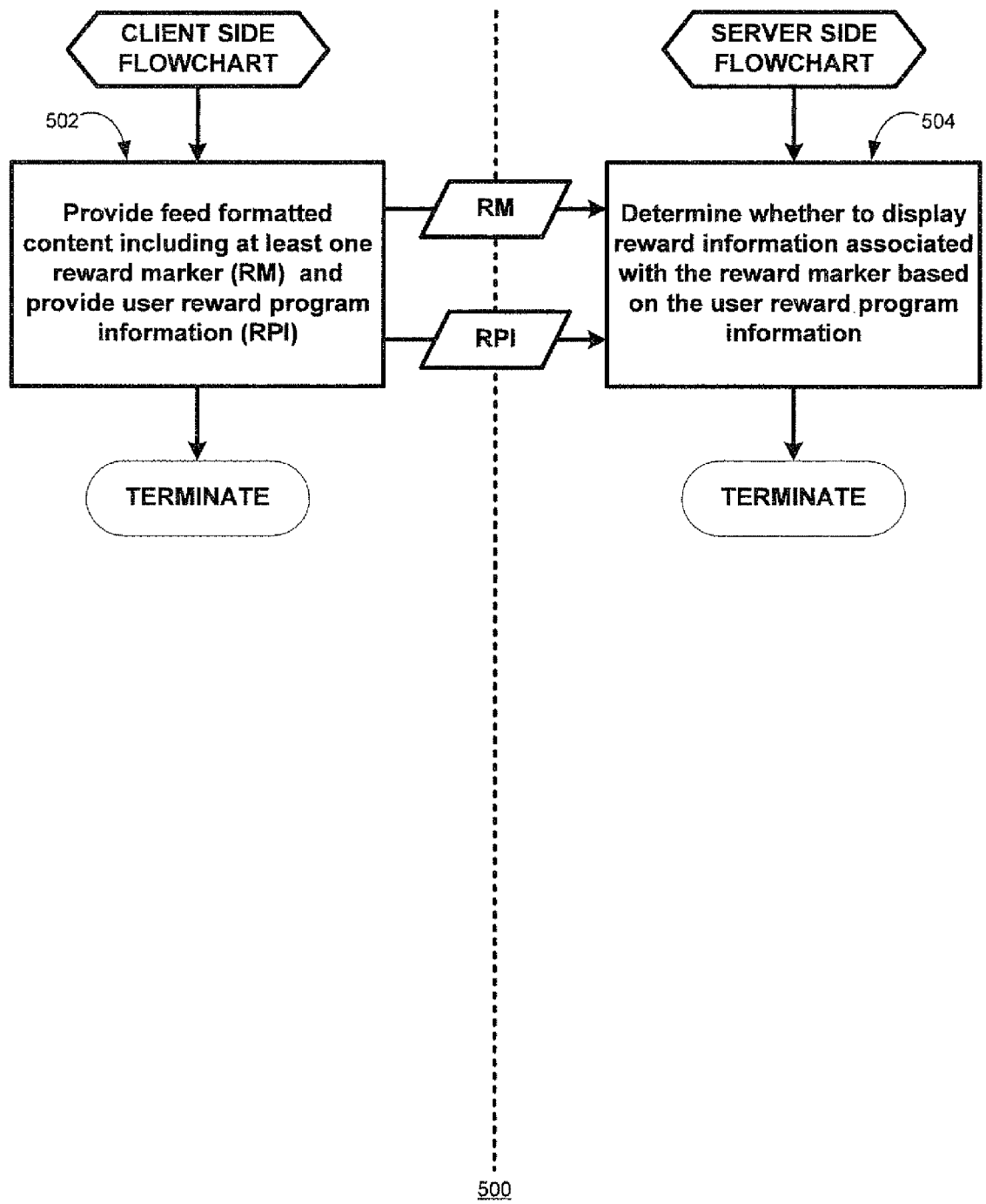
FIG. 5 illustrates a flowchart representative of one embodiment of a method for providing reward marker enhanced feed formatted content.

FIG. 5 illustrates a flowchart representative of one embodiment of a method for providing reward marker enhanced feed formatted content at 500. A content publisher provides feed formatted content including at least one reward marker at 502. User reward program information is also supplied at 502. The server determines whether to display reward information associated with the reward marker based on the user reward program information at 504.

For example, the reward marker might indicate that twenty airline miles are earned per dollar spent at the restaurant. A feed formatted content display service may hold information regarding what users are registered with the rewards program, and may selectively display the reward availability based on the reward marker and the user information.

Figure 6:
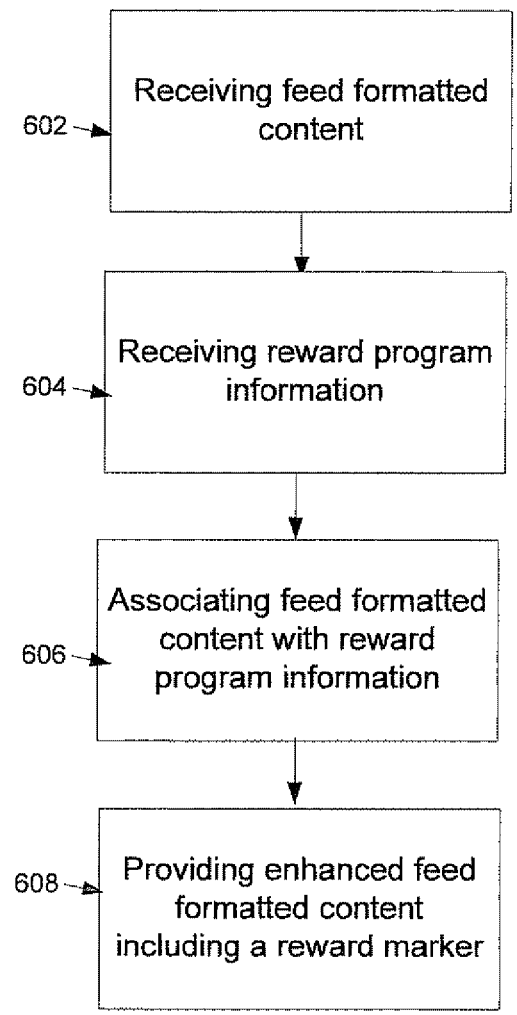
FIG. 6 illustrates a flowchart representative of one embodiment of a method for providing reward marker enhanced feed formatted content.

FIG. 6 illustrates a flowchart representative of one embodiment of a method for providing reward marker enhanced feed formatted content at 600. An ACP receives feed formatted content at 602. The ACP receives reward program information at 604. The ACP associates the feed formatted content with the reward program information at 606. The ACP provides enhanced feed formatted content including a reward marker at 608.

Figure 7:
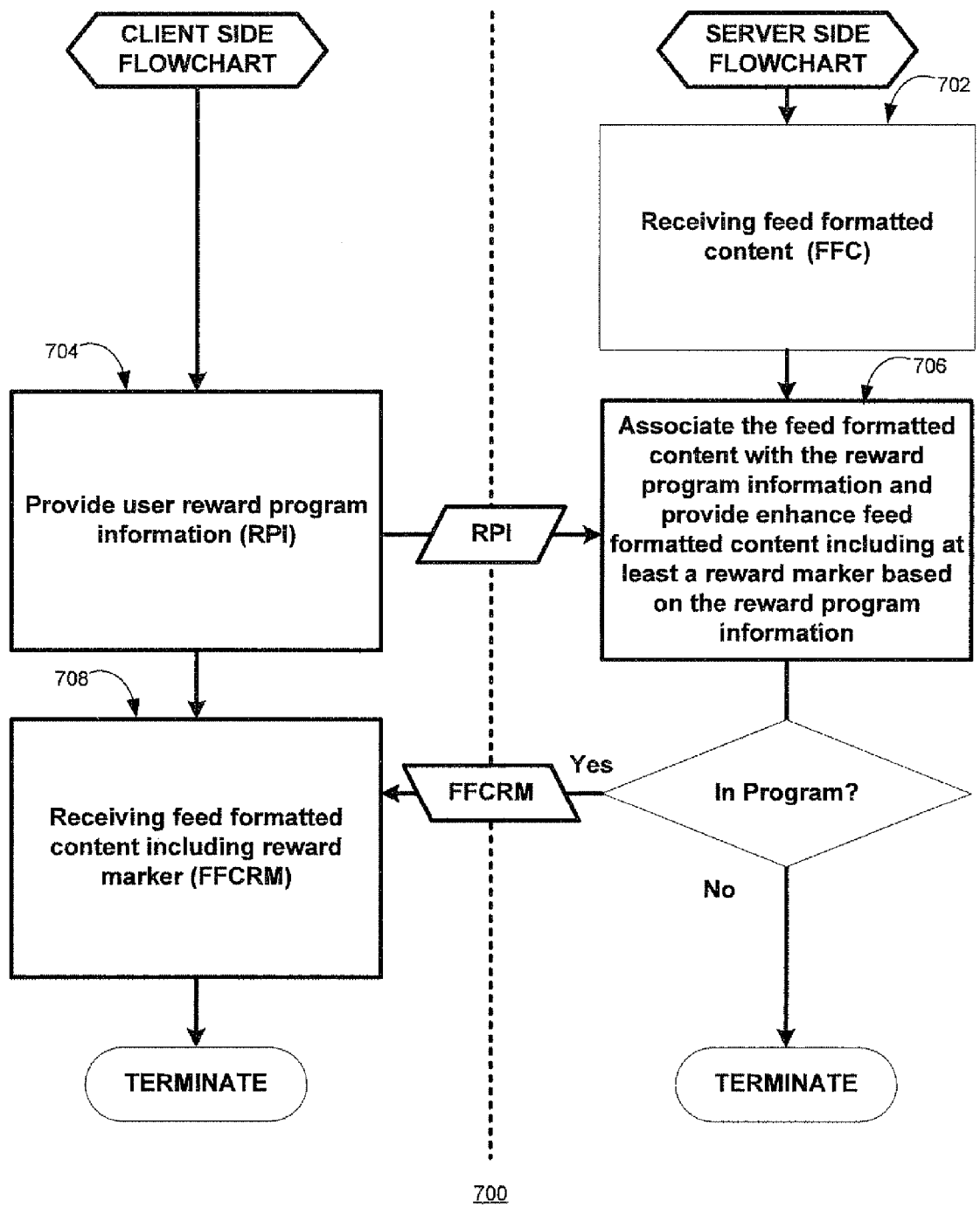
FIG. 7 illustrates a flowchart representative of one embodiment of a method for providing reward marker enhanced feed formatted content.

FIG. 7 illustrates a flowchart representative of one embodiment of a method for providing reward marker enhanced feed formatted content at 700. A server receives feed formatted content at 702. A user provides user reward program information at 704. For example, user reward program information may include indication of participation in a program or status within a program. The server associates the feed formatted content with the user reward program information and provides enhanced feed formatted content including at least a reward marker based on the reward program information at 706. When the user receives feed formatted content from the server, and for example they are in a program associated with the reward marker, the user receives feed formatted content including the reward marker at 708. In one embodiment, the user does not receive the feed formatted content if they are not in the program. Alternatively, the feed formatted content may be received, but the information associated with the reward program is not display. By way of another example, the reward information may be displayed in one manner if the user is in the program and in another if they are not.

Figure 8:
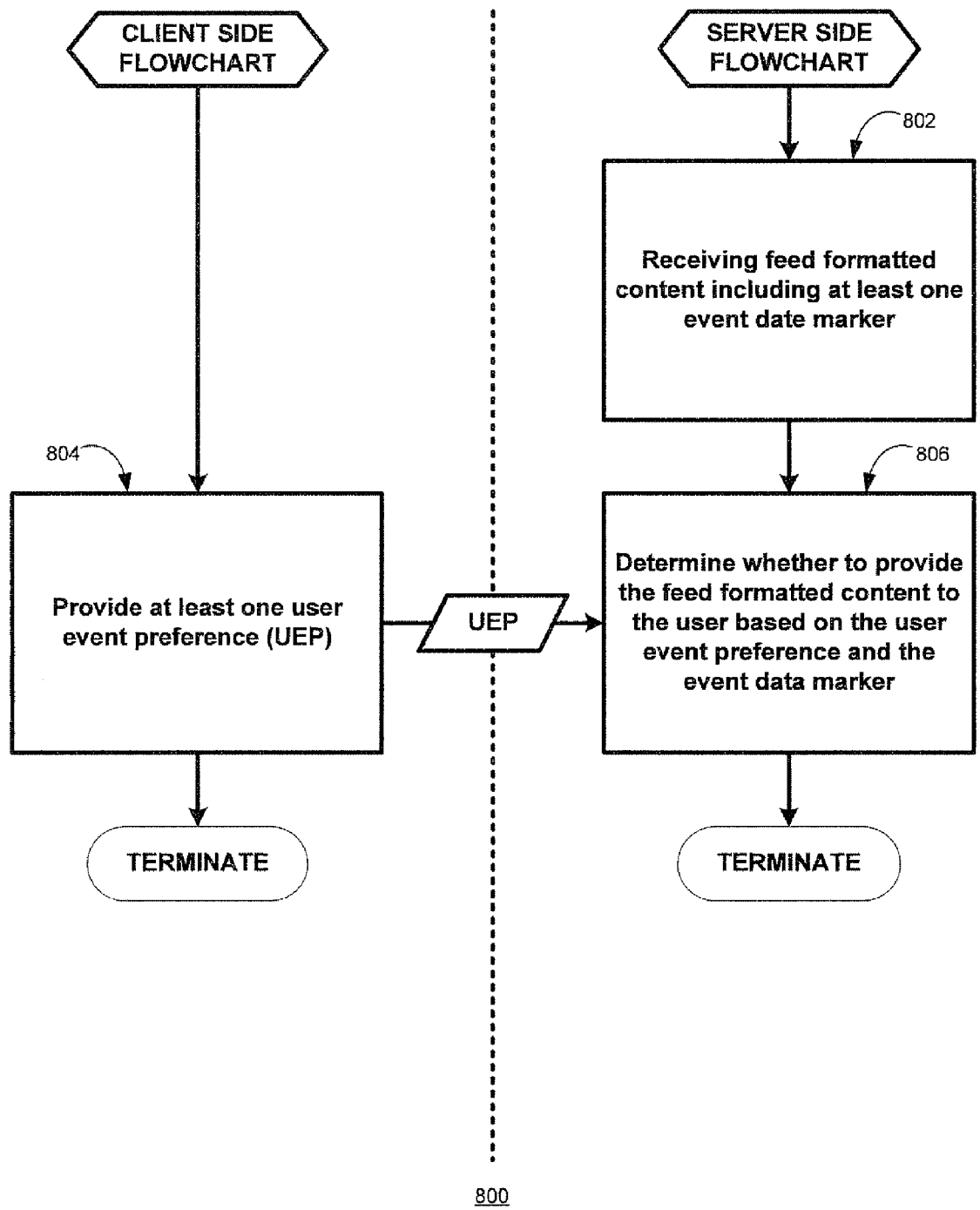
FIG. 8 illustrates a flowchart representative of one embodiment of a method for providing event date marker enhanced feed formatted content.

In one embodiment, feed formatted content may include one or more event date markers. While it is common practice to include a published date for feed formatted content, it would be advantageous to include a date marker particular to an event referred to in the feed formatted content. FIG. 8 illustrates a flowchart representative of one embodiment of a method for providing event date marker enhanced feed formatted content at 800. A server receives feed formatted content including at least one event date marker at 802. A user provides at least one user event preference at 804. The server determines whether to provide the feed formatted content to the user based on the user event preference and the event data marker at 806.

For example, feed formatted content provided by Ticketmaster® may include a feed item referring to a concert that will take place in two weeks. The published date reflects the first date the item is displayed in the feed, but the separate event date marker may be used to communicate the actual concert date. A user may specify a user preference that they wish to receive concert information as much as a month ahead of time. The server may provide them with the feed formatted content from Ticketmaster including the feed item referring to the concert. Alternatively, if the user only wishes to receive information about concerts coming up within the next week, the server does not provide the concert information.

Figure 9:
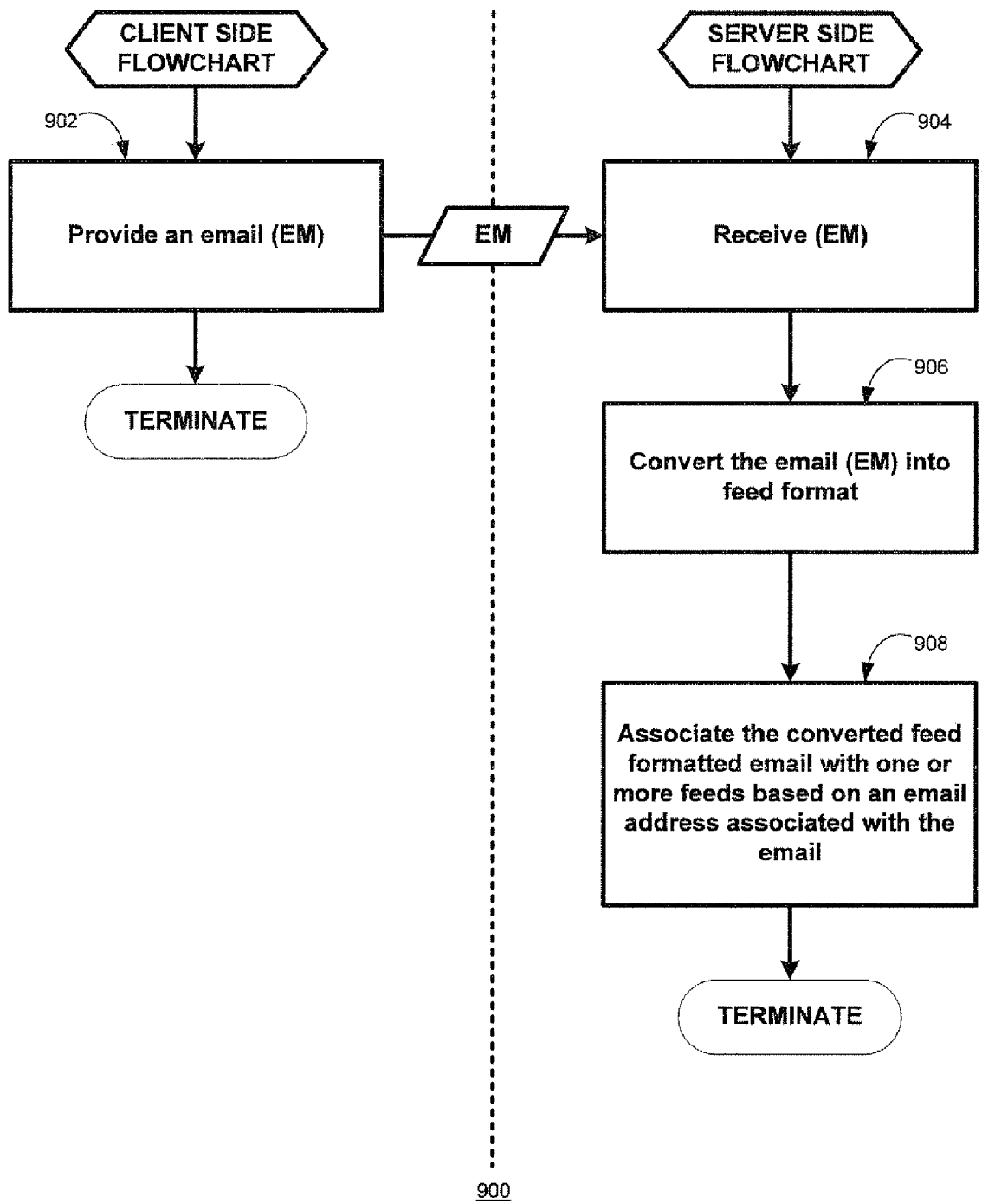
FIG. 9 illustrates a flowchart representative of one embodiment of a method for providing feed formatted content.

Publishing node 240 may act as an OCP or ACP and may serve to publish feeds for a content provider 230, an advertiser 250, a service provider 260, or a user 220. When publishing node 240 acts as an OCP it may receive content in a variety of ways. For example, content may be received at a call center, by web or software interface, by fax, by email, or by any other means of information and data transfer known in the art. In one embodiment, publishing node 240 may receive an email newsletter from an original source and either manually translate the newsletter into feed formatted content or automatically parse or translate it into the same. FIG. 9 illustrates a flowchart representative of one embodiment of a method for providing feed formatted content at 900. A user provides an email at 902. The user may provide the email by sending or forwarding an email, or replying to an email. The server receives the email at 904. The server converts the email into feed format at 906. The server associates the converted feed formatted email with one or more feeds based on an email address associated with the email at 908. For example, an email received at a certain address maintained by publishing node 240 might convert the subject of the email into a feed item title 107, and convert the email message body into a feed item description 109. The feed formatted content may be placed in a certain feed based upon the sending or receiving email address, including the carbon copy and blind carbon copy recipients. Alternatively or in addition, scanning of the email body and/or subject may be used to categorize and assign the converted feed item to a particular feed, for example it may be categorized and inserted into a feed based on key word or subject matter. Other filtering methods known by one skilled in the art may be employed to process the email.

In one embodiment, publishing node 240 may receive calls from advertisers at a call center. If the advertiser has never worked with publishing node 240 before, account information may be entered into an advertiser database. In one embodiment, the account information may include information to be displayed on a landing web page for the advertiser or the advertiser may designate a URL for a landing web page. A feed may be established exclusively for the advertiser to hold the feed formatted content that is ordered. The feed formatted content ordered by the advertiser may be placed in a feed with other feed formatted content.

In one embodiment, a feed formatted content publishing interface may be provided, for example at a web site, that allows users, advertisers, advertising agencies, or any other entity to log in to an account and create feed formatted content. For example, an advertiser may log into their account and encounter a page that includes a form requesting title, link, and description information that will be converted to feed formatted content and included in the advertiser's feed. Given the various methods by which feed formatted content may be created or published by publishing node 240, different pricing methods may be established to charge for the publication and management services. For example, publishing node 240 may charge a certain amount for a phone order but allow submissions via an online interface for a cheaper price or for free.

Figure 10:
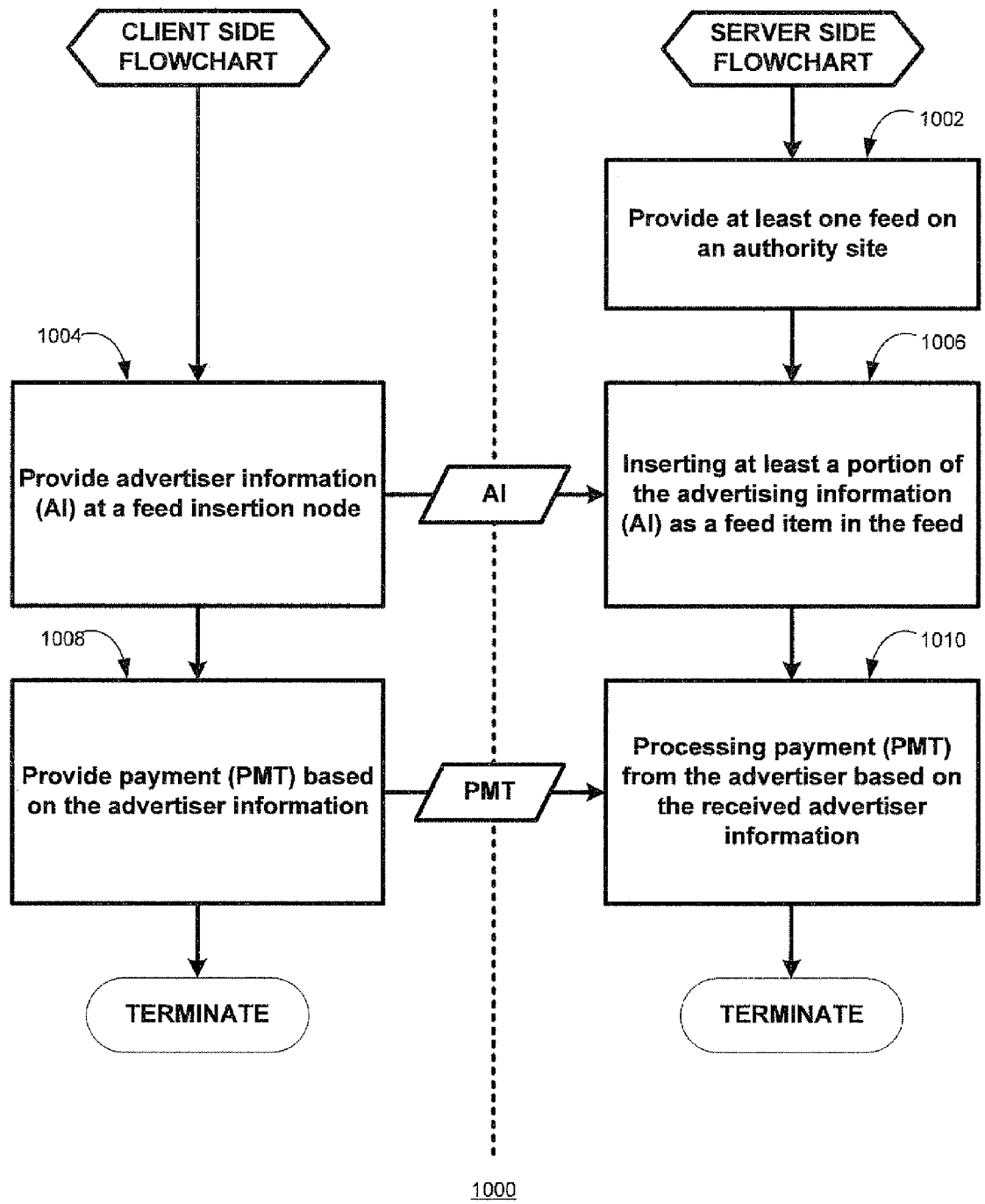
FIG. 10 illustrates a flowchart representative of one embodiment of a method for providing aggregated feed formatted content.

FIG. 10 illustrates a flowchart representative of one embodiment of a method for providing aggregate feed formatted content at 1000. The server provides at least one feed on an authority site 1002. An advertiser provides advertiser information at a feed insertion node at 1004. The server receives the advertiser information and provides at least a portion of the information as a feed item in the feed at 1006. The advertiser provides payment based on the provided advertiser information at 1008. The server processes payment from the advertiser based on the received advertiser information at 1010. In one embodiment, the received advertiser information may include a display time period, demographic characteristics, destination site, or the like. In one embodiment, the server provides an aggregate feed. The aggregate feed may be a feed made up, at least in part, of feeds for each individual advertiser. In one embodiment, the aggregate feed may be modified by the user to include a subset of the feeds or feed items in the aggregate feed.

In one embodiment, the feed formatted content publishing interface may include one or more options, for example as form elements, to specify one or more enhancement markers. For example, a payment marker, reward marker, event marker, or the like may be added to the content through the interface.

Figure 11:
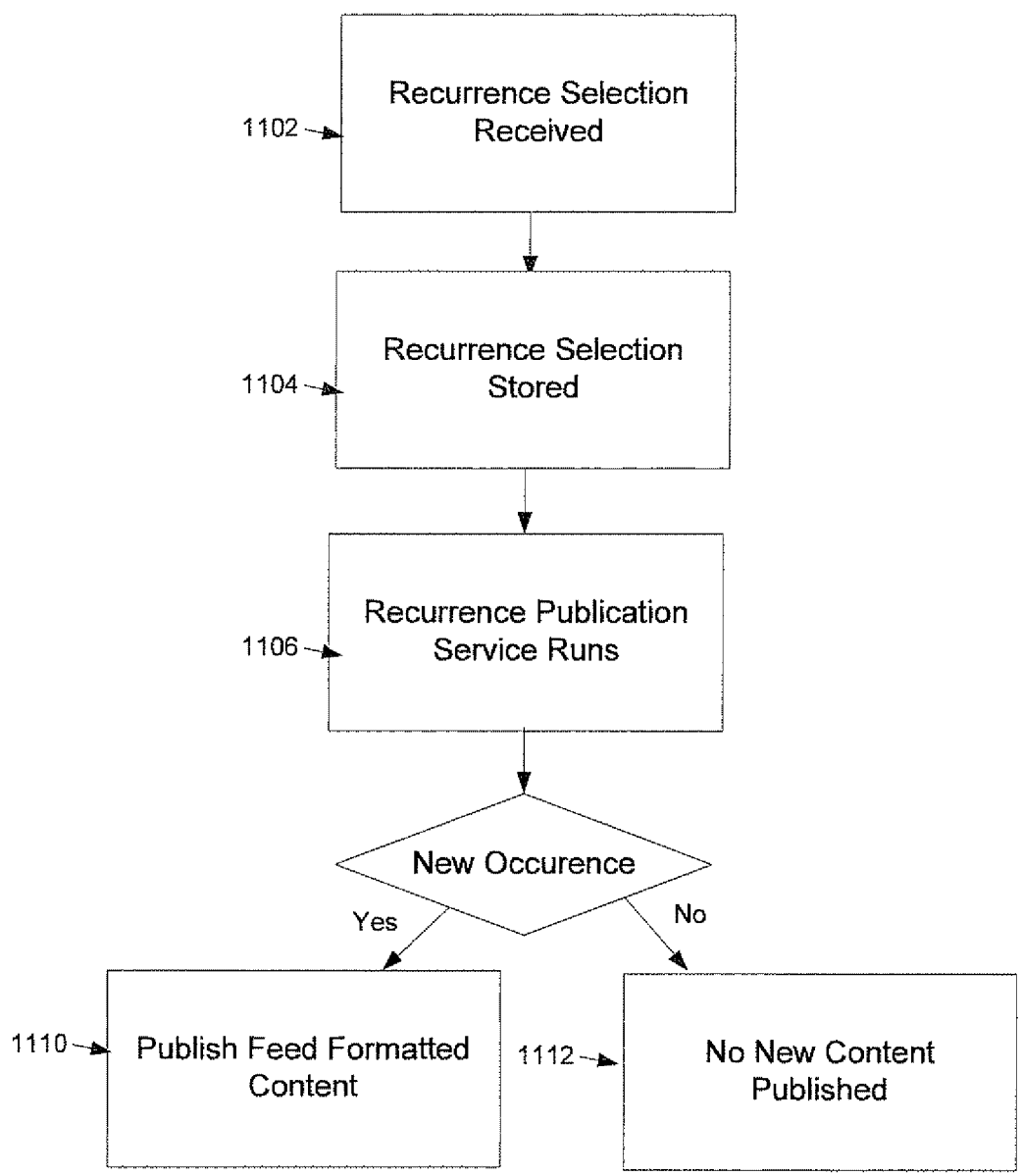
FIG. 11 illustrates a flowchart representative of one embodiment of a method for providing feed formatted content.

In one embodiment, the feed formatted content publishing interface may include interface options for specifying recurrence of feed formatted content. A user may enter one or more recurrence patterns. The publishing node may publish the feed formatted content based on the recurrence pattern. FIG. 11 illustrates a flowchart representative of one embodiment of a method for providing feed formatted content at 1100. A recurrence selection is received at the server at 1102. The server stores the recurrence selection at 1104. The recurrence selection is associated with at least a portion of feed formatted content. A recurrence publication service runs on the server or against the information on the server at 1106. The associated feed formatted content is then selectively published based on the recurrence selection and the recurrence publication service. If the recurrence publication service determines that a new occurrence has occurred, the feed formatted content is published at 1110. If the recurrence publication service determines that a new occurrence has not occurred, no new content is published at 1112.

For example, the recurrence selection could be expressed via an interface. A user may select that a certain feed item should be published at 5 pm on each Monday. The server may, in one embodiment, store the recurrence selection as a recurrence pattern format such as the standardized iCalendar format. The recurrence publication service may run once a minute to determine if any new items are due for publishing. This may be achieved by selecting one ore more recurrence patterns, for example all recurrence patterns, or active recurrence patterns, or recurrence patterns associated with active feed formatted content or users, and the recurrence publication service then projecting the selected recurrence patterns over the time period since it last ran. If a new occurrence falls into that time period, the feed formatted content may then be published. In one embodiment, the publishing node may insert at least one globally unique identifier in the feed formatted content based on the recurrence selection. This globally unique identifier may indicate to feed aggregation programs that the feed formatted content is fresh, even though it is recurring in nature. In one embodiment, a recurring content identifier may be inserted with the published content. A feed aggregation program may be configured to allow a user to filter out feed formatted content containing a recurring content identifier associated with recurring feed formatted content. In one embodiment, a conditional publishing rule may also be associated with the feed formatted content. The feed formatted content may be published based on both the recurrence pattern and the conditional publishing rule.

In one embodiment, the feed formatted content may include a different globally unique identifier (GUID) for some portion of the feed formatted content based on the recurrence pattern. A different GUID may allow a feed aggregator to recognize recurring feed formatted content as unique. Alternatively, the published date of one or more portions of the feed formatted content may change based on the recurrence pattern, and may provide a uniqueness indication.

In one embodiment, the published feed formatted content may include a recurring content identifier (RCID). The RCID may indicate that at least a portion of feed formatted content is recurring in nature.

Figure 12:
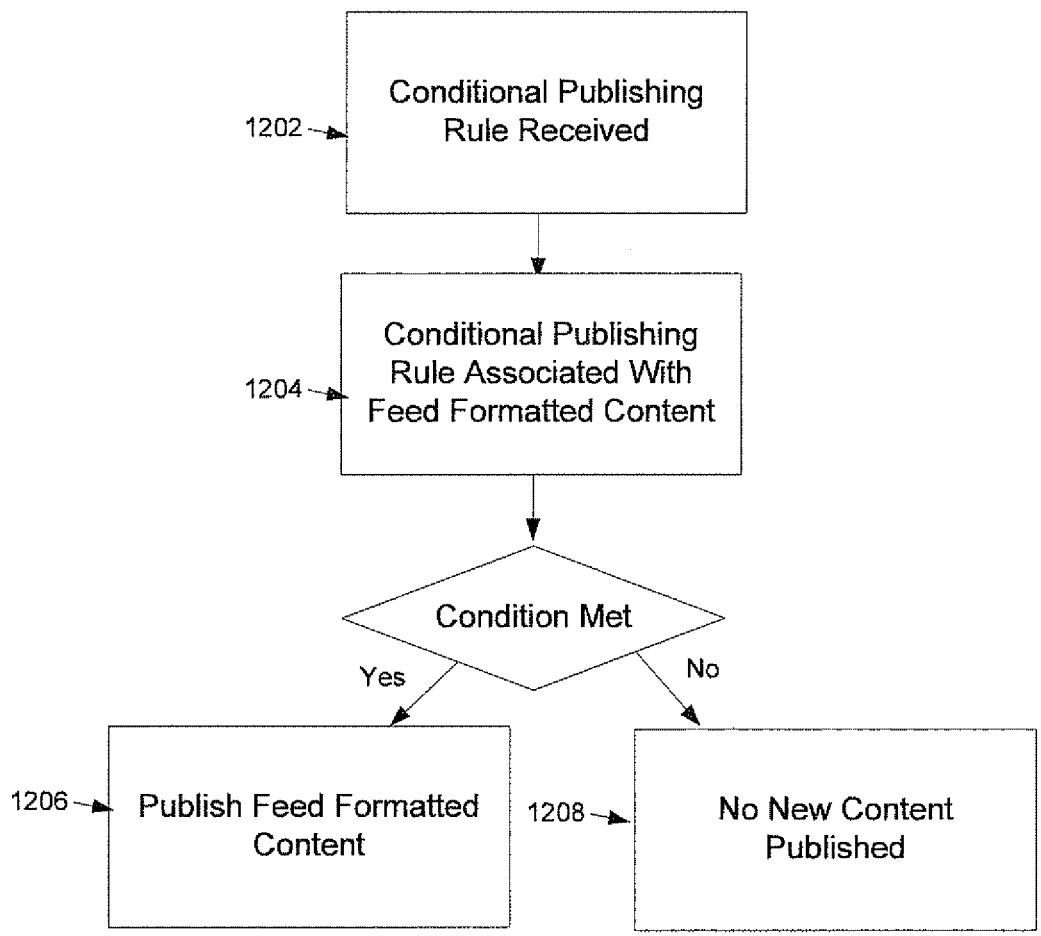
FIG. 12 illustrates a flowchart representative of one embodiment of a method for providing feed formatted content.

In one embodiment, the feed formatted content publishing interface may include the option to provide one or more conditional publishing rules. FIG. 12 illustrates a flowchart representative of one embodiment of a method for providing feed formatted content at 1200. A conditional publishing rule is received at the server at 1202. The conditional publishing rule is associated with feed formatted content at 1204. The feed formatted content is then published based on the conditional publishing rule. If the condition is met, the feed formatted content is published at 1206. If the condition is not met, the feed formatted content is not published at 1208. A user may enter one or more conditional publishing rules. The conditional publishing rules are associated with at least a portion of feed formatted content on the server or at an alternate location. The publishing node publishes the feed formatted content based on the conditional publishing rules. A conditional publishing rule may be a weather condition, a sporting event, a financial event, reservation availability, a product sale, or some other determinable condition. For example, a bar may have a beer garden open on weekend nights. A recurrence pattern may be associated with feed formatted content regarding the special. The recurrence pattern may indicate to publish the feed formatted content on Friday and Saturday of each week from May until November. The weather condition may be determined, in one embodiment, for example, by temperature or weather condition information in feed formatted content from a weather publishing service provider node. However, if one of those weekend days is not warm and/or has rain, the bar may wish that the feed formatted content not be published that day. A conditional publishing rule may be associated with the feed formatted content indicating that it should be published only if the weather is over a certain temperature. Another conditional publishing rule may be associated with the feed formatted content indicating that it should not be published if it is not raining. Weather information may be provided, for example, as feed formatted content by a service provider. The publishing node may receive the weather information and selectively publish the feed formatted content based on the weather information and the conditional publishing rules. Other examples of conditional publishing rules include rules based on portions of or outcomes of sporting events, stock prices, product sales, reservation availability, or the like. A service provider may provide such information, or it may be provided by the publishing node, or by the advertising node.

Figure 13:
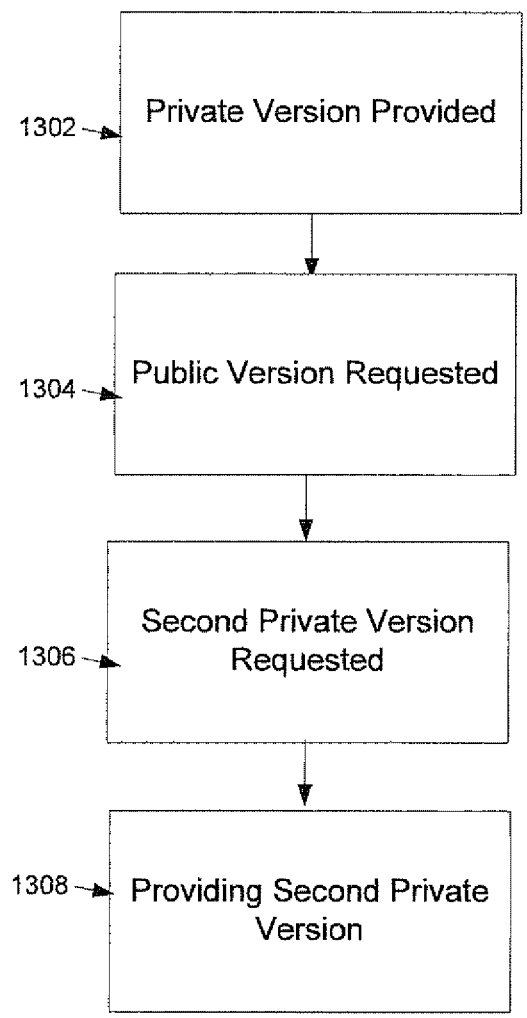
FIG. 13 illustrates a flowchart representative of one embodiment of a method for tracking feed formatted content.

In one embodiment, the feed formatted content publishing interface may include tracking information. In one embodiment, the publishing node may collect the tracking information for display on the interface. Alternatively, the publishing node may employ a service provider for the tracking information such as, for example, that provided by FeedBurner. FIG. 13 illustrates a flowchart representative of one embodiment of a method for tracking feed formatted content at 1300. A publishing node hosts a private version of feed formatted content at 1302. The publishing node may receive a request a public version of feed formatted content 1304. The publishing node may request a second private version of feed formatted content based on the first private version of feed formatted content 1306. The publishing node may publish the public version of feed formatted content based on the second private version of feed formatted content 1308.

Figure 14:
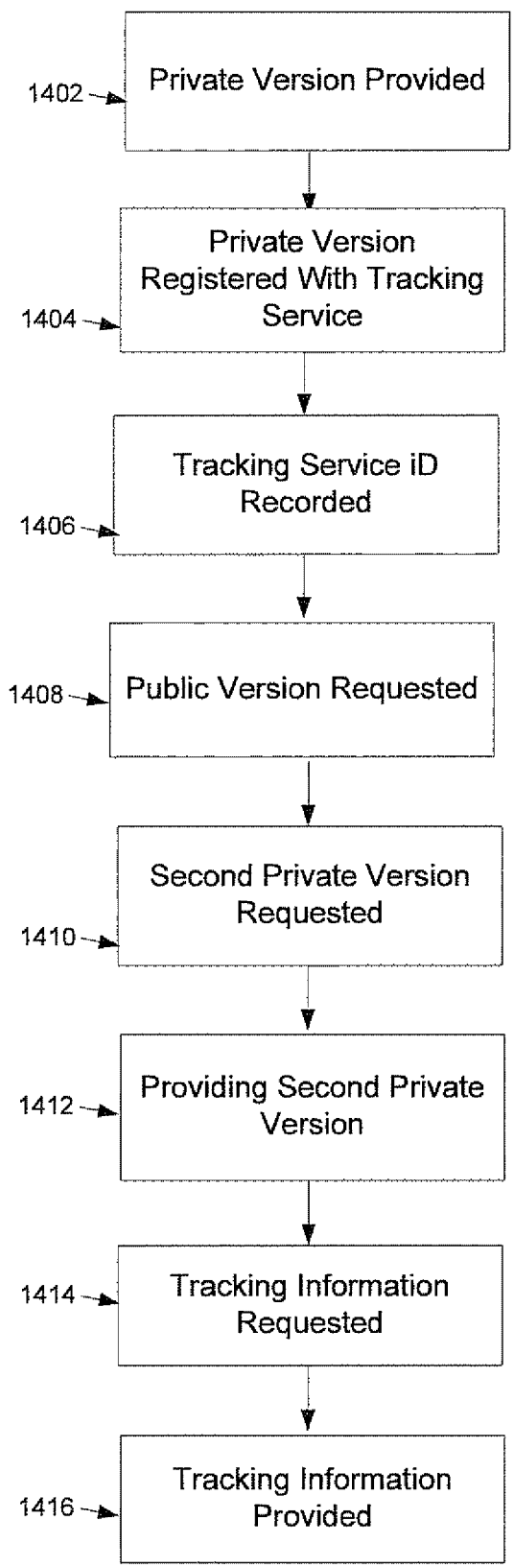
FIG. 14 illustrates a flowchart representative of one embodiment of a method for tracking feed formatted content.

In one embodiment, the publishing node may register the first private version of feed formatted content with the tracking information service provider. FIG. 14 illustrates a flowchart representative of one embodiment of a method for tracking feed formatted content at 1400. The publishing node may post the URI of the private version of feed formatted content at 1402 and provide it to the tracking information service provider at 1404. Other information may be included in the post such as publisher information, feed title, URI information, or feature selection information. The publishing node may store the tracking service identifier at 1406, for example URI of the second version of the feed formatted content as provided by the tracking information service provider. In one embodiment, the publishing node may cache the second version of the feed formatted content. The publishing node may, when it receives a request for the public version of feed formatted content at 1408, request the second version of the feed formatted content at 1410, and publish that feed formatted content to the requestor at 1412. Alternatively, the publishing node may provide the cached feed formatted content. The publishing node may request tracking information at 1414 from the tracking information service provider and provide it at 1416, for example displaying it to a user via the feed formatted content publishing interface. In one embodiment, the publishing node may cache the tracking information. In one embodiment, the private version of the feed formatted content may include one or more recurrence selections, one or more conditional publishing rules, or a combination of selections and rules, and may be published based on these selections and rules.

Figure 15:
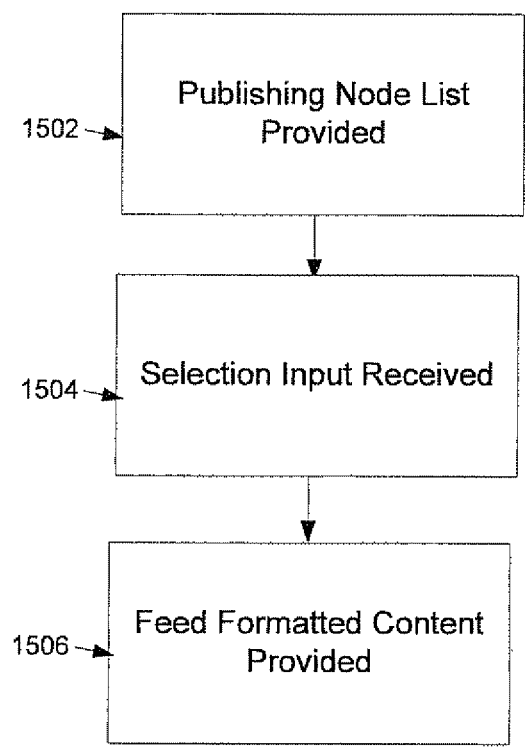
FIG. 15 illustrates a flowchart representative of one embodiment of a method for providing feed formatted content.

FIG. 15 illustrates a flowchart representative of one embodiment of a method for providing feed formatted content at 1500. A publishing node list is provided by a server at 1502. A selection input is received by a user at 1504. The selection input includes identifiers for one or more publishing nodes. A publishing node then provides feed formatted content at 1506. The feed formatted content may be provided to the publishing nodes selected by the user. Payment or consideration may be required based on the selection input. For example, a certain site may charge a monthly fee to have feed formatted content included on its site. Alternatively, a site may require a feed formatted content exchange. By selecting to have feed formatted content on that site, a publisher may be agreeing to publish that site's feed formatted content on his own. In one embodiment, a publishing node may have the option to select acceptance or denial of the feed formatted content based on the selection input of the user. Individuals may contact each site individually to have their content published on those sites, or there could be an interface displaying the end site options and, for example, the amount each costs or the consideration required. This end site publishing node list and interface may be associated with a feed publishing interface or may be provided independently of such an interface. If it is provided independently, the user may specify a feed source for the information they wish to syndicate.

One embodiment of the present invention provides for sponsorship of feed formatted content. Sponsorships may be provided for entire feeds, for aggregate feeds, for individual feed items or subsets of a feed, or for groups of feed formatted content. Sponsorships may be provided in a variety of ways. For example, a feed item may include extra text in the description or title element indicating the sponsorship. Alternatively, when a link in a feed item is clicked, the user may be taken to an intermediate sponsorship page. An intermediate sponsorship page is a page that audibly or visibly indicates association with a sponsor. This intermediate sponsorship page may include a link to the actual desired content, or the page may refresh to display the desired content after a set period of time. In one embodiment, feed formatted content may include an audio or visual marker that is identified and played by the IAP when the feed formatted content is accessed. For example, when a feed formatted content is retrieved from News.com, an audio marker may be included for Intel. When the feed formatted content is provided, the audio marker may be identified and a linked audio file may be played that says, "This News.com feed is sponsored by Intel," followed by the Intel jingle.

Figure 16:
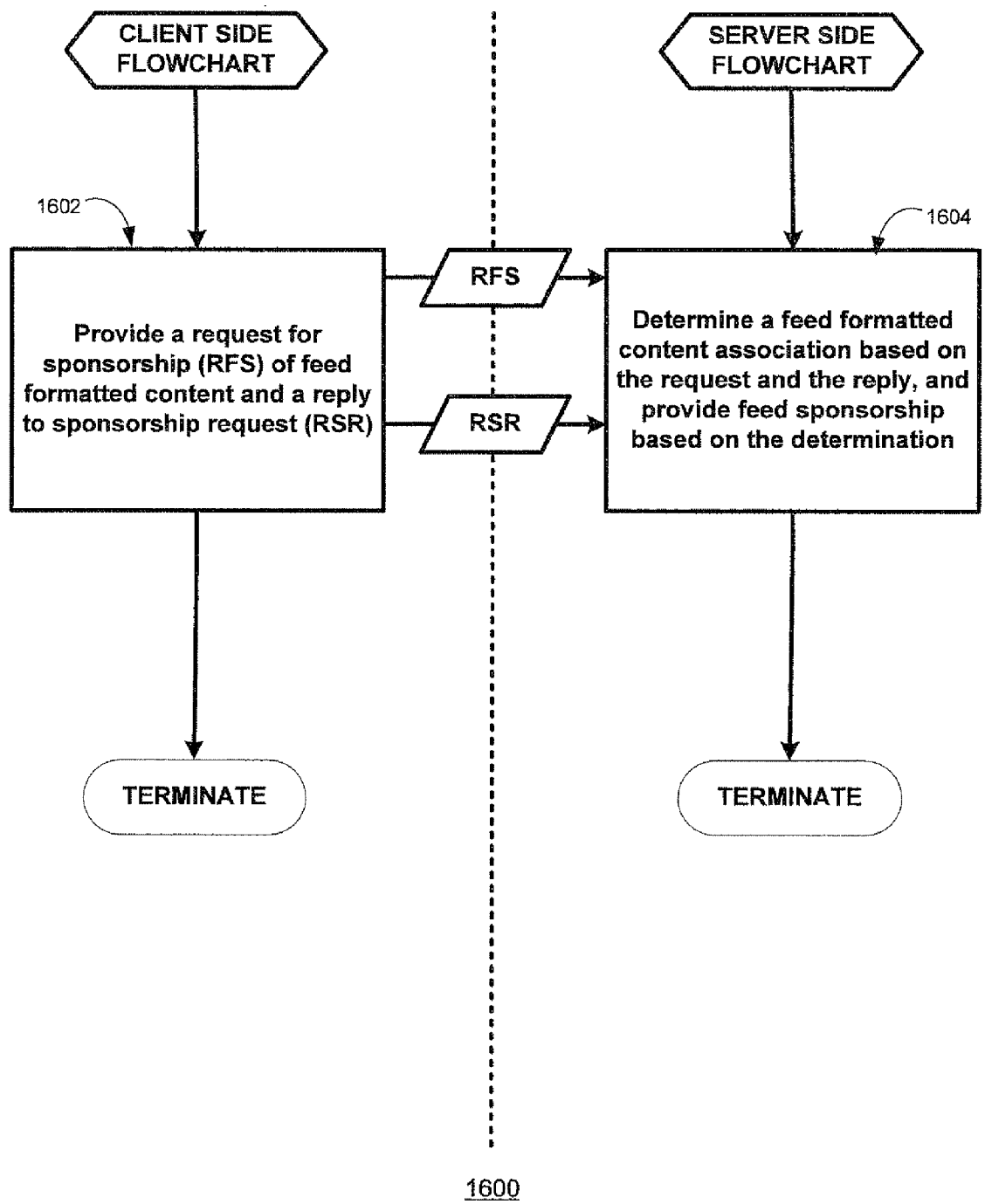
FIG. 16 illustrates a flowchart representative of one embodiment of a method for feed sponsorship.

FIG. 16 illustrates a flowchart representative of one embodiment of a method for feed sponsorship at 1600. One or more clients provide a request for sponsorship of feed formatted content and provide a reply to sponsorship request at 1602. A server determines a feed formatted content association based on the request and the reply, and provides feed sponsorship based on the determination at 1604. A request for sponsorship or a reply to sponsorship may include proposal information such as pricing terms, type of sponsorship allowed, editorial control information, author restriction, time of day, day part, audience demographics, keyword or subject, or the like. Editorial control may include the ability to disassociate a sponsorship with at least a portion of feed formatted content, to edit the content, to approve the content, or the like, prior to publication. Author restriction may include a specification of an author of at least a portion of the feed formatted content requesting sponsorship, the portion determined by the author associated with the content. In one embodiment, the request and/or reply may be provided via an online sponsorship interface. In one embodiment, usage information may be tracked for a plurality of feed formatted content sources. A portion of the feed formatted content, for example the title, and associated tracked feed formatted content usage information, for example number of subscribers, may be provided on the sponsorship interface. The request for sponsorship may be received from an author of the feed formatted content. An author of feed formatted content may be the actual author of the feed formatted content, an agent of the author, or some other representative of the feed formatted content source. The reply to sponsorship may be provided by an author of feed formatted content or by a potential sponsor.

Figure 17:
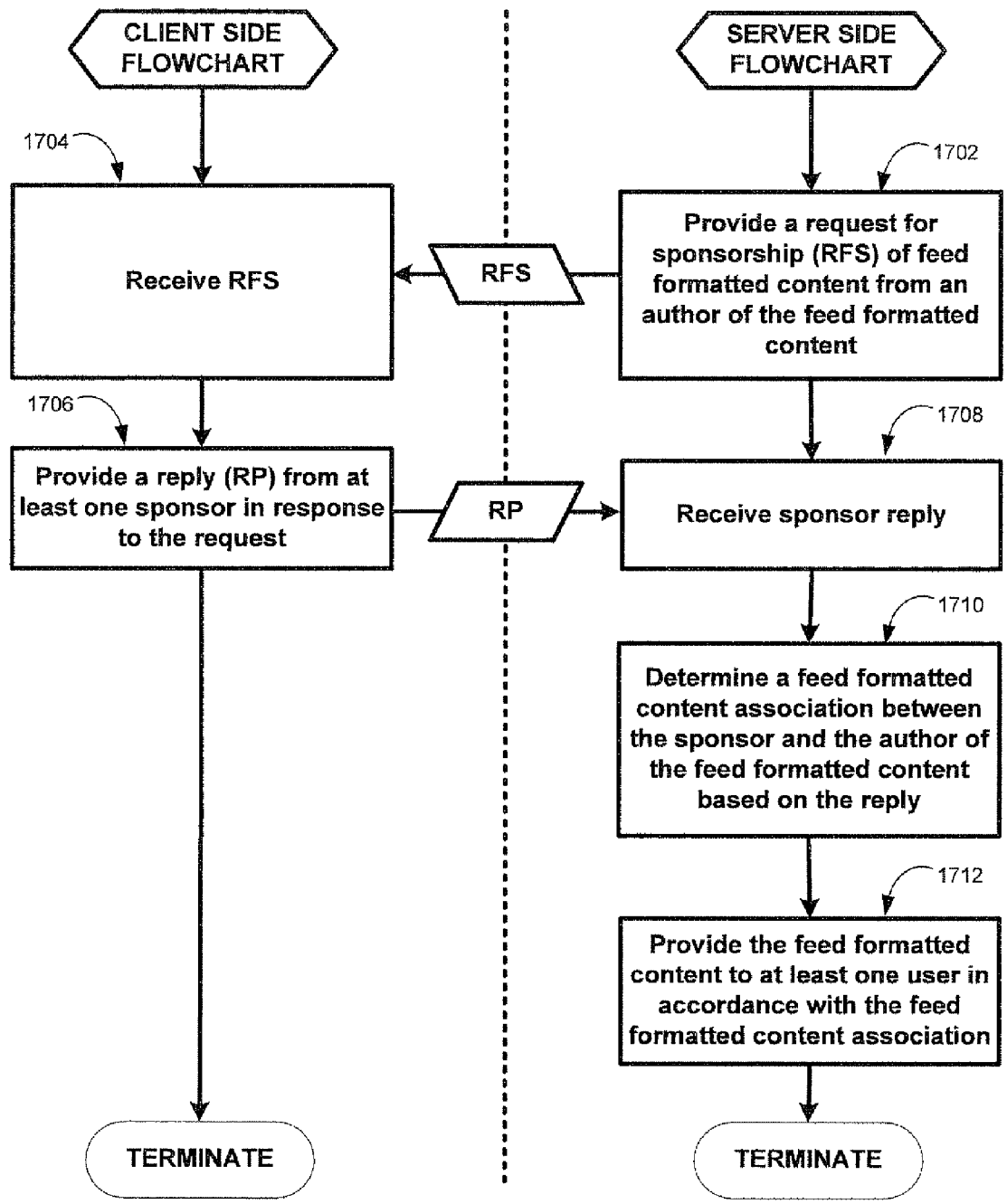
FIG. 17 illustrates a flowchart representative of one embodiment of a process for feed sponsorship.

FIG. 17 illustrates a flowchart representative of one embodiment of a method for feed sponsorship at 1700. A server provides a request for sponsorship of feed formatted content from an author of the feed formatted content at 1702. The request for sponsorship is received at 1704 by a sponsor. A reply is provided by the sponsor in response to the request at 1706. The server receives the sponsor reply at 1708. The server determines a feed formatted content association between the sponsor and the author of the feed formatted content based on the reply at 1710. The server provides the feed formatted content to at least one user in accordance with the feed formatted content association at 1712. Providing the feed formatted content to the user may include providing one or more links in the feed formatted content that deliver an intermediate sponsorship page.

Figure 18:
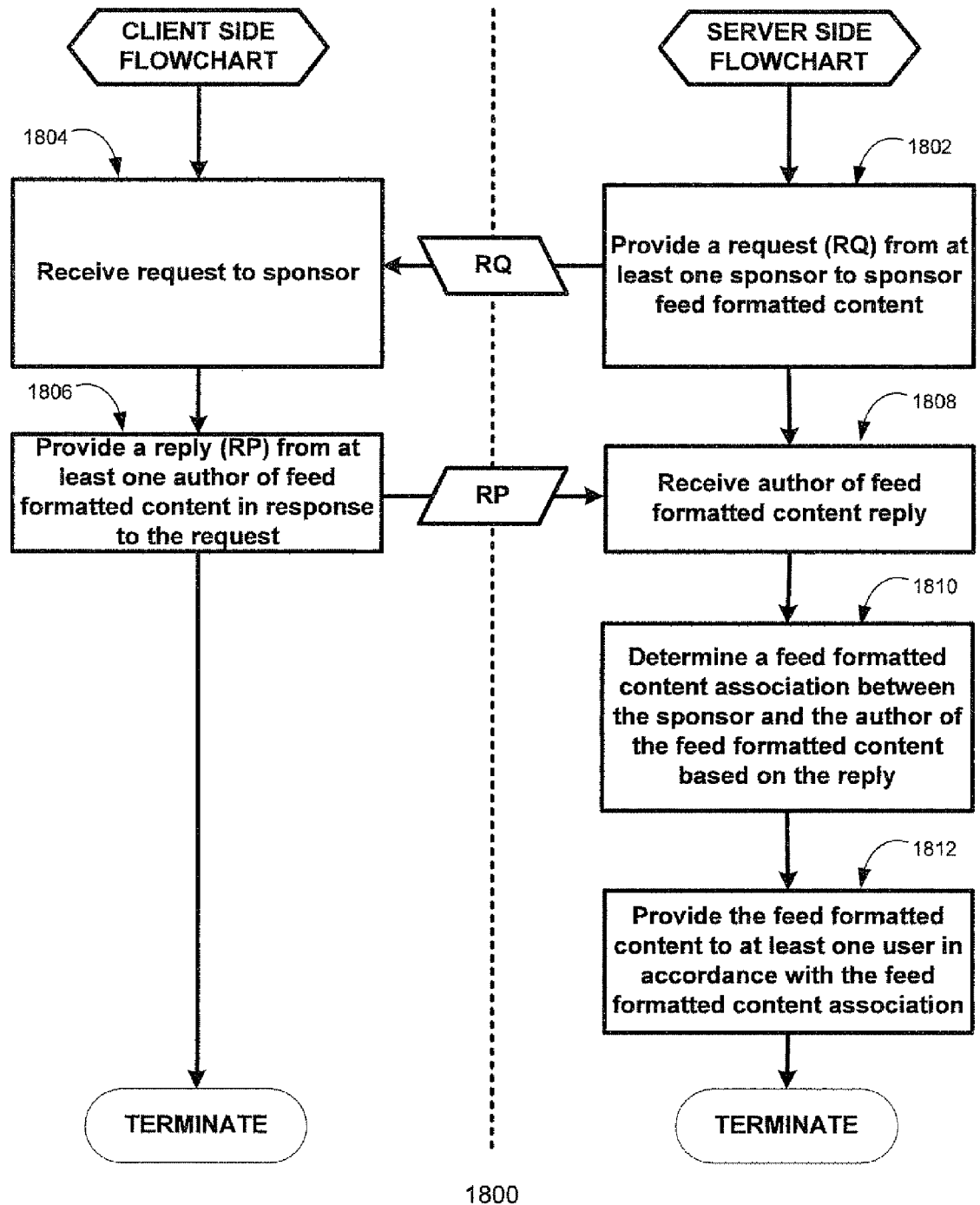
FIG. 18 illustrates a flowchart representative of one embodiment of a process for feed sponsorship.

FIG. 18 illustrates a flowchart representative of one embodiment of a method for feed sponsorship at 1800. A server supplied a request from at least one sponsor to sponsor feed formatted content at 1802. The request to sponsor is received by an author of feed formatted content at 1804. The author of feed formatted content provides a reply to the request at 1806. The server receives the reply at 1808. The server determines a feed formatted content association between the sponsor and the author of the feed formatted content based on the reply at 1810. The server provides the feed formatted content to at least one user in accordance with the feed formatted content association at 1812.

In one embodiment, there is an opportunity for the author or sponsor to review and accept replies prior to feed provision 1712 or 1812. For example, an author may decide that a sponsor that has replied to his sponsorship request is not suitable for his feed formatted content. Though a feed formatted content sponsorship association has been established 1710, the author may not approve the association and the feed formatted content may never be provided with that sponsorship. In one embodiment, the sponsor may include a request for editorial control over a channel as part of their sponsorship response. Again, an author may decide that this is not suitable for his feed formatted content and may deny the sponsorship.

In one embodiment, an interface is provided to aid in the process of providing sponsored feed formatted content. For example, feed formatted content may be categorized and browsed by subject, or searched for based on descriptive key word or based on key words included within the feed formatted content. Current subscription information associated with the feed formatted content may also be used to select or solicit sponsorships of certain feed formatted content. For example, a potential sponsor may use an interface that allows them to select feed formatted content with subscription numbers over ten thousand, and of a certain demographic makeup, such as more than seventy percent female and with an average age under 18.

In one embodiment, a sponsor may designate a geographic region identity in which they wish to sponsor feed formatted content. In one embodiment, a geographic region identity may be supplied in the sponsor reply. A geographic region identity is a set of parameters that define a geographic point or area. For example, a geographic region identity may be specified by providing a center point, be that a zip code, city, or precise longitude and latitude coordinates, and also providing a radius from that center point. When a zip code, city, or the like is provided as a point, the system may determine a latitude and longitude point within the provided area, for example at the centermost point. In one embodiment, the geographic region identity includes the entire zip code, city, or like area in the geographic region identity even if portions of it would be excluded by the determined center point and the provided radius. Alternatively, only the area determined by the center point and the provided radius are included in the geographic region identity. Providing multiple points that form a polygon may also specify a geographic region identity. Again the points may be zip code, city, or latitude and longitude coordinates, and the same inclusion and exclusion embodiments are included as described above. In one embodiment, a geographic region identity includes one or more zip code, city, state, country, or other region selections. In one embodiment, a geographic region identity may be determined by any combination of the above-described embodiments. For example, a center point and radius may be specified in addition to a list of cities to include. As another example, multiple center point and radius pairs may be specified. A geographic region identity may also include areas of exclusion. For example, a center point and radius may be specified that includes ten zip codes, but the user may specify that one of those zip codes is to be excluded.

In one embodiment, a geographic region identity may be determined based on double or single confirmation targeting. A geographic region identity may be determined based on a user profile on a site supplying the feed formatted content, or it may be determined from a profile on another site, such as Yahoo®. Alternatively, a geographic region identity may be determined by IP-to-geography translation. An IP-to-geography service, such as that provided by Digital Envoy, may be used to determine the location of the request.

The geographic origin of a request for sponsored feed formatted content may be determined in a variety of ways. The geographic region identity a sponsor has designated may be included in proposal information. Alternatively, a sponsor database holding sponsor information may include location information that may be associated with one or more sponsorship proposals. In one embodiment, the determination of feed formatted content sponsorship association 1710 and/or 1810 includes the geographic region identity. In one embodiment, the provision of a sponsored feed formatted content 1712 and/or 1812 includes the geographic region identity. Based on the geographic origin of a request for feed formatted content, a sponsor may be associated with the feed formatted content. Different sponsors may be associated with the same feed formatted content based upon requests for feed formatted content from different geographic origins. Different sponsors may also be associated with the same feed formatted content based on day part, profile demographics or any other method of online targeting known in the art.

In one embodiment, a sponsor may specify an author of feed formatted content in their sponsorship request or in their response to a sponsorship request. For example, a request for feed formatted content sponsorship may have multiple authors, and author markers may be included in the feed formatted content to identify each author. A sponsor may select to portions of the feed formatted content that is from one or more authors by including the author or author marker in their proposal information. An individual author of feed formatted content that is displayed in multiple feeds may also submit a request for sponsorship, and sponsorship associations may be made in association with that author.

Figure 19:
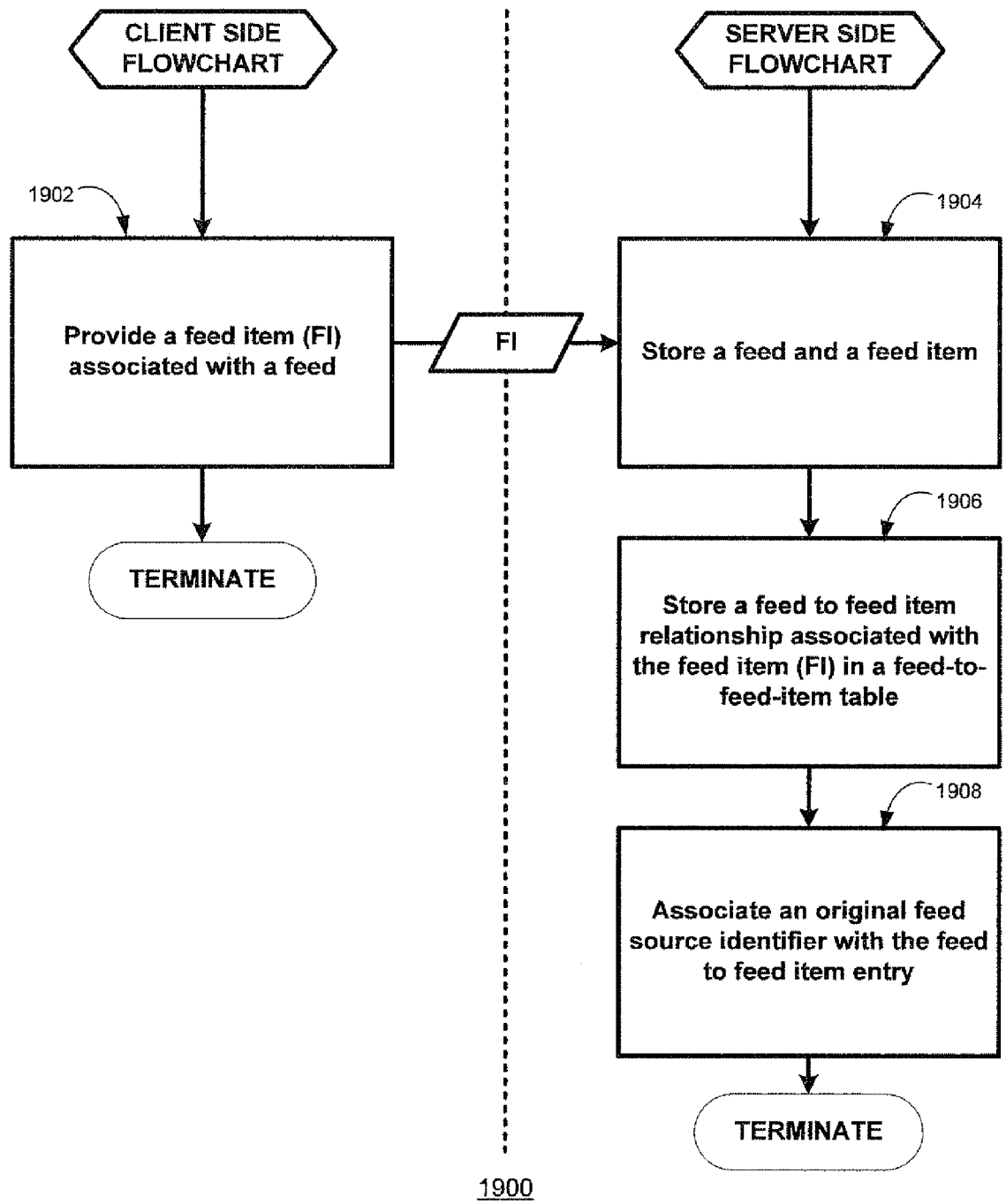
FIG. 19 illustrates a flowchart representative of one embodiment of a method for indexing feed items within a database.

In one embodiment, publisher 140 maintains a database of feed formatted content. The database may be modeled so that a feed item may be indexed to more than one feed. This may serve to limit the total number of feed entries stored in the database as it avoids duplication. For example, the database may contain a feed table, a feed item table, and a feed-to-feed-item table. FIG. 19 illustrates a flowchart representative of one embodiment of a method for indexing feed items within a database at 1900. A feed formatted content publisher provides a feed item associated with a feed at 1902. A server stores the feed and feed item in a database at 1904. The server stores a feed-to-feed-item relationship associated with the feed and feed item in a feed-to-feed-item table at 1906. In one embodiment, the server may also associate an original feed source identifier with the feed-to-feed-item entry at 1908. For example, feed entry in the feed table may represent a feed from Yahoo® News. When the Yahoo News feed is read into the database, its feed information may be received in a feed table and an entry for a feed item is inserted into the feed item table, and an entry is also inserted into the feed-to-feed-item table associating the Yahoo News feed item with the Yahoo News feed. The feed-to-feed-item table may include a flag that signifies that an entry represents the original feed-to-feed-item source relationship. In this example, the entry for the Yahoo News item in the feed-to-feed-item table would indicate by the flag that this is an original source entry. Alternatively, the feed-to-feed-item table may include a column identifying the original feed. As another alternative, an entry date may be used to identify an original source entry as one may assume that the earliest date indicates the original source.

Figure 20:
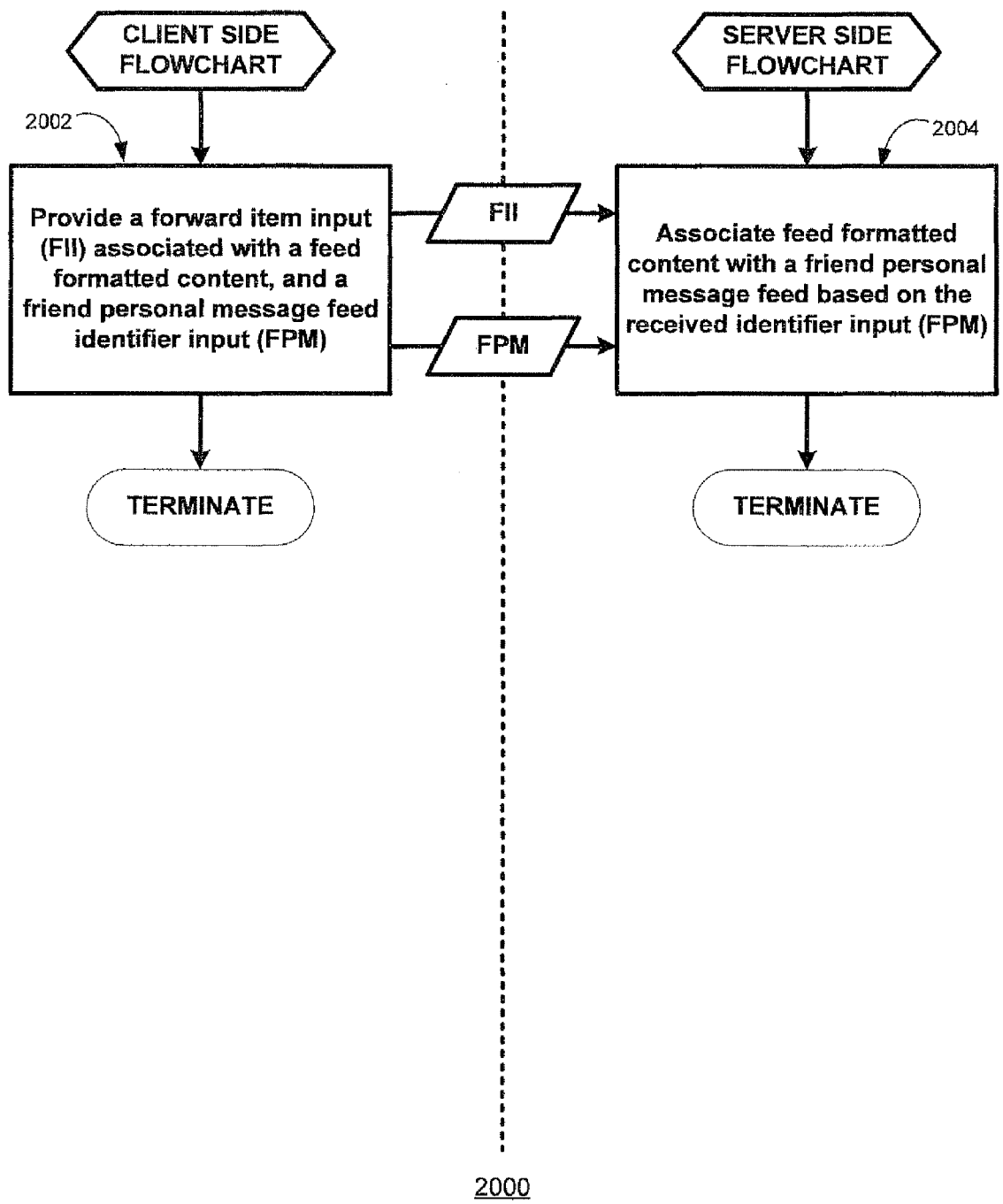
FIG. 20 illustrates a flowchart representative of one embodiment of a method for sharing feed formatted content.

FIG. 20 illustrates a flowchart representative of one embodiment of a method for sharing feed formatted content at 2000. A client provides a forward item input associated with feed formatted content and a friend personal message feed identifier input at 2002. A server associates the feed formatted content with a friend personal message feed based on the received input at 2004. For example, a user that receives the Yahoo News feed item may then wish to forward the feed item to a friend. When the user forwards the feed item, a new entry may be inserted into the feed-to-feed-item table associating the Yahoo News item with a second feed. For example the association may be made with a personal message feed for the friend, or a recommended item feed for the user. In one embodiment, new copies of feed items are inserted into a feed item table when they are associated with a new feed. A friend personal message feed identifier may be associated with a social network.

Figure 21:
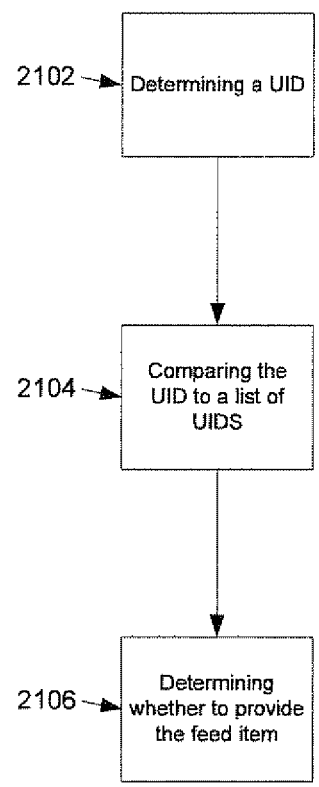
FIG. 21 illustrates a flowchart representative of one embodiment of a method for providing unique feed formatted content.

In one embodiment, it may be beneficial to identify unique feed formatted content. FIG. 21 illustrates a flowchart representative of one embodiment of a method for providing unique feed formatted content at 2100. During stage 2102 of the flowchart 2100, a feed item is processed to determine a unique identifier (UID). In one embodiment, a UID may be the link element 108 of the feed item. Alternatively, the UID may be a combination of factors such as an included posted or published date element and the feed source. The feed source used in this determination may be the feed requested or through examination of an element such as an original source feed element. In one embodiment, the element or elements used as a UID for a feed item may vary by feed. For example, a feed representing real estate listings may contain an element for the Multiple Listing Service Identifier (MLS ID). For this feed the MLS ID, or a combination of the MSL ID and other information, may serve as the UID. In one embodiment, a UID may be selected manually by a user, or by a site or service administrator. The process selected to generate a UID may vary by feed source. In one embodiment, a UID may be generated through the concatenation of any of the following: the feed URI or identifier, the feed or feed item publication date, the feed item title, the feed item link, or an included feed item globally unique identifier (GUID). In one embodiment, the concatenated string may be converted to a data format such as binary, or varbinary that may provide faster comparison.

In one embodiment, the unique feed item provision may be to the user at user node 220. Alternatively, the unique feed item provision may be to some other node of the present system 200. Upon completion of stage 2102, the UID is compared to a list of UIDs associated with the receiving node at 2104. The list may be maintained at a PCP, OCP, ACP, at a remote server, or at the receiving node 220. The comparison may also take place at any of these nodes. Based upon the comparison, it is determined whether to provide the feed item 2106 to the receiving node.

In one embodiment, a marker may be provided in the feed formatted content specifically to provide unique identification. The UID marker may be generated by appending or hashing feed source information with a posted date or locally generated ID. The combination of a locally generated item ID with a URL that uniquely identifies the location provides a globally unique identifier when the combination method employed is the same for each source of feed formatted content. Alternatively, a third party service provider could be used to generate UIDs for inclusion in feed items or other feed formatted content. When a feed item or other feed formatted content is generated by some source, a request could be made to the third party source for a UID, and this UID could be included in the feed item or other feed formatted content.

In one embodiment, a server may collect feed formatted content from one or more content servers. Collected feed items may be stored in a database. When the collecting server pulls in feed formatted content, it may be desirable to only update the database with new and unique feed formatted content. The UID may be stored in the database with the associated feed formatted content, and when feed formatted content is collected, the one ore more UIDs associated with the new feed formatted content may be compared against the UIDs in the database to determine whether any portion of the feed formatted content is to be added to the database. In one embodiment, the UID may be generated in such a way that it can be deconstructed into its concatenated parts. The UID may also be generated in such a way that it may be used for ordering purposes. For example, if the first concatenated string is the publication date and some ordering algorithm is based on how recently a feed item was published in comparison to other feed items, the UID may substitute for the publication date for ordering purposes.

In one embodiment, a feed formatted content aggregation server may employ a method for providing unique feed items or feed formatted content. A user subscribes to one or more feeds, and the feed formatted content aggregation server provides the user with the feed formatted content. When a first feed item is retrieved from a feed that the user is indexed to, the feed item and its associated UID are indexed to the user. Each subsequent feed item from a feed indexed to the user that is received at the IAP server will have its UID compared against the list of UIDs indexed to that user. In one embodiment, if the UID is already indexed to the user, the feed item is not indexed or displayed to the user. Alternatively, the feed item may be indexed to the user but marked as read or viewed, marked as a duplicate and not displayed. In one embodiment the duplicate feed item may still be displayed to the user, and it may include some marker to indicate to the user that the feed item is a duplicate.

In one embodiment, determining a UID 2102 includes indexing and comparing the entire contents of a feed item, and may also include scanning all resources linked to from the feed item. Comparing the UID to a list of UIDs 2104 may include producing a uniqueness quotient. This uniqueness quotient may be used to determine feed formatted content indexing, and/or ranking, and/or display. By way of example, when a user is subscribed to more than one news feed, for example Yahoo Top Stories and CNN Top Stories, these news feeds may publish similar feed formatted content. For example, both may publish a story based on the same Associated Press (AP) release. The feed formatted content aggregation server may determine the similarity and a uniqueness quotient based on keywords, full text, content source, or the like. The server may then suppress a feed item or other feed formatted content based on a low uniqueness quotient—one that indicates that a feed item or feed formatted content is highly similar to one or more feed items or other feed formatted content previously received. In one embodiment, feed formatted content published based on the same information, for example an AP release, may include a story-source identifying marker. Stories may then be optionally filtered based on this marker. In one embodiment, the user may specify whether they wish to receive similar feed items either by a simple yes or no selection or by specifying a uniqueness quotient threshold. The same determination process may be used for all feed formatted content, feeds and feed items, or it may vary by feed formatted content, feed and feed item. For example, two stock quote feed items from the same feed may contain precisely the same information but represent the quote price at different times. This feed might ignore or place a low requirement for a uniqueness quotient.

In one embodiment a feed formatted content aggregation server may aggregate or generate recurring feed formatted content. In one embodiment the feed formatted content may include an existing UID or may generate an existing UID such as through one of the methods described above. Based on the duplicate UID, the feed formatted content aggregation server may perform one of several actions. For example, the duplicate UIDs may be associated with an existing and collected feed item. In one embodiment, a duplicate entry may be included in a feed item table. In one embodiment, the existing feed item entry is marked as active. In one embodiment, the database may include a feed item instance table. When a feed item with an existing UID is received by the system, a new feed item instance entry associated with the existing feed item may be inserted. In one embodiment, a new entry is only inserted if the feed item with the existing UID is not currently active when the duplicate is received. The feed formatted content aggregation server may include a user-to-feed-item-instance table that indicates whether a user has viewed, read or received a feed item.

In one embodiment, a feed formatted content aggregation server may maintain a list of sources for feed formatted content, a list of users, and a list of user subscriptions to feed formatted content. The lists may be maintained in tables of a database. In one embodiment, the table of sources of feed formatted content may include a last updated date, a next update date, an update frequency, a number of failed updates, and a feed status. In one embodiment, a automatic feed update program, for example a daemon, service, chron job or the like, may update the locally stored feed formatted content. The automatic feed update program may select the feeds requiring update. Feeds requiring update may be determined, for example, based upon whether a user is subscribed to the feed, how many users are subscribed to the feed, what the feed status type is, and/or what the last update or next update dates are. For example, if no one is subscribed to a feed, the service may not select that feed for update. When the service has received a list of one or more feeds that require updating, a routine may be executed to update the locally stored feed formatted content. The update procedure may be executed within the automatic feed update program or may execute an external individual feed update program, for example a web service or the like. In one embodiment, the web service may be an asynchronous web service. Updating feed formatted content may be performed in a variety of ways. For example, the feed formatted content may be copied in whole or in part from its source and stored locally. In one embodiment, the feed formatted content may be converted into one or more standardized formats. For example feed formatted content may be collected from sources in atom format and RSS format, and these are converted into one standardized format, for example RSS. Conversion may include, for example, placing data in the content element of an atom feed, into the description element of an RSS feed. In one embodiment, if the individual feed update program fails, the number of failed updates count for the feed may be incremented. In one embodiment, the update may be reattempted either immediately, or after a set period. In one embodiment, after a certain number of failed updates, the waiting period before the next attempted update may increase. In one embodiment, after a number of failed updates, the feed status may be updated to a failed update status. The feed update program may not select feeds with a failed update status. A failed update status may alert users and/or administrators of the system.

Figure 22:
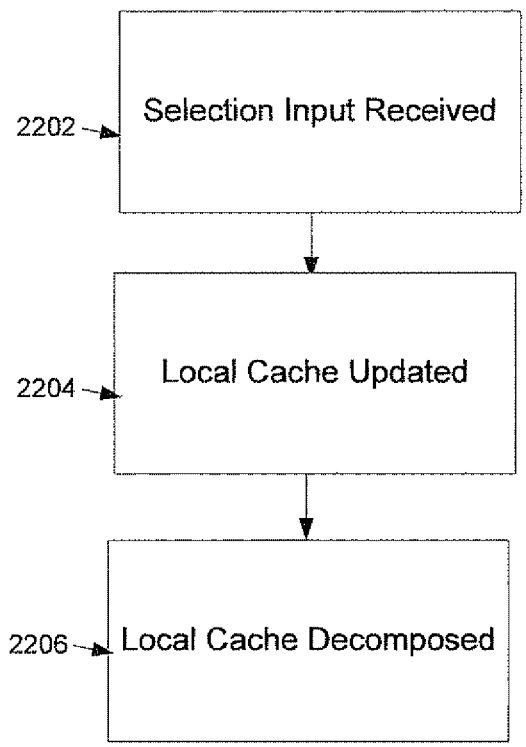
FIG. 22 illustrates a flowchart representative of one embodiment of a method for aggregating feed formatted content.

In one embodiment, a feed formatted content aggregation server may decompose feed formatted content into a database. FIG. 22 illustrates a flowchart representative of one embodiment of a method for aggregating feed formatted content at 2200. Selection input is received at a server at 2202. A local cache at the server is updated at 2204. The local cache is decomposed at 2206. For example, the database may include storage for a local cache of the feed formatted content in its entirety, as well as individual rows for each feed item within a feed. An individual feed update program may decompose the feed formatted content into the individual rows on receipt of the feed. Alternatively, the individual feed update program may update the composed local cache of the feed formatted content. In one embodiment, when the individual feed update program completes an update successfully, the last updated date for the feed may be updated. In one embodiment, when the last updated date is updated, the next update date may also be updated, for example based on the update frequency. For example, the feed update program may execute at 12:35 pm on a particular day. The feed update program selects a feed with a next update date of 12:31 pm, and an update frequency of 2 hours. The feed update program executes the individual feed update program for the feed. If the individual feed update program succeeds at 12:36 pm, the last updated date may be set to 12:36 pm, the next update date may be set to 2:36 pm. In one embodiment, a successful update also may set the number of failed updates back to zero, and may also set the feed status to active or updating correctly.

As stated, in one embodiment, the individual feed update program updates the local store of feed formatted content but not decompose the feed formatted content. In one embodiment, a feed formatted content decomposition program may perform this action independent of the update process. A feed formatted content decomposition program may decompose individual feeds, a group of feeds, or all the feeds in the database.

In one embodiment, the individual feed update program may be executed based on other processes. For example, if a user of the system selects to view a feed, the system may check the last updated date associated with the feed. Based on the last updated date, the system may call the individual feed update program. A user selecting to view a feed may be performed by the system selecting the locally stored feed formatted content. By way of another example, a feed formatted content aggregation server may provide one or more methods, for example a web service, to allow external feed sources to signal that they have posted new feed formatted content. Based on the signal, the individual feed update program may be executed for that feed.

Figure 23:
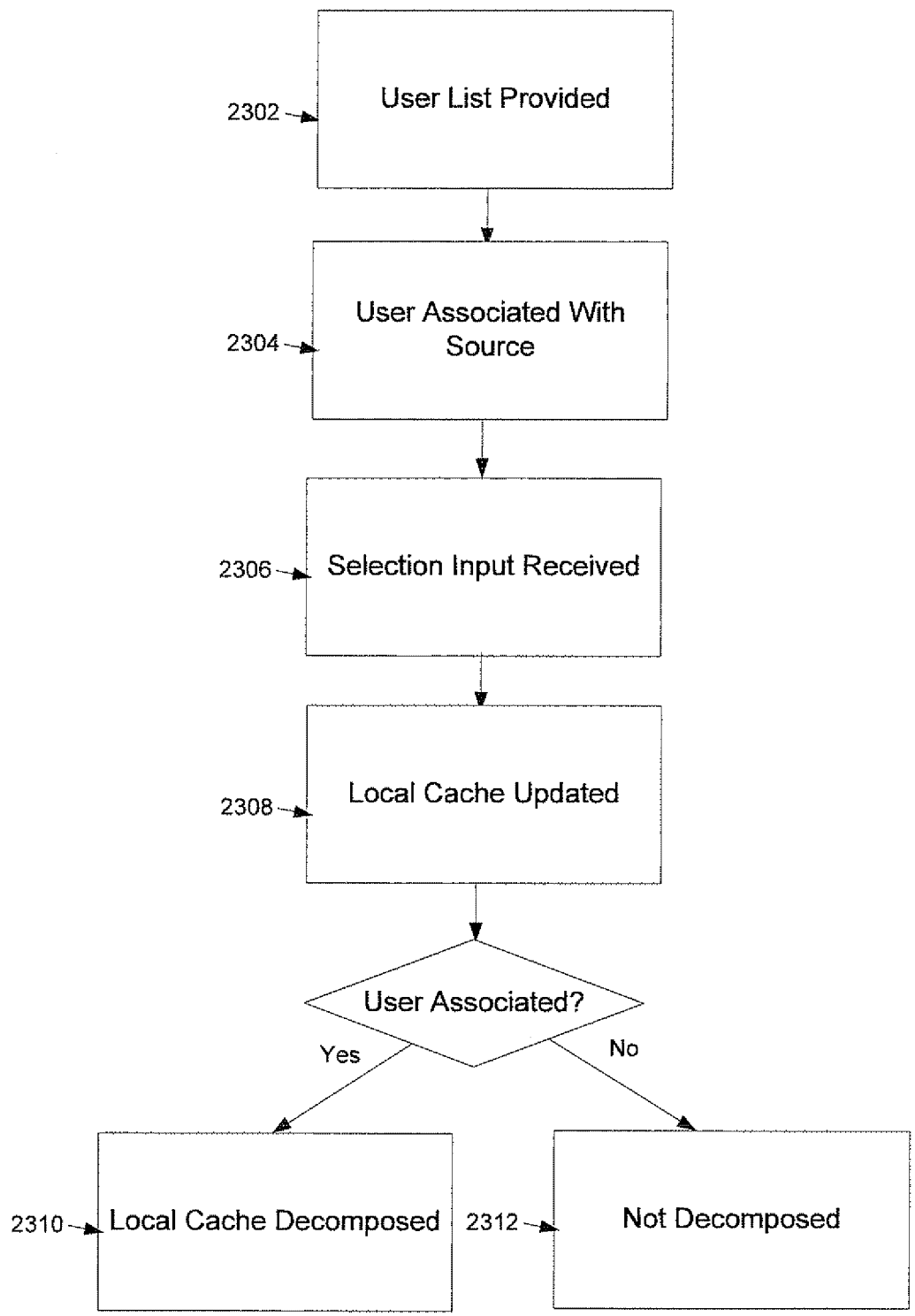
FIG. 23 illustrates a flowchart representative of one embodiment of a method for aggregating feed formatted content.

FIG. 23 illustrates a flowchart representative of one embodiment of a method for aggregating feed formatted content at 2300. A user list is provided at a server at 2302. At least one of the users is associated with a feed formatted content source at 2304. A list of feed formatted content sources may have been provided, and the association may be made with one of the sources from that list. A selection input may be received from one of the users at 2306. For example a user may request to view a feed. Based on this selection input, a local cache is updated at 2308 with the retrieved current version of the feed formatted content. The locally cached content is selectively decomposed based on the association between the user and the feed formatted content source. If a user is associated with the feed formatted content source, the local cache is decomposed at 2310. If a user is not associated with the feed formatted content source, the local cache is not decomposed at 2312.

In one embodiment, a feed formatted content aggregation server may determine the update frequency for a feed based on a variety of factors. For example, a feed specified update frequency may be specified within the feed formatted content, and that may be used to determine the update frequency for the system. By way of another example, the number of users subscribed to a feed may determine the update frequency. A historical view of feed formatted content updates for the feed may be used to determine the update frequency. For example, a feed that has had two thousand feed items in the last month may be assumed to update more frequently than a feed with only thirty feed items in the last month. By way of another example, a comic feed may update once a day at a certain time, and this may be determined from the historical view of feed formatted content updates for that feed. The system may set updates for that feed based on the historical time that updates occur.

Figure 24:
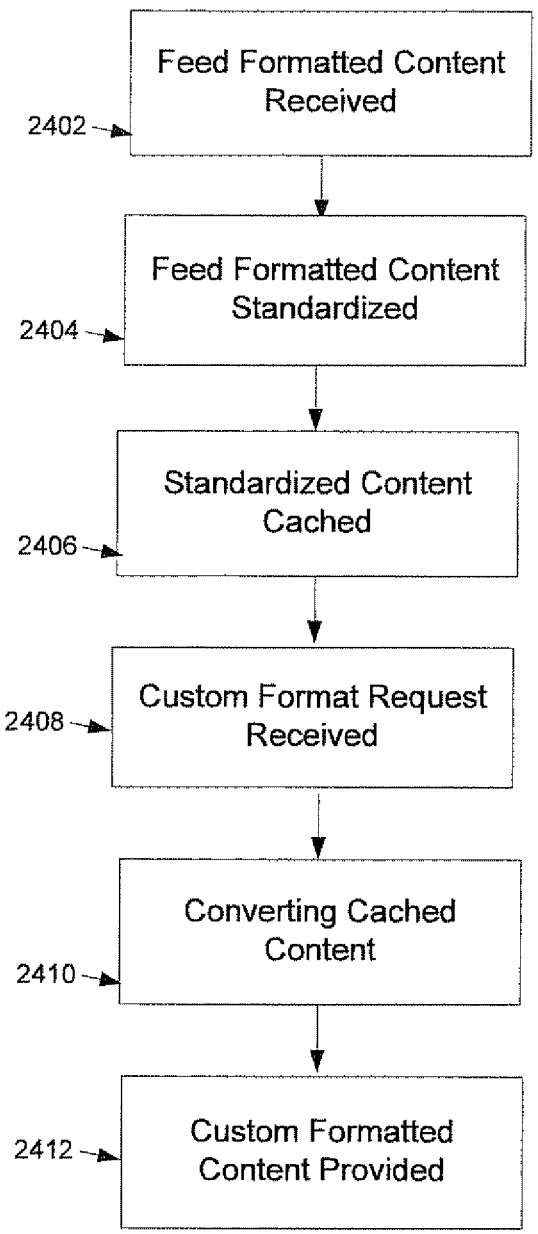
FIG. 24 illustrates a flowchart representative of one embodiment of a method for providing feed formatted content.

In one embodiment, a feed formatted content aggregation server may serve as a standardizing, content cleansing, or intermediary server. FIG. 24 illustrates a flowchart representative of one embodiment of a method for providing feed formatted content at 2400. The feed formatted content aggregation server receives feed formatted content at 2402. The feed formatted content may be standardized at 2404. The standardized feed formatted content may be stored either in whole, decomposed, or both at the feed formatted content aggregation server at 2406. A custom format request may be received at the feed formatted content aggregation server at 2408. The feed formatted content aggregation server may then convert the cached content at 2410 into the custom format. The feed formatted content aggregation server may then supply the feed formatted content in the custom format at 2412. The custom format may be supplied with the request, may be stored in association with the requester, or an argument may be supplied indicating what custom format is being requested. For example, a cell phone company may provide a feed formatted content-based cellular delivery system. The cellular delivery system may require a custom feed formatted content schema. In one embodiment, the custom format may be an XML schema. The cell phone company may provide an XML schema definition (XSD) describing the required schema. Alternatively the cell phone company may provide an XML transformation (XSLT) describing the required transformation. The XSD or XSLT may be provided with the custom format content request, or it may be associated with the cell phone company for some or all requests from the cell phone company.

One embodiment of the present invention includes an Independent Access Portal (IAP). An IAP may include one or more of the functions of feed formatted content aggregation, management, and/or display. An IAP may incorporate, internally or externally, a variety of services such as, for example, social networking functions. An IAP may perform processes and methods such as feed aggregation, unique feed provision, as well as others included in this application. An IAP may include, produce, or use markers to allow enhanced feed provision, such as those that have been and will be described. In one embodiment, the IAP may be software at the user node 220, software at an OCP or ACP, or a combination of the two. The IAP may include one or more web based interfaces. These interfaces may be standard web pages, or combinations of web content and software. The term IAP may refer to any of these, and the term IAP server may be used to designate software or interfaces not held at user node 220, but one skilled in the art should understand that various aspects of the programming may be transferred between nodes and not depart from the spirit of the invention.

Figure 25:
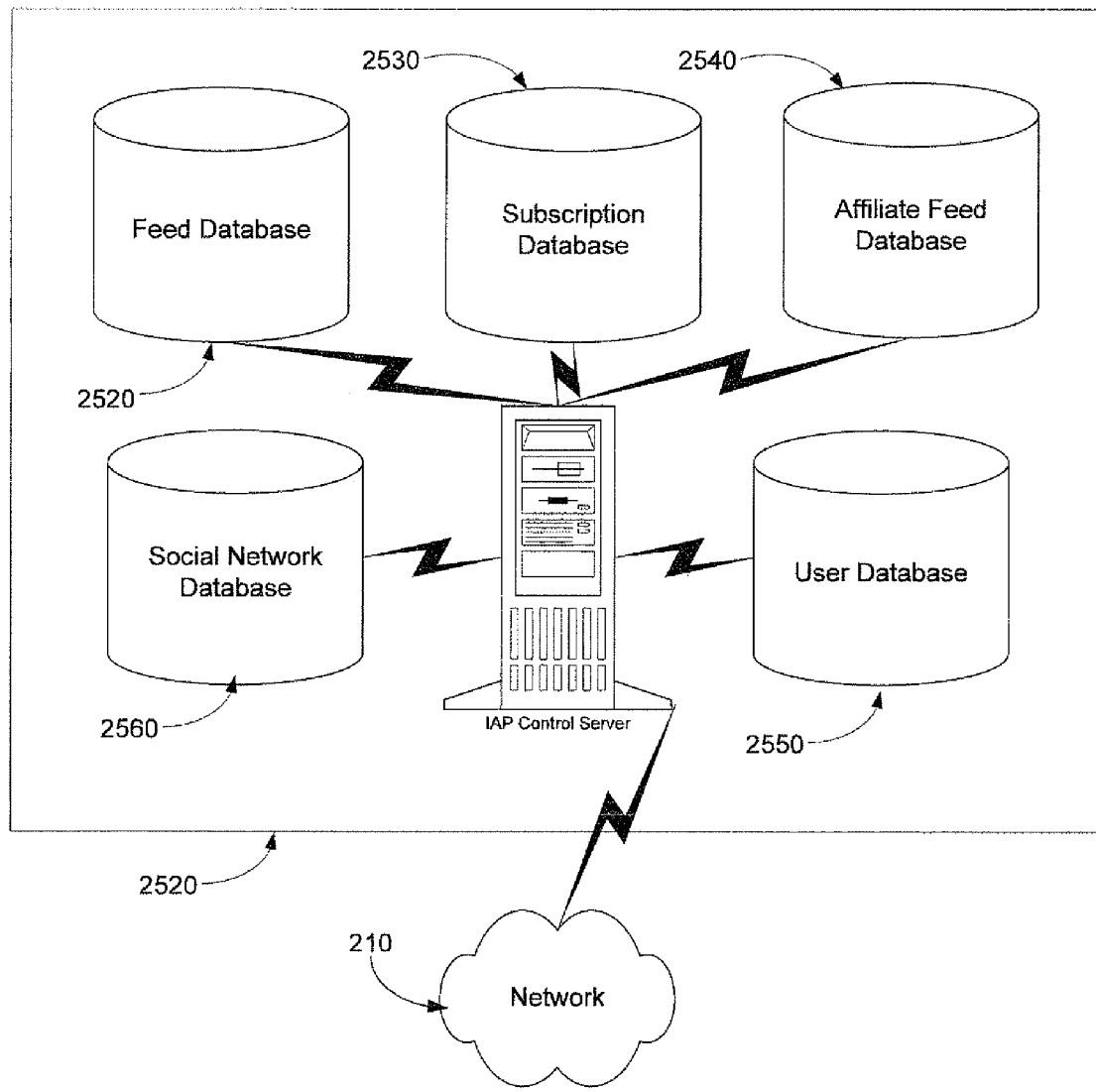
FIG. 25 illustrates a schematic diagram of one embodiment of an IAP control server.

FIG. 25 illustrates a schematic diagram of a system including an IAP control server at 2500. In one embodiment, the IAP control server 2510 may have access to a variety of data including feed database 2520, subscription database 2530, affiliate feed database 2540, user database 2550, and social network database 2560. Databases 2520-2560 may be separate databases, two or more may be maintained in the same database, they may be hosted on one or more servers, and any other database configuration as known in the art. One or more of the databases may, in one embodiment, be maintained by a company or service other than the IAP. For example, the social network database maintained by Friendster, Inc. may be employed to perform functions described as proper to social network database 2560. The Friendster database may be accessed remotely, be cached locally, or the like. Other databases and services may be provided via network 210 by service provider node 280.

The role of subscription database 2530 may include maintaining records of subscriptions to feed formatted content. The records may record anonymous aggregate subscription information, may record subscriptions associated with users, or a combination of the two. In one embodiment, the users associated with the subscriptions have profiles maintained in user database 2550. Subscription database 2530 may also maintain records of feed formatted content access as well as recommendations or ratings associated with feed formatted content. Alternatively, records of feed formatted content access as well as recommendations or ratings associated with the feed formatted content may be held within user database 2550.

A link to subscribe to feed formatted content may be associated with an IAP. Clicking on the link may signal to the IAP server that the user at user node 220 should be indexed to the specified feed formatted content. If the IAP server does not recognize an IAP installation at user node 220 the user may be presented with a registration option, installation option, or the installation may automatically begin. In one embodiment, when installation and/or registration are complete, the user is indexed to the specified feed.

Content and user information held at the IAP server may be accessed at a website. The IAP server may include standard content and feed formatted content recommendations for users that may, in one embodiment, be based on a characteristic profiled response database. If the access request to the IAP website is made by clicking on an advertisement, the IAP website may employ the single or double confirmation targeting information associated with the advertisement to customize the website for that particular access request, and if a cookie is employed it may also be used for future access requests. For example, a certain feed might be particularly relevant to users in Chicago. If the IAP ran advertisements on a site, such as Yahoo® that were targeted to Chicago, this targeting may be based on user profile information. There is single confirmation that users clicking through from this advertisement are in Chicago. If IP-to-geography translation also indicates that the user is in Chicago, this constitutes double confirmation. The IAP may suggest or automatically display the feed particularly relevant to users in Chicago based on the single or double confirmation targeting information.

In one embodiment, the IAP may provide several methods for feed subscription. A user may use an interface to select from a list of feeds known by the IAP. A user may enter feed location information, for example a URI, into a form that is submitted to the IAP. A feed enabled section of a web site may be one bounded by tags. A user can click on and/or outline and/or highlight a feed enabled section of a target website and drag the mouse to the user's desktop IAP. Alternatively, a user may right-click on a feed enabled section of a target website and select an option to subscribe to the feed. In one embodiment, responsive to the drag or right-click action the selected feed is indexed to the user in subscription database 1430 and a feed is established between the target website and the IAP server. The user can then access the information through its connection between the user's IAP and the IAP server.

Figure 26:
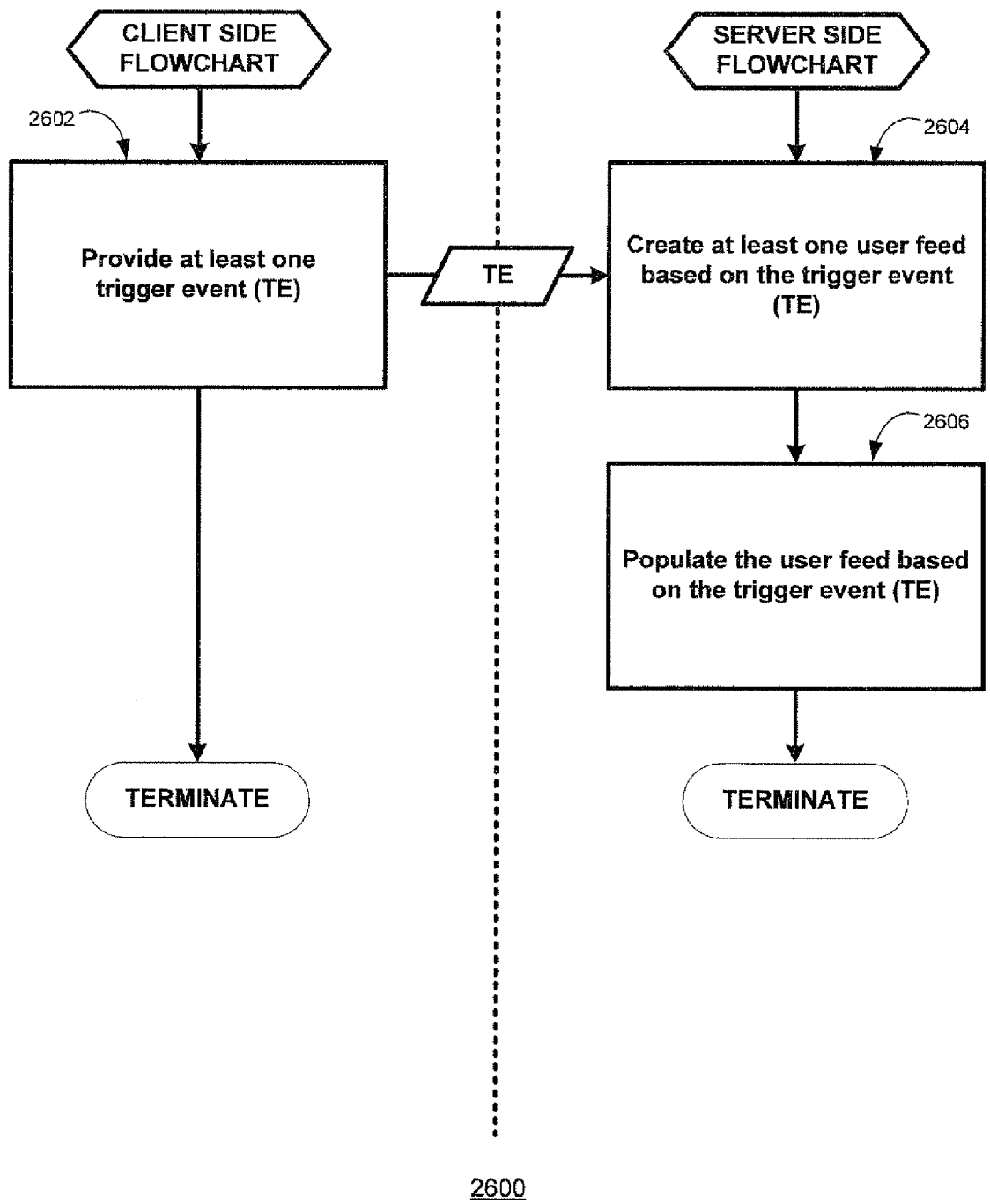
FIG. 26 illustrates a flowchart representative of one embodiment of a method for providing and populating a user feed.

In addition to direct user subscriptions, extra feeds may be established and indexed to a user or group of users by the IAP server. FIG. 26 illustrates a flowchart representative of one embodiment of a method for providing and populating a user feed at 2600. A client provides a trigger event at 2602. The server receives the trigger event and creates at least one user feed based on the trigger event at 2604. In one embodiment, the server may also populate the user feed based on the trigger event at 2606. For example, one or more feeds may be established and indexed to a user when they register with the IAP, such as a personal calendar items feed, a personal favorite sites feed, or a personal message feed. Alternatively, the feed may be created the first time an item of the corresponding type is to be associated with the user. The feed may also be created by user request, or by some other trigger.

In one embodiment, a personal calendar items feed associated with a specific user is created. Event items may be added to the personal calendar items feed by selecting to add feed formatted content from another feed to the personal calendar items feed. A link or button to add feed formatted content to the personal calendar items feed may be provided on the IAP. Alternatively, event items may be created by users through an online or software interface, by email parsing, via a call center, or the like, and these items may then be indexed to the personal calendar items feed of the user or a group of users. In one embodiment, users may be indexed to other users and the user profiles associated with those users. Dates associated with these users such as birthdays, anniversaries, graduations, or the like, may be indexed to the personal calendar items feed. The personal calendar items feed may be created for use exclusively by the IAP, or it may be accessed by other feed aggregation and display tools.

Figure 27:
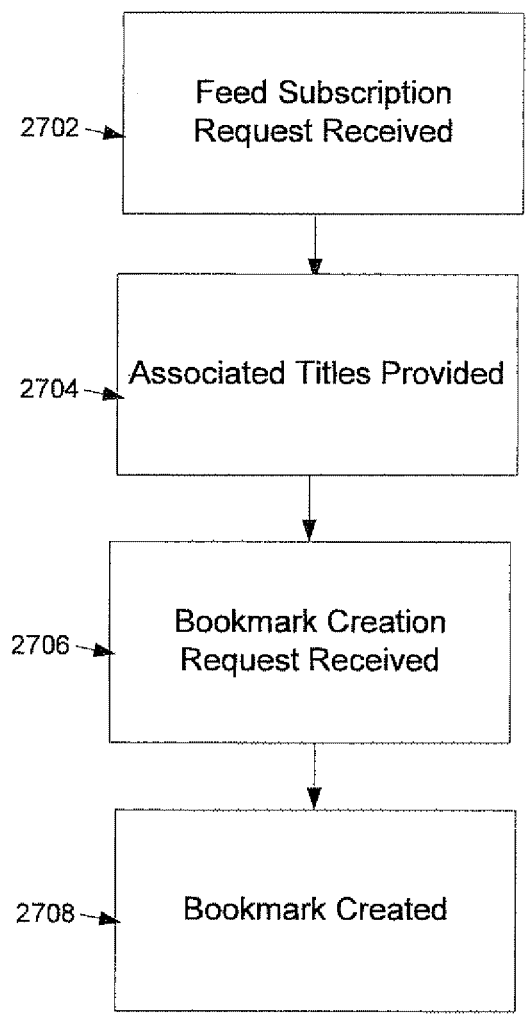
FIG. 27 illustrates a flowchart representative of one embodiment of a method for managing server-based bookmarks.

In one embodiment, a personal favorite sites feed is created and available for the user to add favorite site items to. Favorite site items may be created by users through an online or software interface, by email parsing, via a call center, or the like and these items may then be indexed to the personal favorite sites feed of a user or group of users. Alternatively, the IAP may index a user's favorites list from their browser with a personal favorite sites feed. The IAP may also index the home page of a user's browser to a personal favorite sites feed. In one embodiment, the IAP may monitor one or more users' browsing activity, and items may be inserted into a personal favorite sites feed based on this browsing activity. Such interactions with the browser may require the user to download a browser plug-in. For example, a plug-in may select the sites on a users favorites list, and execute an insert statement for each site in the favorites list. FIG. 27 illustrates a flowchart representative of one embodiment of a method for managing server-based bookmarks at 2700. A feed subscription request is received at 2702. Titles associated with the feed subscription request and/or other feed subscriptions are provided at 2704. A bookmark creation request is received at 2706. Based on the bookmark creation request, a server-based bookmark is created at 2708.

In one embodiment, a personal message feed is created and available as a method to send feed formatted content directly to the user. Personal message items may be created by users through an online or software interface, by email parsing, via a call center, or the like and these items may then be indexed to the personal message feed of a user or group of users. In one embodiment, a user may forward an email account to, set messages to be copied from, or receive email directly at an email address that parses email and places it in a personal message feed. In one embodiment, the entire message is translated into feed formatted content. Alternatively, only the subject of the email or some other portion is translated into feed formatted content. Personal message items may also be sent to a user via the IAP. For example, a user may forward a feed item to another user by clicking on a forward to a friend button or link on the IAP. The user may then specify some identifier for a friend user's personal message feed, for example by selecting the identifier from a list. The IAP may then associate the feed item with the friend's personal message feed.

In one embodiment, the IAP may provide end users with the ability to host their own feed formatted content. For example, space may be provided on the IAP server for users to host feed formatted content. Alternatively, the IAP client side software may include a server software portion that enables a user device to host feed formatted content. Using software such as the Dynamic DNS system commercially available by No-IP.com, a user device may be associated with a standard domain name even where the user device has a dynamically assigned IP address. In one embodiment, server software provided with, or independently from, the IAP may be used in conjunction with other IAP services and features to allow a user to host feed formatted content from the user device, including serving information stored at the user device, at the IAP server, at a third party server, or some combination thereof.

Figure 28:
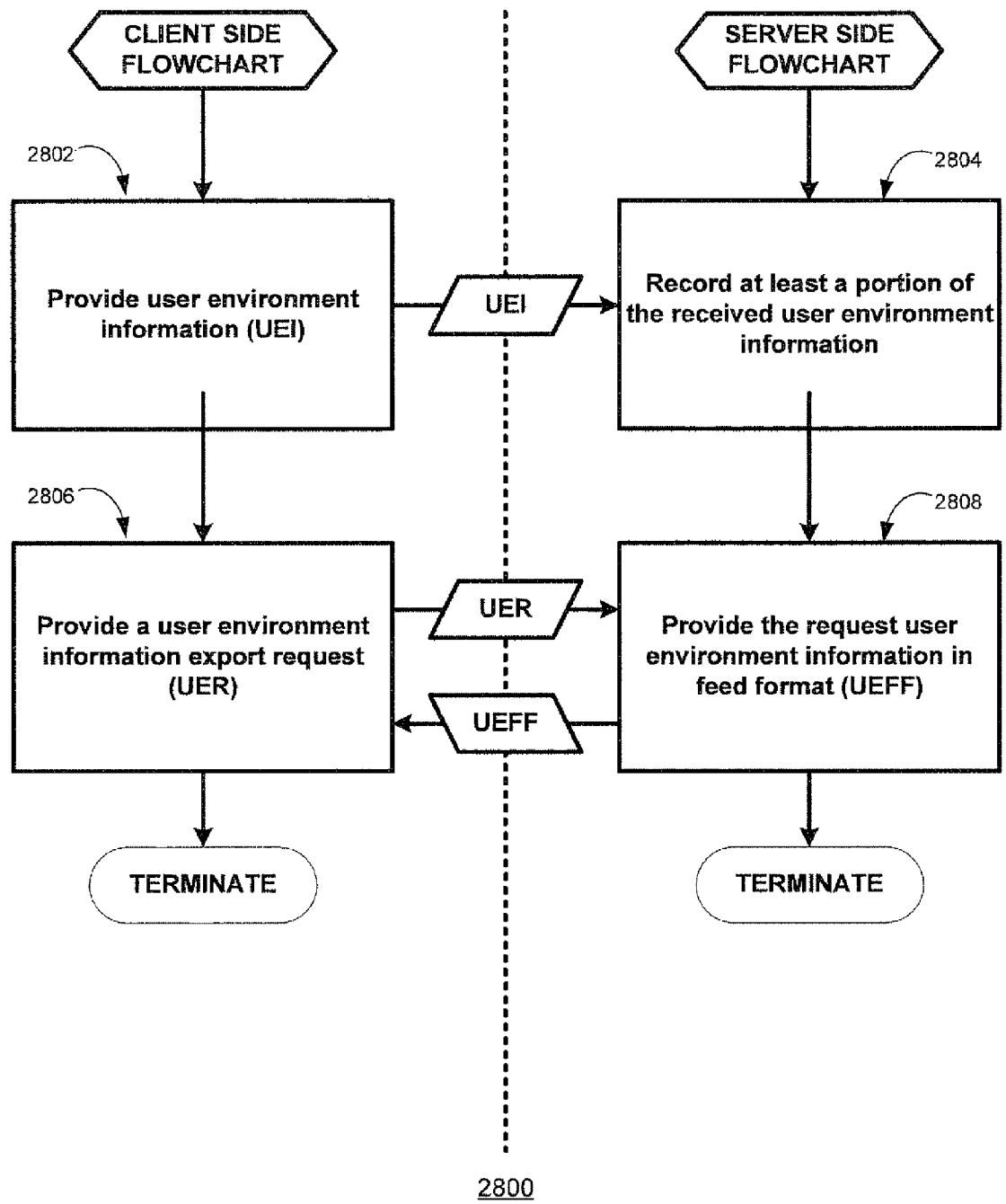
FIG. 28 illustrates a flowchart representative of one embodiment of a method for managing feed formatted content.

In one embodiment, an IAP may provide one or more methods for transferring feed subscriptions, and/or other user associated data. FIG. 28 illustrates a flowchart representative of one embodiment of a method for managing feed formatted content at 2800. A user provides user environment information at 2802. A server records at least a portion of the received user environment information at 2804. The user provides a user environment information export request at 2806. The server provides at least a portion of the recorded user environment information in feed format at 2808. For example, a user may download a file, for example in outline processor markup language (OPML), including certain user environment information held by the IAP such as feed subscriptions, feed rankings, social network information, event markers, feed buckets, and the like. This file may be used to transfer subscription information to other feed formatted content aggregation and display programs. As an alternative, one or more feeds may be provided holding user information, and the URI of this feed may be entered into another formatted content aggregation and display program to pass subscription information.

In one embodiment, an IAP user may set a preference for advance event notification. This preference setting may be specific to each feed, or may be set to some definable subset of events listed within one or more feeds. For example, a user may select to receive notification the day of events from a feed regarding bar and restaurant specials. The same user may, for example, elect to receive notification two weeks prior to concert events supplied in a different feed. Alternatively, the user may, for example, select to receive two-week prior notification for concerts at certain venues, but only one-week prior for other venues. In this manner, a user can set notification preference for any event with both time and geographic location.

In one embodiment, an IAP is always running when a web browser or an IAP program is open. Alternatively, the IAP may run as a background process, on at all times the computer is running. The user may interact with this background process through an interface.

In one embodiment, the user receives an incentive to operate the IAP. For example, the incentive may comprise the award of points, accumulation of points, award of consideration, or an honorific, all herein to be referred to collectively as points. Points may be directly awarded for a predetermined action or may accumulate in response to a span of time that the IAP is operable. Predetermined actions may include, for example, clicking on an advertisement, sending an email, filling out a profile, responding to a survey, providing a review, referring a friend, accessing feed formatted content, accessing links within feed formatted content or other content, accessing links referred to within feed formatted content or other content, winning a contest, and the like. Regarding the award of points for a span of time, the user may, for example, collect a point for a designated time period, such as five minutes, that the IAP is running. In one embodiment, the IAP requires a user to login in order to correctly associate a user with their IAP account.

In one embodiment, the IAP software may record whether a web site that is the IAP or is associated with the IAP is set as a user's homepage. Points may be awarded for maintaining a certain homepage.

The IAP may incorporate methods of attracting users such as awarding points for recommending the service to friends. In one embodiment, the recommending user may receive some portion of the points earned by the recommended user during at least a period of time the recommended user uses the IAP.

In one embodiment, providing additional profile information may also accumulate points. Additional profile information may also accelerate the rate points accumulate for leaving the IAP running.

In one embodiment, the IAP includes opportunities for games, raffles, gambling or other types of contests. IAP points may be required for entry into these contests. In one embodiment, prizes may consist of a coupon for a product or service, perhaps a local one such as pizza, and may include a valid time of day or other time limitation. Alternatively, winners may receive IAP points. In one embodiment, interactions with such opportunities, and the points awarded may be stored in the characteristic profiled response database.

Often times when advertisers are running promotions they want as many redemptions as possible to allow them to, for example, move merchandise or introduce a new product. In one embodiment, IAP users may be associated through user social database 1460. A user may designate an association with one or more other IAP users in some manner such as, for example, upon sign up as part of profile information, automatically when one user's IAP is merged with another user's IAP, or by a direct request sent to the IAP server, which then links the associated parties within the IAP database. These associations allow the promotional events including games, for example, poker tournaments, fantasy football leagues, and the like to include play between multiple users. For example, players from one team of associated IAPs can play a game and all would get 20 percent off a pizza and the winner get a month's supply of Pizza. In one embodiment, promotions can be established so that IAP teams can play against one another and the winner would get a special discount over the other team. In one example, team trivia contests can reward the whole team with discounts if one IAP user of the team gets the answer. Promotional games can be run on short notice to increase business during slow periods. For example, guessing a spread at half time of a football game to win the promotion.

In one embodiment, the IAP provides the user with constantly updating information, provided for example from feed formatted content, refreshed on a regular basis—for example, once every one or five minutes. This information may include sports scores, weather reports, news information, horoscopes, stock quotes, inspirational quotes, or the like. In one embodiment, the information also includes advertisements. The advertisements may be associated with the feed formatted content or independent of it, and may be displayed with the feed formatted content or independent of it. In one embodiment, the IAP brings itself to the front of the desktop, known as gaining focus, over other programs, each time the information refreshes. In one embodiment, the IAP does this only when certain types of information are refreshed or displayed, for example an advertisement may cause the IAP to gain focus, or an updated score for a certain sports team may cause the IAP to gain focus. In one embodiment, the user may specify which refreshed content may cause the IAP to gain focus.

In one embodiment, any ads displayed on an IAP are independent of access requests by the user, with content information and ads refreshing on regular intervals. These ads allow a variety of targeting methods, and a quick method to reach end users is attained. Independent refresh requests from various communications devices and associated profiles may be recorded and a current audience determined based upon these refresh requests.

In one embodiment, some information related to user location or schedule may be stored in the IAP database. For example, school schedules may be entered into the IAP database for college students in order to appropriately target certain schedule specific information, such as graduation deals.

Advertisements displayed over the IAP may be designed specifically to be run over the IAP, may be templates, or another type of advertisement. Template ads may relate to a category of advertisers, such as restaurants, politicians, or grocery stores.

Figure 29:
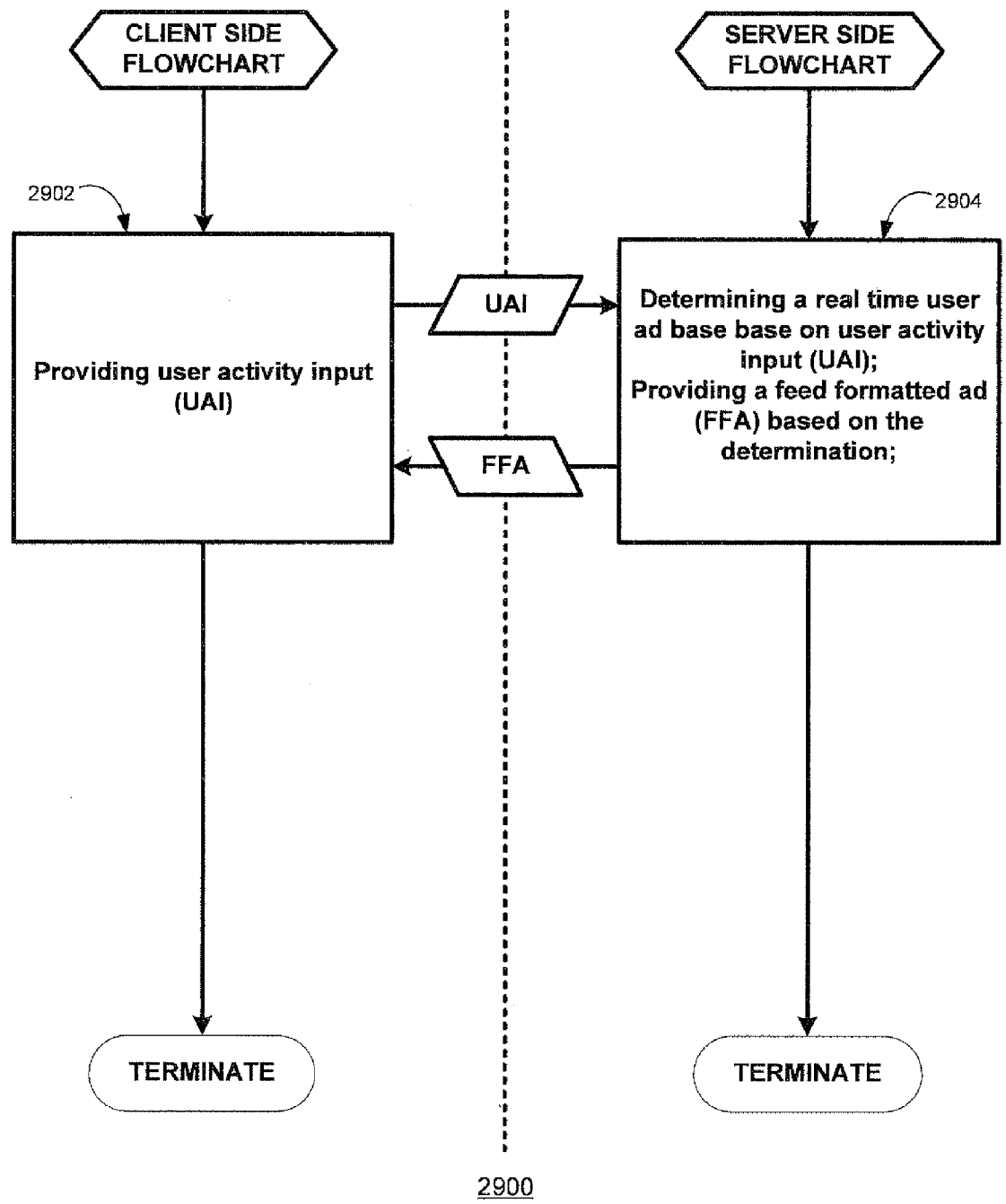
FIG. 29 illustrates a flowchart representative of one embodiment of a method for providing real time advertising.

In one embodiment, the IAP will periodically or continually check for user activity input, such as mouse or keyboard activity to determine the presence of a user. FIG. 29 illustrates a flowchart representative of one embodiment of a method for providing real time advertising at 2900. A user provides user activity input at 2902. User activity input may be received from a plurality of users. A server determines at least one real time user based on the user activity input at 2904. The real time user may also provide a feed formatted ad based on the determination at 2904. Requests for advertising may be based on profile information, cookie information, multiple confirmation targeting, or other targeting methods described herein independently or in conjunction with each other, as well as other methods of targeting as may occur to one skilled in the art. The user activity input may be used to determine a current active audience for the IAP. Active users within a geographic location may also be determined. In one embodiment, the IAP determines a date or seasonal period and provides the feed formatted ad based on that determination. The IAP may also base the ad provision on weather condition determination, some other conditional publishing rule, or the like. In one embodiment, the IAP notifies potential advertisers of the current audience or current active audience. For example, if a large number of IAP users are active on their IAP, the IAP may notify a movie theater of the opportunity to advertise an R-rated movie that is going to begin showing in a few hours. Advertisers may also request current audience or current active audience information via a website, command center, or various other methods. Advertisers may require information regarding subset audiences. For example, the IAP may provide the movie theater with only active audience numbers for users within a certain zip codes surrounding the theater or perhaps also narrow by providing numbers of users also known to be over 18.

In one embodiment, an IAP may be associated with advertising node 150. Information collected by or activity performed by an IAP may contribute to profile information used in advertisement selection for advertising node 150. In one embodiment, the IAP may be associated with a Third Party Ad Server (TPAS). In one embodiment, the TPAS may be a feed formatted content publisher. The IAP may provide an interface for users to view and edit information collected about that user. Further, the IAP may track the ads displayed to the user and allow for feedback by the user. The user can receive points for providing feedback on the advertisements delivered over the IAP or over other sites by the TPAS.

In one embodiment, the IAP may provide coupons in conjunction with or independent of advertisements. For example, an advertiser may include a page with a coupon as the click through destination of an advertisement. Alternatively, a coupon marker may be included in feed formatted content. The IAP may selectively display a coupon availability link or image based on the coupon marker.

In one embodiment, feed formatted content may be collected or categorized in a level above feeds. A collection of feeds may be associated with a feed bucket. A feed bucket may be represented in a table of feed database 2520. In one embodiment, the user created feed bucket may include a title, and may also include a description. A feed bucket may also be associated with other feed buckets. In one embodiment, a feed bucket may only have one parent feed bucket. Alternatively, a feed bucket may have multiple parent feed buckets. In one embodiment, a feed bucket with multiple parent feed buckets may also have one primary parent feed bucket. For example, feed buckets may be used to categorize feeds into a tree-style directory. Top level categories such as "news", "sports", and "entertainment" may not have parent feed buckets. Feed buckets "magazines" and "newspapers" may specify "news" as their parent feed bucket in the feed bucket table. Alternatively, a feed-bucket-to-feed-bucket table may store the parent feed bucket relationships. A relationship in the feed-bucket-to-feed-bucket table may also store a relationship specifying "sports magazines" as having "sports" as a parent feed bucket, and another relationship specifying "sports magazines" as having "magazines" as a parent feed bucket.

In one embodiment, subscription database 2530 may allow a user to subscribe to a feed bucket. Subscription database 2530 may store an association between a user and a feed bucket. Alternatively, subscription database 2530 may store an association between a user and the feeds within a feed bucket.

In one embodiment, users may create feed buckets. A user may categorize feed subscriptions into feed buckets they have created. In one embodiment, the title and/or description assigned by one or more users may be used by the IAP to provide feed categorization.

Feed formatted content may be singular in source or aggregated. For example, two restaurants may maintain feeds singular to their establishments. An aggregate channel of restaurant feeds may combine these two feeds to provide an aggregated restaurants feed. Any number of feeds or selected feed items from feeds may be combined to produce an aggregate feed. In one embodiment, a feed item incorporated within an aggregate feed may include an original source marker identifying its singular original source. When the feed formatted content from the aggregate feed is displayed at user node 220, a link to the singular original source or some means of subscribing or unsubscribing the user to or from the singular original feed, such as a button or link, may be provided. In this manner, if the user enjoys information from one singular original source in an aggregate feed, but wishes to unsubscribe from the aggregate feed, an easy method of subscribing to the singular original source has been provided. Alternatively, if the user wishes to maintain a subscription to the aggregate feed, but unsubscribe from one singular original source, an easy method of unsubscribing from the singular original source has been provided. In one embodiment, an aggregate feed is the feeds and feed items within a feed bucket.

In one embodiment, publishing node 240 may partner with a chamber of commerce, young professionals network, newspaper, manufacturers association, or some other entity that maintains relationships with multiple potential content sources. A chamber of commerce may, for example, provide a feed, feed bucket, or group of feed buckets on its website, maintained by publishing node 240 acting as an OCP. Chamber members may indicate in their membership application or renewal forms that they wish to have feed formatted content published in the chamber feed. The chamber may collect a fee from the member for this privilege and may pass some of this fee to publishing node 240. Chamber members may then either supply content for the chamber feed via an online interface, via email, via fax, or by phone to publishing node 240 directly or via the chamber. In one embodiment, a chamber member calls a representative at publishing node 240 to request that a sale at their establishment be advertised by feed formatted content in the chamber feed. The representative then enters the information for publishing to the chamber feed. In one embodiment, the representative may then recommend additional feeds that the information may be published in. In one embodiment, an advertiser may already have a feed and may pay for inclusion of their feed within the aggregate chamber feed. Advertisers may call to request that information be published without knowing what feed they wish to be placed in. In one embodiment, feed recommendation may be based on one or more of the specific advertiser, the advertiser's industry, the location of the advertiser, the specific information that is to be published, the date or dates relevant to information. In this manner, information may be published as feed formatted content.

Figure 30:
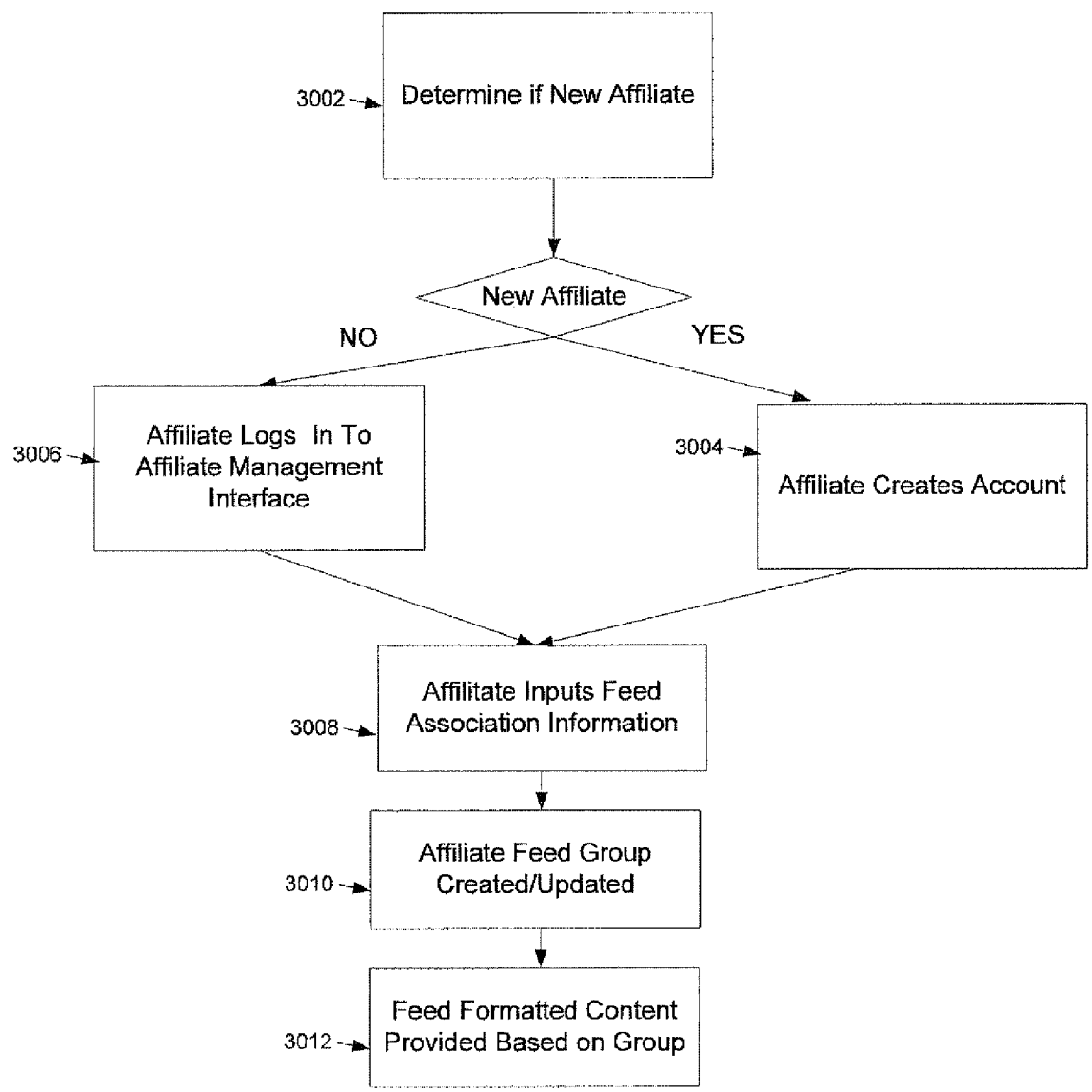
FIG. 30 illustrates a flowchart representative of a process for associating affiliate feed formatted content.

FIG. 30 illustrates a flowchart representative of a process for associating affiliate feed formatted content at 3000. First, the system determines whether a user is a new affiliate at 3002. In one embodiment, for example, IAP control server 2510 maintains affiliate feed information in affiliate feed database 2540. Affiliate feed database 2540 may include such information as affiliate profiles, login information, relationships between affiliates and the like. An affiliate may be any individual, business, government, organization, or the like that signs up in affiliate feed database 2540. An affiliate wishing to use the affiliate feed system may sign up via a website, for example. At the affiliate feed system website the affiliate may be presented with the question whether they are a new affiliate or not. If a user is a new affiliate, the affiliate creates an affiliate account at 3004. In one embodiment, for example, the affiliate account may be recorded in affiliate feed database 2540. If the user is an existing affiliate, the affiliate logs in to the affiliate management interface at 3006. Once an affiliate has logged in to the affiliate management interface of has created an account, the affiliate may then input feed association information at 3008 via the affiliate management interface. Feed association information may include feeds owned, managed, or published by the affiliate, feeds the affiliate wishes to have included within one or more of their own feeds, specification that they wish to allow other affiliates to include their feed formatted content in the other affiliate's feed or feeds, and the like. The affiliate management interface serves to facilitate feed aggregation and association. Based on the input feed association information, the server determines whether to create or update an affiliate feed group at 3110. Feed formatted content is then provided based on the affiliate feed group at 3112. In one embodiment, the provided content combines content from a plurality of affiliates. A user factor may determine a user affiliate relationship. Based on this relationship, a user may be subscribed to an affiliate feed group. A user factor may be, for example, a user subscribing to a lead affiliate feed, subscribing to a non-lead affiliate feed, demographics, signing up with a service, or the like.

In one embodiment, for example, an affiliate may be a company such as CondéNet, Inc., producer of GQ.com, the online version of magazine Gentleman's Quarterly (GQ). GQ may manage one or more feeds such as a GQ lifestyle feed, and a GQ articles feed. GQ, and by GQ a representative of GQ may be included, may wish to include the GQ articles feed in the GQ lifestyle feed. Via the affiliate interface the URL for both feeds may be specified, and new IAP based URLs for the feeds may be generated. GQ may then specify that the GQ articles feed be included in the GQ lifestyle feed. In one embodiment, after this specification accessing the IAP generated lifestyle feed will then result in a combined feed of both the feed items in the lifestyle feed as well as those in the articles feed. In this feed relationship, the lifestyle feed is said to be the lead affiliate feed. In an alternative embodiment, when a user of the IAP selects this feed, they may be automatically subscribed to both feeds. GQ may also wish to have other feeds included with one of these feeds. For example, Cigar Aficionado may pay an affiliation fee to GQ to have one of its feeds included in the GQ lifestyle feed. GQ may specify that this Cigar Aficionado feed be associated with the lifestyle feed. Again, feed items from this feed may be automatically included within the lifestyle feed, or the users may automatically be subscribed to this feed. When an affiliate associates a feed with one they manage, the affiliate who does the associating is a lead affiliate, their feed is the lead affiliate feed, and the affiliate managing the feed that is associated is a subordinate affiliate, and their feed is the subordinate affiliate feed.

In one embodiment, an affiliate may designate a type of association with another affiliate feed or their own feed. For example, the feeds may be combined into an aggregate feed. Alternatively, the associated feeds may be listed as recommended subscriptions for users of the IAP. Alternatively, the associated feeds may be subscribed to for a user based on one or more factors, including: an associated feed group, user subscription to one of the feeds in an associated feed group, user subscription to a lead affiliate feed, user selection of a branded IAP interface. In one embodiment, an affiliate may specify an affiliate feed association command to affect any of these associations. Any of these commands may be given through the affiliate feed management interface. In one embodiment, an affiliate may specify a filter on an affiliate feed they wish to associate with. For example, Major League Baseball as an affiliate may wish to include a weather feed from an affiliate, but may filter it based on only accepting feed items on game days. A variety of filters may be specified such as date, keyword, author, and the like.

Figure 31:
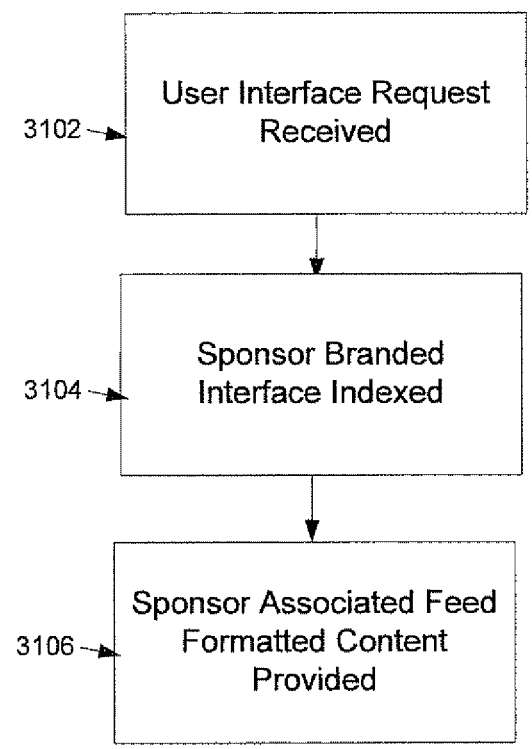
FIG. 31 illustrates a flowchart representative of one embodiment of a method for providing feed formatted content.

By way of another example, a popular site such as ESPN.com may wish to associate a feed with their feed, such as one provided by sports apparel and equipment provider, Fogdog Sports. In one embodiment, Fogdog may pay ESPN to associate the Fogdog feed with the ESPN feed. The relationship may be facilitated, and statistics regarding the relationship and financial details recorded and displayed via the affiliate interface. When a user subscribes to the ESPN feed, the Fogdog feed may be incorporated with the ESPN feed. Alternatively, an interface may be provided for the user whereby subscribing to the ESPN feed displays a recommendation of the Fogdog feed. In another embodiment, ESPN may provide a branded version of the IAP, and when a user installs, registers for, or uses the ESPN branded IAP, the subscription to the Fogdog feed may be made by default, recommended to the user, or again may be included in the ESPN feed as it is delivered to the IAP. FIG. 31 illustrates a flowchart representative of one embodiment of a method for providing feed formatted content at 3100. A user interface is requested at 3102. A sponsor branded interface is indexed at 3104 to the user requesting the interface. Sponsor associated feed formatted content is provided at 3106, for example based on an affiliate feed group. Sponsor associated feed formatted content may include at least one lead affiliate feed; it may also comprise at least one associated affiliate feed. The user interface request may be received at an aggregator site, at a sponsor site, or at some other site. User characteristics or demographics may be determined based on the interface request, and the provided feed formatted content may be based on the user characteristics. In one embodiment, at least a portion of the feed formatted content may comprise an ad or promotional information, and revenue may be associated with displaying such content. A portion of the revenue may be provided to a sponsor, for example one associated with the sponsor branded user interface. In one embodiment, subscription information associated with the user may be provided to a sponsor, for example a sponsor associated with the interface used by the user.

Continuing the ESPN example, the interface may provide ESPN with the ability to group together multiple ESPN feeds along with the ability to add other non-ESPN feeds to the group. A user may subscribe to this aggregate feed. In one embodiment, the user may supply user preference input regarding the feeds or feed items they wish to receive. For example, a user may specify portions of the aggregate feed, as in one or more of the feeds that make up the aggregate feed, that they do not wish to receive. Subscription to an aggregate feed may be associated with the user as a single subscription, or as all the individual subscriptions to the feeds within the aggregate feed. Specifying not to receive one of the feeds within the aggregate feed may be accomplished by recording a negative subscription to one of the underlying feeds, or the user may be unsubscribed from that feed if each of the underlying feed subscriptions is maintained separately, or the aggregate feed subscription may be removed and all the underlying feeds may be subscribed to except the one or ones specified by the user.

Figure 32:
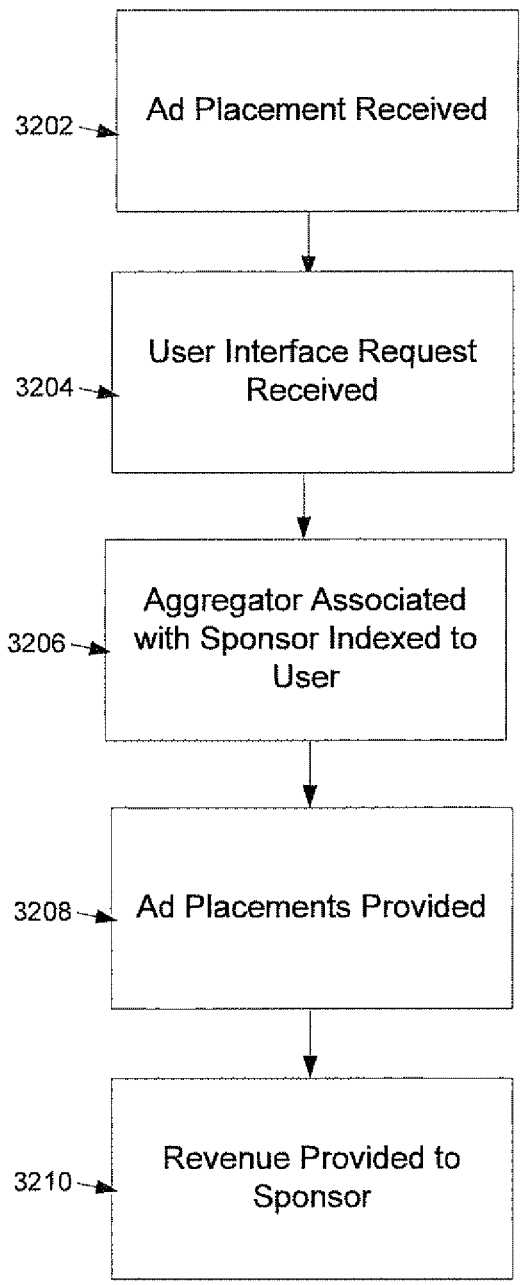
FIG. 32 illustrates a flowchart representative of one embodiment of a method for providing a branded feed formatted content aggregator interface.

FIG. 32 illustrates a flowchart representative of one embodiment of a method for providing a branded feed formatted content aggregator interface at 3200. An ad placement is received at 3202. The ad placement may include payment, and may be received via an advertiser interface. A user interface request is received at 3204. An aggregator associated with a sponsor is indexed to a user at 3206 based on the request. The received ad placements are provided as feed formatted content at 3208. At least a portion of the revenue is provided to the sponsor at 3210.

Figure 33:
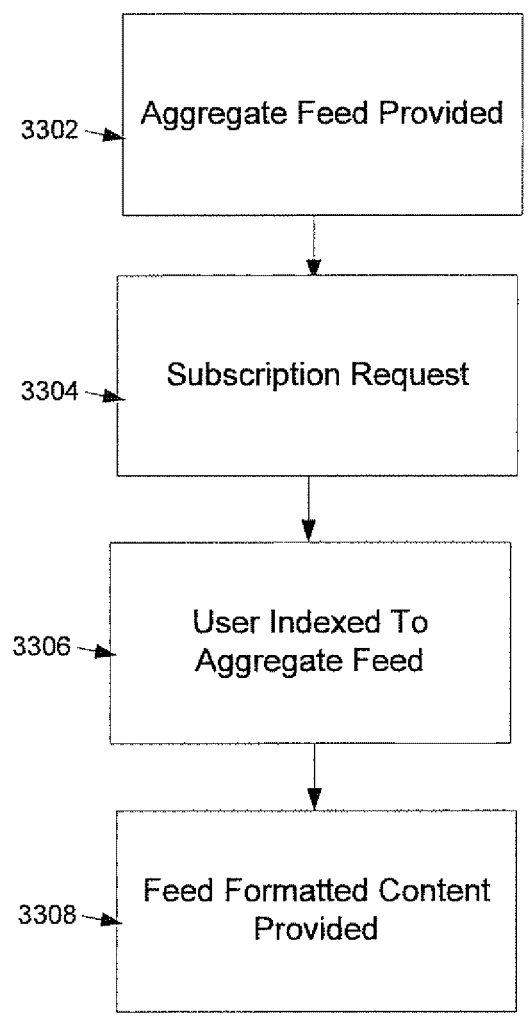
FIG. 33 illustrates a flowchart representative of one embodiment of a method for providing feed formatted content.

FIG. 33 illustrates a flowchart representative of one embodiment of a method for providing feed formatted content at 3300. An aggregate feed is provided at 3302. A subscription request is received from a user at 3304. The user is indexed to the aggregate feed at 3306 based on the subscription request. The user is provided with feed formatted content based on the indexing at 3308. In one embodiment, one or more additional feeds may be indexed to the aggregate feed at a time subsequent to user subscription to the aggregate feed. A user may be provided with feed formatted content from the additional feed based on the aggregate feed subscription. In one embodiment, the user may be subscribed to the feeds within the aggregate feed. A user may provide a feed unsubscribe request, and based on this request a user to feed index may be removed. In one embodiment, the user to aggregate feed indexing may be removed based on the feed unsubscribe request.

In one embodiment, the IAP may assist in tracking the source of feed traffic. For example, when a feed item from a subordinate affiliate is served, it may be recorded that that feed item was served by the lead affiliate as opposed to from the subordinate affiliate's own feed. In one embodiment, a feed may be reformatted to record click throughs on included links. For example, a link may include a querystring that specifies the lead affiliate. Alternatively, a link that passes back through the IAP server may be used to allow it to record the traffic. In this manner, further tracking regarding whether traffic is due to items being served from it's original subordinate feed or from an associated lead feed may be provided.

In one embodiment, one or more feeds may have a charitable donation associated with user subscription and viewing of feed formatted content. For example, a chamber of commerce may have a feed that advertises for its members. It may be indicated to those who subscribe to the feed that for every certain number of feed items viewed a donation of a certain amount is made to the chamber of commerce. As another example, a local restaurant near a university may make a donation to a student run charity organization or event based on a certain number of feed items viewed, a number of feed item links clicked, a number of user registrations, or a number of redeemed offers. Alternatively a donation may be made based on the selection of a sponsor's skin, or the selection of a skin in combination with a period of time the skin is in place.

In one embodiment, the IAP icons on various websites may vary in appearance based upon whether the user is known to have an existing IAP account. In one embodiment, this determination can be made by checking for an IAP cookie that is deposited on the IAP user access device in an operation associated with the IAP. For example, when a user is viewing Basketball headlines on ESPN and is not known to be an IAP user, the IAP icon may include a message such as "Keep track of basketball scores even when you're not at ESPN." If the user is a known IAP user, the IAP icon may include a message such as "Add basketball scores to your IAP." Alternatively, the icon may not contain text, but may be an image recognizable as associated with the IAP.

Alternative to this distributed method of finding IAP content, users may check certain categories of interest on the IAP to choose what content is displayed. This may be done on a page managed by the IAP that aggregates all IAP channel options. IAP channel selection and category selection can be used to determine user characteristics and establish additional user profile.

Figure 34:
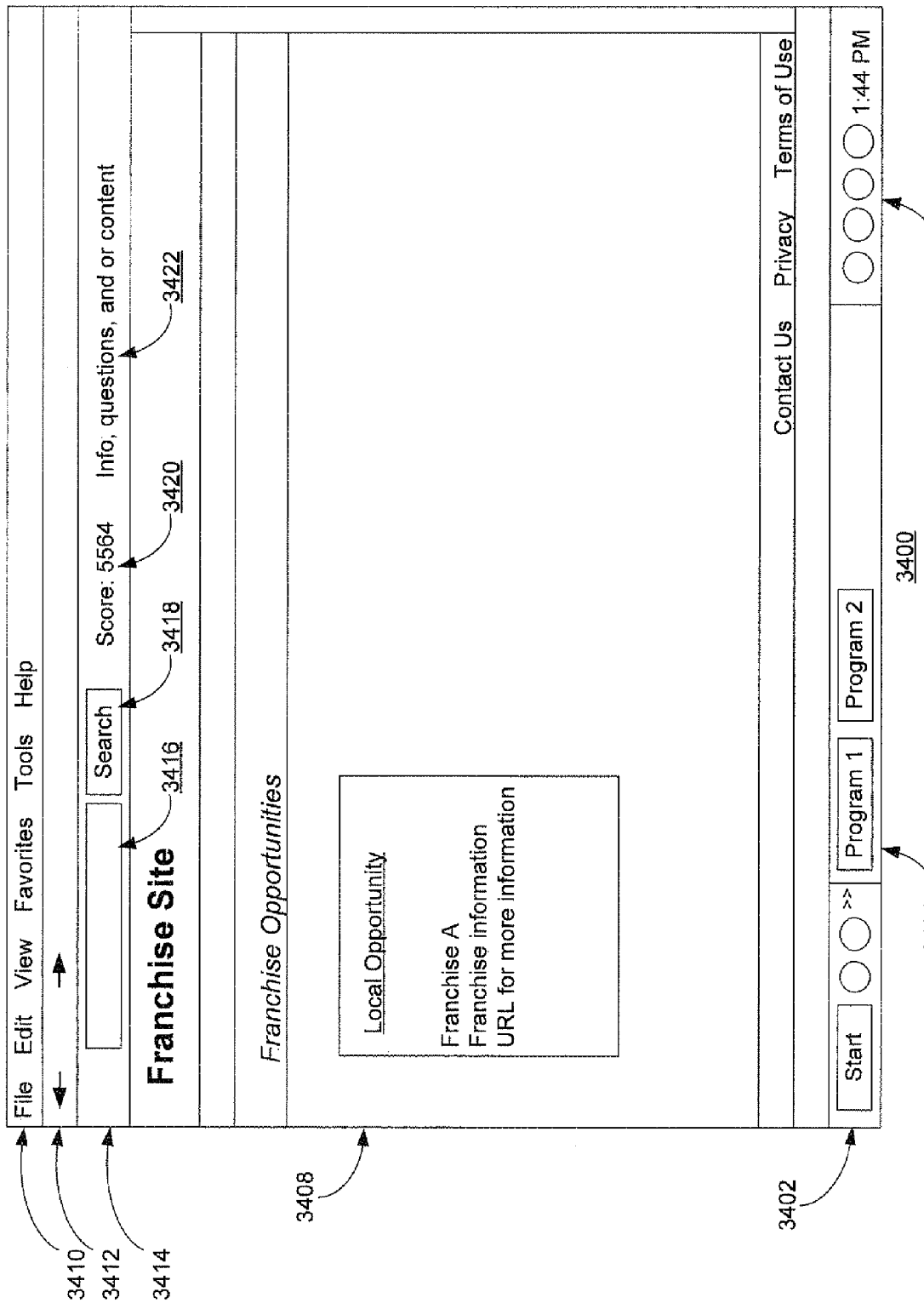
FIG. 34 illustrates a schematic diagram of one embodiment of an IAP.

A variety of interfaces may be provided to interact with the IAP. For example an IAP interface may be a standard website. The IAP may be a combination of website and software, or may be exclusively software. FIG. 34 illustrates a schematic diagram of one embodiment of an IAP at 3400. The sample screen includes elements such as a start bar 3402, icons representing open programs 3404, icons for starting programs 3406 in the system tray, and a browser displaying a web page 3408. The browser includes a standard menu 3410, navigation elements 3412, and a toolbar IAP 3414. In one embodiment, toolbar IAP 3414 is provided to supply additional information, questions, and/or content 3422 to the user. In one embodiment, toolbar IAP 3414 includes a field for the user to enter search terms 3416 and allows the user to submit the search 3418. In one embodiment, toolbar IAP 3414 includes a score 3420, associated with points collected by one or more users of the toolbar. While the toolbar IAP in this diagram is displayed at the top of the page, the toolbar IAP may be displayed on the side of the browser such as services provided by SideStep, or the included history and favorites sidebars provided with Internet Explorer.

Figure 35:
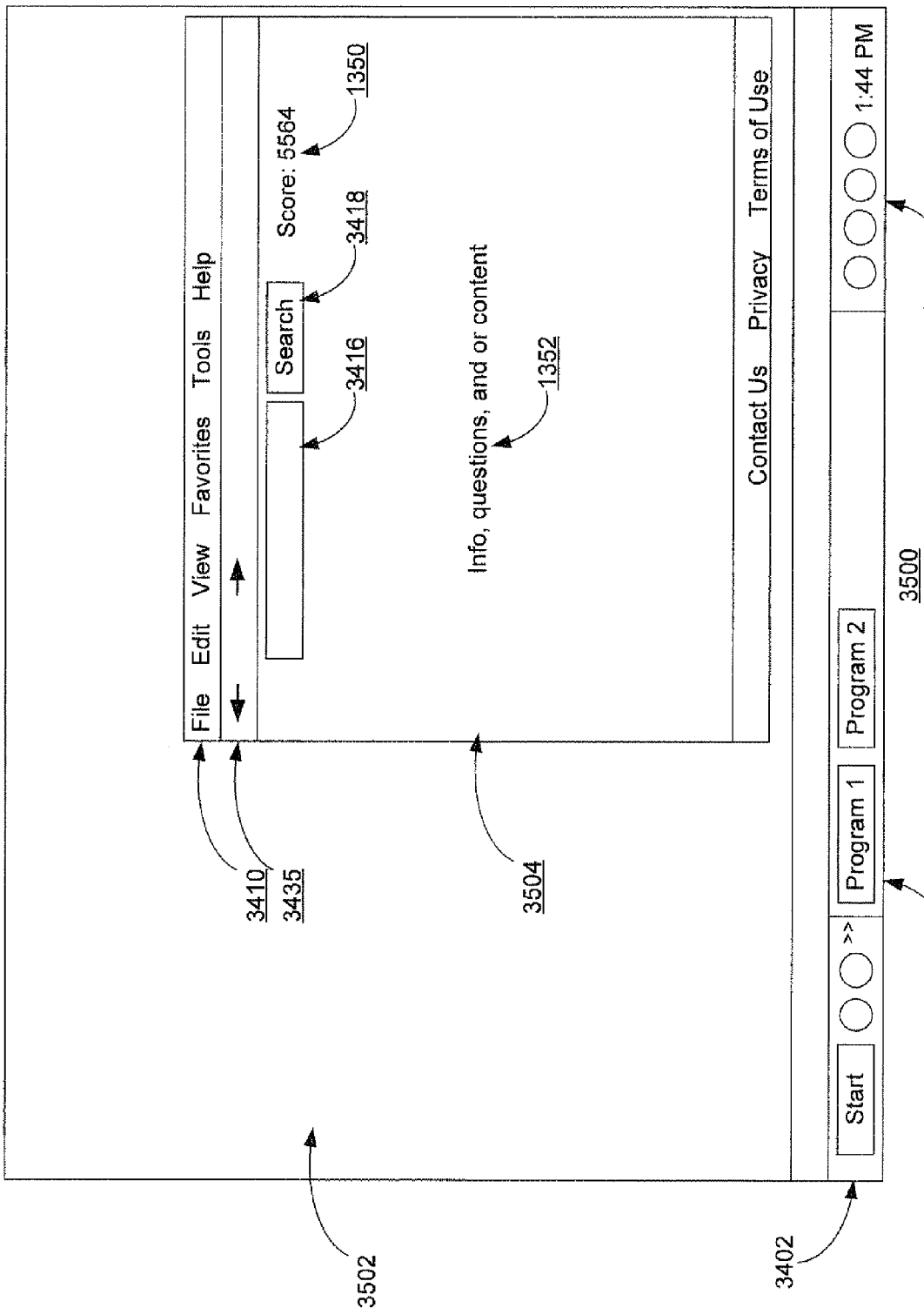
FIG. 35 illustrates a schematic diagram of one embodiment of an IAP.

FIG. 35 illustrates a schematic diagram of one embodiment of an IAP at 3500. On this screen, standalone IAP 3504 is displayed. In one embodiment, standalone IAP 3504 is set to a fixed size, smaller than the desktop, allowing portions of the desktop 3502, or other programs running behind standalone IAP 3504, to show. In one embodiment, standalone IAP 3504 is a web browser capable of displaying web content. Alternatively, standalone IAP 3504 may be a desktop program, or some combination of desktop program and web browser.

Figure 36:
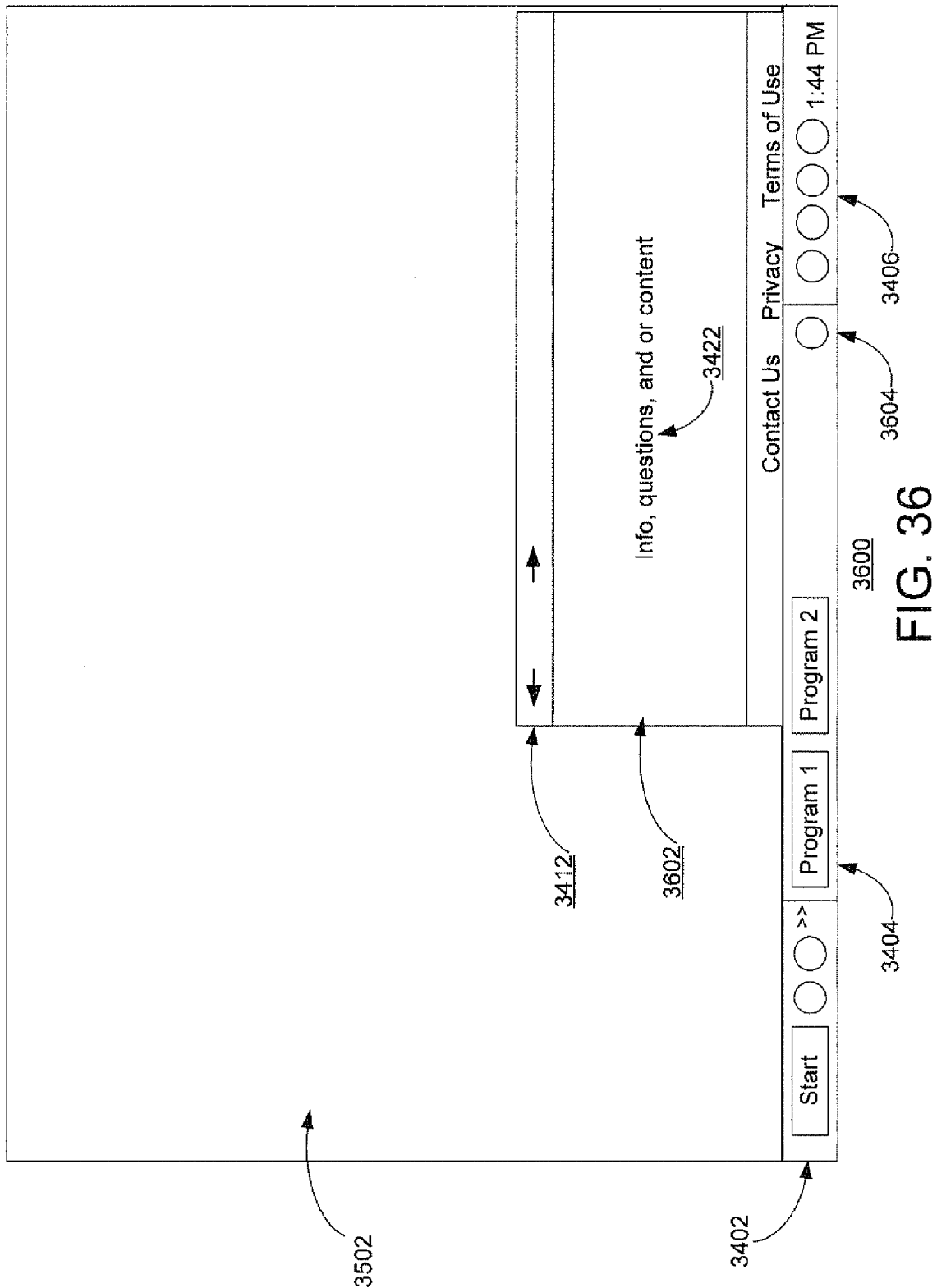
FIG. 36 illustrates a schematic diagram of one embodiment of an IAP.

In one embodiment, the IAP is a combination desktop software and website. Software is installed at user node 220 that includes an application, for example in deskbar style. For example, FIG. 36 illustrates a schematic diagram of one embodiment of an IAP at 3600. On this screen deskbar IAP 3602 is displayed. Deskbar IAP 3602 may be a combination of desktop program and web browser—such as the deskbar made available by Google—that combines programmatic capabilities in addition to browsing. Deskbar IAP 3602 may contain all of the menu, search, and other items described with the other IAP embodiments, or it may consist of only some of these, such as info, questions, and/or content 3422 and navigation elements 3412. Deskbar IAP 3602 may be accessed by clicking on a deskbar icon 3604 that may be within the system tray or outside of it. When an icon on the startbar of the user desktop is clicked, a browser window expands open. The browser window may display, among other things, feed formatted content. Where enhanced feed customization, personalization or display is discussed as proper to the IAP, it should be understood that this may be achieved through additions to existing feed aggregation and display solutions. The content received in the browser may interact with the deskbar application. For example, the browser in the deskbar application may be set to make an HTTP request at a certain time interval. This request may be based on a refresh tag in the HTML, based on a request prompted by a timer in the deskbar application, or the like. When new content is received in the browser, a customized header tag or some other type of awaken marker may be included in the HTML, XML, or other HTTP response. The deskbar application may scan the new content response for the awaken marker, and if it is present the IAP may automatically expand the browser window open. In one embodiment, a similar header tag or some other type of display icon marker may be scanned for by the desktop application and a specific icon may be displayed on the startbar based on the display icon marker. Alternatively, the display icon marker may cause an icon to rotate, flash, or change in some other way. Information regarding deskbar behavior may be requested independently, either synchronously or asynchronously, of the browser requests.

Figure 37:
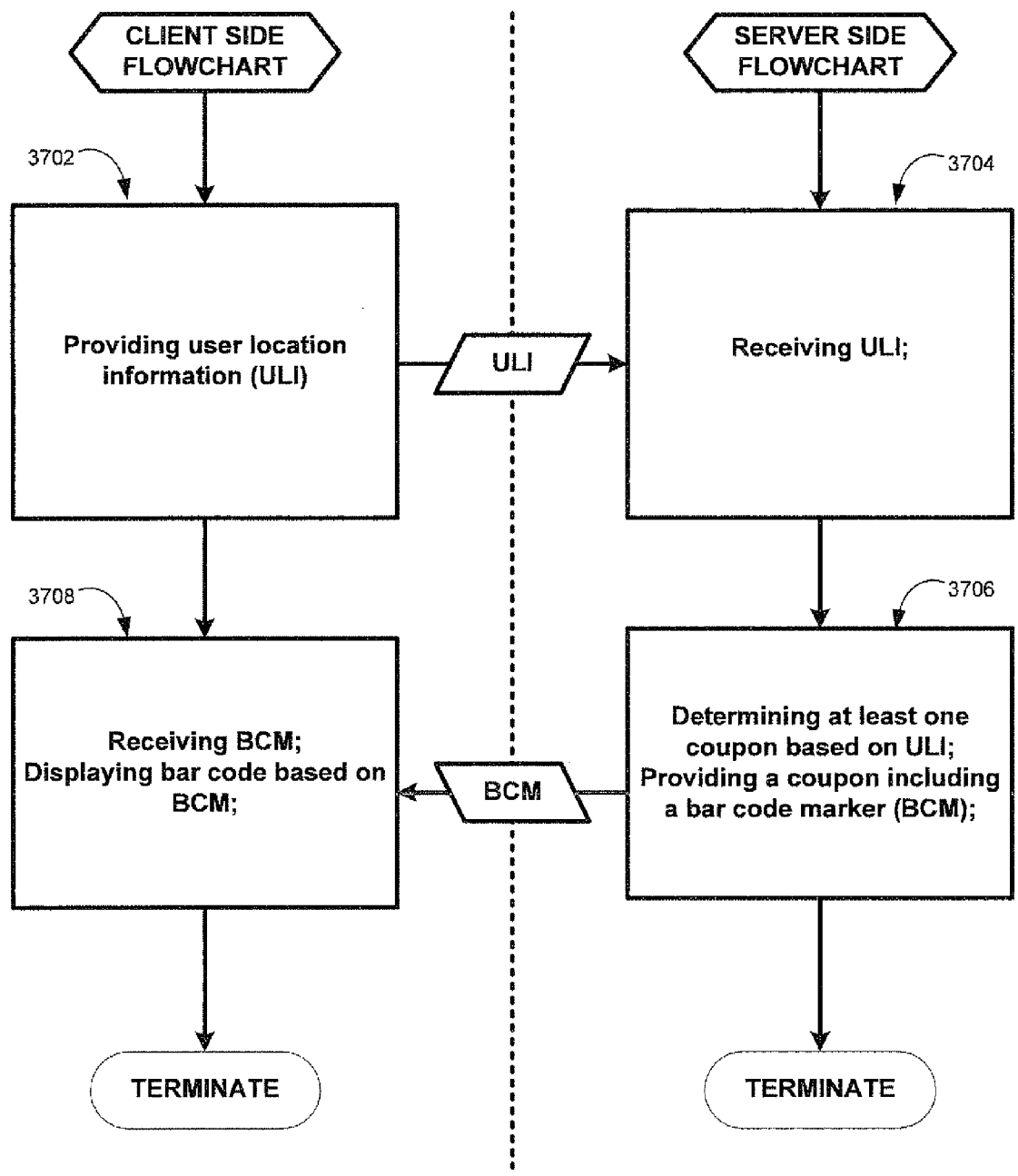
FIG. 37 illustrates a flowchart representative of one embodiment of a method for providing real time advertising.

In one embodiment, interaction with the IAP may be conducted through an instant messenger bot, a cell phone or other web-connected device, or through email. For example, a query to an instant messenger bot might respond with a users current score. The bot may respond based upon the screenname issuing the request, based upon the message sent or a combination of the two. Using email as an example means of interaction, an email to a particular email account may result in a reply email containing a link that indicates a user's IAP settings, allowing them to share their preferences by forwarding the email. Alternatively, an email may be sent to the user based on some IAP trigger, such as the reception of feed formatted content that contains a particular set of keywords, or came from a particular source. For example, a user can access his IAP via a cell phone with a display screen, or via an automated response system that the user dials into, and request lunch specials. Based on the user profile, which may include both where the user works and lives, the IAP server determines lunch specials for the location and sends available listings from the IAP server to the cell phone. Alternatively, the user's location may be dynamically established based upon a mobile location service such as is available through Microsoft's MapPoint suite of programs. In one embodiment, the user can read off the coupon numbers to the restaurant to get his discount. In one embodiment, the coupon will include a bar code, which can be read through the phone into a bar code scanner to receive a discount. In one embodiment, the bar code may be included in feed formatted content as a bar code marker. FIG. 37 illustrates a flowchart representative of one embodiment of a method for providing real time advertising at 3700. A user node provides user location information at 3702. User location information is received at 3704 at a server. The server determines a coupon based on the user location information at 3706 including a bar code marker. The user node receives the bar code marker and the bar code is displayed based on the bar code marker at 3708. The bar code marker may include a link to a bar code image, or a code to generate a bar code. For example, a bar code marker may include numerical information that may be translated into a bar code. A program on the cell phone of the user may convert the received numerical information into a bar code display. This displayed bar code may be scanned, for example, at a standard checkout desk. Location information may be determined by GPS, signal triangulation, user profile information, any other method known in the art, or a combination of these methods, for example providing double confirmation targeting.

In one embodiment, the IAP may be minimized or may, when minimized, disappear off the Windows desktop startbar and be restored by an icon in the system tray. The IAP may be capable of restoring itself. For example, a time sensitive ad or message might prompt the IAP to bring itself into focus.

In one embodiment, an IAP can be dedicated to one or more types of content. In one embodiment, an IAP can be dedicated to a single function, for example, weather information for the users geographic location. Other IAPs can be dedicated to different functions, for example, sports scores. A user of the Weather IAP can also be a user of the Sports IAP. Upon refresh of the two IAPs a determination is made that the refresh requests are from the same communication device. Based on this determination, in one embodiment a combined Sports and Weather IAP is delivered and the single function IAPs are deleted. Alternatively, one of the IAPs may expand to combine both Sports and Weather while the absorbed IAP is deleted. This will allow a user to build a custom IAP based on desired information. Custom IAP settings and preferences of different users can be shared or a first user may add a custom IAP of a second user to the first users IAP. In one embodiment, the second user may email or instant message a link to his IAP or IAP settings and preferences. In one embodiment, once the first user views the custom IAP of the second user a timing trigger can be set at the IAP server. The timer can, for example, be based on a number of timed refresh requests or any other time delay to allow the first user to view it for a period before the second user IAP is combined with the first user IAP. In one embodiment, the second user must actively select to combine the first user's IAP with their IAP. In another embodiment, each information source, or example a feed, of an IAP can have an add or delete symbol or icon to allow a user to add or delete functions he no longer desires. For example, by clicking a delete icon next to a Weather function, the IAP would send a delete request to the server to delete the Weather function. In one embodiment, a history of IAP changes and preference profiles are maintained. A user may be allowed to select a previous IAP state, providing a rollback feature on IAP settings.

For example, the IAP may maintain multiple potential methods of communication with a user. The IAP may communicate with a user via an IAP webpage, a deskbar or other desktop application, email, by phone using voice, SMS or WAP, or any other method of communication known in the art. The user may specify by what method of delivery they wish to receive feed formatted content. For example, a user may select to view Yahoo News on their main IAP homepage, but not on the deskbar, and they may wish to receive Best of Craigs List posts on their deskbar, but not on their main IAP homepage. Alerts for events the user may wish to have delivered to their deskbar. In one embodiment, if confirmation is not given indicating that a message has been received, a new method of communication may be attempted. For example, with regards to an event alert sent to the deskbar, if the user does not click on a button or otherwise acknowledge receipt of the reminder, the event reminder may be sent as a text message to the user's phone. An interface may be provided to allow users to customize the delivery behavior of feed formatted content. The IAP may also determine what method of delivery should be used based on one or more factors, including: time sensitivity of message content, source of message, available delivery channels, previous response information from this and other users, and the like.

Figure 38:
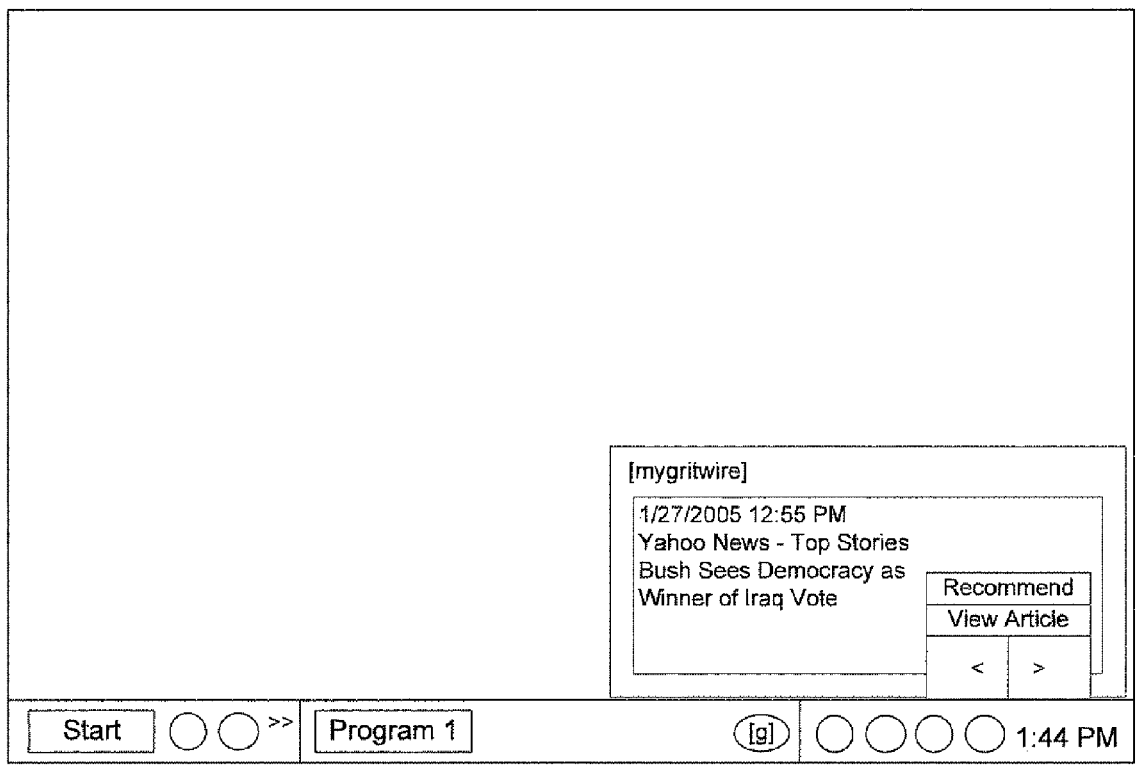
FIG. 38 illustrates a schematic diagram of one embodiment of an IAP.

One embodiment of the present invention provides for a single item window, as shown in FIG. 38. The single item window includes the capabilities described for the IAP. For example, the single item window may be used to display feed formatted content to the user. The single item window may display a single information item, such as a feed item, to the user, thus forcing attention on a single piece of information. A single item may be, in one embodiment, a title element from a feed item. For example, an RSS feed may hold article titles, descriptions, and links to the full article. The single item window may display the article title and provide a link to the full article. Alternatively, a sale or promotion may be available in feed format including a short description of the sale or promotion as a title, and also include a link to more detail. For example, a local food and entertainment feed can be compiled from promotional information from various restaurants, bars, movie theaters, etc. The single item window may display this title or short promotional message and include a link to the additional detail. In one embodiment, hovering over the item may display some or all of the article or additional detail information.

In one embodiment, in order to move to another item, the user must interact with the single item window, providing a decision regarding the displayed item. The decision may be, for example, to click on a link or button in the single item window to view additional information regarding the displayed item. The additional information may be displayed in the single item window, or it may be displayed separately, for example in a standard browser window. Alternatively, the decision may be a rating of the item. For example, the user may be required to provide a rating of one through ten of the item, and on rating the item, the next item is displayed. The rating may be in the form of a two-option approval/disapproval. The decision may also be to click through to the next available item. In one embodiment, the user may be provided with the option to provide a rating prior to selecting to click through to the next available item.

In one embodiment, the single item window may be provided in the form of a deskbar, as shown in FIG. 38. A deskbar in a computer application that installs at least one button on the start bar or dock of a computer, and clicking on the at least one button displays a window. In one embodiment, the window displayed is a browser window. The browser window may be configured to open to a particular starting page or program, this starting page or program may be stored on the local machine, or may be remote.

In one embodiment, the browser window may open a remote web page that includes an object such as a flash file. The flash file may act as the single item window or presentation vehicle for IAP information. The flash file may issue requests for information to display. The request may be to a single provider of information, alternatively it may be from multiple sources. For example, the flash file may request feed formatted content.

In one embodiment, the browser window may open a local program, for example a flash file that may in turn request feed formatted content. The local program may display the content itself, or may load a remote program, such as a second flash file, that may display the content. Several results may be achieved by this multiple tiered structure. A local program may allow additional interaction with the local machine, for example access to reading and writing local files. A local program may also directly request remote content, potentially removing caching issues for requests that would have been made through the browser. Loading a local file will generally lead to a faster initial display to the user. Also, providing the local program with the ability to load a remote file allows updates to the display program without requiring the user to update the local program.

The single item window may, in one embodiment, display items in a specifiable order. The order may be specified by the program or by the user. For example, the user may select to view items from a particular source in groups, such as six items from a British Broadcasting Corporation (BBC) source, and four items from a Wall Street Journal (WSJ) source. Alternatively, the user or program may group items by topic or order, or may spread items of similar source or topic out.

In one embodiment, after an item has been displayed in the single item window, a user may find it in a recorded history of items viewed. The user may also select to add an item to a saved items list that may be viewed separately from the history of items viewed. In one embodiment, a copy of any content linked to the item may be cached on the user's computer or at the IAP server. Caching may take place for all items, or may be done selectively based, for example, on items having been placed in a user's saved items list.

In one embodiment, the single item window may include one or more interface items to allow the user to filter, order, or otherwise adjust what items are displayed. For example, the particular feed sources a user is subscribed to may be displayed on the single item window in a tabbed or drop-down selection style, as known in the art. Alternatively, the options presented to the user may categorize one or more of the feeds, as shown in FIG. 39c. In one embodiment, the single item window may only display options that have items currently available to the user. Alternatively, options that have items currently available to the user may be presented differently to the user, for example highlighted, underlined, or the like. The user may, for example, select to see sports information. Based on the user selection, the items displayed to the user may be exclusively of the category or feed selected, or it may prioritize the sports items stronger. In one embodiment, a default order option, tab, or drop box selection may be provided to provide the items in a default order. This order may be random, based on a prioritization specified by the program, user or both, or any other ordering method as known in the art. When a user selects a tab, drop-down, or the like, the particular selection may cause the items displayed in the single item window to be of that selection for a certain number of items, until all items of that feed or category are displayed, or for a certain period of time. When there are no more items of that particular feed or category, or when the certain number of items has been displayed, or when the period of time has passed, the single item window may return to a default order. In one embodiment, an item may be displayed when the ordering is returning to default that indicates this change.

In one embodiment, the user may recommend feed formatted content, for example individual feed items, on the interface. For example, a recommend element may be provided in the interface, as shown in FIG. 39a.

In one embodiment, the user may provide rankings of feed formatted content, for example individual feed items, on the interface. For example, a two choice good or bad, or thumbs up thumbs down rating option may be supplied, as shown in FIG. 39b. Alternatively, multiple rating options, may be provided, such as the scale of seven options, as shown in FIG. 39c.

In one embodiment, the interface may include a calendar launch button, image or link, as shown in FIG. 39c.

In one embodiment, the tabbed, drop-down, or other selection options may include one or more titles or categories of one or more feeds defined by the user. For example, a user may define a category called "work feeds" and one called "home feeds". The user may be presented with these as selection options on the single item window and by selecting one or the other, determine or prioritize the feed sources displayed in the window.

When an item is viewed in the single item window, or when the user selects to view the next item, it may be recorded locally, at a server, or in both places that the item has been viewed. In one embodiment, the order in which items are displayed to the user may be determined on a remote server. Alternatively, a program on the user's computer may order the items, for example a local flash file, or one displayed in a browser window. The single item window may pull them down from the server individually or several at a time. An item queue may be maintained on the local machine, ordered locally or at the server. If the ordering is managed on the server, an item already held in the local queue may be downloaded in duplicate if it has not yet been viewed. The single item window may include a queue of viewed items. This queue of viewed items may serve to allow the user to review previously viewed items as well as provide a local record of viewed items that any queued items received from the server may be checked against. Items received from the server may also be checked against items waiting in the queue and whatever item is currently being displayed. In this manner, the single item window may prevent the user from viewing an item repeatedly. In one embodiment, the single item window may manage ordering of items based on ordering or prioritization rules stored locally or pulled from a server.

In one embodiment, the single item window or a configuration interface thereof may provide the user with the opportunity to select in what manner item transition is handled. For example, the user may select to have the items scroll automatically, and may select the frequency of the scrolling.

Figure 40:
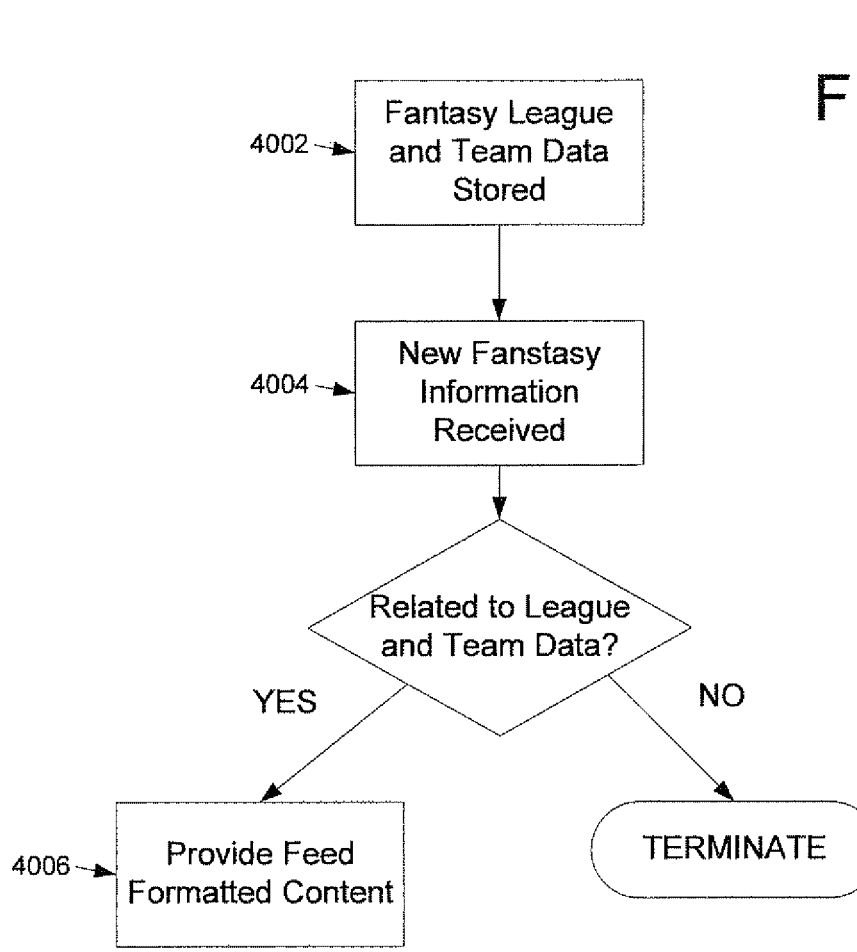
FIG. 40 illustrates a flowchart representative of one embodiment of a method for providing feed formatted content.

One type of information that may be displayed in the single item window is information related to fantasy sports. FIG. 40 illustrates a flowchart representative of one embodiment of a method for providing feed formatted content at 4000. Fantasy league and team data is stored at 4002. New fantasy information is received at 4004. For example, a server may receive feed formatted content representing fantasy information. A determination is then made whether the received fantasy information is related to the league and team date. If the information is related, feed formatted content is provided at 4406. For example, a user may receive updates on the statistics of players they have specified, player injuries, players not currently held in their league that are having impressive statistics, scouting reports for weekly matchups, or the like. In one embodiment, a fantasy sports information feed may be provided for each player in a sport. Alternatively, the feed may include information in feed items indicating what play the information may be associated with.

Figure 41:
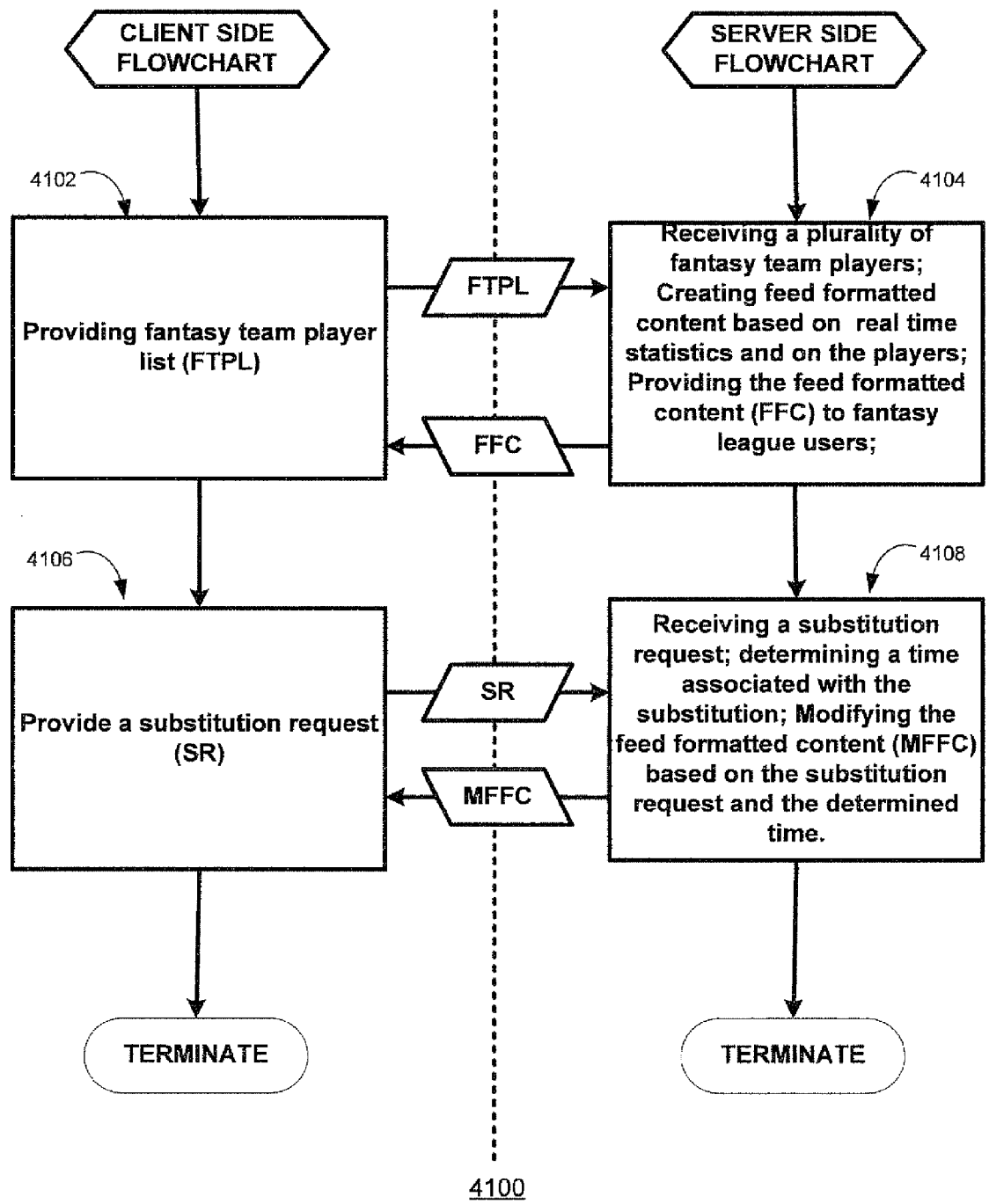
FIG. 41 illustrates a flowchart representative of one embodiment of a method for operating a real time fantasy sports league.

In one embodiment, feed formatted content may facilitate fantasy league play. FIG. 41 illustrates a flowchart representative of one embodiment of a method for operating a real time fantasy sports league at 4100. A user provides a fantasy team player list at 4102. A server creates feed formatted content based on real time statistics and on the fantasy team player list and provides the feed formatted content to the user at 4104. The user provides a substitution request at 4106. The server receives the substitution request, determines a time associated with the substitution, and modifies the feed formatted content based on the substitution request and the determined time at 4108. For example, statistics and feed formatted content may be provided and tallied to a user based on their specified team. A user may note that a player has been injured, or that it is halftime in a game, and may substitute in an alternate player at that time. The provided and tallied statistics may represent the team with the substitute starting at the time the substitution is submitted.

Figure 42:
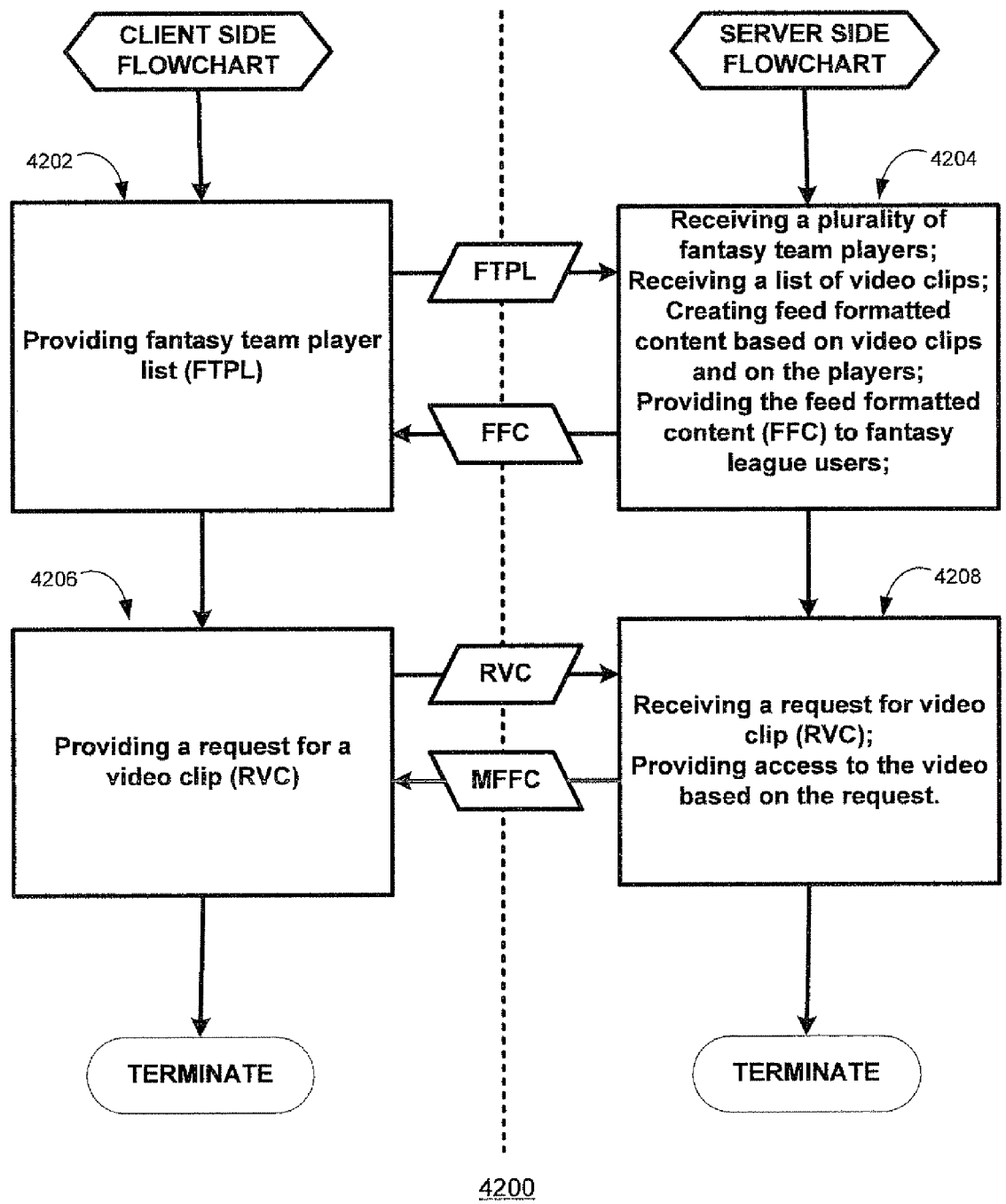
FIG. 42 illustrates a flowchart representative of one embodiment of a method for operating a real time fantasy sports league.

In one embodiment, feed items may include one or more video, audio, or audio/video clips or links to one or more video, audio, or audio/video clips. Such a feed may be read to a computer, a cellphone, an internet connected digital video recorder (DVR), or the like. In one embodiment, a DVR or other device may aggregate clips into a highlight reel of important fantasy sports plays, for example for a user's active players in a league. FIG. 42 illustrates a flowchart representative of one embodiment of a method for operating a real time fantasy sports league at 4200. A user provides a fantasy team player list at 4202. A server receives a plurality of fantasy team players, receives a list of video clips, creates feed formatted content based on the video clips and the players, and provides the feed formatted content at 4204. The user provides a request for a video clip based on the provided feed formatted content at 4206. The server may receive the request for a video clip and provide access to the video clip at 4208. In this way a user may request either an individual highlight video clip of a fantasy player, or, in one embodiment, the user may request all video clips associated with one or more of their players. When more than one video clip is selected, a playlist may be provided. In one embodiment, the playlist may include one or more accompanying audio clips, for example selected by the user, to play in conjunction with the playlist. Commentary, audio, video or written may also be included in the feed formatted content. For example, an opponent may make supply a heckling comment to accompany a play in which one a user's key player is injured.

In one embodiment, feed items in queue may have some or all information associated or linked to from them cached at the user's machine. The queue may serve as a starting point for a local spidering or indexing program that pulls down the content. In one embodiment, any associated pages or content may be downloaded by a local program running in a browser, for example a flash file. Content may be loaded into an invisible iframe or if the program has access to the local hard drive it may be stored there.

One embodiment of the present invention provides a method for creating feed formatted content from a mobile device. A phone number or email address may be designated that allow text messages or emails to be received by a program that converts the received content into feed format. For example, a user may have a personal feed associated with an account, and may be given an email address that allows posting to that personal feed. In one embodiment, only content received from designated sources—be they specific email addresses, cell phone numbers, or the like—may be allowed to post to the personal feed. These may be designated by the user. In one embodiment, when an email, text message, or the like, is received at the email address provided to the user, the body of the email may be parsed out as the description portion of an RSS feed, the subject may be parsed out as the title, and the sent date as the publication date. In addition or alternative to personal feeds, a feed on a specific subject may be created. Again, only certain email addresses, cell phone numbers, or the like may be allowed to post to the feed, or it may be generally accessible. In this manner, one or more persons may report on a subject from a remote location and have the information accessible to anyone subscribed to the feed. For example, a street team might be assembled to report on how the patrons and atmosphere of a bar appear on any given night. Alternatively, people attending a concert may be able to make comments about the show during the event.

One embodiment of the present invention provides a browser toolbar that allows a user to create a feed item from a visited page. When the user is on a page, they may click a button on the toolbar that passes the URL of the current page to either a local program, or a remote program—such as a dynamic web page, ASP.NET for example—that may convert that page into a feed item for a particular feed. For example, a user may click a "favorites" button, that adds a page to a personal favorites feed. The user may be allowed to create any number of feeds that pages may be placed in. For example, a user may be doing research on a particular academic subject and wish to make any found information available to anyone interested in the subject. In one embodiment, one or more feeds may be available for which multiple users may provide pages. Individual users may be granted permission to add pages to the feed, or it may be generally accessible. For example, a commonly accessible "funny stuff" feed may be made generally accessible to users. When a user finds a web page they find qualifies as "funny stuff," they may hit a button on their toolbar to include the URL and title of the page they are on to the "funny stuff" feed.

In one embodiment, a page converted to feed formatted content may be passed as a recommended feed item. The recommendation may be a general public recommendation, or the recommendation may be addressed to specific persons, for example one or more users that the user who created the feed item holds relationships with in a friends network.

In one embodiment, a single item window may be used as an academic tool. For example, a group of feeds may be provided a teacher that students in a class are assigned to subscribe to. Additionally, a posting board may be provided for commentary or questions. Each item added to the posting board may be available in feed format and students subscribed to the class posting board feed would be updated on that item. One or more feeds may also be provided for class announcements, such as test schedules, field trips, changes in assignments, or the like.

One embodiment of the present invention provides for combining a job posting and searching site with a friends network. A user may post a resume, specify job skills, and other job search criteria. Employers may search for users with certain criteria and then determine, based on the friends network, whether they or one of their employees is somehow connected to a job candidate. For example, a company may be looking for someone to fill a role in the marketing department. Using standard methods, the employer may search for job applicants based on resume and/or application information. The list of returned applicants may include any relationship connections between the recruiting user and any of the job candidates. Additionally or alternatively, the list of applicants may include any relationship connections between an employee of the recruiting company and the applicants. The search may be limited to include only those applicants who are within a certain number of connections of the recruiter or another company employee. A similar process may be used by a job seeker, in that they may view a list of employees at a potential job provider to see what relationship connections they may already have with individuals at that company. In one embodiment, a search criteria for job applicants, or by a job applicant, may be provided in feed format, for example RSS. The recruiter or applicant may subscribe to such a feed to receive updates as new jobs or applicants that meet their criteria are posted to the system.

In one embodiment, a friends network may be combined with a seller information system, such as, for example, that provided by Ebay. For example, a seller profile page may include, in addition to feedback ratings and comments, a description of any relationship connections between a user and a seller. Additionally, any connections between a user and a previous buyer from a seller may also be provided.

In one embodiment, a single item window may display the birthdays of users connected by a friends network. The single item window may also display other calendar events.

In one embodiment, one or more feeds may be associated with a geographic area. For example, a database may maintain a list of feeds and zip codes, and associations between feeds and zip codes. When a user indicates presence or interest in a certain area, feeds associated with that area may be recommended to the user or automatically subscribed to.

In one embodiment, certain categories of feeds may be provided to a user, for example local news. Appropriate local news feeds may be determined based on geographic association, such as the method described above. In one embodiment, exclusivity may be granted to a feed provider for a given area. For example, The Freeport Press, may be a local paper for a certain area. When a user signs up and indicates they live within the area of exclusivity for The Freeport Press, the local news category may be exclusively granted to The Freeport Press.

In one embodiment, a user of a single item window, or a group of users in a friends network may designate a charity that a portion of revenue associated with their accounts may be donated to. For example, a portion of any advertising revenue from advertisements displayed to the user, as well as portions of any affiliate program purchases, paid subscriptions, or the like may be donated to a charity. For example, some feed formatted content, or the information linked to from feed formatted content, may be provided only on a paid subscription basis. By way of specific example, the Wall Street Journal charges a monthly subscription to articles on its site. For a user to view the article they must pay the subscription. In one embodiment, the Wall Street Journal may allow a portion of the subscription payment to go to the provider of the single item window if a user signs up for the paid subscription at the single item window configuration interface, or may pay a portion for any user that accesses articles via the single item interface. The portion of the income may, like other income sources, have a portion allocated to a charity.

In one embodiment, starting configurations for the single item window and IAP, and/or continuing recommendations and content may be based on affinity groups. For example, users may indicate interest in such affinity groups as entertainers such as Josh Grobman, or Destiny's Child, or for sports teams such as the Philadelphia Eagles, or Chicago Bulls, or to schools such as Northwestern University, or Glenbard West High School, or to disease groups such as breast cancer, AIDS, or the like. Customized skins, feed categories, quick links, recommendations, and the like may be provided based on any selected affinity group.

Figure 43:
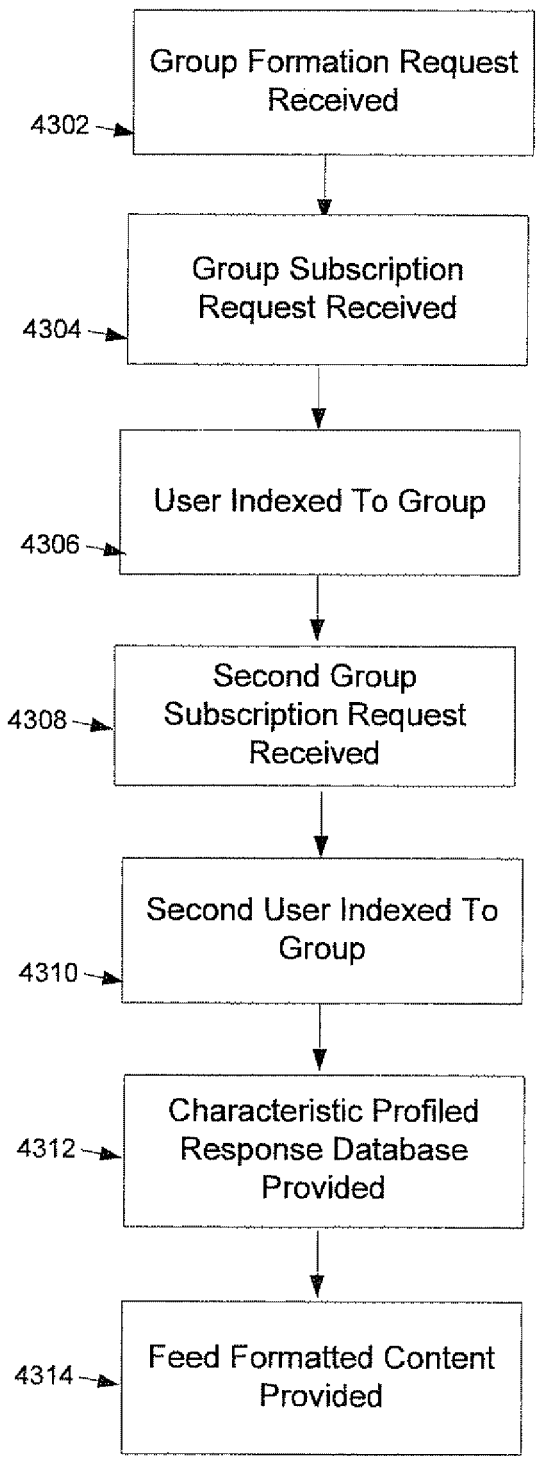
FIG. 43 illustrates a flowchart representative of one embodiment of a method for providing feed formatted content.

In one embodiment, a social network may include the ability for a user to designate groups to connect or associate users. FIG. 43 illustrates a flowchart representative of one embodiment of a method for providing feed formatted content at 4300. A group formation request is received at 4302. A group subscription request is received from a first user at 4304. The first user is indexed to the group based on the received subscription request at 4306. A second user provides a group subscription request at 4308. The second user is indexed to the group based on the received subscription request at 4310. A characteristic profiled response database is provided at 4312. Feed formatted content is supplied to the second user based on response data from the first user and the group subscriptions at 4314. For example, a user may collect members of an organization, classmates, or their children, into named groups. Using the example of the children, a parent may have control over the feed subscription capabilities of the children, or may subscribe to feeds themselves that they associate with one or more children. For example, a parent may subscribe to feeds for sports teams, school events, church schedules, friend's birthdays, or the like on behalf of their children or for themselves in association with the one or more children. In this manner, the parent may view the schedules and events associated with their children as made available through such feeds. The feed information may be displayed in calendar format as previously disclosed.

In one embodiment, the single item window may display survey or polling questions. The ability to respond to the survey may be presented in the single item window, or the link provided in the single item window may lead to a survey or poll page. In one embodiment, the results of a survey or poll may influence the recommended or delivered content to the single item window. Influence of the recommendations or delivered content may be directly related to the question, for example "would you prefer to receive CNN information instead of BBC information," or it may be based on more subtle or gleaned preferences such as "do you consider yourself republican or democrat" influencing whether a more liberal or conservative new source is recommended, or it may be related to the feed subscription and delivery preferences found in people who answered the survey similarly.

One embodiment of the present invention provides a call center for receiving updates to feed formatted content associated with a set of clients. For example, an online yellow page style directory equipped with feeds associated with the listings may have such a call center. When a client calls to add, change or update their feed the call center may request an account number, user name, secret password, or the like to confirm the identity of the caller or their authority to make the change requested. In one embodiment, the call center may also verify the origin of the phone call as one of an accepted set before or in addition to requiring the identity confirmation. In one embodiment, the call center may record the audio placement of the change request and associate the recording with the change request for liability purposes.

In one embodiment, the IAP can include a legend or key that includes various view item categories. The view item categories may include, for example, world news, technology news, business news, entertainment news, friend messages, business messages, local lunch deals, local entertainment news, fantasy sports reports, stock information, calendar day items, and any other category. Some or all of the view items shown in the legend can be pre-selected by the user or pre-loaded by the IAP. The legend may be constructed in all or part based on one or more of the following: user profile, branded IAP profile, or user preference. The user or IAP can select the number of information items displayed in the IAP view window at any time. The user can select a view item category from the legend and responsive to the selection, the information items corresponding to the selected category will be presented based on the display item preference.

For example, if a user selects technology news, which had a three at a time item display preference, the IAP would provide three business news information items at a time to appear in the IAP view window. The user may then click through the business news items three at a time until all business news items were displayed. The user may then, for example, select calendar day items, which may have a variable display item preference to accommodate various calendar items for any given day, The IAP view window can expand and contract based on the selection. The number of items display preference can also be pre-set or adjusted for handheld wireless devices, telematics units in mobile vehicles, home and business computers, television display, and the like.

In one embodiment, for example, the IAP may be set up for a business group, where a the group members or group leader can override number of items display preference for priority information items. There may also be provided a preload override for priority items, wherein regardless of the view item category selected by a group member, the priority message or messages will be displayed. The view window can also be automatically expanded to accommodate a length of a priority message. In addition, a return receipt or confirmation can be required for priority or other messages.

In one embodiment, a feed provision and aggregation system may be employed by organizations to coordinate activities and information dissemination. For example, a political candidate, government organization or party may employ such a system. One or more feeds may be provided and made selectively or generally available for such functions and subjects as: campaign or organization fundraising events, campaign or organization appearances, articles and news relating to an organization or campaign, articles and news of interest to those interested in an organization or campaign, blogs maintained by members of a campaign or organization, or the like.

One important way to find out about new job openings is through referrals or friends that are aware of openings. In one embodiment, friends could post job openings to friends and distribute via the IAP through the friend network of the friend that posts the job opening.

In one embodiment, as shown in FIG. 38, the IAP or single item window allows only a single information item. That single information item may include, for example a title to an article, an introduction to a promotion, a subject matter of a message, a short message, a short promotion. The single information item focuses a user's attention to one area of the box and requires the user to read the information item to determine if he wants to click to the next information item or click to open the information item or make another IAP function selection. IAP function selections may include, forwarding to a friend, storing in a folder, adding to a feed, rating or recommending, or providing commentary.

In one embodiment, the IAP would in addition to pulling titles of content to be displayed in the IAP window, the content itself can be downloaded and stored at the computer so that when the article titles are clicked on the saved web page is displayed. In one embodiment, the IAP may sense usage and download any further articles. The IAP may also delete articles based on usage conditions, such as, when the user has clicked a certain number of titles or when a user has opened an article and then closed it out. In one embodiment, the IAP can download weather, sports scores and statistics, fantasy points and other content that may or may not be displayed via the IAP window, for example based on preferences supplied by the user.

In one embodiment, the downloaded articles can be searched using key words input by the user. The search can delete articles and titles to be displayed that do not contain the key words. For example, a user may select ESPN football news as a feed, and then input key words including "Dallas" and "Cowboys." The user computer can search the text of the downloaded web page for these key words and delete all articles and titles not containing the keywords. This process would take place in the background, so that when a user accesses the IAP the article titles, which corresponding articles included the key words, are all that are displayed at the IAP.

In one embodiment, the single item window includes one or more display advertisements, either as the item, in addition to the item, or in place of the item. The single item window will constantly check for mouse or keyboard movement to determine the presence of a user and then request targeted advertising from the server based on a user profile, a geo cookie, a double confirmation geo cookie, and/or a geo click through cookie. In one embodiment, the single item window includes local entertainment. For example, restaurants and bars in a given city or geographic region would have template items stored in a database that could be modified upon a call to a call center or by some other notification method including fax and email, instant messaging and the like. Once a user is detected as present at a computer, a check for geographic information related to the user would be made and a request for a time sensitive ad would be made to the ad server. If a time sensitive directive was received at the call center from Joe's bar, the Joe's bar ad would be pulled and appropriate language in accordance with the directive would be inserted in the ad and displayed in the single item window. For example, an ad at Joe's Bar may be delivered to a user "Come on in drinks are half off." The ad may not be served if there is additional profile information about he user that would not be compatible with the advertiser. Alternatively or in addition, a banner ad could be served to a web page sent to the user's computer based on the same criteria.

In one embodiment, the IAP includes an information provider interface that allows providers of feed items the ability to select placement of their items within one or more feeds. In one embodiment the provider interface allows users to select from one or more priority factors, including for example, frequency of occurrence within a feed, frequency during a particular time or season, position of the feed item within the feed (for example: first, last, etc.), priority of positioning adjacent complimentary feeds (for example: restaurant item presented before or after movie item), priority based on demographic (for example: presented first to single females between 18-24 years old), priority based on geographic location, priority based on profile factors (for example: age, sex, address, etc.), priority based on survey data, priority based on time of day and/or date, priority based on season or holiday period, priority based on feed subject matter (for example: home improvement feed, food and entertainment feed, etc.) and other priority classifications. In one embodiment, priority can be based on whether an item is clicked on. For example, if a golf club item is clicked on, a provider could select that the next item viewed through the single item viewer would be a golf ball item. Priority selection may also be provided for displacing two or more items together in a feed item window. For example, a provider of a camera item can select to simultaneously display a second camera accessory item in the IAP window. The interface can allow providers to select other items providers, which it will agree to jointly appear with within an IAP display window.

In one embodiment, feed item providers can have pre-established business relationships formed via the IAP relationship system. For example, a group of three companies can establish an agreed upon discounted entertainment package via the IAP relationship network which may include, for example, an early dinner at a restaurant, followed by a movie, followed by a desert at an ice cream shop. Such an entertainment package may be advertised or otherwise distributed via the IAP, for example in coupon format. The interface may provide this group to have its own entity placement via the information provider interface with payment percentages being pulled from each of the three providers paypal or other account. This allows the group entity to bid higher for particular priority factors. In addition, a specific time and date for the entertainment package can be loaded in the feed item, which may be pulled and loaded into a IAP user's feed calendar. Other cross-promotional packages and business relationships may be established via the IAP, such as one between a window washer and a horticultural service company. Again they may split the cost of advertising via the IAP and present a cross-promotional offering and deal.

The relationship network of businesses may be managed in a similar manner to the previously described relationship network. Businesses may search for other businesses based on name, area of business, location, and other characteristics. When a company is found, a cooperative relationship may be requested. If this relationship is agreed upon, a set of interaction tools, such as that described above for allowing cross-promotional advertising, may be presented.

In one embodiment, the IAP is sized to fit titles of articles or other information in a small screen area. This design can then also be used in PDA's, cell phones and other handheld devices, as well as being displayed on a section of a monitor used for television. In one embodiment, the message can be formatted to allow a user to scroll through the information line by line. The tiles and messages can also be scrolled at a set rate and repeated a set number of times. Television programming can be paused when a title is clicked upon. In one embodiment, a user or feed manager can select information titles for display at the IAP based on their relation to the television or radio programming. For example, a user may select that all Fantasy Football players on his team and/or opponents team with yardage, touchdowns and Fantasy points be displayed every 5 minutes or scrolled through while the user is watching TV or as a message to the users portable communication device on Sundays. Friends' messages related to the football or other game can be prioritized for display when the user is watching TV on game day.

In one embodiment, the IAP allows the user to designate a portion of proceeds from advertising revenue to selected causes including charities, political parties, candidates, associations, clubs, or any for any other purpose. The advertising revenue may include, for example, direct advertising revenue from skins, or ads on the IAP network of sites, shared revenue from book or product recommendations on Amazon, Ebay or other site, shared revenue from Google, Overture, or other search sites for adwords, etc. The IAP user may form friend networks and achieve revenue goals for charity or other purposes and display the revenue totals in feed format during a designated period. The revenue can be calculated for each individual user or group and displayed at the IAP window, web site, calendar, etc.

In one embodiment of the IAP the display window is a small box that holds, for example, three lines of text to allow titles to be displayed. A button can be provided to click through the titles without user input at a set rate that can be adjusted by the user. Other buttons can be provided to allow a user to select a class or type of information to be displayed in the IAP window. For example, if the user selects the sports button, the sports news will be queued up to be displayed in the IAP window. The user may also, for example, select calendar alerts to be fed into the IAP window on the appropriate day from the calendar event feed. The selected calendar alerts can also be directed to the IAP windows of all associated members in a friend network. For example, a Baseball Coach can reschedule an event on his calendar, which can then be inserted into the baseball team feed and loaded into the players IAP calendars as well as sending an alert to the IAP windows of the team members.

In one embodiment, a related story button can be pressed at the IAP and a background search for other related stories can be found and cued up for display for viewing through the IAP window.

In one embodiment, the single item window may provide a search interface for online shopping for products and services. For example, an interface may be provided to search for airline tickets. A single information source such as American Airlines or Expedia may be used, or an aggregation service such as SideStep. In one embodiment, a user may save search criteria and receive price updates based on the search criteria.

In one embodiment, the IAP may provide an interface that includes the ability to search for companies by company name, stock ticker, or the like. In one embodiment the results of the search may include options for the user to select stock price, press release, related article, analyst commentary, corporate earnings statements, and other company information feeds. Information feeds may also be presented for associated companies, or links to pages or lists displaying the feeds for the associated companies, for example competitors within a field of business or complementary companies. Some feeds may be customizable, such as setting the price points, price changes, dollar value, percentage, or the like, or volatility that triggers whether an item is included or not.

In one embodiment, a search interface for a product may return a variety of results. For example, searching for a coffee maker may return a list of coffee makers. A coffee maker may have additional information available such as comments or recommendation information posted regarding the item, in one embodiment these comments or recommendations may be displayed based on a social network database. In one embodiment, a promotional code may be returned for purchases of products made on particular web sites. For example, if a user was shopping for a coffee maker in a standard browser window, and during the checkout process was presented with the opportunity to enter a promotional code, the options for searching for such a code include: leaving the page, finding the code, then returning to that page all within the same browser window; or opening a new browser window to search for the code, then returning to the browser window to enter the found code. The deskbar single item window allows the user to keep the full size browser window open and on the purchasing page, and then allows the user to search for a product or web site promotional code while maintaining visibility on the full size browser window. In one embodiment, if a product does not have any comments or recommendations associated with it, the user may post a link to the product as a feed item, requesting comments or recommendations in general, or forwarding the feed item specifically to users within their friend network.

In one embodiment, users may associate themselves with life groups. A life group may be a company or organization, nationality, or a life point such as recent college graduate, pregnancy, disease sufferer, or any other group representative of an affiliation with others users. Communication via the IAP or single item window may be directed toward group members. For example, a woman during her first pregnancy may experience a variety of physical and emotional incidents and wish to ask questions of others experiencing the same. In the same vein, a wide variety of purchases are associated with pregnancy, from maternity clothes purchasing to vitamin supplements and baby products. The IAP may provide a channel, feed, or set of feeds to allow members of a pregnancy group to recommend URLs of available products, or to communicate regarding experiences.

In one embodiment, users may enter, edit, or provide controlling association over other user accounts. For example a parent or employer may exercise control over feed subscriptions for children or employees.

A user profile in the IAP may include one or more feeds of information associated with a user, such as a wish list. Users may use a toolbar, provide direct entry, or the like of pages or products that they wish to appear in their wish list feed. A message item indicating a user birthday to another user who has a friend relationship may include a link to a wish list feed. Alternatively, a button or link may be provided to take a user to a page of recommended presents for a person of the age, sex, or other set of characteristics. For example, some toy sites provide the opportunity to enter an age and sex and receive a list of recommended presents. A link may take a user from a child's profile to the exact list of presents for the age and sex combination of the child's profile. Address, and other pertinent shipping or delivery instructions and information may also be passed to the retail site.

In one embodiment, a user may select specific interests within a category to receive updates. For example, a user may customize a best sellers or recently published list of books to only receive messages regarding a specific list of authors. Actors, directors, genres, or the like may be specified for a similar feed for movies.

In one embodiment, music recommendations may be provided to users via the IAP or single item window based on new releases of bands or artists or new projects for members of bands the user has entered interest in. Recommendations may also be made based on other user profiles, the user profiles used for recommendation may be limited to a certain breadth within the friend network.

In one embodiment, a link or button may be provided on the IAP or single item window to provide the user with peripheral information regarding an item. For example, peripheral information could include user or other third party commentary on the source or subject of the item, map information, similar items, general information, bonus or benefit information, or the like. For example, a feed item regarding college recruitment at a specific college could include a link to a college rating service. By way of another example, a restaurant special could include a link to rewards network miles per dollar information for the restaurant.

In one embodiment, sellers of products may supply feed formatted inventory lists. The inventory lists may be associated with locations. A user may search the IAP for a product and receive a list of local sellers of the product. The list of local sellers may include the inventory information supplied by the sellers, along with any pricing, special, or sale information.

In one embodiment, a user may associate one or more locations with their user profile. Feeds in a feed database may include associations with locations. A user may be presented with certain feeds associated with the locations in their profile during signup, further configurations, or as subscription recommendations on the IAP or single item window.

In one embodiment, a user may be associated with attributes. An attribute may be based on profile information, feed subscriptions, feed interaction, survey information, or the like. For example, a user may add an attribute to their profile indicating that they attended a certain college, and another attribute indicating that they are a fan of Quentin Tarantino movies. A profile or attribute list may be presented to the user where one or more of the attributes provides a link through to a list of top-rated feeds or feed items for users with the same attribute. In one embodiment, the top-rated feeds or feed items may exclude those already viewed or subscribed to the user. Additionally, advertisers may queue in on one or more attributes. For example, Cigar Aficionado may have determined a correlation between those who play or are interested in golf, and their product. Cigar Aficionado may select to send messages to a user with an attribute such as having answered a survey indicating the user enjoys golf, or to a user with an attribute such as having subscribed to a Golf Digest feed. Advertisers may select to advertise to those who exhibit multiple attributes, for example one who has subscribed to Golf Digest and also makes over a certain salary.

In one embodiment, specials, sales, or coupons may be provided to a user via the IAP or single item window with a recommendation requirement. A recommendation requirement may be, for example, that the user must forward the item to a certain number of friends. The IAP may record the number of recommendations or item forwards, and issue an item with a coupon or promotional code when the recommendation requirement is reached.

In one embodiment, the IAP or single item window may include quicklinks. A quicklink is a link to a web page available to the user from one or more IAP or single item window. Quicklinks may be configured by the user. A user may choose to set the IAP as their homepage, and the page being replaced as a homepage may be automatically set as a quicklink. Quicklinks may also be recommended and permanently or temporarily set for a user. Quicklink recommendations may be made based on the recommendation methods and processes described for feed formatted content recommendations described herein. For example, a survey question may be presented to a user of the single item window asking whether they intend to take a spring vacation. Based on the survey response, the IAP may add one or more quicklinks to travel and vacation sites. Such recommended quicklinks may be temporary in nature, permanent, or the user may be presented with the option to remove or make permanent a recommendation.

In one embodiment, a fantasy sports feed can be continuously adjusted based on user selected or IAP suggested or provided factors, for example, for fantasy football some factors may include: player versus defense strength, player versus opponent time of possession, player's historical performance against opponent team, players performance at stadium, weather conditions, opponents players, player's recent performance, injury reports, etc. The user may select factors for the player selection feed, which then based on the factors selects the best team from the users fantasy team and all other available players. For example, during a football season Sunday, a fantasy player may be injured; the feed will provide a replacement player based on the selected or provided factors. The feed may make the selection for the user or alert the user with a feed item alert.

In one embodiment, a user may select a plurality of custom feed systems. For example, ESPN may offer a bundled feed system with articles and content geared to its target audience. The IAP reader associated with the ESPN bundled feed system can be customized by adjusting number of information items per view window display. The IAP may also allow customization through key word queue preference and content preference.

One embodiment of the present invention provides a configuration interface for the IAP or feed sources for a single item window or other feed formatted content display interface.

Figure 44:
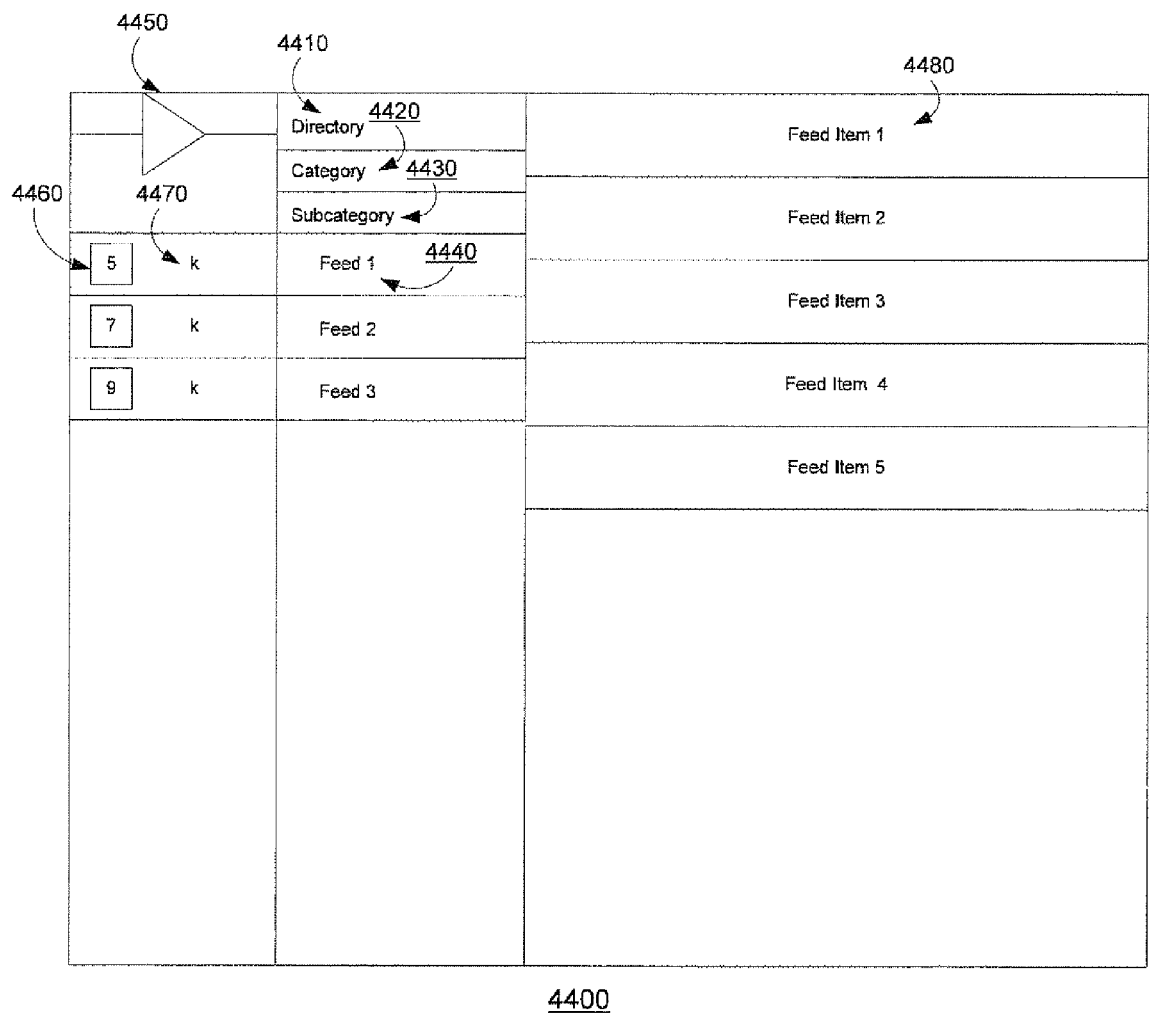
FIG. 44 illustrates a schematic diagram of one embodiment of a single page multi-source configuration interface.

FIG. 44 illustrates a schematic diagram of one embodiment of a single page multi-source configuration interface (SPMSCI) at 4400. SPMSCI may include a directory link 4410 that displays available category links 4420 to the user. Clicking on directory link 4410 displays all available category links 4420. Clicking on a category link 4420 may display subcategory links 4430, or feeds 4440 from that category. Clicking on subcategory link 4430 may display further subcategory links 4430 below the first subcategory, or feeds 4440. Clicking on or hovering over feed 4440 may cause feed items 4480 to be displayed. The feed 4440 may include an option to select a feed for subscription. A feed 4440 that has been selected for subscription may display configuration options such as a display configuration option 4460 that may be used to rank or prioritize the feed, to determine how many items should show in a row in a single item window, or some other display configuration. Feed 4440 may also include a configuration option in the form of a keyword option 4470 that allows the user to specify key word requirements for the content in a feed item for it to be delivered to them. In one embodiment, such configuration options, or other portions of the SPMSCI may be collapsible by way of clicking or hovering over display control 4450.

All feed and feed item loading, interface display and hiding, and configuration updating may be performed without refreshing the SPMSCI by developing the SPMSCI in a technology such as Flash or java that allows background connections to data sources without requiring visible roundtrips to a server for each information update.

In one embodiment, the user may elect to provide their own categories for subscribed feeds. The user may then be presented with links, icons, buttons, or the like on a display interface to select the bundle of feeds represented by their assigned categories or by the user created categories.

In one embodiment, an attribute may indicate affinity to a certain actor, singer, or other celebrity. A sales pitch may be delivered in audio format to a user based on such an attribute including a portion of the pitch done by the performer.

In one embodiment, the SPMSCI may accept two basic data formats for display in the row of directory link 2510 and the area of feed items 2580. The row of directory link 2510 displays a list of categories and feeds for subscription. The Outline Processor Markup Language (OPML) specification provides a standardized method for presenting just such information. By pulling the information for display into the SPMSCI using OPML, the SPMSCI may allow for easier export and import of existing feed lists, such as a user's feed subscription list in a standard RSS aggregator. Various feed lists maintained or generated by the IAP may be presented or otherwise made available in OPML. For example, a user viewing a second user's profile in the friends network may be provided with a function to view the feed subscriptions for the second user. By clicking a button or link, or in one embodiment by selecting their friend from a portion of the interface on the SPMSCI, the second user's feed subscriptions may be loaded into the SPMSCI for viewing. A URL querystring, a text box for URLs, a local file directory browsing function, or the like may be provided on the SPMSCI for the user to directly load an OPML file into the SPMSCI, allowing the user to easily view feed items from, subscribe to, or indeed perform any sort of feed subscription, review or management of the loaded feeds. In this manner, any individual or company may provide the directory structure for display in the SPMSCI. For example, ESPN may host an OPML file that lists their available feeds, including a directory style category breakdown. A user may enter the location of the ESPN directory file in the SPMSCI, or click on a link including a querystring element pointing to the OPML file location, and the user may then manage subscriptions of ESPN feeds.

Similarly, as the area of feed items 4480 displays feed information, the data to be loaded into that area may be provided in one or more standardized formats such as atom, RDF, or any version of RSS. Again a URL querystring, a text box for URLs, a local file directory browsing function, or the like may be provided on the SPMSCI for the user to directly load a feed for into the SPMSCI, allowing the user to easily view feed items from, subscribe to, or indeed perform any sort of feed subscription, review or management of the loaded feed.

If the requested OPML or feed file is on a remote server, the SPMSCI may circumvent any sandboxing issues in a variety of ways, for example by proxying the request through the SPMSCI hosting server, as known in the art.

Figure 45A:
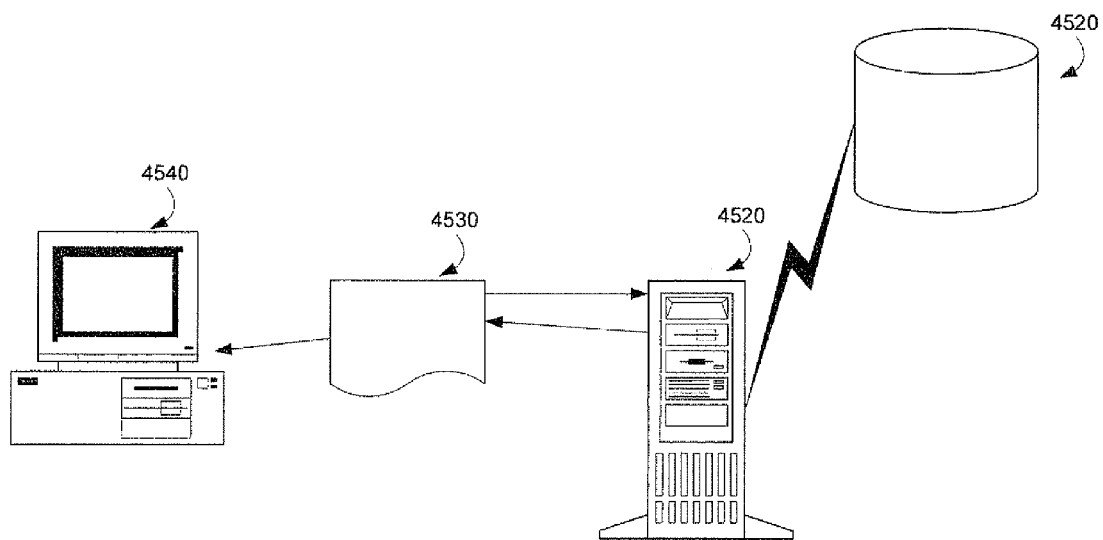
FIG. 45a-b illustrates schematic diagrams of various embodiments of an intelligent thin client.
Figure 45B:
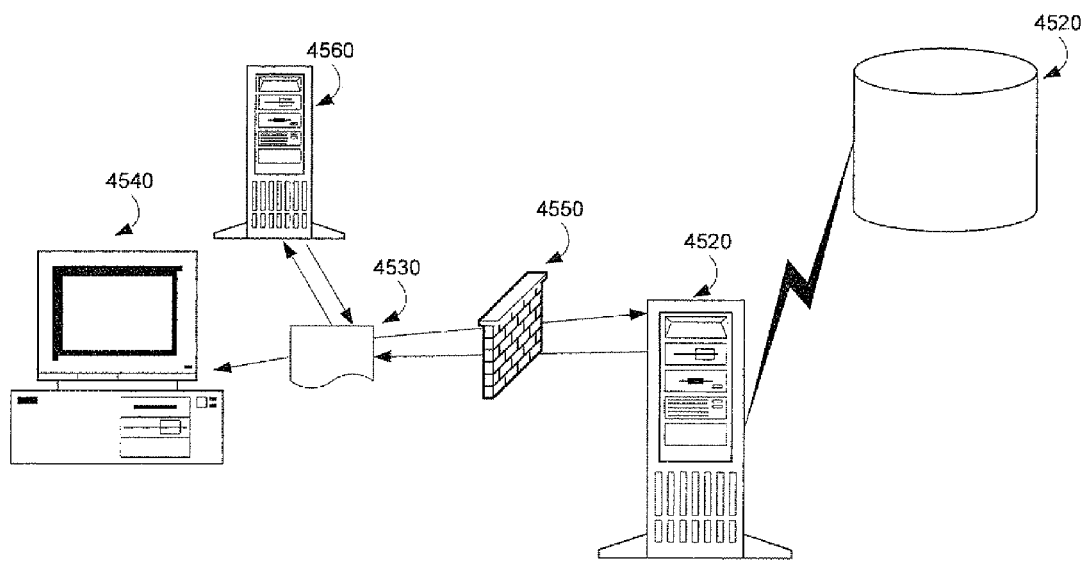

FIG. 45*a-b* illustrate schematic diagrams of various embodiments of an intelligent thin client at 4500*a-b*. A web server 4520 may serve web content including an intelligent thin client 4530 that may display data including data from database 4510 to a user of client computer 4540. Client computer 4540 may be a desktop, laptop, dumb terminal, PDA, cell phone, or indeed any web client capable of displaying an interface technology capable of background data updates. When intelligent thin client 4530 is received at client computer 4540 it may include a first set of data for display, or may initiate a request for display data after its receipt. In one embodiment, intelligent thin client 4530 may request data from a single source such as web server 4520.

In one embodiment, intelligent thin client 4530 may request data updates from multiple sources. Multiple remote web servers 4520 may be sources of data updates, or if client computer 4540 is on a local network, for example behind firewall 4550, that may include a local web server 4560, intelligent thin client 4530 may request data from one or more local web servers 4560 as well. For example, a company may host a feed on an internal server with private or proprietary company announcements that it does not wish to make publicly available. By hosting the feed on an internal server that does not have a publicly accessible IP address or domain name, the information may be protected. Intelligent thin client 4530, being within the local network, may request data from local web server 4560. Some client side technologies include certain sandboxing, or security features, that disallow certain functions. For example, an intelligent thin client 4530 may not be able to directly request information from a server other than the server on which the intelligent thin client 4530 is hosted. Some technologies, such as javascript, do not hold this limitation, and may be used to pull the content into the intelligent thin client 4530, even if the intelligent thin client 4530 is not predominantly written in javascript. For example, a javascript may be set to execute on a regular basis that makes remote data requests and uses dynamic HTML to update portions of the web page, for example an iframe or div, that host intelligent thin client 4530, as is known in the art. Intelligent thin client 4530 may not have limitations from reading its own hosting page, so the data may now be read in to the client.

Additional features may be provided by the intelligent thin client 4530. For example, prioritization, filtering, ranking, and other such logic may be performed by intelligent thin client 4530. Intelligent thin client 4530 may include in its initial load, or may make one or more requests to one or more servers for data providing rules for such logic. This may offload some of the processing required to prioritize, sort, filter or the like messages for a particular user to the user's client computer 4540.

Another feature an intelligent thin client 4530 may provide is that it may include additional control over information display not inherently included in standard HTML. Flash, for example, may display text in an uncopiable format—that is, a user may not highlight or otherwise select the text to have it pulled onto a clipboard. Intelligent thin client 4530 may provide selective ability to forward information items displayed to a user. Some content providers may not desire their information to be generally available, either because it is provided on a paid subscription or paid individual basis, or because the information is sensitive, such as the above described local server embodiment. If a forwarding function is not provided to the user, and the text is uncopiable, it may provide sufficient protection for some information or content providers to make their information available via such a method and interface. Additional protection and security may be provided by providing secure delivery of data delivered to the intelligent thin client 4530, such as SSL, and/or some level of coding or encryption on the text as it is transferred between the server and client.

Figure 46:
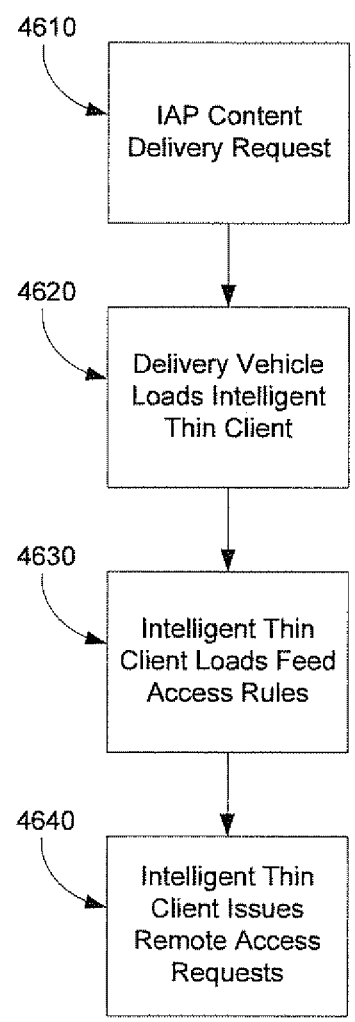
FIG. 46 illustrates a flowchart representative of one embodiment of a method for delivering feed formatted content to an intelligent thin client.

FIG. 46 illustrates a flowchart representative of one embodiment of a method for delivering feed formatted content to an intelligent thin client at 4600. A request is issued by a user for IAP content delivery 4610. The delivery vehicle, for example an internet browser such as Internet Explorer or Firefox, loads the intelligent thin client 4620. The intelligent thin client initializes by loading feed access rules 4630. The feed access rules may have been delivered with the thin client, or may be collected by a separate request. The intelligent thin client then issues one or more remote access requests 4640 for the IAP content.

Figure 47A:
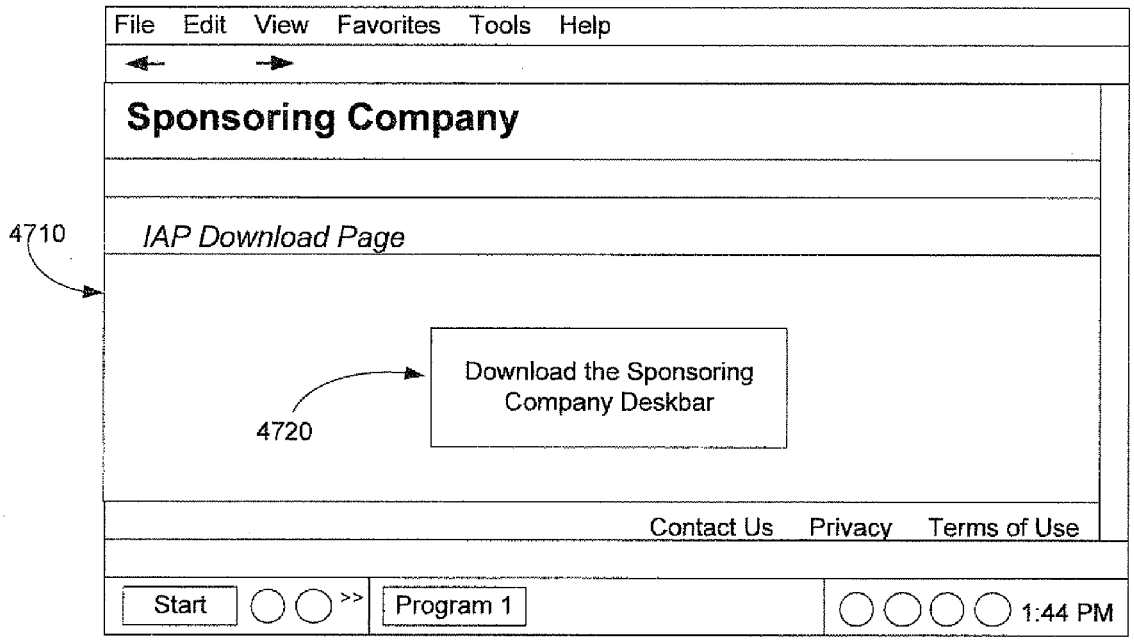
FIG. 47a-b illustrates schematic diagrams of various embodiments of an interface screenshot for selecting a customized IAP interface.
Figure 47B:
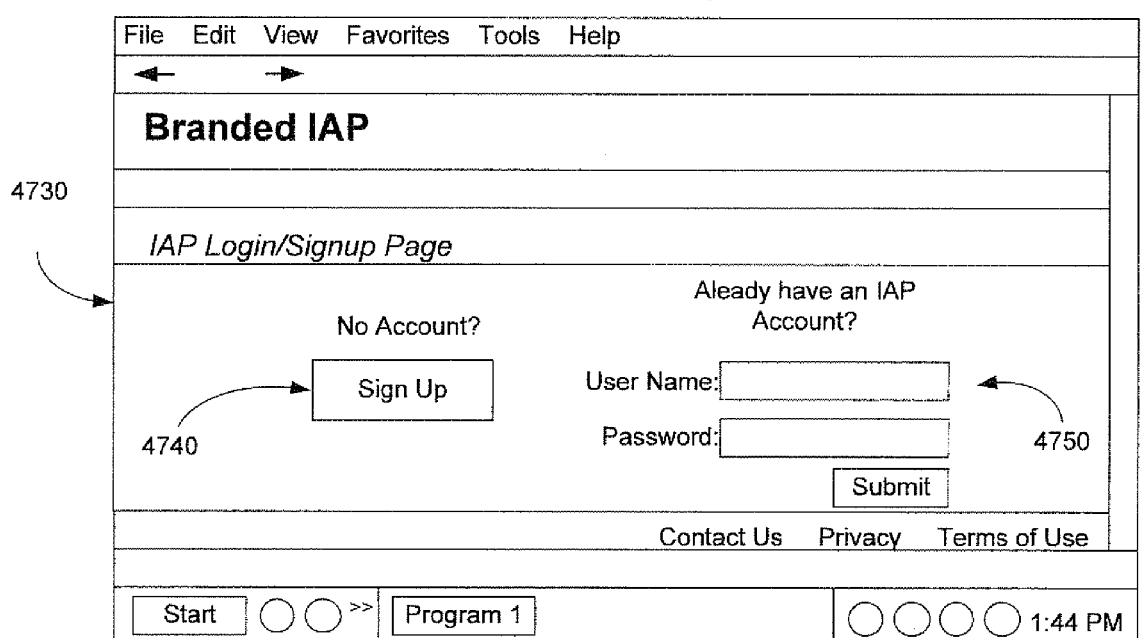

FIG. 47a-b illustrate schematic diagrams of various embodiments of interface screenshot for selecting a customized IAP interface at 4700a-b. FIG. 47a illustrates a user desktop in the first step of selecting a customized IAP interface, including a screenshot of a web browser 4710. The user is browsing the site of a sponsor company. A sponsor company is one that has an associated customized IAP interface. For example, a newspaper may wish to have a customized IAP interface. The newspaper website may include a button or link 4720 for signing up for or downloading the customized IAP interface. In the case that the IAP is a web-based interface, the user may be taken to another web page. Alternatively, if the IAP is a software-based program, the software download or installation may be prompted from the sponsor site. In another embodiment, the user may be redirected to the IAP site and the download or installation may be prompted there.

FIG. 47b illustrates a user desktop after they have selected to download or sign up for the customized IAP, including a screenshot of a web browser 4730. This may be displaying a web page on the same site of the sponsoring company, at another site hosted by the sponsoring company, or at the IAP site. This may also be prior to or after any necessary software download or installation has taken place. In one embodiment, a second page is not required, as the software may manage the functions described as being performed on the browser displayed at 4730. In one embodiment, individual user accounts are created for the IAP. The IAP may alternatively function with anonymous use. In the case that a user account is allowed or required, a user may be presented with a sign up button or link 4740 if they do not have an IAP account yet. A sign in section 4750 may also be supplied for users already holding IAP accounts.

Figure 48:
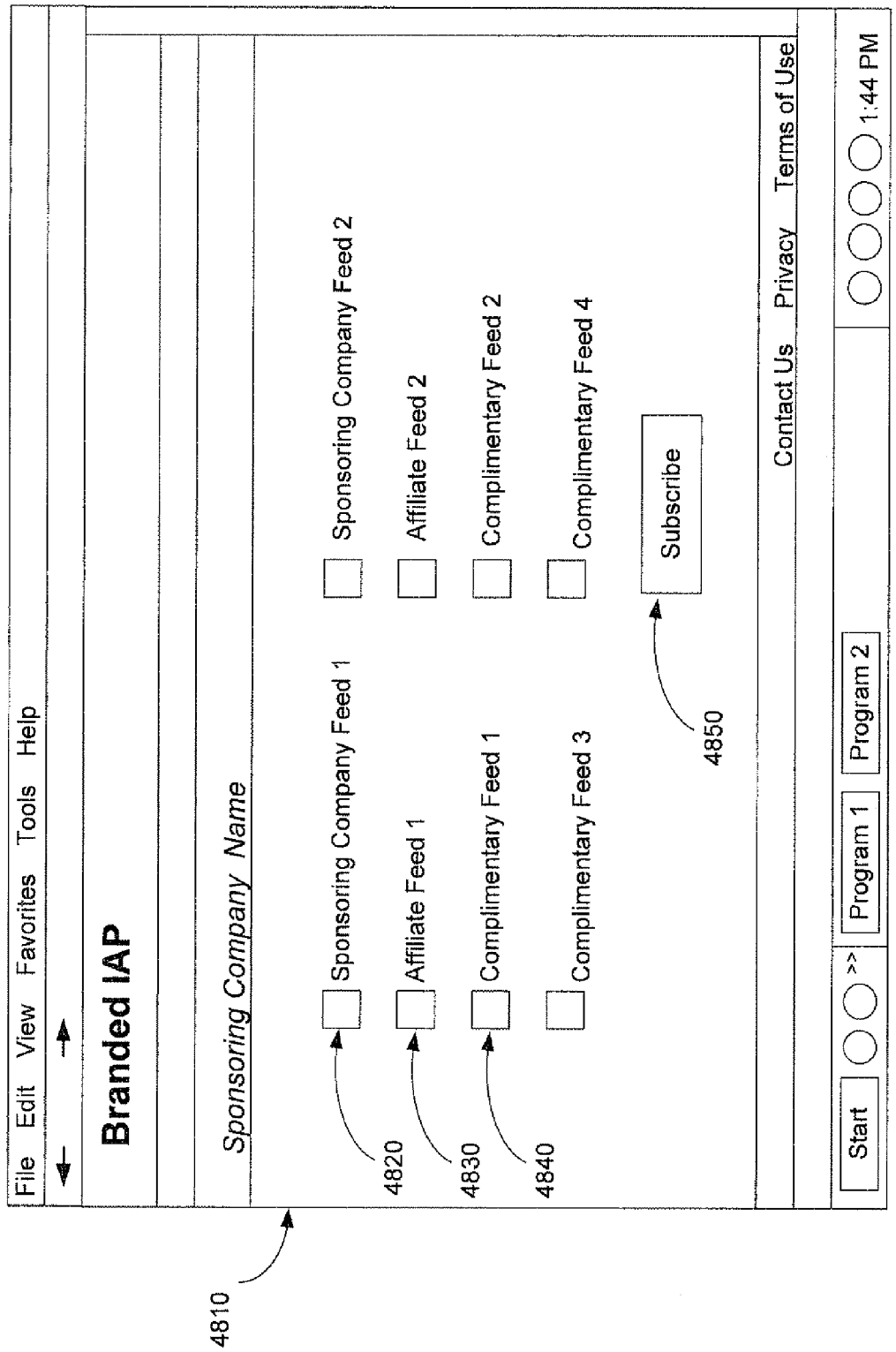
FIG. 48 illustrates a schematic diagram of one embodiment of an interface screenshot for affiliate feed subscription.

FIG. 48 illustrates a schematic diagram of one embodiment of an interface screenshot for affiliate feed subscription at 4800. A web browser interface 4810 displays a page that may be hosted by the IAP or by a sponsor site. A user is presented with options for feed subscription 4820-4840. For example, feeds from the sponsoring party, or lead affiliate feeds 4820 may be displayed, and optionally selected by default. Also listed may be subordinate affiliate feeds 4830, and complimentary feeds 4840, any of which may be selected by default. In one embodiment, the feeds displayed on web browser interface 4810 may be pre-selected or predetermined based on the selected customized feed, or lead affiliate feed. All or some of the listed feeds and their selection status may be predetermined or dynamically generated. Predetermined factors and rules for dynamic factors may be stored in a profile corresponding to the selected customized interface. In one embodiment, these factors may be entered via the affiliate interface, and updated by affiliate feed association commands.

In one embodiment, a user may not be provided the option to select the feeds they wish to receive associated with the customized IAP interface. Alternatively, they may specify user preference input regarding the feeds. In one embodiment, selecting a customized IAP is also associated with the request for a lead affiliate feed. For example, selecting the newspaper customized IAP, as in the above example, may subscribe a user to a feed associated with the newspaper. In one embodiment, selecting the customized IAP may also subscribe, or suggest subscription to the user for a lead affiliate feed and any associated affiliate feeds.

Figure 49:
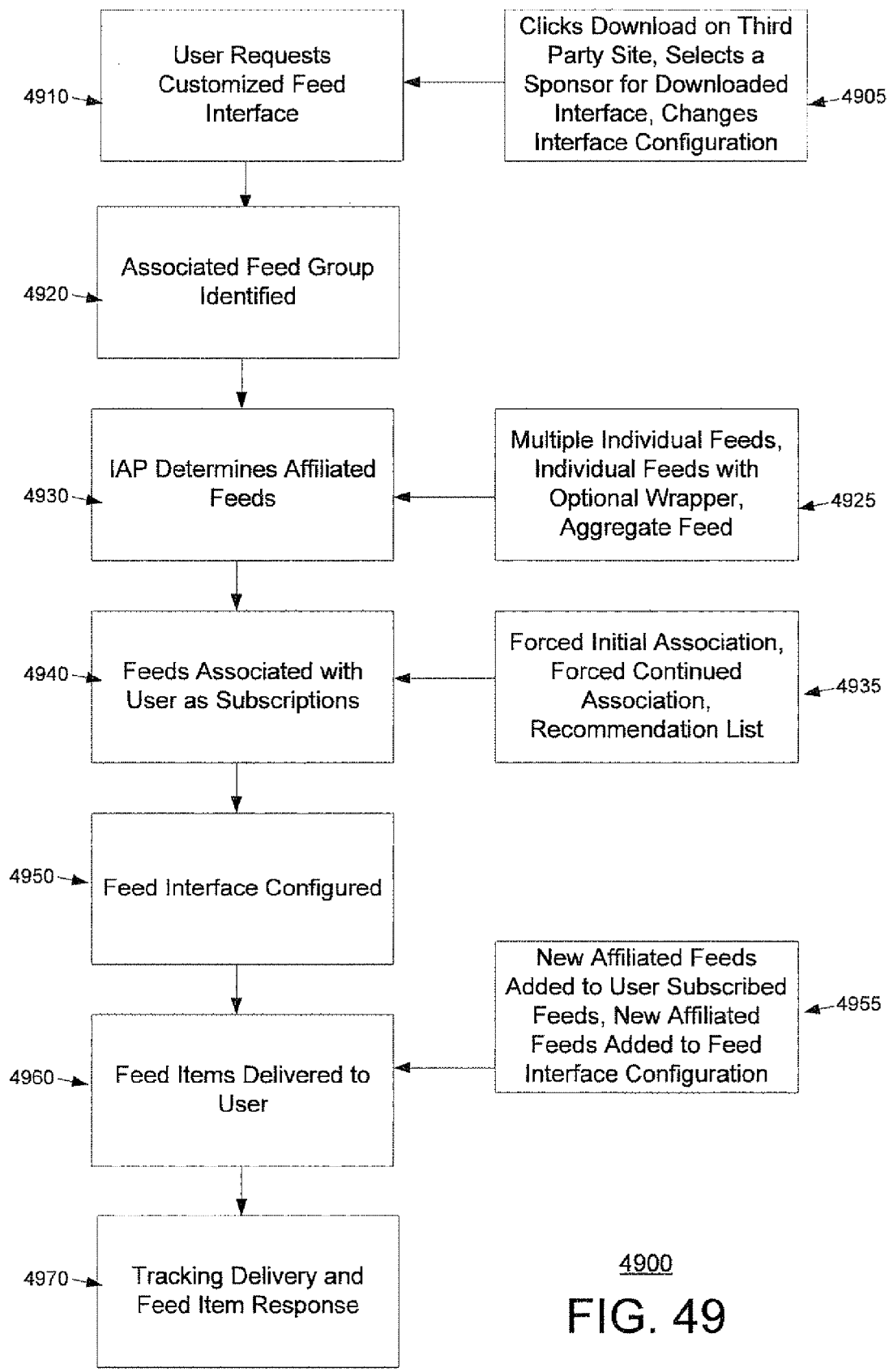
FIG. 49 illustrates a flowchart representative of one embodiment of a method for selecting a customized IAP interface.

FIG. 49 illustrates a flowchart representative of one embodiment of a method for selecting a customized IAP interface at 4900. First, a user performs some action regarding a customized IAP interface such as clicking download or signup on an IAP, affiliate, or third party site, selecting a sponsor for an IAP interface already downloaded, changing the configuration of an existing IAP account, or the like, at 4905. In this manner it is indicated that a user request for a customized feed interface has been initiated at 4910. Each customized IAP interface may have a feed group associated with it, and based on the customized IAP interface selected, this feed group may be identified at 4920. The IAP then determines an affiliate feed relationships held by feeds within the feed group at 4930. In one embodiment, for example, the feed group maybe be identified based on affiliate feed database 2540. These affiliate feed relationships may be supplied as multiple individual feeds, individual feeds grouped under an aggregate feed, or the like, at 4925. These feeds are then optionally presented to the user for approval, provided to the user through forced initial association, provided as a recommendation list, or the like, at 4935. After the user approval, if such is allowed or provided, the feeds are associated with the user as feed subscriptions at 4940. In one embodiment, for example, the feed subscriptions may be stored in subscription database 2530. The feed interface is then configured at 4950. In one embodiment, for example, this is based on the selected customized IAP interface, and the subscribed feeds. Configuration may include, for example graphical or skin selection, and other optional IAP interface adjustments. Feed items are then delivered to the user at 4960. In one embodiment, for example, the IAP control server 2510 delivers the feed items via the customized IAP interface, or some other interface, in accordance with the subscribed feeds held in subscription database 2530. In one embodiment, new affiliate feeds may be added to the users subscribed feeds, recommended to them on a feed interface configuration page for subscriptions, or the like, at 4955. In one embodiment, for example, affiliate feeds may change based on an affiliate feed association command. In one embodiment, the IAP may track delivery and feed item response data at 4970.

In one embodiment, for example, the tracking may be based on any lead affiliate or subordinate affiliate relationships existing among the subscribed feeds.

In one embodiment, a customized IAP interface is not associated with a sponsor, but maintained by the IAP. For example, the IAP may offer interfaces customized towards individuals interested in sports, business, or the like. Skins may be designed and feed groups selected based on the customized interface.

In one embodiment, an IAP may have an interface branded to match a site, service or product. This branded interface may be called a skin, and the site, service or product will be called a sponsor. For example, a user may download a version of the IAP that includes a coca-cola icon that may expand a browser window that may also be branded with coca-cola colors and logos. In one embodiment, the company supplying the IAP may offer or require a user downloading the IAP to select a sponsor for their download. This selected download sponsor may dictate the branded skin displayed for the user. Sponsors may pay to be listed as skin options during the sign up process, and a sponsor may pay to be listed as the default skin option during the sign up process. Sponsors may select to be listed as a skin option or as the default skin for all IAP users, or may select to be listed based on one or more user characteristic. In one embodiment, the user may adjust all branding by changing their IAP configuration. Alternatively, portions of the IAP may not be changeable, while select portions do change based on a selected skin.

In one embodiment, the selected skin may be included in the characteristic profiled response database. A sponsor may make specific selections for default feed formatted content subscriptions for users that download their sponsored version of the IAP. In one embodiment the IAP may also make different recommendations for original feed subscriptions based in part on at least the characteristic profiled response database, any supplied registration information, or the selected skin or sponsor. The sponsor may, in one embodiment, maintain a priority placement for information on the IAP. For example, a feed item may hold a high priority based on a user's history and it's time relevance, but a feed item that would be prioritized lower based on these factors but that is from a feed associated with the sponsor may be displayed ahead of the first feed item.

In one embodiment, advertisers may select what IAP users they wish to target based at least in part on the user's selected skin. In one embodiment, a sponsor may be granted some level of exclusive advertising rights overall or within a product or service category.

In one embodiment, a charity or other organization may promote the use of one or more feeds or one or more branded or unbranded versions of an IAP. For example, a student newspaper may promote the use of an IAP branded with a skin for a local movie theater. Each user, or each user that is determined to be a student at that particular institution, may select to download the movie theater branded IAP. The student newspaper may earn a certain amount of money for each user that selects to do so. In one embodiment, the student newspaper or movie theater may also select one or more feeds to include as part of a default profile of subscriptions for any user that sets up the IAP from their download, or that later selects their skin. For example, users selecting the movie theater skin may have included in their default profile of subscriptions a feed for show times at the movie theater. As another example, the user may also have included in their default profile of subscriptions a feed for the student newspaper.

In one embodiment, advertising feed formatted content may be sent to the user, either through feeds specified as part of their default profile of subscriptions, or inserted into a non-subscription based personal feed. In one embodiment, a sponsor or provider of an IAP download may share in the advertising revenue earned from the IAP user. Alternatively, a sponsor may be paid, or may pay, for each user that downloads a branded IAP.

In one embodiment, a charitable donation may be associated with some form of IAP interaction. For example, a certain donation may be made when a person becomes an IAP user, perhaps depending on what skin or sponsor they select. By way of another example, feed subscription, and other feed item interaction may result in donations made to one or more charities. A feed subscription interface for the IAP may include information about the charitable donations provided for specified actions such as those listed above.

In one embodiment, user feed subscription information may be shared either on an individual or aggregate basis to business entities. For example, a skin sponsor may be provided with aggregate information regarding what feeds are subscribed to by users that have their skin selected. A statistical comparison may also be provided comparing average subscription information versus subscription information of users with that particular skin. Interaction information beyond subscription may also be provided. For example, Blockbuster Video may sponsor an IAP skin. If those with the Blockbuster skin show a higher propensity to subscribe to an Internet Movie Database feed than does the average IAP user, Blockbuster may choose to advertise new releases and other products and services on the Internet Movie Database site.

In one embodiment, the IAP may record user interaction with feed formatted content, for example in feed database 2520, subscription database 2530, or user database 2550. For example, a user to feed item table or user to feed item instance table may be provided. When a user views a feed item, an identifier associated with the feed item or feed item instance and an identifier associated with the user may be inserted in a table. In one embodiment, the table entry may include an indication that the item was viewed. If a user reads a feed item, an entry may be made in the same table indicating that the feed item was read, in another table specifically for recording read items, or an existing item in a table may be updated to indicate the feed item status in relation to the user as read. Similarly, if a user recommends an item, that may be recorded as well. In one embodiment, the IAP may include interface elements that allow a user to select the feed item status they wish to view. For example, the interface may provide the options to view new, viewed, read or recommended items. Based on the user selecting the view, the records in the table associated with that user are retrieved. The feed formatted content associated with the records is also selected. The feed formatted content is then displayed to the user based on their selection.

In one embodiment, a toolbar or Internet spidering program may be programmed to search a domain for a list of feeds in one or more specific locations in a file of a certain name and file extension. For example, a program searching the yahoo.com domain may attempt to call up a feed list at http://www.yahoo.com/rss.opml or when searching the espn.com domain may attempt to call up a feed list at http://www.espn.com/rss.opml. The feed list may contain a list of feeds and/or a list of additional locations to search for feed lists. A user visiting any page of a website may thereby be presented with the list of feeds available for that domain, by examination of the feed list file. For example, a user may have a button on a browser or browser toolbar that, when clicked, takes the user to a subscription page displaying the feeds listed in the feed list at the standard location. Alternative to taking the user to a subscription page, the user may be automatically subscribed to the feeds in the feed list, or the feeds may be displayed on the browser or toolbar including an opportunity to subscribe to them individually. Alternative to a standard location, one or more pages in a website may contain a meta tag, such as a link element, for example of type "application/rdf+xml", that may point to the location of a feed list.

Figure 50:
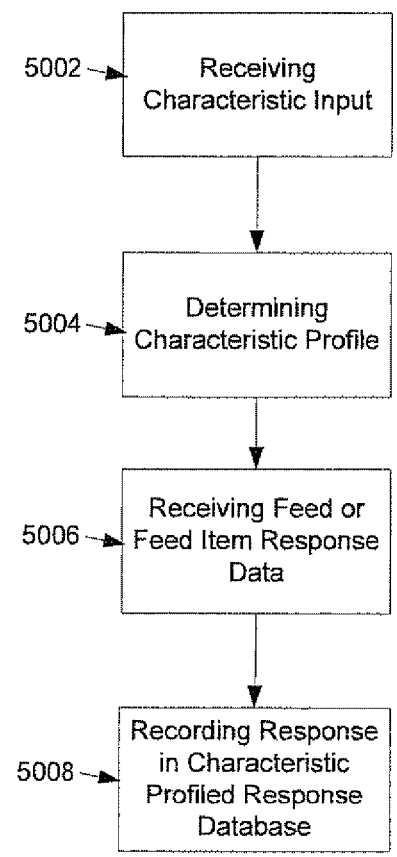
FIG. 50 illustrates a flowchart representative of one embodiment of a method for providing profiled feed response tracking.

In publishing feed formatted content, many uses may be achieved by tracking use and other response information with regards to the content or feed itself. FIG. 50 illustrates a flowchart representative of one embodiment of a method for providing profiled feed response tracking at 5000. Feed access, also called subscription, may be recorded anonymously or indexed to a particular user. For example, a request for a feed may not include personally identifying information regarding user node 220 that made the request. Alternatively, a request may be made from an identified user node 220. User characteristic information input is received into the system 5002 either through association with the anonymous request, the request itself indicating the characteristic of a user that has requested that feed or geographic location of the request established by IP address to geography translation, or through association with the user characteristic information associated with the identified user node. Characteristic information associated with the identified user node may include other feeds requested, feed access frequency, feedback received from the user with regards to one or more feeds or feed items, access frequency, age, sex, location, or other user information held in a profile or established by other means.

In one embodiment, profile information may be collected by the IAP either at registration or at some other time. This information may be used to provide profiled feed response tracking 5000, and further to make feed and feed item recommendations to IAP users.

User profiles may be maintained by feed aggregation and display software at user node 220, at content provider node 230, at publishing node 240, or at advertiser node 250. The characteristic information received or input is then used to determine a characteristic profile 5004 of the requestor. Feed formatted content response data is then received 5006 and collected by the receiving node. Feed formatted content response data, collectively response data, may take many forms. In one embodiment, response data is related to feed formatted content interaction. For example, continued feed requests, discontinuance of feed request, or recorded removal of feed subscription may constitute response data. Further, response data may include clicking on links in a feed item, or other access of online resources referenced in the feed item. A cookie associated with the feed request may be employed to track indirect access of resources listed in or referenced in a feed item. For example, a feed item may reference a sale being held on a particular website and a link may be provided in the feed item to access that web site and a cookie associated with the request displaying that feed item may be placed at user node 220. If the user clicks on the included link, this action may be received as feed item response data. If the user later visits the web site, the cookie identifies them as having received the feed item and this action may be received as feed item response data.

Another method of receiving feed item response data 5006 includes the use of a user survey, and reception of associated user survey input. A feed item may include this user survey in its content. For example, a displayed feed item may have a link that says, "I liked this information." If the user clicks on this link, it is received as feed item response data. There are many types of surveys that may be included, such as, providing the user the ability to rank the feed formatted content on a scale of one to ten, to provide a basic good or bad response, or to provide free form written response. The survey may be displayed with the feed item, or there may be a link to the survey in the feed item, or the resource available by following link element 5008 may include the survey.

Received feed formatted content response data is recorded in a characteristic profiled response database 5008. This data may then be used for many purposes. For example, reports may be generated with individual or aggregated response information for feed publishers or other entities. For example, aggregate response information may be provided via an online interface to allow potential subscribers to view feed formatted content popularity or other feed formatted content characteristics. Collaborative filtering may be applied over the characteristic profiled response database to provide feed formatted content recommendations.

In one embodiment, data from a characteristic profiled response database is used to dynamically create feeds and associate them with users. For example, feed formatted content response data may indicate that users with certain profile characteristics have enjoyed a particular feed item. The IAP may create a feed and index it to users who fit that set of profile characteristics but have not received that particular feed item. The feed item may then be indexed to this feed. In this manner, one or more users may be provided with a feed item even though they have not subscribed to a feed containing that feed item.

In one embodiment, a user interface for the aggregation and display of feed formatted data may include a ranking mechanism for the feeds subscribed to by the user or to the individual feed items received by the user. Information compiled in the characteristic profiled response database may be used for this ranking mechanism, which may, for example, raise a feed formatted content higher on a display list. A type of feed item, group of feed items, feed or group of feeds may be categorized by the system for use in displaying the feed formatted content to the user. These categories may be accessed by a link, button, or the like on a convenient point of the interface, if for example the user frequently clicks on information in that category. Alternatively the user may set his own category access preferences. The categories may include items classified by, for example, subject matter topics, friends, groups, and the like.

In one embodiment, a feed formatted content aggregation and display system can run additional searches for similar or associated information related to a feed for which the user has shown preference. For example, if a user indicated high priority in a survey or via an interface to all data from New York Times website concerning new weight loss techniques, the system could scan the feed items title and/or key words alone or in combination and search other websites for associated or similar information. This associated information can then be accessed via the aggregation and display system. Related feed items or related web pages may be indexed and given singularly or listed in part or in whole to the user based on user request or sent automatically.

Figure 51:
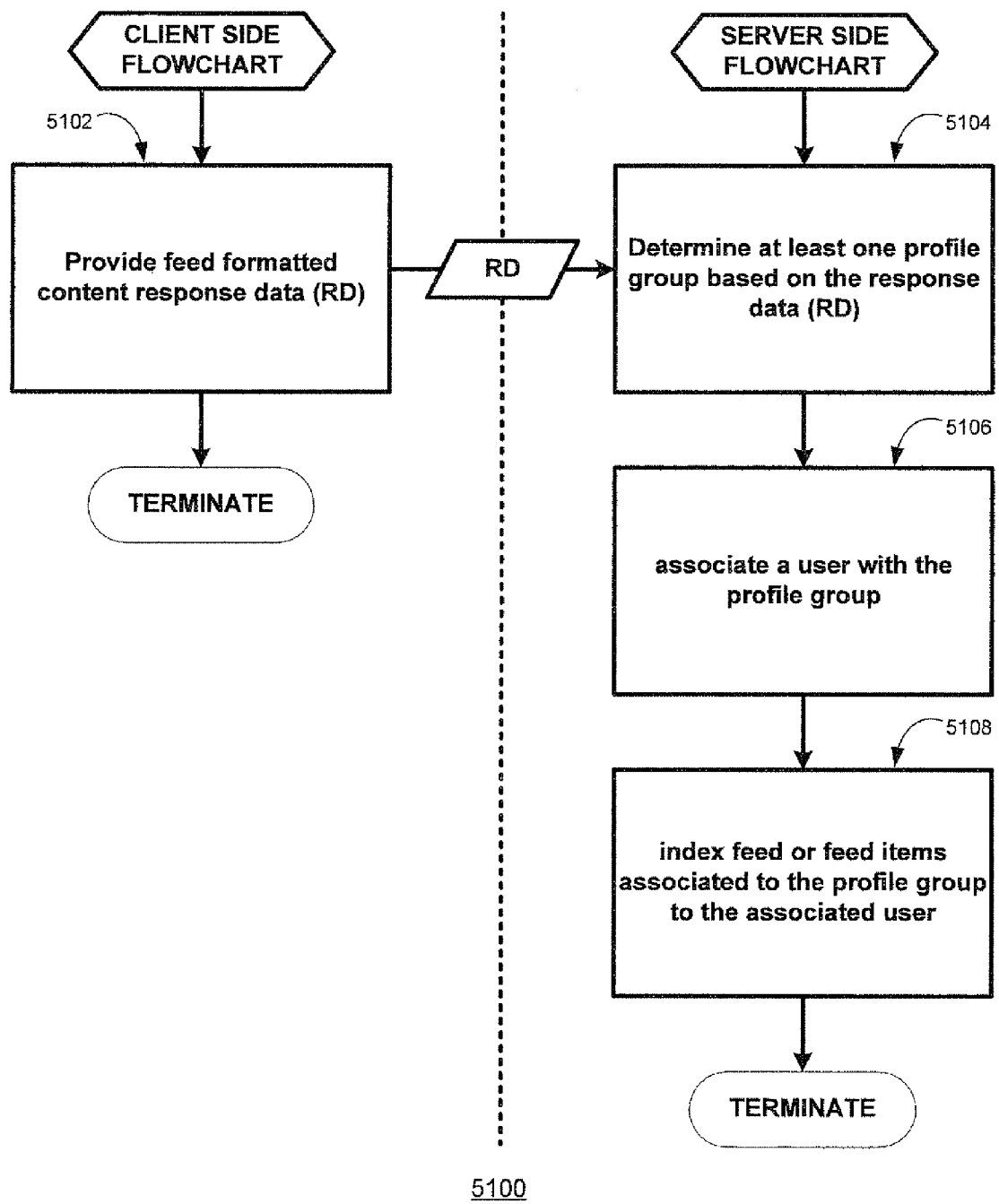
FIG. 51 illustrates a flowchart representative of one embodiment of a method for providing feed formatted content at 5100.

FIG. 51 illustrates a flowchart representative of one embodiment of a method for providing feed formatted content at 5100. A user provides feed formatted content response data at 5102. A server determines at least on profile group based on the response data at 5104. The server associates a user with the profile group at 5106. The server indexes feed formatted content, one or more feeds, or one or more feed items associated with the profile group to the associated user at 5108. The profile group may be associated with profile characteristics. The user may be associated with the profile group based on the profile characteristics.

Figure 52:
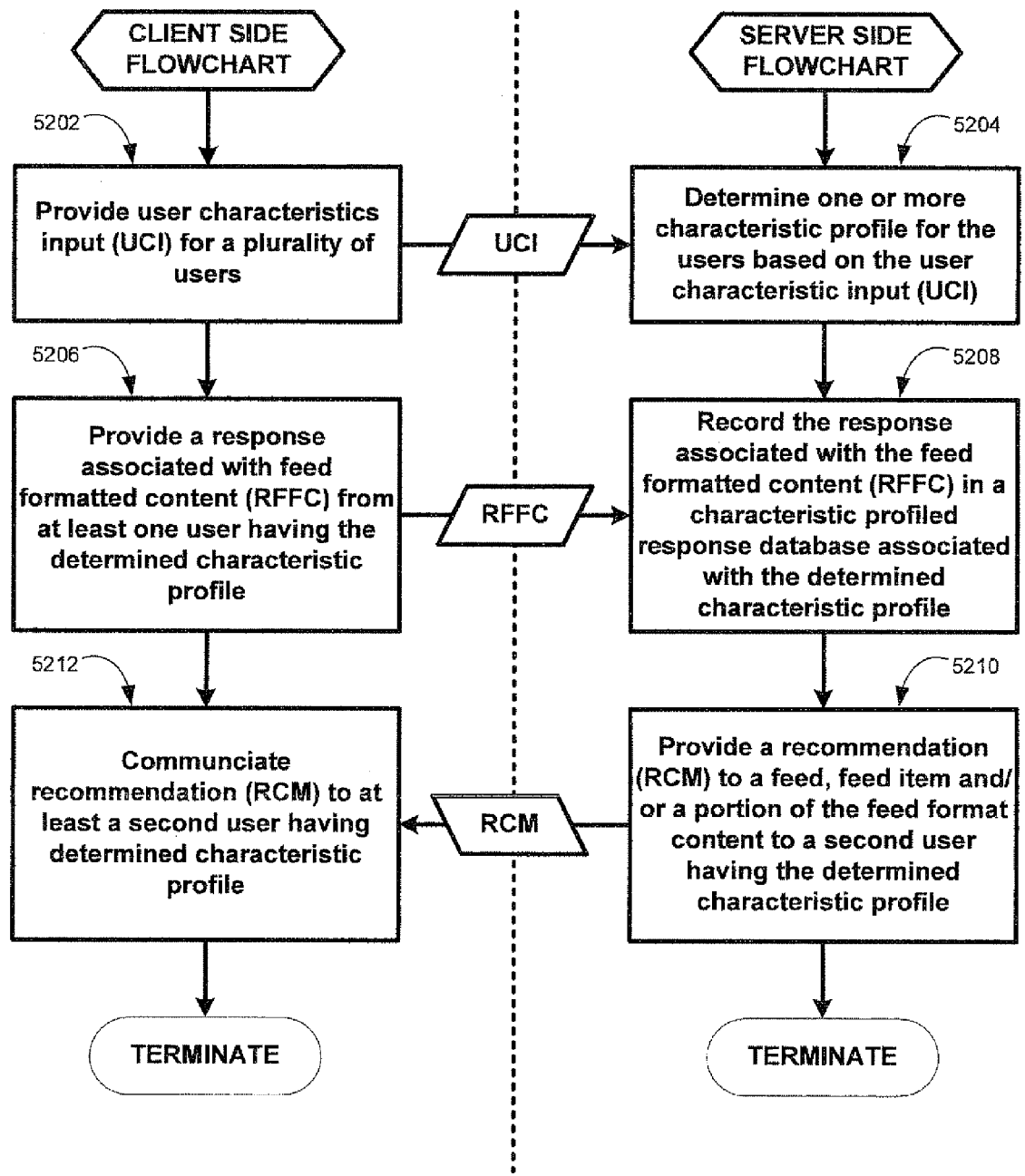
FIG. 52 illustrates a flowchart representative of one embodiment of a method for monitoring feed formatted content at 5200.

FIG. 52 illustrates a flowchart representative of one embodiment of a method for monitoring feed formatted content at 5200. The client side provides user characteristics input for a plurality of users at 5202. The server side determines one or more characteristic profiles for the users based on the user characteristic input at 5204. The client side provides a response associated with feed formatted content from at least one user having the determined characteristic profile at 5206. The server side records the response associated with the feed formatted content in a characteristic profile response database associated with the determined characteristic profile at 5208. The server side provides a recommendation to feed formatted content to a second user having the determined characteristic profile at 5210. The client side receives a communicated recommendation at 5212. Data associated with the characteristic profile response database may be provided to a feed provider. In one embodiment, the response may comprise a user survey input.

Figure 53:
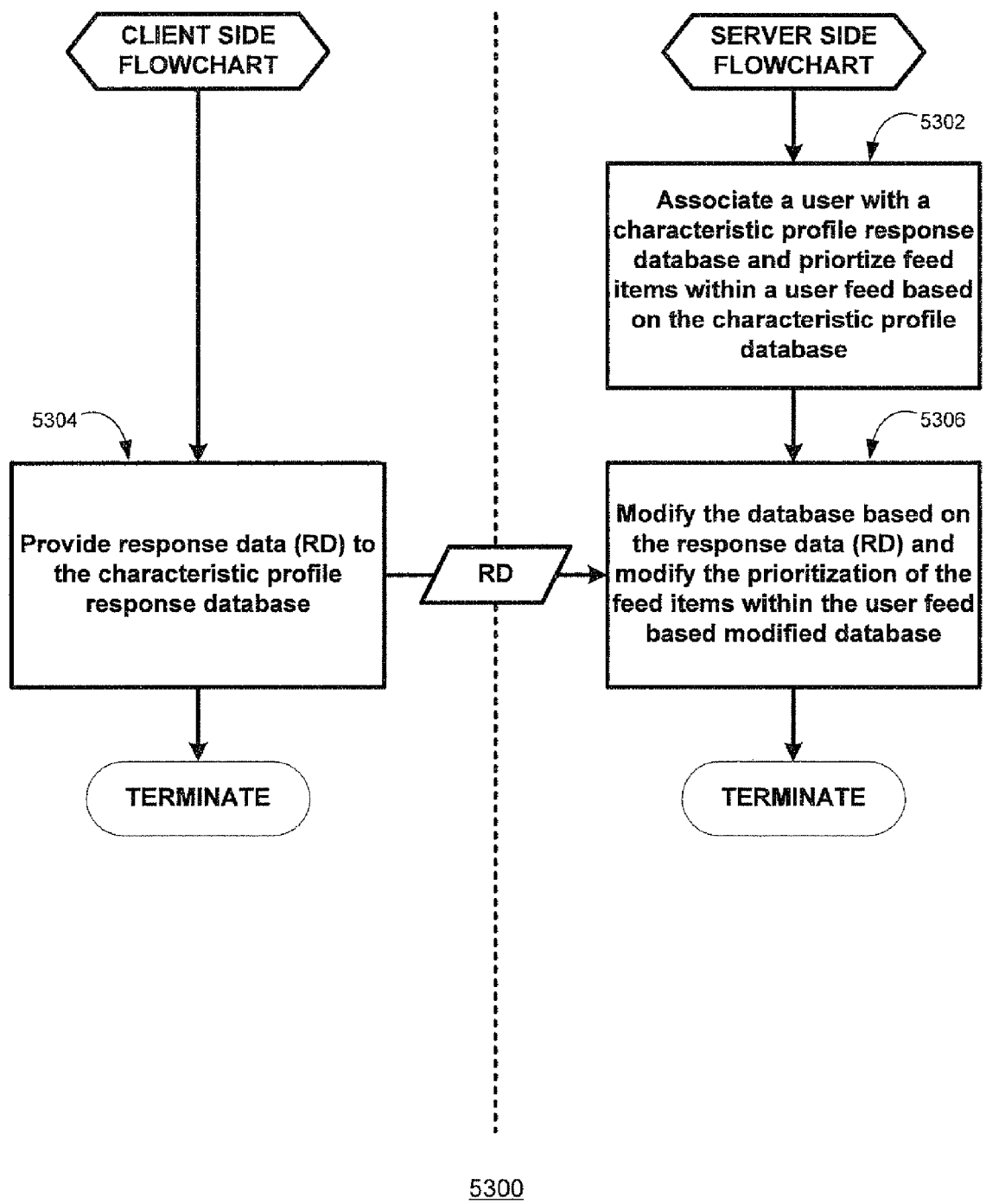
FIG. 53 illustrates a flowchart representative of one embodiment of a method for prioritizing feed formatted content at 5300.

FIG. 53 illustrates a flowchart representative of one embodiment of a method for prioritizing feed formatted content at 5300. The server side associates a user with a characteristic profile response database and prioritize feed items within a user feed based on the characteristic profile database at 5302. The client side provides response data to the characteristic profile response database at 5304. The server side modifies the database based on the response data and modifies the prioritization of the feed items within the user feed based on the modified database at 5306.

Figure 54:
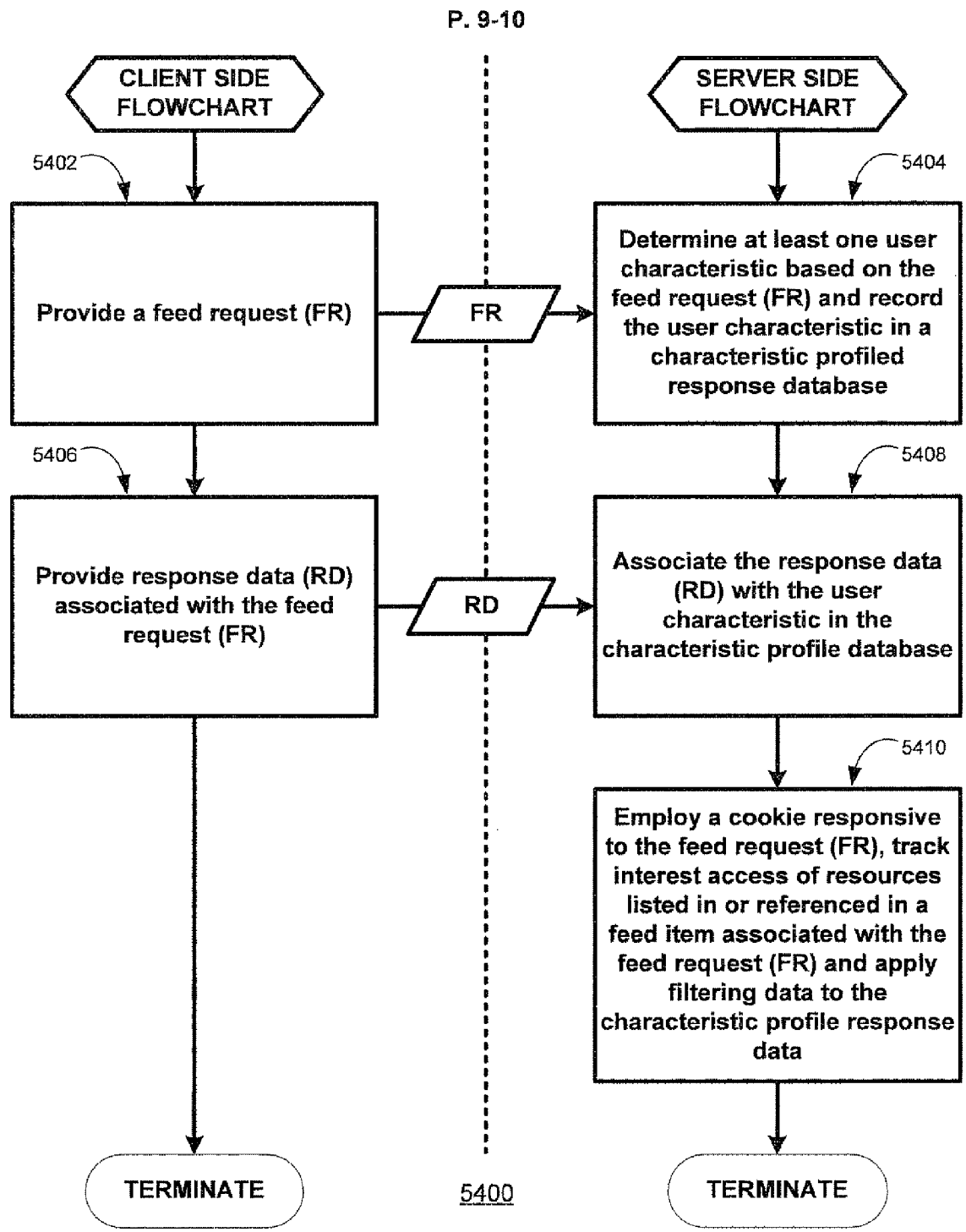
FIG. 54 illustrates a flowchart representative of one embodiment of a method for profile feed response tracking at 5400.

FIG. 54 illustrates a flowchart representative of one embodiment of a method for profile feed response tracking at 5400. The client side provides a feed request at 5402. The server side determines at least one user characteristic based on the feed request and records the user characteristic in a characteristic profile response database at 5404. The client side provides response data associated with the fed request at 5406. The server side associates the response data with the user characteristic in the characteristic profile database at 5408. The server side may employ a cookie responsive to the feed request, track interest access of resources listed in or referenced in a feed item associated with the feed request and apply filtering data to the characteristic profile response data at 5410.

Figure 55:
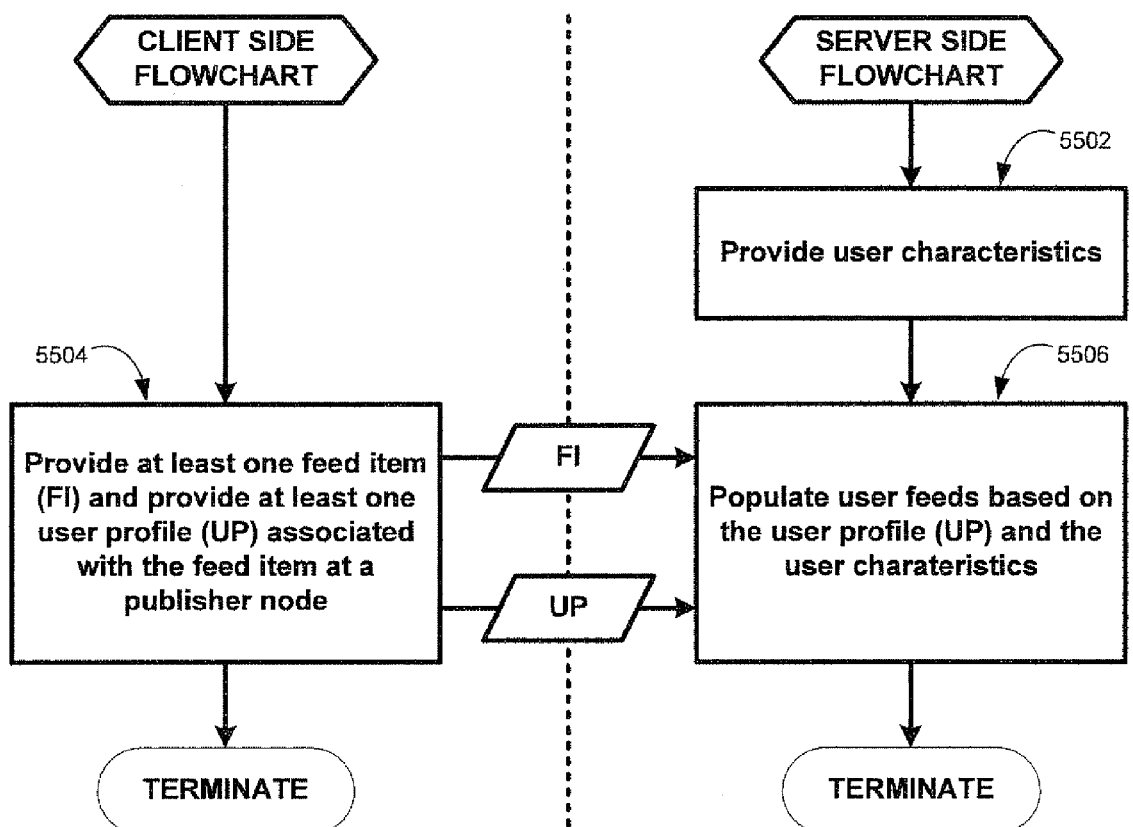
FIG. 55 illustrates a flowchart representative of one embodiment of a method for providing feed formatted content at 5500.

FIG. 55 illustrates a flowchart representative of one embodiment of a method for providing feed formatted content at 5500. The server side provides user characteristics at 5502. The client side provides at least one feed item and one user profile associated with the feed item at a publisher node at 5504. The server side populates user feeds based on the user profile and the user characteristics at 5506. In one embodiment the user profile may include demographic information.

Figure 56:
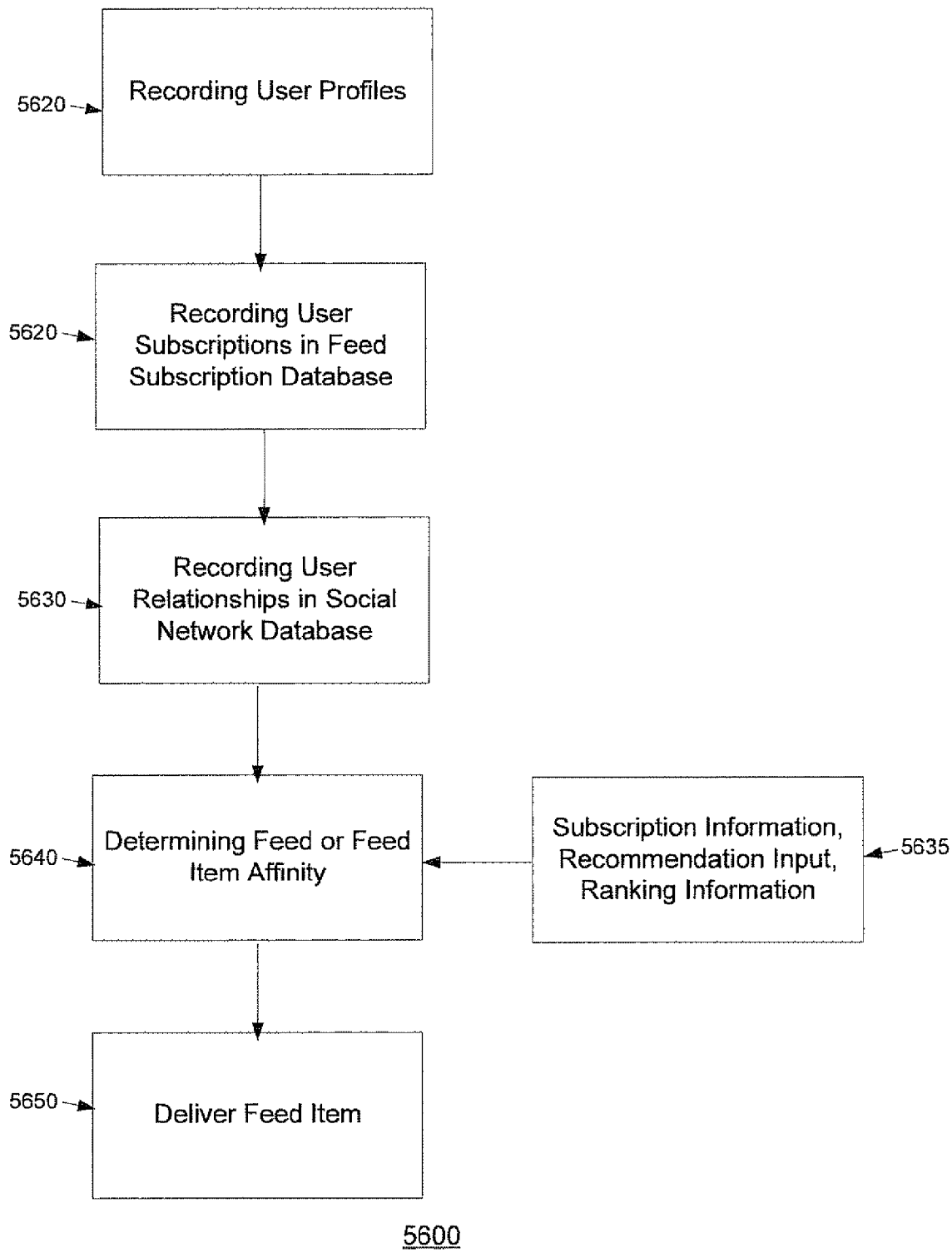
FIG. 56 illustrates a flowchart representative of a process for providing feed formatted content in association with a social network database at 5600.

FIG. 56 illustrates a flowchart representative of a process for providing feed formatted content in association with a social network database at 5600. First, user profiles are recorded (BLOCK 5610). In one embodiment, for example, the IAP control server 2520 may accept new users and their associated new user profiles, and record the user profiles in the user database 2550. User profiles may be accepted via a web interface, or any other method of registration for a service as known in the art. User feed subscriptions are then recorded (BLOCK 5620) in association with the user profiles. In one embodiment, for example, the IAP control server 2520 records the feed subscriptions for each user in the subscription database 2530.

User relationships are recorded in a social network database (BLOCK 5630). In one embodiment, for example, the role of social network database 2560 is to maintain records of relationships between people. For example, social network database 2560 may record as a friend relationship that a first user has indicated that they are friends with a second user. Users may indicate with whom they are friends by specifying email addresses, user names, searching for the same and clicking a link or button, or by clicking on a link or button provided to them by their friend. In one embodiment, one user indicating they are friends with another user is enough to establish the friend relationship within the social network database. Alternatively, the other user must confirm the friendship for the relationship to be established. Social network database 2560 may also record as a family relationship that a first user has a familial tie with a second user.

A variety of factors, including feed subscription, recommendation, or rating information may be used individually or in combination as inputs into the process for providing feed formatted content in association with a social network database (BLOCK 5635). In one embodiment, for example, using social network database 2560, the IAP may accomplish many features with regards to feed recommendation or delivery. Based on recorded or received information, feed formatted content affinity is determined (BLOCK 5640). In one embodiment, for example, the feed subscription, recommendation or rating information stored in subscription database 2530 or user database 2550 may be used in conjunction with social network database 2560 to determine feed formatted content affinity. In one embodiment, feed formatted content affinity may be determined as follows: IAP control server 2510 may compare the feed subscription information between a first user and a second user that have a friend relationship recorded in social network database 2560. IAP control server 2510 identifies a feed formatted content received by the user but not the second user. Finally, a feed formatted content is delivered (BLOCK 5650). Continuing the above example, based on the identification, the feed formatted content may be delivered to the second user. Other methods may be employed to determine what feed formatted contents are delivered based on social network database 2560. For example, the social network database 2560 may also be used in conjunction with user database 2550 to ascertain users that have similar profile data and also hold some relationship, and deliver feed formatted contents based on this. Further, social network database 2560 may be used in conjunction with the subscription database to determine users that have similar subscriptions as well as hold some relationship, and deliver feed formatted contents based on this. Alternatively, other methods of determining associated interests such as purchase histories, survey results, or the like may be used in conjunction with social network database 2560 to deliver a feed formatted contents. Any of these factors may be used in combination to deliver a feed formatted contents.

In one embodiment, a user may supply recommendation or rating information associated with a feed formatted content. These recommendations may be stored in feed database 2520, subscription database 2530, or user database 2550. A relationship may be maintained between the recommendation or rating and the user that supplied it. In this way, another user may view recommendation or rating information supplied by other users associated with them in the social network database 2560. In one embodiment, a user may specify a feed formatted content they wish to recommend by clicking on a link on the IAP interface. This recommendation input may be in the form of a numeric or similar rating, a basic statement of recommendation, it may be in the form of a written review, a selection from a menu, or it may be a combination of these. Recommendation input may also include negative input. The user may have the option to make the recommendation to the public in general, to the users associated with them in social network database 2560, or to specific individuals or a group of individuals associated with them in social network database 2560. In one embodiment, the likelihood that an item is delivered to a user is affected by the recommendations supplied in conjunction with the closeness of the relationship they maintain with the person supplying the recommendation. For example, a recommendation to the public in general may not produce as strong a feed formatted content affinity as a recommendation supplied directly to an individual by another user with whom they have a friend relationship.

In one embodiment, a recommendation may be made to an entire social network, or a larger portion of a social network than a user has direct connections with. This recommendation could therefore include an extended friend circle, two or more degrees away from the user. For the recommendation to be sent to each user in the extended friend circle, a confirmation of the recommendation may be required by a direct friend of a user before the user received the recommendation. The confirmed recommendation may indicate that it comes from the initial recommender, or the confirmer. In one embodiment, the recommendation may not require a confirmation, but the recommendation may be delayed in its delivery to the extended network to give an opportunity for confirmation.

Also, when a user is viewing a feed formatted content, any recommendations regarding the feed formatted content by their friends may be seen. A user may view recommendations or reviews made by direct friends, or select to view recommendations or reviews by friends that are two degrees or more away.

In one embodiment, the prioritization of feed item delivery via the one or more methods of communication maintained by the IAP may be based on a user's subscription settings, time relevancy of the feed item, recommendations, and social network database 2560. Recommendations may be weighted based upon closeness of relationship, a user's reaction to prior recommendations from the same source, as well as whether it was a direct recommendation to the user, a recommendation to friends, or a general recommendation. Feed item prioritization may also be based on a frequency factor. A frequency factor is the frequency items are posted at the feed source. Feed items may also be prioritized based on the recentness they were posted, as well as the quality of the feed source. The quality of the feed source may be based on the number of subscribers to a feed, the age of the feed or site publishing the feed, a third party ranking of the site, such as the Google or Alexa rank of the site publishing the feed.

Figure 57:
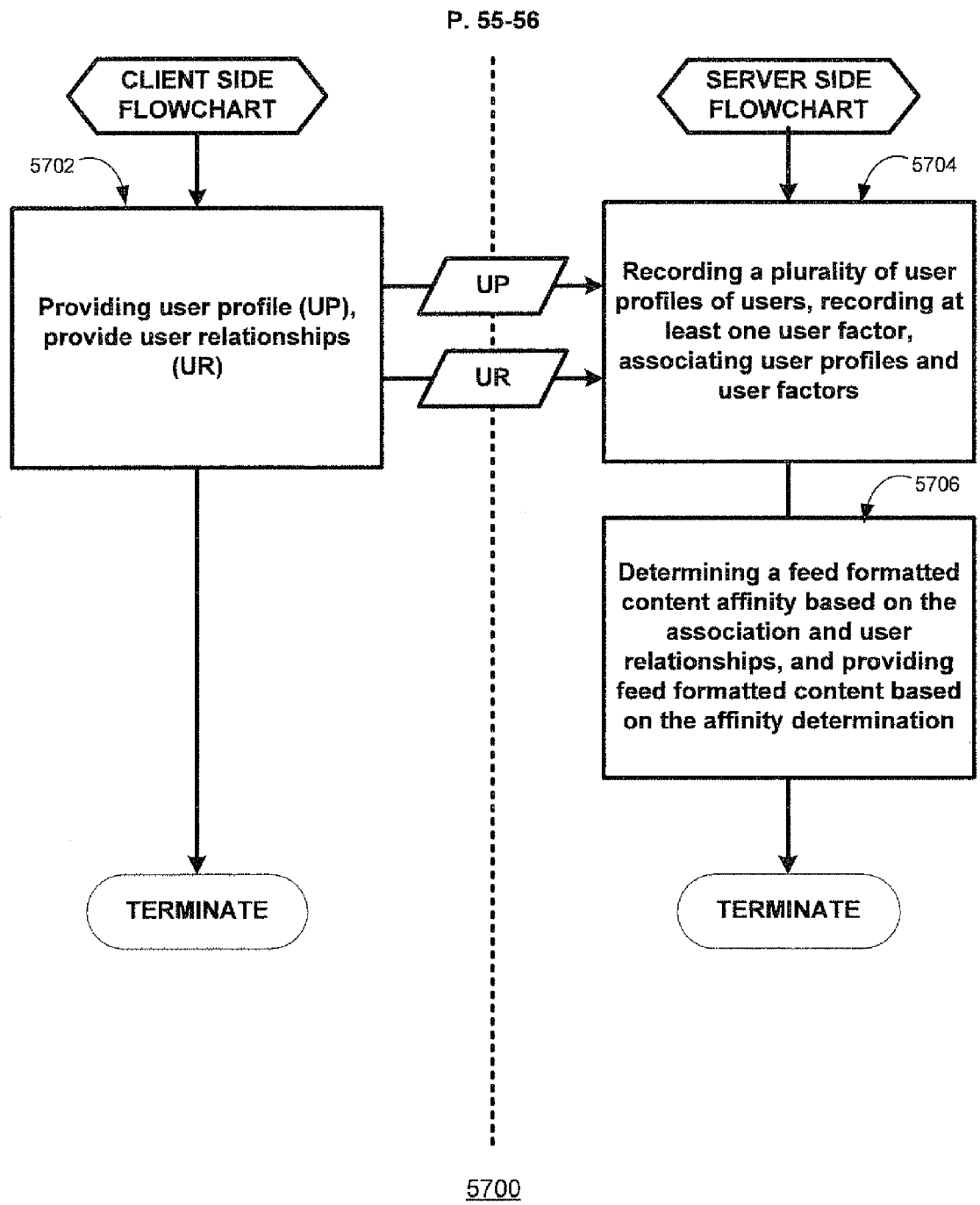
FIG. 57 illustrates a flowchart representative of one embodiment of a method for providing feed formatted content at 5700.

FIG. 57 illustrates a flowchart representative of one embodiment of a method for providing feed formatted content at 5700. The client side provides a user profile and user relationships at 5702. The server side records a plurality of user profiles of users, records at least one user factor, and associates user profiles and user factors at 5704. The server side determines a feed formatted content affinity based on the association and user relationships, and provides feed formatted content based on the affinity determination at 5706. A user factor may be user characteristics, demographics, or information such as feed subscriptions, recommendations to feed formatted content, or rating of feed formatted content.

Figure 58:
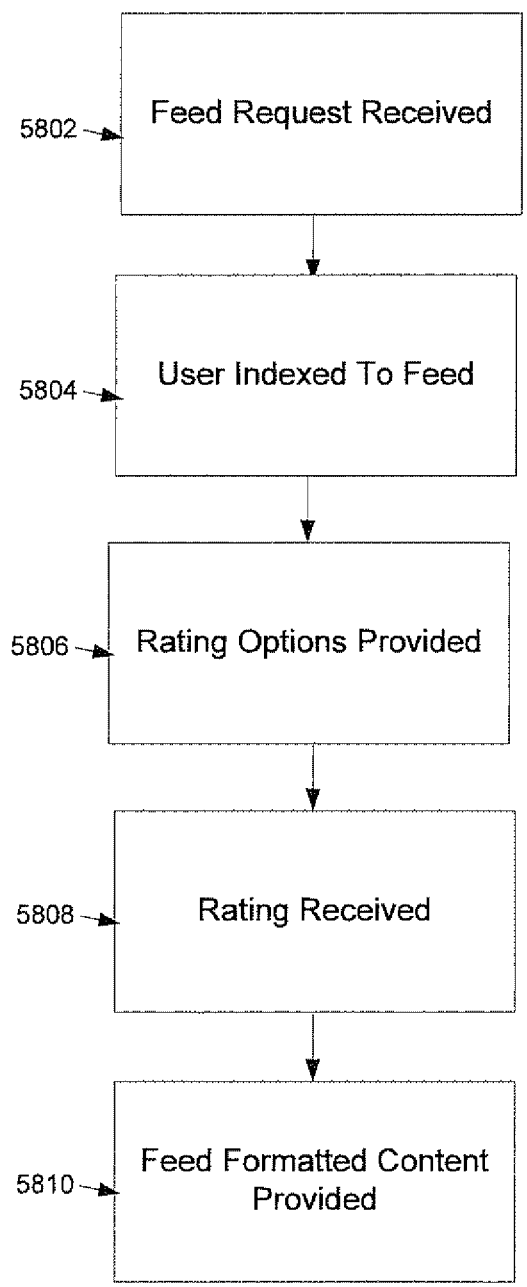
FIG. 58 illustrates a flowchart representative of one embodiment of a method for providing feed formatted content at 5800.

FIG. 58 illustrates a flowchart representative of one embodiment of a method for providing feed formatted content at 5800. A feed request is received at 5802. A user is indexed to at least one feed from a feed subscription database based on the request at 5804. Rating options are provided to the user at 5806. A rating is received from the user at 5808. Feed formatted content is provided to the user based on the rating at 5810.

Figure 59:
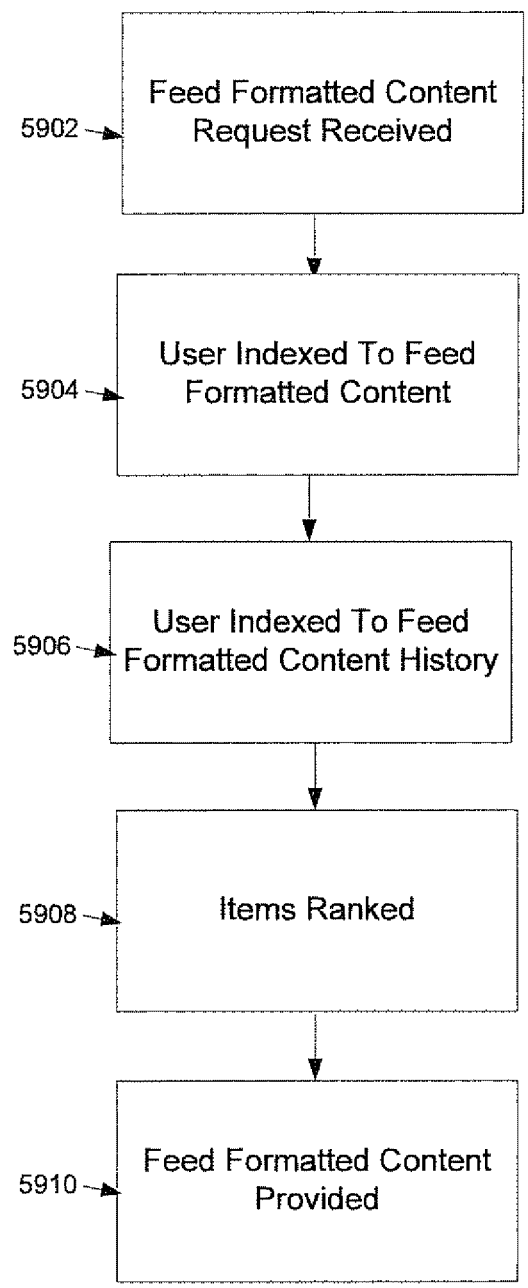
FIG. 59 illustrates a flowchart representative of one embodiment of a method for providing feed formatted content at 5900.

FIG. 59 illustrates a flowchart representative of one embodiment of a method for providing feed formatted content at 5900. A feed formatted content request is received at 5902. A user is indexed to feed formatted content at 5904. The user is indexed to a feed formatted content history at 5906. Feed items are ranked at 5908. Feed formatted content is provided to the user based on the ranking at 5910. User feed formatted content rankings may be one or more of the following: profiled characteristic response data, explicitly provided feed, feed item rankings, or feed item subset rankings, or feed formatted content recommendations. The rankings may also be based on a social network.

Personal or group circumstances that result in particularly high interest levels in certain feed formatted content may be recognizable and recurring in nature. For example, the hours just previous to lunch or dinner are likely to indicate high interest levels for restaurant advertising. Tuxedo information may result in high interest levels for men who are engaged to be married. Nightclub and movie advertising may result in high interest levels each weekend. While these template opportunities may be as simple as the above case of recognizing a time of day for restaurants, they may involve much more complex templates. For example, a template may be based upon online behaviors such as visiting certain sites or searching for certain words, or the like. Additionally, a template may be based upon profile information obtained directly from a profile or via profile-based targeting from a third-party site. Further, a template may be based upon factors external to the user such as time, day, IP-based geographic targeting, or the like. Some templates may be based on a nature sketch. A nature sketch is a quality that may be displayed in a variety of manners. For example, a template advertising opportunity may include a competitiveness attribute. Applying an individual to the competitiveness attribute may be done in variety of ways, the only part necessary to them falling into the template opportunity that the attribute is expressed in some way. For example, competitiveness may be attributed based upon the results of a personality profile the user filled out, or based upon frequently checking scores in fantasy leagues, interest in sports, gambling sites, or the like. Such attributes and nature sketches may be stored in or indexed to a characteristic profile response database.

Figure 60:
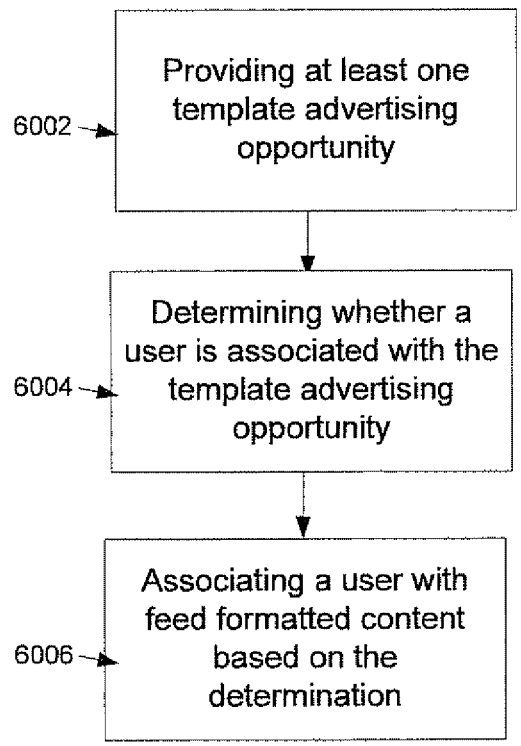
FIG. 60 illustrates a flowchart representative of one embodiment of a method for feed formatted content advertising at 6000.

FIG. 60 illustrates a flowchart representative of one embodiment of a method for feed formatted content advertising at 6000. A server provides a template advertising opportunity at 6002. The server determines whether a user is associated with the template advertising opportunity at 6004. The server associates a user with feed formatted content based on the determination at 6006.

Determining an opportunity to exercise a template advertising opportunity may be achieved in a variety of ways. Using the example of a man engaged to be married, this information may be directly volunteered by the user. The user may have provided this information erroneously, and therefore a degree of certainty may be applied to the likelihood that this is the expected template opportunity may be assigned. If profile information suggests that the user is male there is a larger degree of certainty that they are a man engaged to be married than if they were simply an anonymous user. If this user, recognized as male, also is visiting wedding registry sites or has subscribed to feeds associated with wedding information, the degree of certainty again increases. Based upon the attributes provided regarding each user, a template advertising opportunity system may apply a degree of certainty that a user is in each template advertising opportunity.

Advertisers or other entities may be provided the opportunity to associate one or more ads or information, for example feed formatted content, with a template advertising opportunity. The advertiser may further select a degree of certainty that a user is in the template for their advertisement to be displayed.

Template advertising opportunities may be discovered in a variety of ways. There may be an understood causation that leads to the creation of a template. This is called a determined template. For example, one may recognize that certain geographical areas that represent college markets display high interest levels on travel package advertising in the month of February. Upon examination one recognizes that this interest is due to college spring breaks that begin the following month. Based on this recognition the college spring break determined template may be created.

An alternative method of recognizing template advertising opportunities employs past advertising and interest level information, such as the characteristic profile response database system previously described. The profiled response database system is capable of recognizing abstract templates, these may be made up of what seem to be random characteristics that combine to increase positive response input. Examination of the characteristics may explain the template advertising opportunity, allowing descriptive titling, but in some cases the cause of the template may remain unknown.

Both determined and abstract template advertising opportunities may be made available to advertisers. An advertiser may be queued for a user who enters a template. Alternatively, an advertiser may request to advertise to users already in a template. For example, an IAP may maintain one or more feeds and associated feed formatted content that is indexed to a template advertising opportunity. Based on IAP user interaction, either through specific input, for example via a survey on an IAP user interface, or by received response or behavior input, the IAP may index a user to a template advertising opportunity in the IAP database. In one embodiment, the indexing between a user and a template advertising opportunity also includes a certainty factor, indicating the certainty level that they are indeed in the indexed template. Based on this association, the IAP may recommend subscription or automatically subscribe the user to the appropriate feed.

For example, consider the following advertising opportunity. An IAP may be a local entertainment site, and further it may hold standard profile information such as the age, location, and sex of the user. A bar may wish to advertise a ladies night special. Each week, on the night of the special, the bar may publish feed formatted content or some other form of advertisement over the IAP to IAP users over the age of 21, further targeted to the zip code of and other zip codes surrounding the bar. An advertisement may not even require scheduling on a regular basis, the bar may submit the advertisement only on one of the ladies nights to include information as specific as how many people are currently at the bar. This on the fly advertising may be submitted by phone order or via online interface. Restaurants and bars in a given city or geographic region may have template ads stored in a database that would be modified upon a call to an IAP command center or via another notification method such as fax, email, instant messaging, and the like. Alternatively, the same ad may be scheduled to be displayed at a regular interval. If a user is detected present at a computer, a check for geographic and other information for that user would be made and a time sensitive ad would be made from the ad server. If a time sensitive directive were received at the IAP command center from Joe's bar, the Joe's bar template ad would be pulled and appropriate language in accordance with the directive would be inserted in the ad and displayed on the appropriate IAPs. For example, an ad at Joe's Bar may be delivered to a user "Come on in, drinks are half off." The ad may not be served if there is additional profile information about the user that would not be compatible with the advertiser or advertisement. Alternatively or in addition, a banner or text advertisement could be served to a web page separate from the IAP sent to the user's computer based on the same criteria.

Figure 61:
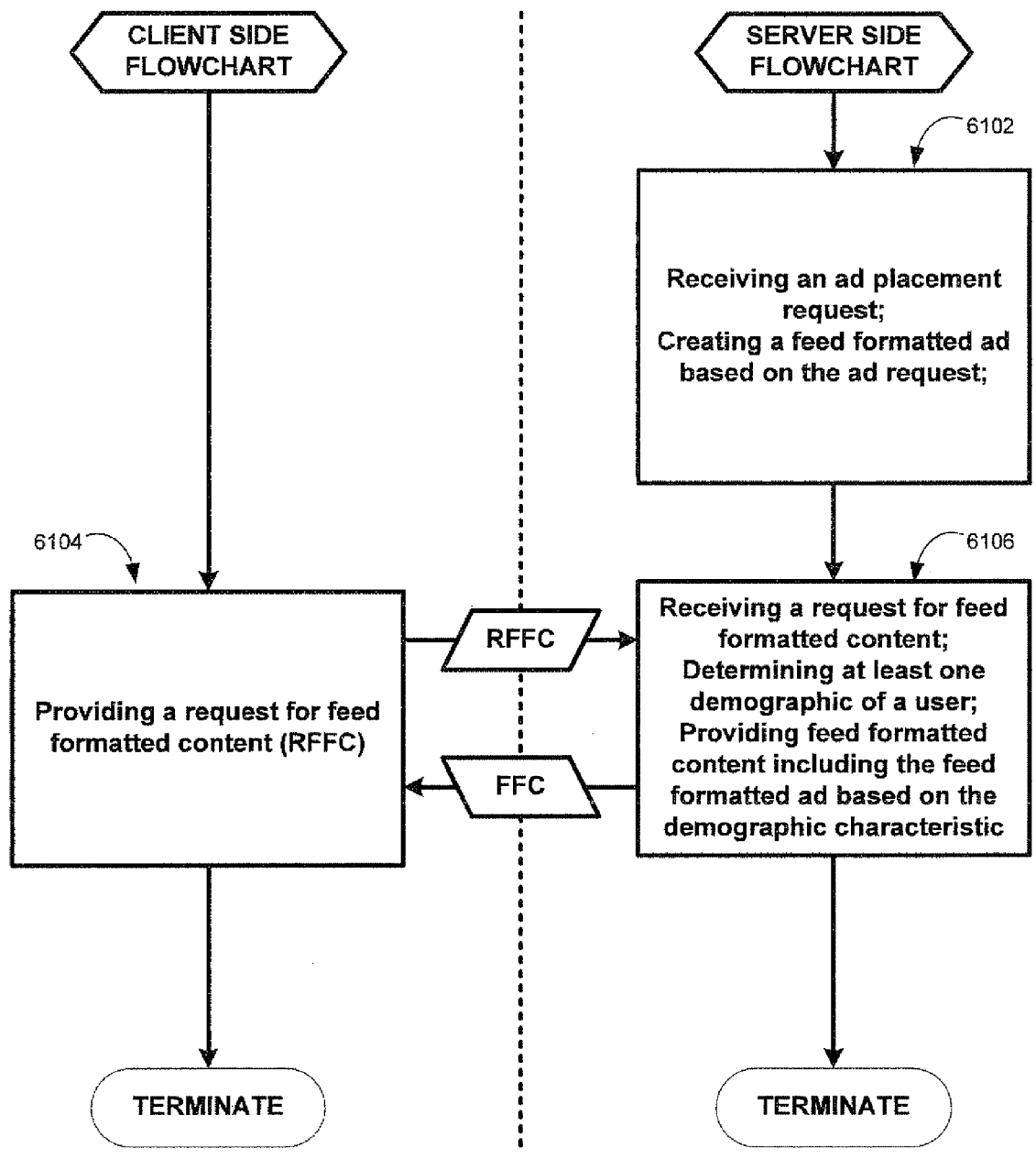
FIG. 61 illustrates a flowchart representative of one embodiment of a method for providing real time advertising at 6100.

FIG. 61 illustrates a flowchart representative of one embodiment of a method for providing real time advertising at 6100. The server side receives an ad placement request and creates a feed formatted ad based on the ad request at 6102. The client side provides a request for feed formatted content at 6104. The server side receives a request for feed formatted content, determines at least one demographic of a user, and provides feed formatted content including the feed formatted ad based on the demographic characteristic at 6106. The conversion of the ad may comprise modifying a previously provided ad template with updated information. The ad placement request may comprise a recurrence input or conditional publishing rule. It may be determined whether a user is at a computer based on user activity information, and the feed formatted content may be provided based on the determination. In one embodiment, a user may provide feedback on the ad. The user may be provided with points based on the feedback. In one embodiment, the ad may be provided via a wireless network or device.

Figures 62A, 62B, 62C:
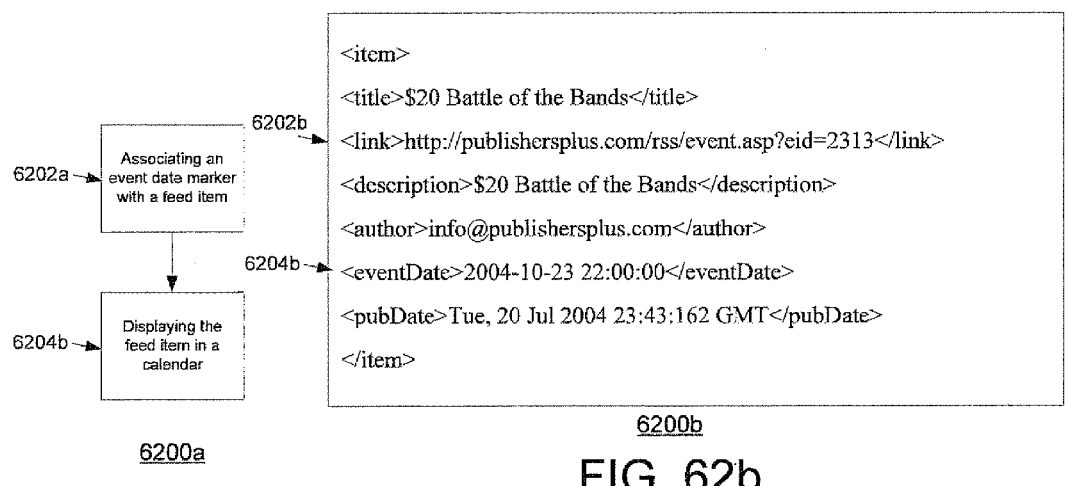
FIG. 62a illustrates a flowchart representative of one embodiment of a method for providing a feed based calendar.
FIG. 62b illustrates a feed item including an event date marker.
FIG. 62c illustrates a feed based calendar.

FIG. 62a illustrates a flowchart representative of one embodiment of a method for providing a feed based calendar at 6200a; FIG. 62b illustrates a feed item including an event date marker at 6200b; and FIG. 62c illustrates a feed based calendar at 6200c. First, a feed is provided including at least one feed item that contains an event date marker 6202a. One example of this is seen in feed item 6200b, containing title marker 502b and event date marker 6204b. The feed may also be a personal calendar items feed as described above. One or more users may subscribe to the feed containing feed item 6200b. In one embodiment, the feed source company may also use the feed internally. For example, the source company may provide a web based calendar on their website. This may be a feed based calendar 6200c that is associated with feed item 6200b. When the web page displaying the feed based calendar 6200c is generated, code in the page associates the calendar object with the feed. The calendar object reads in the feed information, iterating through each feed item. In one embodiment, only feed items for the time period displayed in the calendar, or reflecting other selection criteria such as event locations, are read or iterated through by the calendar object. When the calendar object identifies a feed item with an event date for the time period being displayed, the feed item is displayed in the calendar 6204a. For example, the title element 6202b of feed item 6200b may be displayed in feed based calendar 6200c as seen at 6202c.

Figure 63:
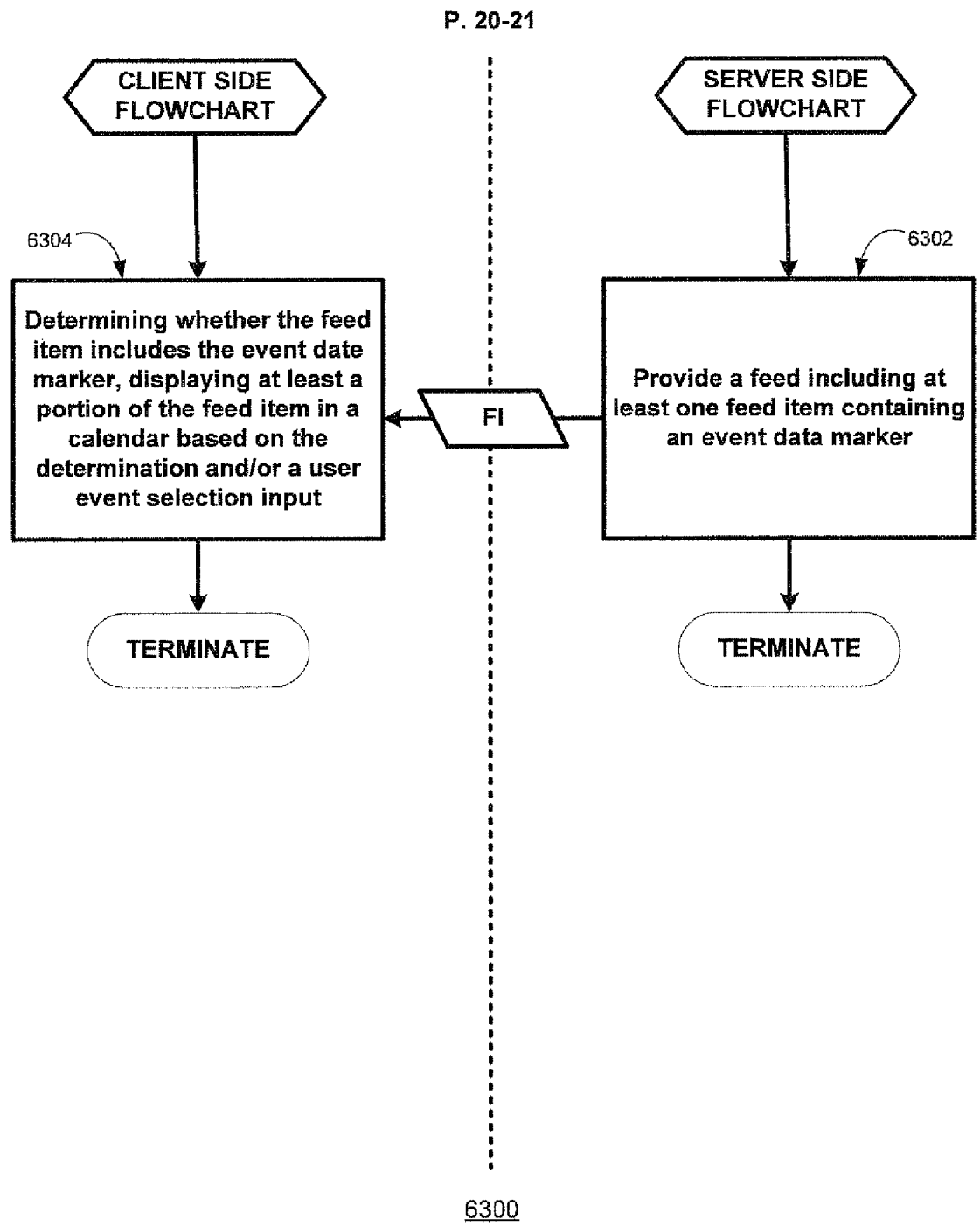
FIG. 63 illustrates a flowchart representative of one embodiment of a method for providing a feed based calendar.

FIG. 63 illustrates a flowchart representative of one embodiment of a method for providing a feed based calendar at 6300. The server side provides a feed including at least one feed item containing an event date marker at 6302. The client side determines whether the feed item includes the event date marker and displays at least a portion of the feed item in a calendar based on the determination and/or a user event selection input at 6304.

Figure 64:
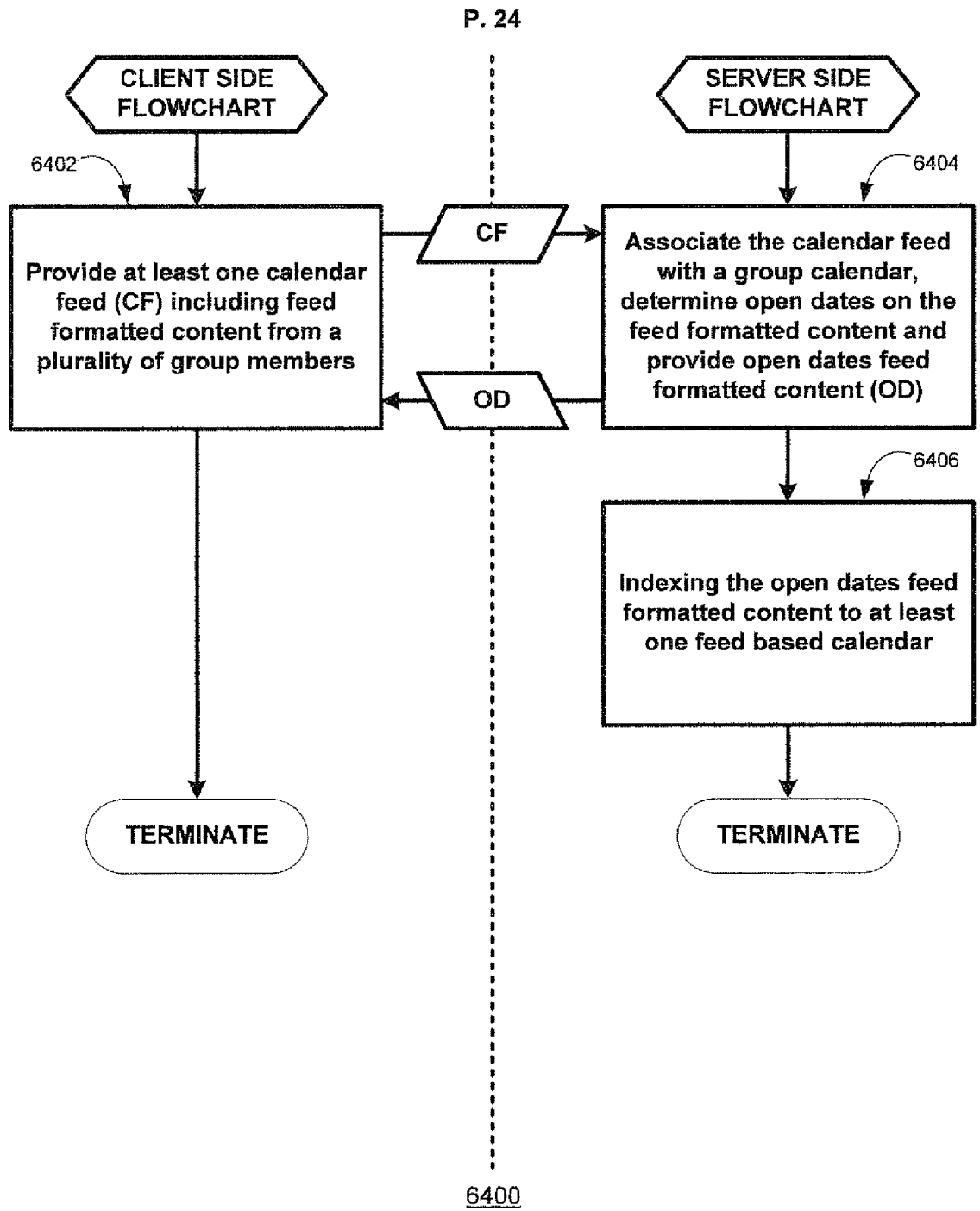
FIG. 64 illustrates a flowchart representative of one embodiment of a method for group scheduling.

FIG. 64 illustrates a flowchart representative of one embodiment of a method for group scheduling at 6400. The client side provides at least one calendar feed including feed formatted content from a plurality of group members at 6402. The server side associates the calendar feed with a group calendar, determines open dates on the feed formatted content and provides open dates feed formatted information at 6404. The server side may index open dates feed formatted content to at least one feed based calendar at 6406.

Figure 65:
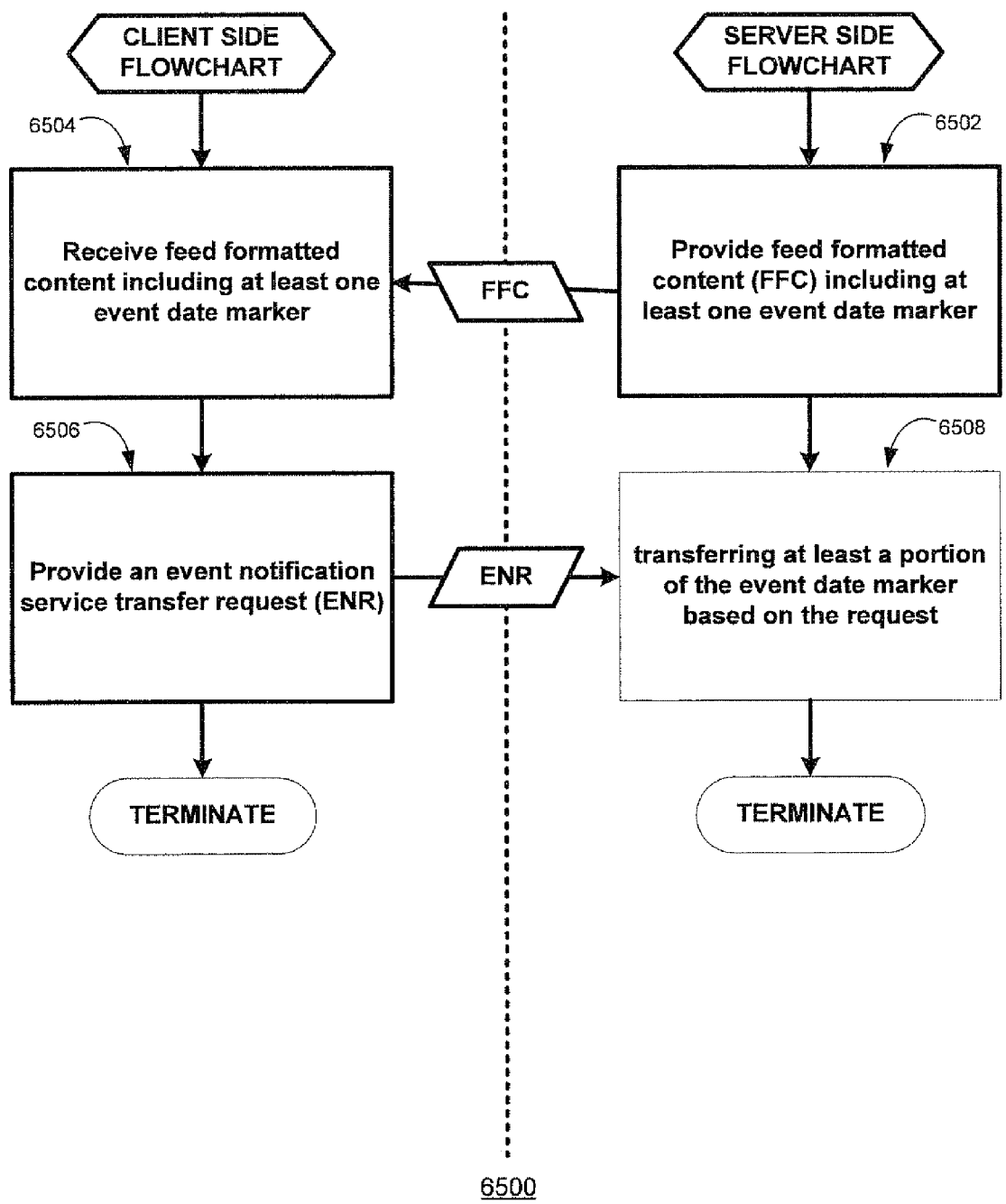
FIG. 65 illustrates a flowchart representative of one embodiment of a method for event notification.

FIG. 65 illustrates a flowchart representative of one embodiment of a method for event notification at 6500. The server side provides feed formatted content including at least one event date marker at 6502. The client side receives feed formatted content including the event date marker at 6504. The client side provides an event notification transfer request at 6506. The server side transfers at least a portion of the event date marker based on the request at 6508.

Figure 66:
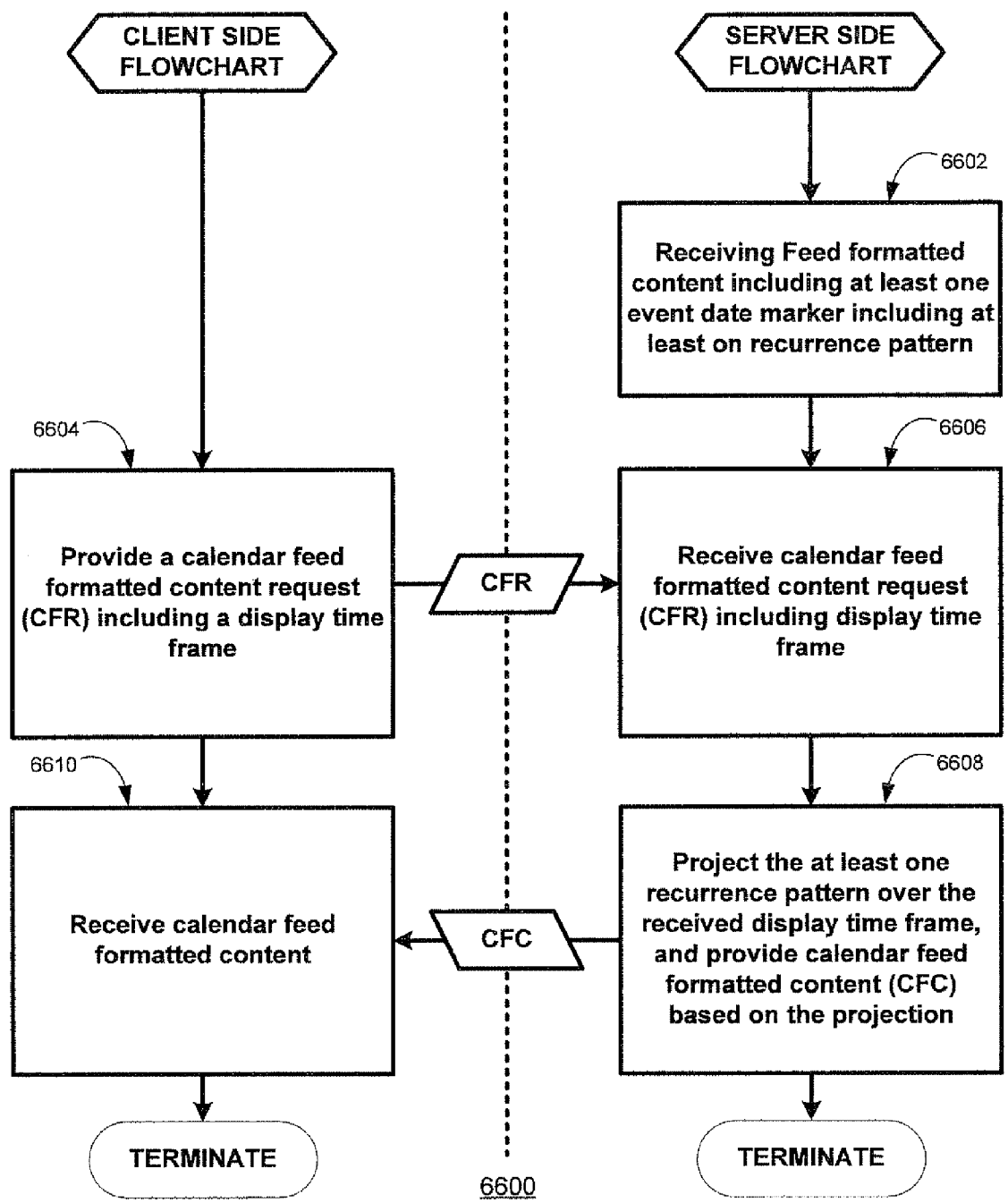
FIG. 66 illustrates a flowchart representative of one embodiment of a method for providing event date notification.

FIG. 66 illustrates a flowchart representative of one embodiment of a method for providing event date notification at 6600. The server side receives feed formatted content including at least one event date marker including at least one recurrence pattern at 6602. The client side provides a calendar feed formatted content request including a display time frame at 6604. The server side receives calendar feed formatted content request including a display time frame at 6606. The server side projects the at least one recurrence pattern over the received display time frame and provides calendar feed formatted content based on the projection at 6608. The client side receives calendar feed formatted content at 6610.

Figure 67:
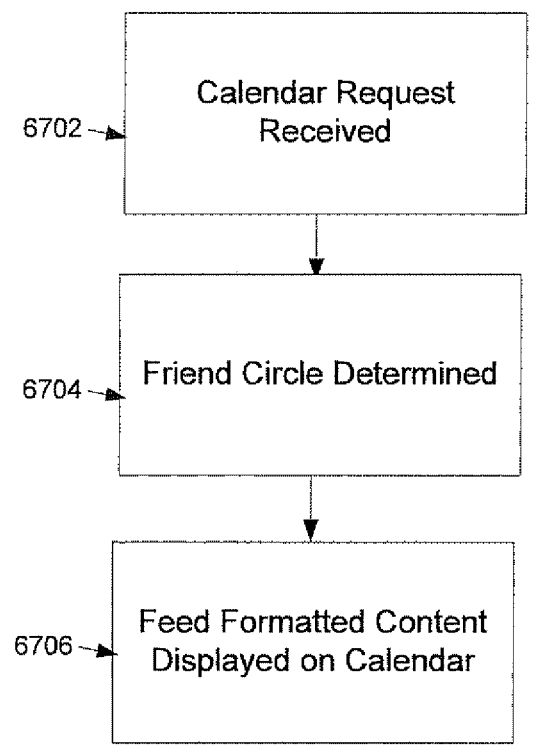
FIG. 67 illustrates a flowchart representative of one embodiment of a method for sharing date information.

FIG. 67 illustrates a flowchart representative of one embodiment of a method for sharing date information at 6700. A calendar request is received at 6702. A friend or associate circle is determined at 6704. Feed formatted content is displayed based on the determination at 6706. In one embodiment, the feed formatted content comprises friend or associate profile date information.

Feed based calendars may be web or software based, and may be controlled in a variety of ways. For example, the feed based calendar may be provided as a plug-in or addition to desktop software such as Microsoft's Outlook program. For example, an RSS reader plug-in for Outlook is available that displays RSS items in inbox folders. In one embodiment, feed items read into Outlook may be scanned for event date markers. When an event date marker is found, the event may be added to the Outlook calendar. In one embodiment, the user may select whether feed items from a particular feed or any feeds at all are to be included in their Outlook calendar.

In one embodiment, calendar items that are entered into Outlook may be transmitted to the IAP server and indexed to the user as feed formatted content including an event date marker. Multiple feeds may be provided to access the user indexed feed formatted content, each feed providing a different level of information. For example, one feed might be provided that only indicates that an event is scheduled, but without information regarding what the event is. A feed such as this may be distributed to colleagues or made generally available for the purpose of coordinating meeting or event times. A group or individual wishing to schedule a meeting may associate these user calendar feeds with a feed based calendar or feed based scheduling program in order to determine optimal meeting times.

In one embodiment, a scheduling feed based calendar is created for a specific group. Group members provide a feed to their schedule to be fed into the scheduling feed based calendar. The provided feed may display only when their time is booked or available, and may not display what they are specifically doing when the time is booked. Each member of the group, or a meeting time coordinator for the group, may view the scheduling feed based calendar to see what time slots are available and schedule meetings based on mutually available times. When a meeting time is determined, the new feed item associated with the meeting may then be distributed to the group members.

In one embodiment, individual feed items may be accessed at a particular URL. By forwarding a URL to an individual feed item, for example as a link in an email or on a web page, an event can be distributed in a format that allows users to add them to a feed based calendar. For example, an event organization provider such as Evite® may associate a feed item with an event. When invitations for the event are sent via email or when the invitation is viewed in some other form online, a link or button either to the feed item or that can directly add the feed item to a feed based calendar may be provided.

In one embodiment, a list of feed subscriptions for a user may be stored at a third party server, such as an IAP server. In this embodiment, a web or IAP based calendar may be used to display feed items from any feed based source to a user via a variety of display devices.

In one embodiment, a feed based calendar may be used in conjunction with feeds related to a school course. Class schedules, syllabi, extra credit opportunities, and other class related events may be displayed in a calendar. A user of this calendar may have multiple course feed subscriptions, and the calendar may be useful in identifying potential scheduling conflicts. In one embodiment, the calendar can also receive and display events from a local event feed that can include local cultural and promotional events. These events can also be displayed together or alone with the class events and again conflicts can be indicated.

In one embodiment, publishing node 240 provides feeds that include event date markers. Various organizations may manage feed based calendars, or the feeds compatible with feed based calendars through publishing node 140. In one embodiment, operators at a call center can take and enter event date marked information for an organization.

In one embodiment, when a user may elect to add an individual feed item or feed to their feed based calendar for display. When the user makes this election, they may be presented with the opportunity to provide preference information such as how much of a feed item to display in the calendar, what color to display the item in, what category of event items should it be associated with, or the like. A user may be provided with the opportunity to include one or more advance reminders for upcoming items. For example, a user adding a feed item that represents a school test to their calendar may wish to provide an advance event notification of two days to remind them they need to study.

Feed based calendars may display different periods of time. For example, views of individual days, work weeks, full weeks, or entire months may be provided. In one embodiment, if a user is using a view that displays an event that has advance notification, the advance notification is not displayed. However, if the current view does not display the day or time of the event, the advance notification is displayed.

In one embodiment, feed formatted content with an event marker may also contain an audio or visual marker. Content displayed in the feed formatted calendar may include an icon, button, or link when the audio or visual marker is present. In one embodiment, if the icon, button, or link is clicked, a video or audio file associated with the marker is played. In one embodiment, a phone voicemail message may be stored on a network accessible server. The phone message may be associated with feed formatted content by an audio marker. When a user views the feed formatted content an icon, button or link may be displayed to give the user access to the stored voicemail message.

In one embodiment, the feed subscription information to be displayed in a feed based calendar may be held at a central server. Alternatively, it may be held on a user display device. In one embodiment, the feed subscription and event information displayed in a feed based calendar may be provided in aggregated format as a feed itself. For example, an IAP user may register for various feeds, and perhaps have added personal events, all to be displayed in a feed formatted calendar hosted on the IAP. The IAP user may use another service or visit another site that employs a feed based calendar, for example a calendar on Evite®. The IAP user may wish to populate the Evite hosted calendar with their personal IAP calendar information. In one embodiment, the IAP, and/or other feed based calendar hosts, may provide a feed that the user may pass into another feed based calendar that holds the event and/or subscription information of the first feed based calendar. The user may specify whether they wish to copy all feed information over to be stored on the second feed based calendar, or whether it should just be temporarily populated. Either the link to the user's IAP calendar feed or the copied information may be held in a profile at the host of the second feed based calendar.

In one embodiment, the feed formatted content to be displayed in a feed based calendar may be categorized. For example, categories may include work, fun, television schedule, sports practice schedule, and the like. The interface for a feed based calendar may include the option to select which categories are to be displayed. For example, the interface may include a list of categories and associated checkboxes. The feed based calendar then only displaying the feed based content indexed to the checked categories.

In one embodiment, the IAP works with feed formatted content that includes one or more event date markers. An event date marker may take many different formats. For example, an event date marker may be a single XML element indicating an event date. Alternatively, the event date marker may be made up of multiple elements such as those elements described in the iCalendar, Internet Calendaring and Scheduling Core Object Specification defined by RFC 2445. The IAP may be able to process multiple types of event date marker. In one embodiment, the display of feed formatted content that contains an event date marker may include an interface option to add the content to a calendar. In one embodiment, this calendar may be a feed based calendar hosted by the IAP or some other site or service. Alternatively, the IAP may allow users to read the feed formatted content into a variety of other calendar programs. For example, the IAP may supply a link that adds the event to a users Yahoo! calendar, a Hotmail calendar, that begins the download of an iCalendar file the user may open and add to Outlook or any other iCalendar based calendaring and scheduling program, or that provides some other event notification destination. In one embodiment, an IAP user may configure which calendar or format they wish to have as the result of clicking on the IAP interface button for adding feed formatted content to a calendar by checking boxes or some other way selecting event notification destination options. In one embodiment, the IAP adds the event to the user's IAP calendar in addition to one or more other calendar sites or programs. The IAP may accomplish this by reformatting the feed item based on the event notification destination options. For example, the IAP may parse out the elements of a feed item, create a temporary file, write out the feed item elements in iCalendar format into the temporary file, and provide this temporary file to the user. In this example, the reformatting takes place at IAP control server 1410. Alternatively, when the IAP display interface receives a feed item for display, it may also receive or have stored the users event notification destination options. If the user has selected to have items added to their Yahoo! Calendar, the interface may parse out the elements of a feed item, and place them into a hyperlink format compatible with the Yahoo!

Calendar event format. In this example, the reformatting takes place at the IAP display interface. The IAP may interact with other event notification systems. For example, items may be sent in email format to alert a user. Alternatively, items may be queued to be sent by SMS to a user cell phone.

In one embodiment, a feed based calendar may be used in conjunction with social network database 1460. For example, a user may select to share with friends a personal calendar feed. A user may also select to have the birthdays of friends in the social network added to their calendar. This maybe accomplished by the IAP maintaining a feed location that takes the argument of a username or identification and returns all the first degree birthday dates and names in feed format. Selecting to view birthdays on the calendar may access this feed and populate the user feed based calendar. Users may also share conditional purchase opportunities with their friends by selecting an opportunity and selecting to pass the opportunity on to their friends.

In one embodiment, the IAP takes advantage of another feed enhancing marker, a geographic marker. FIG. 68*a* illustrates a flowchart embodiment of providing a geographically enhanced feed 6800*a*; FIG. 68*b* illustrates a geographically enhanced feed item 6800*b*; and FIG. 68*c* illustrates the IAP display of a geographically enhanced feed item 6800*c*. First, the IAP receives a feed item including a geographic marker 6802*a*. One example of a feed item including a geographic marker is shown at feed item 6800*b*, including geographic marker 6802*b*. When the IAP displays a geographically enhanced feed item as shown in 6800*c*, the display may include a link to geographic data such as map information 6802*c* or a link to directions information 6804*c*.

The geographic marker may take many forms. A geographic marker may be a single element in a feed item, or it may be multiple elements. In one embodiment, the geographic marker includes the street address of a location. In another embodiment, the geographic marker is made up of longitude and latitude information. Alternatively, the geographic marker may take the form of a location identifier that indexes address or longitude and latitude information to a separate identifier.

The destination of the link to directions information 6804*c* may be achieved by using user address information held by the IAP server, held at the user node 220, or supplied by the user when they request the directions information. In one embodiment, the user may have multiple address profiles based on, for example, a work address and a home address.

Figure 69:
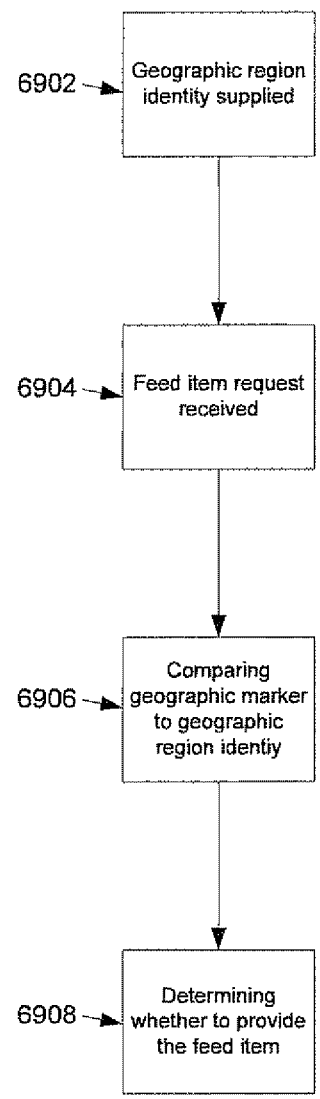
FIG. 69 illustrates a flowchart representative of one embodiment of a method for selectively providing a feed based on a geographic marker.

FIG. 69 illustrates a flowchart representative of one embodiment of a method for selectively providing a feed based on a geographic marker at 6900.

First, a geographic region identity is supplied 6902. The geographic region identity may be supplied by a user, taken from information associated with a user, determined by IP-to-geography translation, or if the feed is being displayed as information on a website the geographic region identity may be supplied by the site administrator.

After the geographic region identity is supplied 6902, a feed item request is received 6904. This request may be received at a feed source server, at a third party pass through server, or at the user node 220. Where the request is received, a comparison is made between geographic information included in the geographic marker of the feed item and the supplied geographic region identity 6906. Based on this comparison, the feed item is selectively displayed 6908. For example, a user may specify that they only wish to receive concert information at a certain list of venues. This list of venues may be stored at the concert information source server, at a third party pass through server, or locally on a feed aggregator and display program. If a request is received at the source server, including the list of venues, the source server may selectively supply the concert information feed items based on this list. The same may be done at the third party pass through server. Requests for feed items at the local aggregator and display program may prompt the program to iterate through received feed information, discarding feed items that have location markers specifying venues other than the select list.

One embodiment of the present invention provides for a feed based map. For example, online mapping service providers such as Rand McNally, Mapquest, and the like, may wish to display a variety of information on provided maps. In one embodiment, a feed item may include at least one location marker, such as longitude and latitude coordinates, or an address, that may be used to display at least a portion of the item, or a symbol or the like representing the item, on a map. A user may be given the opportunity to select one or more feeds they wish to have displayed on a map, or coding in a page may dictate what feeds are to be displayed. For example, a social network database may include location information associated with its users. A user of the social network database may elect to view a map that includes display of the locations of users they have relations with. In one embodiment, the user may select to view only friends they have a direct relation with, or they may select to view friends they are within two connections of, or the like. The map may display different relations differently.

Another embodiment of a feed based map may include one or more feeds associated with local businesses. A user may select to view a certain location, and may additionally select a certain time. The map may access a feed including location marker and event marker information and display information that falls within the geographical scope of the map and also within the time frame selected by the user. For example, a user may know that they intend to visit a certain area of New York in the upcoming weekend. The user may access a map of the area by specifying the address where they intend to stay. The user may then elect to view any friends they have in the area by accessing a feed associated with a social network database. Using a link provided with user symbols displayed on the map the user may access a profile for a friend that is near to the area they are staying and access a feed associated with that friend that includes a list of their favorite local restaurant establishments. The user may select to view the restaurants in that feed on the map, and may then elect to view feed information available for those restaurant locations with event marker information for the coming weekend. In one embodiment, the restaurant may provide associated with a booking system that indicates whether a reservation is available for that time period. Alternatively, the restaurant may advertise a conditional purchase opportunity available for that time period, and the user may elect to place a contingent purchase offer on that opportunity. The user may send a feed item to the friend in New York that includes an event marker for the invitation. If the friend is unavailable, the user may have the opportunity to retract the contingent purchase offer, if it has not yet been transacted. Alternatively, part of the contingent purchase offer may include a requirement that the friend confirm the reservation offer for it to be transacted.

In one embodiment, the IAP may store or publish feed information including for example, event marker and location marker information for companies. Access to the feeds may be provided to other service providers such as Rand McNally, Mapquest, Yellowpages.com, Google, a newspaper site, or the like. In one embodiment, a subscription price may be charged for access. In one embodiment, the companies may pay for feed interactions such as subscriptions, items delivered, and feed item links clicked. In one embodiment, individual companies or groups of companies represented by a feed may have the opportunity to select which service providers they wish to provide access to their feed for. In one embodiment, inclusion in the information provided by the service providers may require a subscription payment by the individual company or group of companies. For example, a subscription or payment deal may be offered to companies with feeds hosted by the IAP wherein their feed information may be included on Google as one of their AdWords, and an alternative subscription or payment deal may be offered to have the information included with a yellowpages.com listing for the company.

Figure 70:
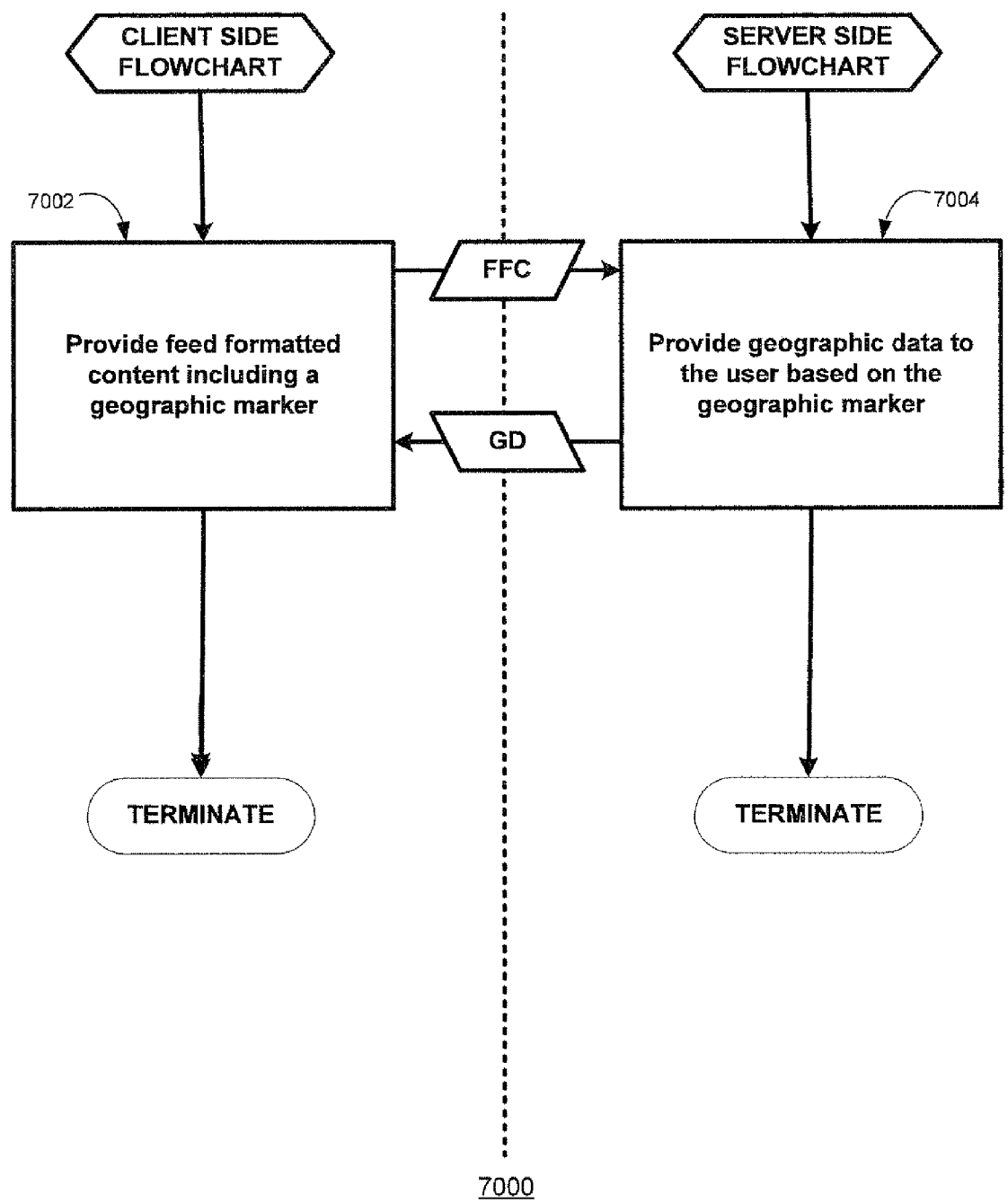
FIG. 70 illustrates a flowchart representative of one embodiment of a method for selectively providing geographically related feed formatted content.

FIG. 70 illustrates a flowchart representative of one embodiment of a method for selectively providing geographically related feed formatted content at 7000. The client side provides a feed formatted content request including a geographic marker at 7002. The server side provides geographic data to the user based on the geographic marker at 7004. In one embodiment, the geographic data may comprise one of directions or map.

Figure 71:
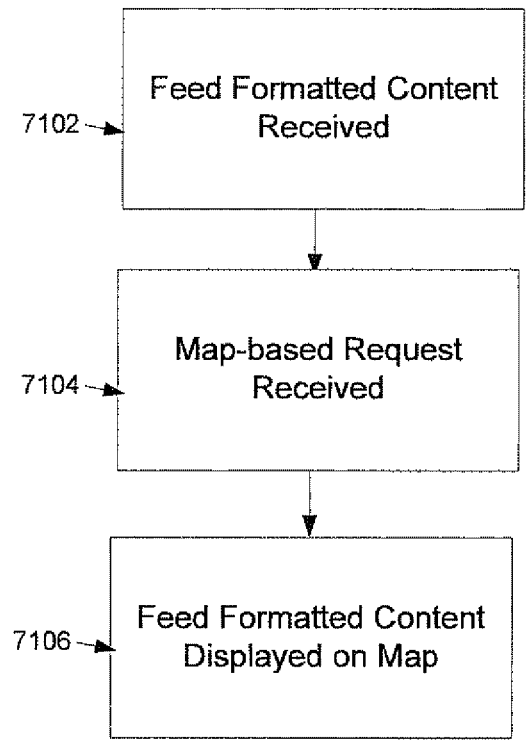
FIG. 71 illustrates a flowchart representative of one embodiment of a method for providing information on a map.

FIG. 71 illustrates a flowchart representative of one embodiment of a method for providing information on a map at 7100. Feed formatted content including at least one location marker is received at 7102. A map-based content request is received at 7104. The feed formatted content is displayed on a map at 7106 based on the location marker. In one embodiment, the location marker may include location information of associates from a social network database.

Figure 72:
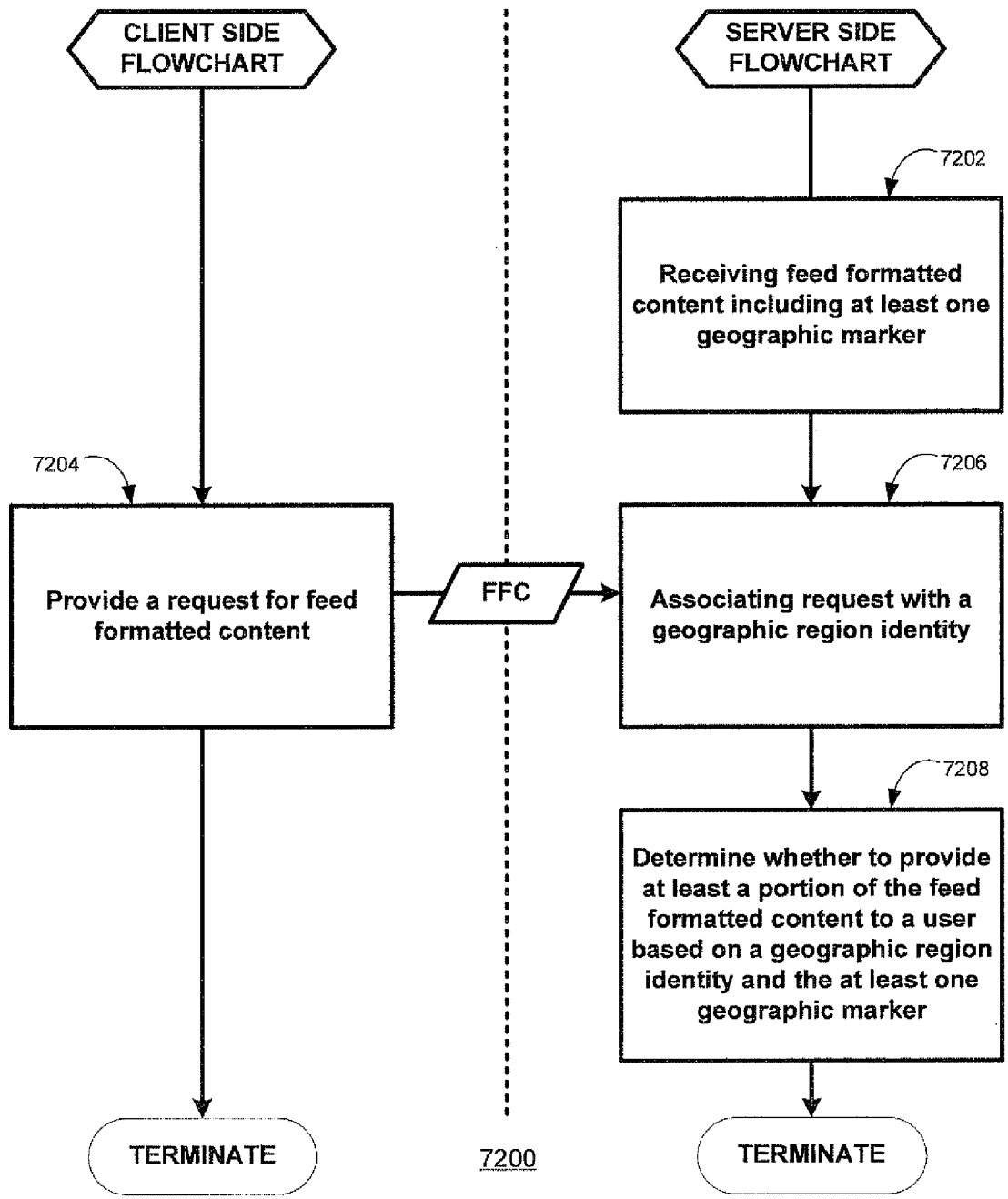
FIG. 72 illustrates a flowchart representative of one embodiment of a method for selectively providing geographic related feed formatted content.

FIG. 72 illustrates a flowchart representative of one embodiment of a method for selectively providing geographic related feed formatted content at 7200. The server side receives feed formatted content including at least one geographic marker at 7202. The client side provides a request for feed formatted content at 7204. The server side associates the request with a geographic region identity at 7206. The server side determines whether to provide at least a portion of the feed formatted content to a user based on a geographic region identity and the at least one geographic marker at 7208. In one embodiment, the geographic region identity may be provided by the user with the request. Alternatively, the geographic region identity may be based on a profile information, IP-to-geography translation, single or double confirmation targeting.

Figure 73:
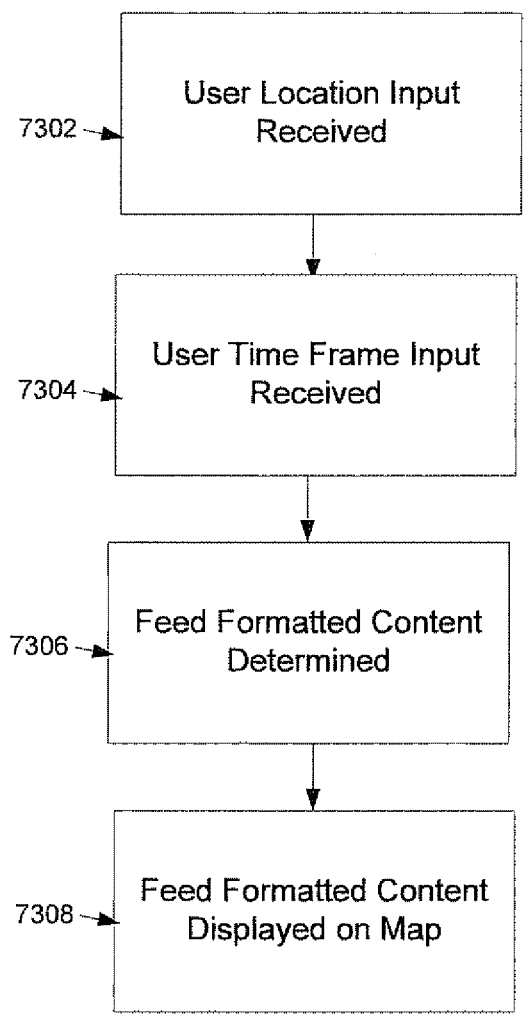
FIG. 73 illustrates a flowchart representative of one embodiment of a method for providing location information.

FIG. 73 illustrates a flowchart representative of one embodiment of a method for providing location information at 7300. A user location input is received at 7302. A user time frame input is received at 7304. Feed formatted content is determined based on at least one event date marker, the location input, and the time frame input at 7306. At least a portion of the feed formatted content is displayed on a map based on the determination at 7308.

In one embodiment, the IAP can index a variety of user marker signals, for the use of personalizing some aspect of a feed formatted content. A marker may be an element inserted into a feed formatted content, or it may be held in a database and used to selectively format or provide a feed formatted content. For example, the IAP can index marker signals identifying information referred from a friend. The IAP can forward on feed items referred from a friend as indexed to the user in the IAP server database. In one embodiment, a user may receive multiple marker notifications. Examples of possible notifications include audio or visual signals. For example, a user could receive a first notification that a feed from a friend is present, and a second notification that the feed pertains to a particular subject.

Figure 74:
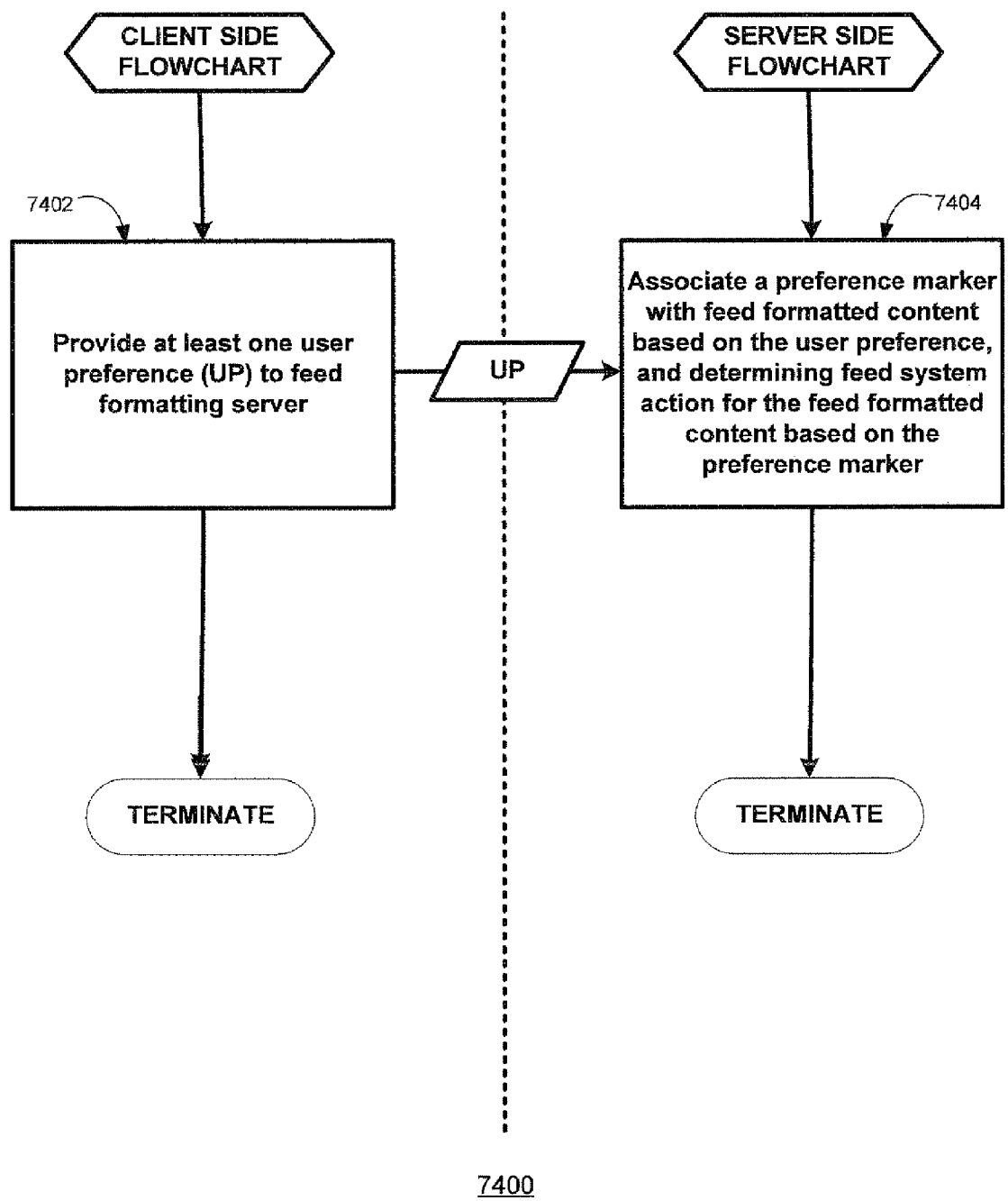
FIG. 74 illustrates a flowchart representative of one embodiment of a method for providing customized feed formatted content.

FIG. 74 illustrates a flowchart representative of one embodiment of a method for providing customized feed formatted content at 7400. The client side provides at least one user preference to a feed formatting server at 7402. The server side associates a preference marker with feed formatted content based on the user preference, and determines feed system action for the feed formatted content based on the preference marker at 7404. The preference marker may be inserted into the feed formatted content. The preference marker may be stored in a database associated with the feed formatting server.

Figure 75:
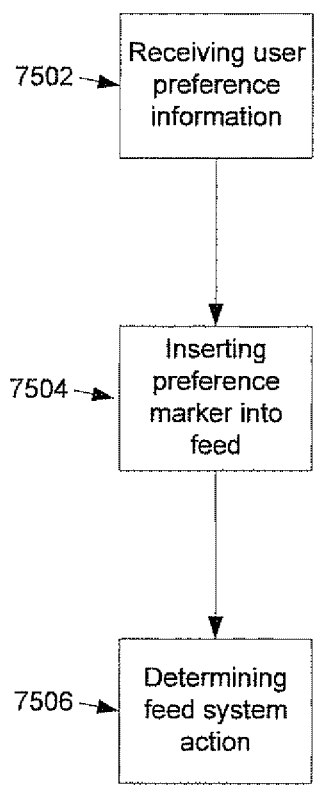
FIG. 75 illustrates a flowchart representative of one embodiment of a method for providing customized feed formatted content.

FIG. 75 illustrates a flowchart representative of one embodiment of a method for providing customized feed formatted content at 7500. The feed formatting server may be a PCP, OCP, or ACP. The feed formatting server receives user preference information at 7502. User preference information includes a preference associated with at least one user and a designation of one or more feeds the preference should be applied to. When a feed is generated for the user, a preference marker representing the preference information is inserted into the feed 7504. Various feed system actions may be taken based upon the determined presence of the preference marker 7506.

Figure 76:
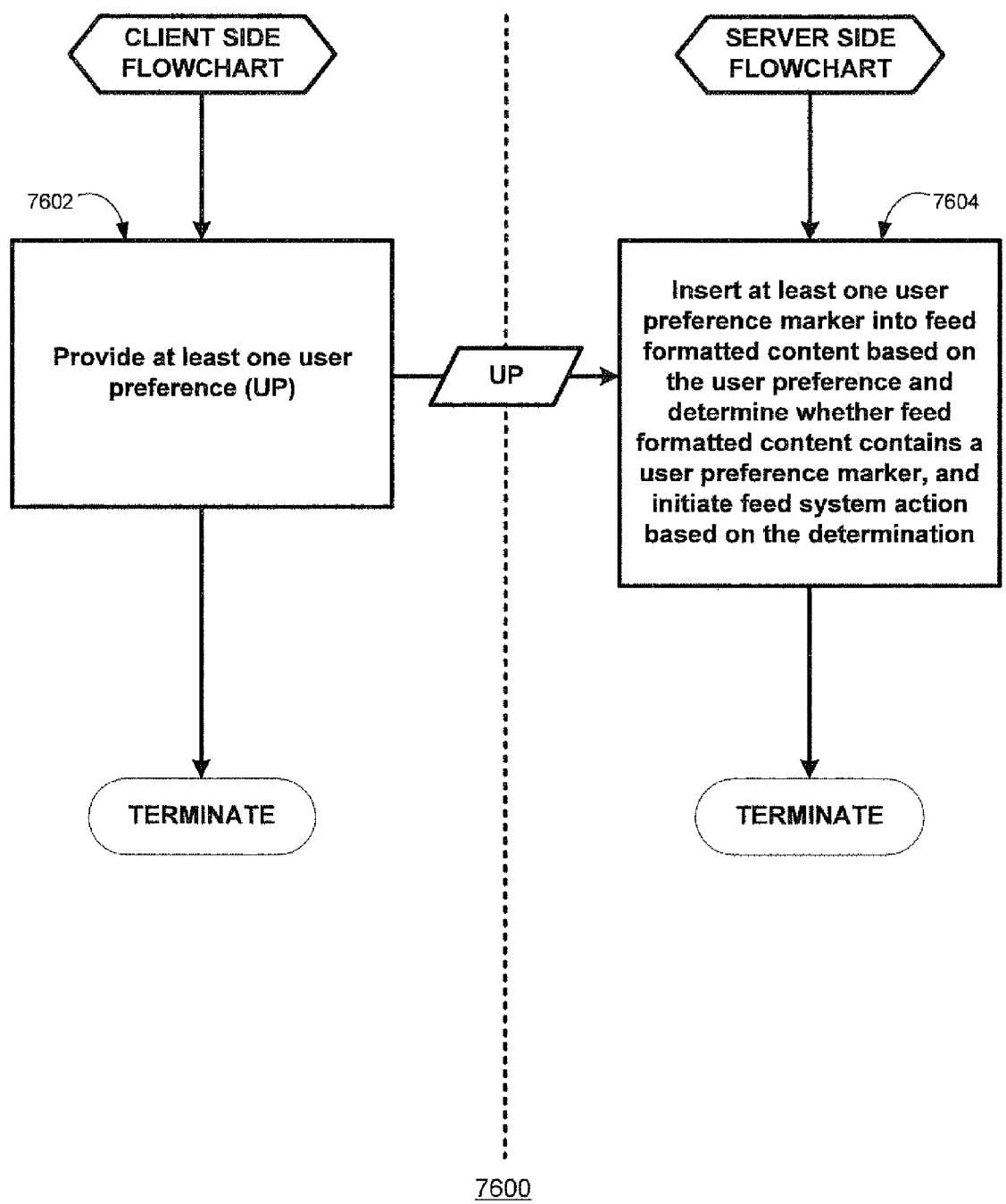
FIG. 76 illustrates a flowchart representative of one embodiment of a method for providing customized feed formatted content.

FIG. 76 illustrates a flowchart representative of one embodiment of a method for providing customized feed formatted content at 7600. The client side provides at least one user preference at 7602. The server side inserts at least one user preference marker into feed formatted content based on the user preference, determines whether feed formatted content contains a user preference marker, and initiates feed system action based on the determination at 7604.

For example, the IAP can insert a preference marker into feed formatted content to notify a user of certain information. The preference marker may include an audible or visual signal. In one example, a link to a chime signal can be inserted in the information feed from the IAP server to the user IAP, which will result in a feed system action of the signal being played a predetermined time period relative to displaying the information when received at the IAP. In one embodiment, the user can select chime or other audio signals, or audio/visual signals, to associate with various categories of information. In one embodiment, the data fed from the feed source server to the IAP server can be scanned and the preference marker inserted based on keywords identified in the text of the feed. In another embodiment, the marker is inserted based on a determination of the feed source server.

In one embodiment, a user preference can be specified in preference markers relating to the timing of notifications from particular people or subject matters. In this embodiment, each feed item can be forwarded through feed system action from the IAP server to the user IAP in accordance with the preference marker set up by the user. For example, a user can establish one or more preference markers to hold all information pertaining to sports news and news from friends until after 5:00 PM, but allow stock news through as it is received.

In one embodiment, preference marker placement can be set at the IAP server based on user interaction with the IAP. For example, information from various feeds can be sent from the IAP server to the IAP based on the frequency the IAP user has clicked on similar information.

In one embodiment, the customization of the feeds includes the formatting of content to include one or more preference markers. The reformatting to insert the preference marker can be accomplished at a feed source server, a third party pass though server or at a user's local aggregator. The preference markers can be inserted based on profile data collected from a user, direct indication by a user of a user preference, or desired customization feature, other user usage based profile data, or the like. In one embodiment, an IAP user may request a feed from a website. The local IAP recognizes the new feed and prompts the user with a user preference invitation. In one embodiment, the user preference invitation may provide one or more customization and preference options.

In one embodiment, sections of a web site may be designated as feed-enabled. A feed enabled section of a web site is one that displays via the web page information that may be read from a feed. This may be achieved by surrounding a portion of HTML with a feed tag. When a user is on a web page that has a section that is feed-enabled, the mouse pointer may change from a pointer to a different icon when hovering over a feed-enabled area. In one embodiment, a user can outline and/or highlight, or click-and-drag a feed-enabled section of a target website to the user's IAP. Alternatively, the user may right click to access a menu option that indexes the feed to their IAP. In one embodiment, responsive to the user action, the feed-enabled website portion is indexed to the user in the IAP database and a third party pass through relationship is established between the target feed server, the IAP server, and the indexed user. The user can then access the information through its connection between the user's IAP and the IAP server.

Figure 77:
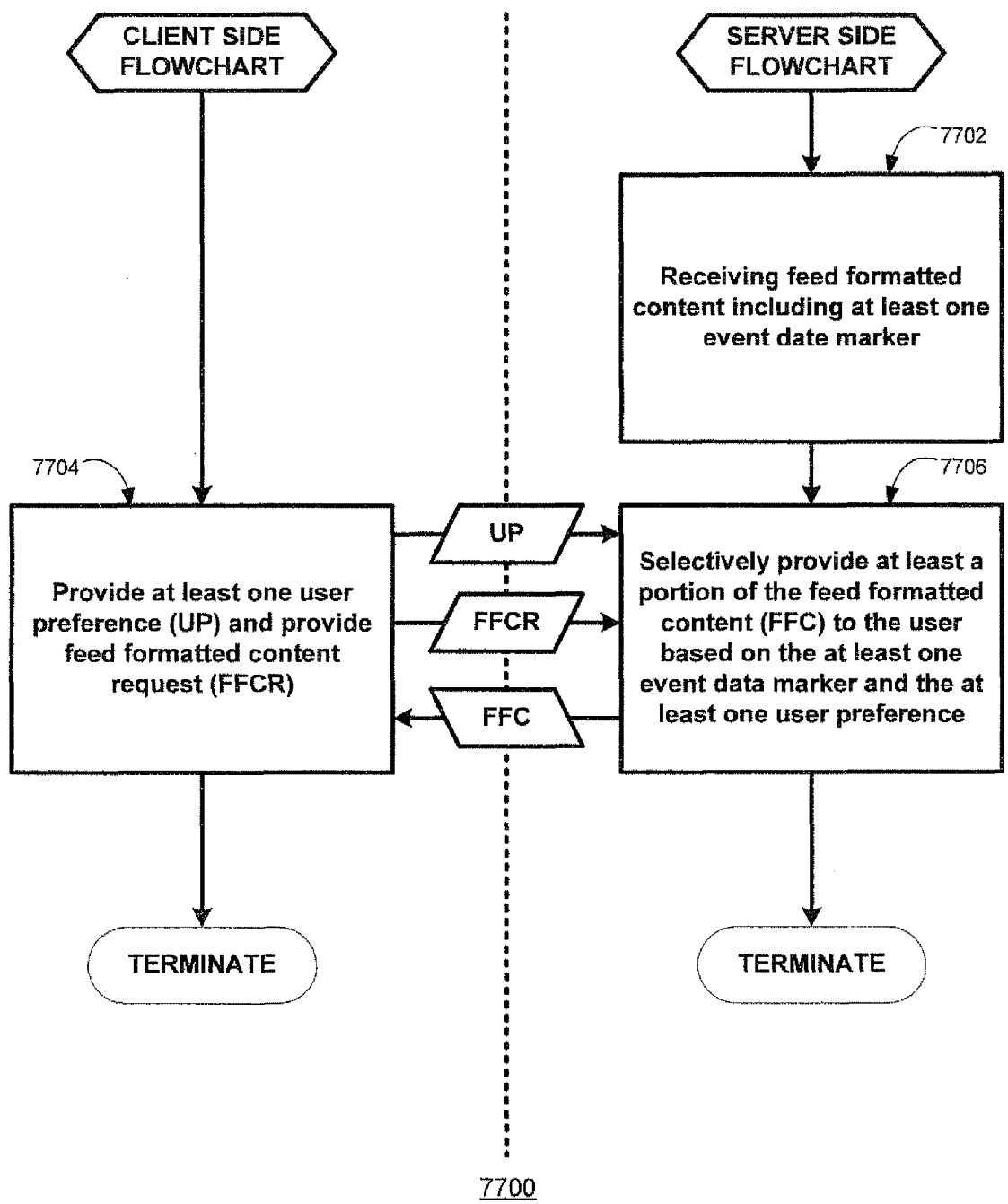
FIG. 77 illustrates a flowchart representative of one embodiment of a method for providing feed formatted content.

Another customization and user preference feature provides for event notification. FIG. 77 illustrates a flowchart representative of one embodiment of a method for providing feed formatted content at 7700. The server side receives feed formatted content including at least on event date marker at 7702. The client side provides at least one user preference and a feed formatted request at 7704. The server side selectively provides at least a portion of the feed formatted content to the user based on the at least one event date marker and at least one user preference at 7706. In one embodiment, the feed formatted content may be displayed in a calendar. For example, the user may specify a user preference to turn on the event notification feature for all feeds or for specific feeds specified or categorized by the user. When in the on-mode, in one embodiment, the local IAP monitors for an event date marker embedded in the feed. When an event marker is identified a feed system action is taken wherein the feed title is made viewable and operable in a feed based calendar, for example, a Microsoft Outlook calendar provided with a feed based calendar plug in, or a web based feed based calendar.

Figure 78:
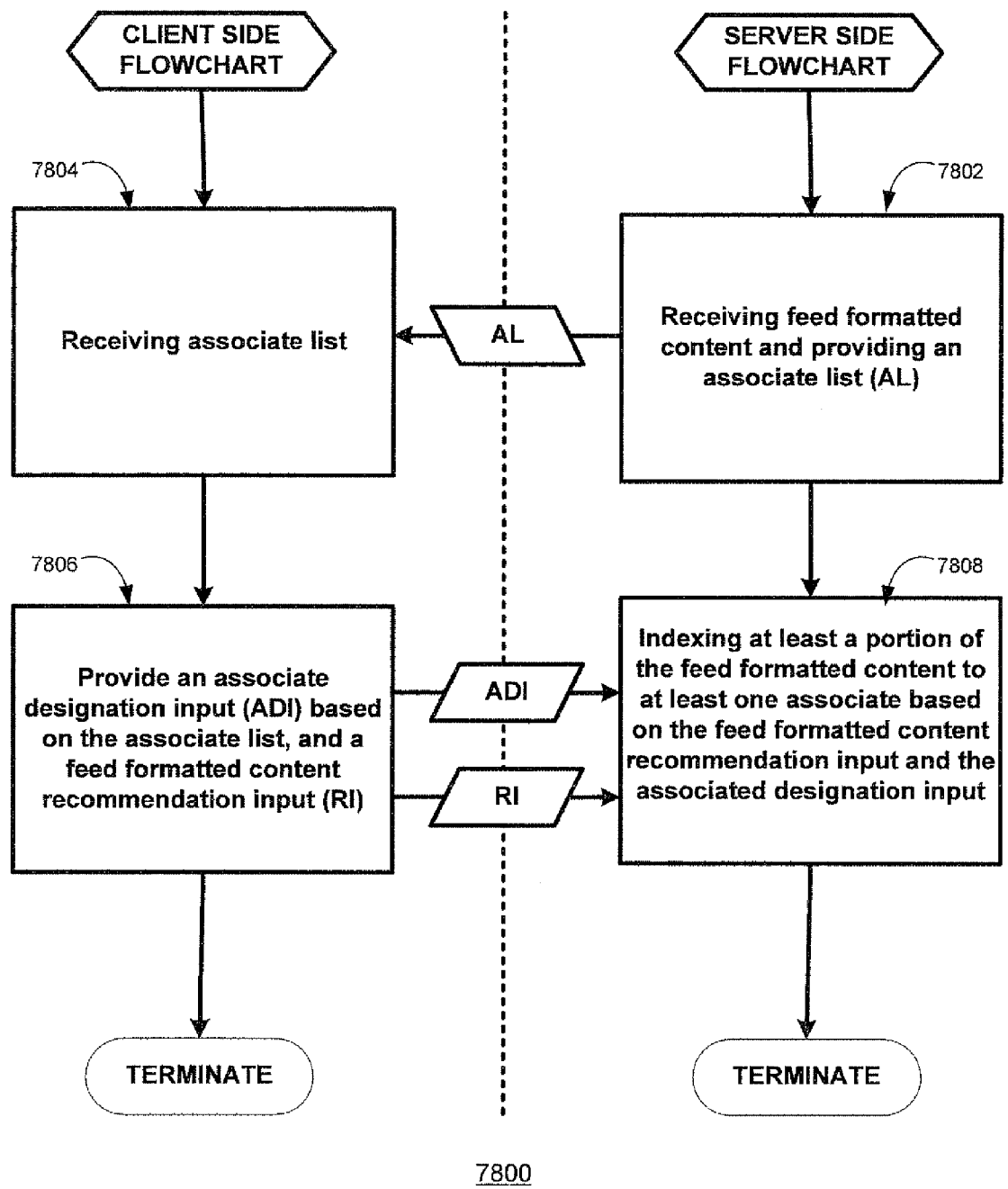
FIG. 78 illustrates a flowchart representative of one embodiment of a method for recommending feed formatted content.

Another preference feature allows a user to select a feed or customized feed to send to one or more friend or associate. The terms friend and associate may be used interchangeably. FIG. 78 illustrates a flowchart representative of one embodiment of a method for recommending feed formatted content at 7800. The server side receives feed formatted content and provides an associate list at 7802. The client side receives the associate list at 7804. The client side provides an associate designation input based on the associate list and a feed formatted content recommendation input at 7806. The server side indexes at least a portion of the feed formatted content to at least one associate based on the feed formatted content recommendation input and the associate designation input at 7808. The associate list may be based on a social network database. In one embodiment, it may be determined whether the associate has previously been indexed to the feed formatted content. In one embodiment, a recommendation table based on the recommendations may be maintained in a database. In one embodiment, the recommendation input may include a comment or recommendation note from the user, and this or some other portion of the recommendation input may be displayed to the recommended user.

In one embodiment, the user has a friend's list associated with the user's local IAP. The user can designate a feed for a friend from the list, and responsive to this designation, the feed system action may be taken wherein the designated feed is forwarded to the friend. In one embodiment, a "forward to a friend" link or button may be provided next to a feed item displayed on the IAP. When the link or button is clicked, the user is given the option to designate another user. The designation may be done through providing an email address, username, or some other unique identification of a user account. In one embodiment, the user may have a list of user accounts already indexed to them in the IAP database. These may be displayed to the user and the user may select to which account they wish to forward the feed item. When the user account or accounts the feed item is to be forwarded to have been selected, the IAP server receives the specified accounts and an identifier for the list item, or the list item itself. Based on this information, the IAP server may determine whether the users that are to receive the recommendation have already been indexed to the feed item. If the users have not been indexed to the feed item the indexing is then added. In one embodiment, an additional indexing is provided based on the recommendation. In one embodiment, a separate recommendation table may be maintained in the IAP database, and this IAP database may be a characteristic profile response database. In one embodiment, the IAP server maintains the recommendation information as response data for the feed formatted content. In one embodiment, the IAP server maintains the recommendation information and displays it to the user when the feed formatted content is viewed. For example, a feed item that has been forwarded may include text or link to text that indicates that it was recommended. This recommendation indication text may include a list of the one or more users who recommended the feed formatted content. In one embodiment, if a user wishes to forward a feed formatted content recommendation to a person who is not an IAP user, a portion of the feed or a particular feed item may be inserted into an email and sent to the non-IAP user. This recommendation email may include information regarding how to sign up as an IAP user, such as a link to a registration page.

Figure 79:
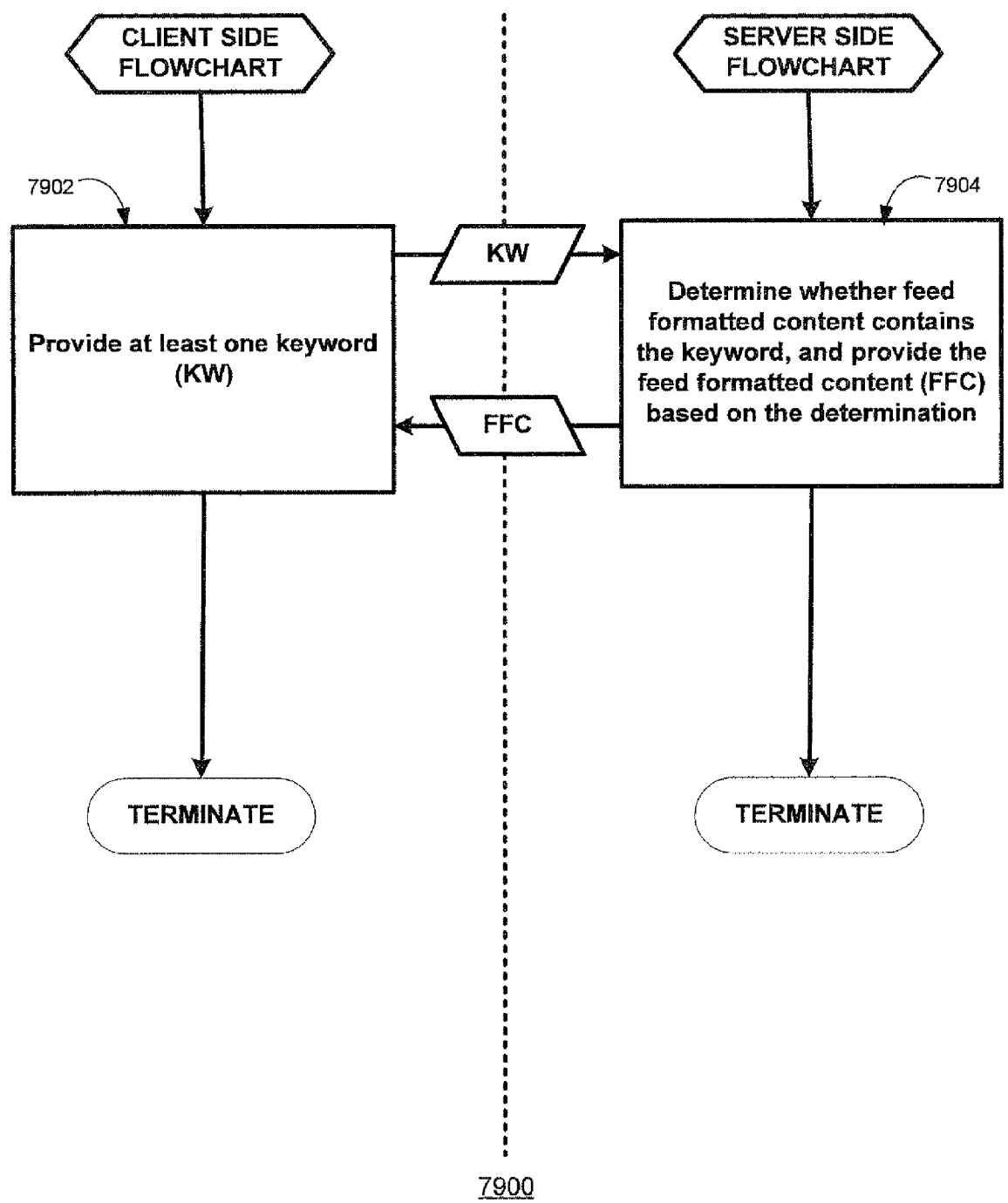
FIG. 79 illustrates a flowchart representative of one embodiment of a method for customizing feed formatted content.

Another customization feature allows a user to identify a user preference for content from feeds based on one or more keywords. FIG. 79 illustrates a flowchart representative of one embodiment of a method for customizing feed formatted content at 7900. The client side provides at least one keyword at 7902. The server side determines whether feed formatted content contains the keyword and provides the feed formatted content based on the determination at 7904. For example, a user may specify keywords of interest. An online web page interface may be provided that includes a field for text input. The submitted text input may be indexed to the user in the IAP database as keywords of interest. Feed content at the IAP can be scanned for the keywords. When keywords are identified within the content, the feed formatted content holding that content is indexed to the user. The feed system action may be taken wherein the user receives the feed formatted content at their IAP or they may be notified and/or the portion of the feed including the key word can be stored for later retrieval by the user. In one embodiment, the key word content search can be used to classify all or portions of different feeds, which are then placed in classified feeds.

Feed preference information may also include preferences regarding user display devices. For example, an IAP user may specify that when they access the IAP from their desktop, information from certain feeds should be displayed. However, when that user accesses the IAP via their cell phone, they may have specified that a different set of feeds should be displayed. Delivery preference information may be stored at the IAP server, indexing a user to a feed or selected feed items and a particular display device. A request to the IAP may include information identifying the device type, and based on this identification information and the delivery preference information one or more feed formatted contents may be selectively displayed.

Figure 80:
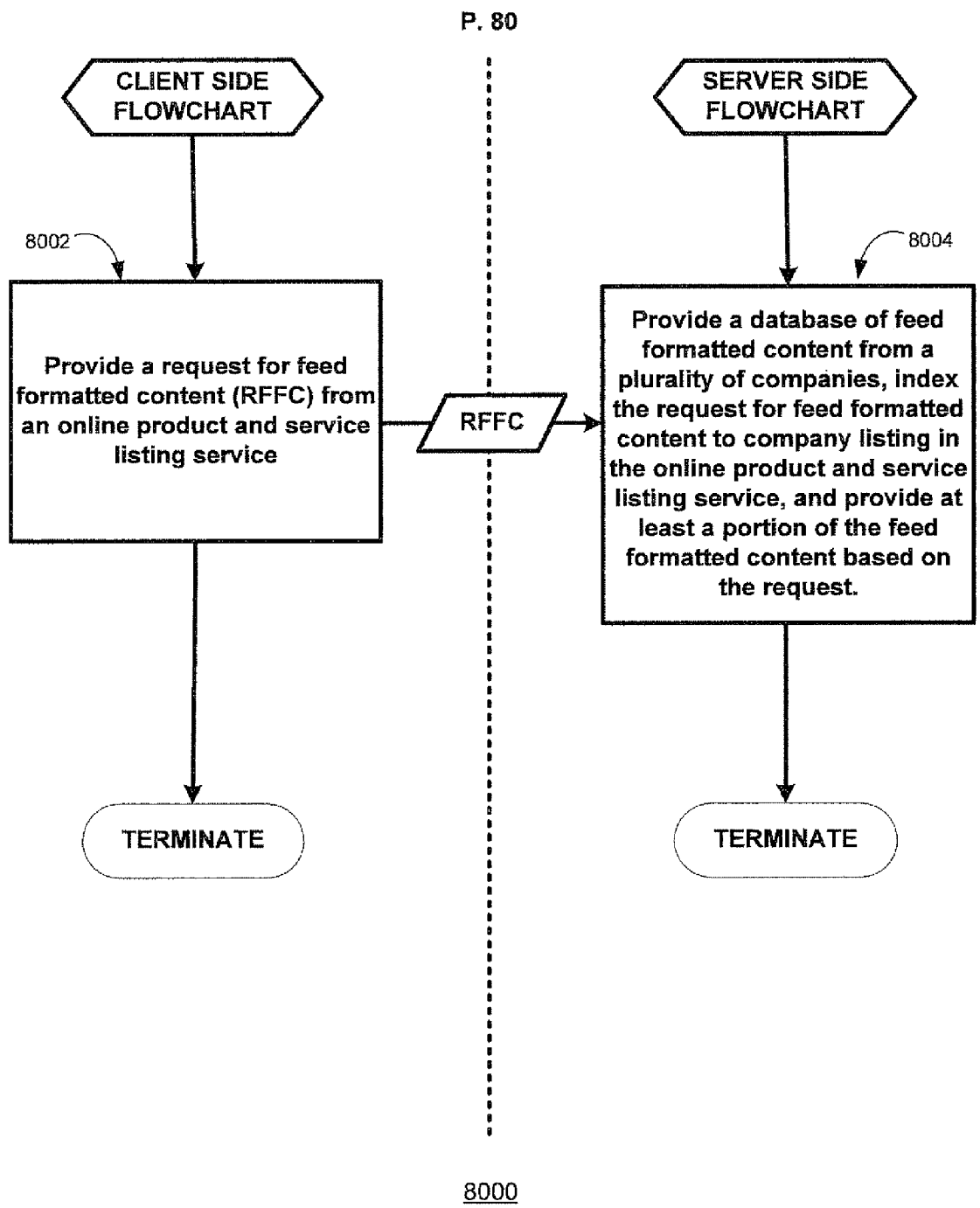
FIG. 80 illustrates a flowchart representative of one embodiment of a method for enhancing online product and service listing books.

One embodiment of the present invention includes a feed enhanced time relevant yellow pages directory online. FIG. 80 illustrates a flowchart representative of one embodiment of a method for enhancing online product and service listing books at 8000. The client side provides a request for feed formatted content from an online product and service listing site at 8002. The serer side provides a database of feed formatted content from a plurality of companies, indexes the request from feed formatted content to a company listing in the online product and service listing service, and provides at least a portion of the feed formatted content based on the request at 8004. In one embodiment, companies may provide promotional information in real time to the database via a feed formatted content publishing interface.

Figure 81:
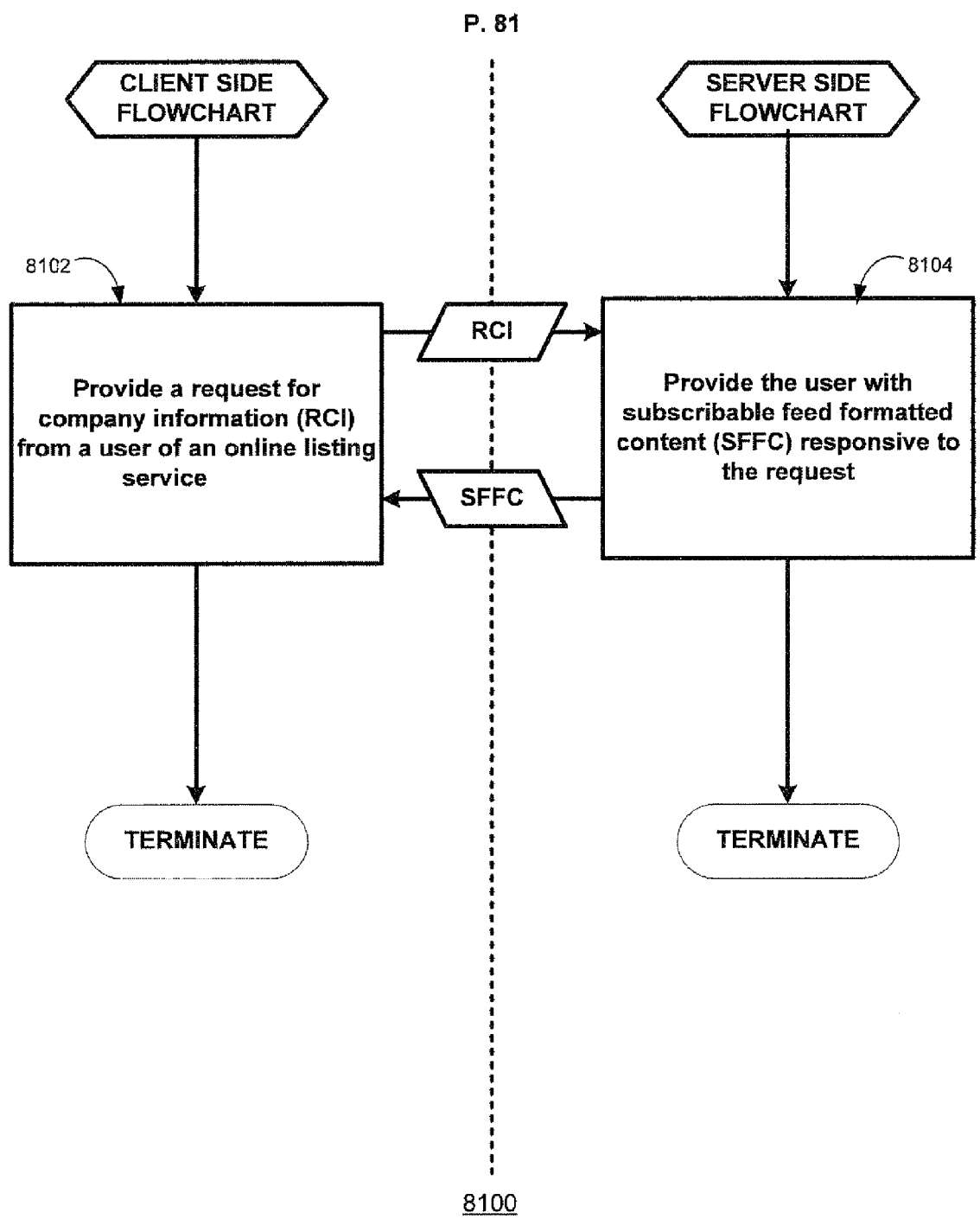
FIG. 81 illustrates a flowchart representative of one embodiment of a method for providing online product and service listing service information.

FIG. 81 illustrates a flowchart representative of one embodiment of a method for providing online product and service listing service information at 8100. The client side provides a request from a user of an online listing service for company information at 8102. The server side provides the user with subscribable feed formatted content responsive to the request at 8104. In one embodiment, a geographic region identity may be associated with the user, and the feed formatted content may be supplied based on the association.

For example, a user may navigate the yellow pages directory using existing methods such as free form search or category drilldown. Each layer of category drilldown may provide the user with the opportunity to subscribe to a feed associated with that category. For example, a user might navigate to the entertainment category, and see a list of categories that includes movies, bars and restaurants, and theater, among others. Each of these categories may be clicked on to further drill down, or a button, link, or feed enabled section of the site may be provided to allow the user to subscribe to that category. Also, when a user has searched down to individual yellow page entries, such as a particular list of business locations, each business entry may include a list of current or upcoming sales and events that are also company specific feeds that are available for subscription.

A slightly modified interface for the above-described yellow pages could be used for cell phone or PDA access. A call center interface could also be developed that takes into account geographic information from the cell phone or landline location of the caller. A caller could request information about restaurants around their location and receive current sale and special information. A server system that translates text to voice could also be provided to read the specials information. A call-based system may take audio input into a voice recognition system or provide options in a call tree manner.

In one embodiment, the company, event, and sale information may be maintained by a local feed formatted content collection company. For example, the local feed formatted content collection company may hold accounts for advertisers and other entities that include address, category and other information. Each feed item may then be linked to one of these accounts. This local feed formatted content may then be purchased by or licensed to other companies, such as, Yellowpages.com®, Superpages.com®, Yahoo®, Google® and other online yellow pages, search engines, and sites that provide local information. Access to the feed formatted content may be limited by encryption, password, or the like. In this manner, a local feed formatted content collection company may selectively supply other online companies with access to their feed formatted content. Various methods of secure data transfer may be employed to transmit the information from the local feed formatted content collection company to another site or service. In one embodiment, the feed formatted content may be indexed to the content provided by the other site or service based on address, company or entity name, unique company or entity identifier, or the like.

One embodiment of the present invention includes a request for proposal (RFP) interface and subscription model. Businesses and vendors may subscribe to feeds that contain RFPs as feed items. The user providing a request for proposal may either post an RFP document online and link to it via an RFP submission form, or the entire RFP may be entered via form.

For example, a plumber may register for the RFP system, specifying the geographic area that the plumbing business services and the method by which they wish to be contacted. When a homeowner within the specified geographic area has a clogged drain and submits a request for proposal from the plumber, the RFP or link to the RFP is transmitted to the plumber.

This RFP system may be combined with the feed enhanced time relevant yellow pages described above.

One problem with existing on-line advertising is the extra steps necessary to get information to a user. Various on-line advertising approaches have been taken to target advertising to subject matter of searches and key words in content. The user must then, however, click on the ad and find his way to a desired product or service. The user may then be required to call the product or service provider or go through additional steps to purchase the product or service.

In one embodiment, an IAP may include a request window. A user can type in a product or service of interest into the request window and send the request to the IAP server. The request would then be scanned for key words, parsed, and/or interpreted by IAP personnel. The request or an interpreted or modified version of the request can then be sent to a retail data interface, or RDI, for communicating with the IAP. In one embodiment the RDI accesses feed formatted content from vendors. For many products and services, local retailers, e.g. those located within a predefined radius from the user, are necessary and/or desirable. In one embodiment, once the subject matter of the request is determined, a second determination can be made to determine if the subject matter requested applies to local retailers or both local and national retailers. In another embodiment, the entity providing the product or service may choose to be classified as a national or local retailer. Based on this geographic relevancy determination, the request is then sent to the geographically relevant RDIs.

For example, a user may type in a request for a sink to be unclogged and send the request to the IAP server. The request would be interpreted as a plumber service request being geographically relevant to an area within, for example, a zip code, a distance from the requestor's address, DMA, or other suitable geographic area. Once the IAP determines the relevant geographic region, the region can be compared to a list of plumber profiles containing the plumber locations and/or geographic areas they are willing to service. The request may then access feed formatted content associated with one or more plumbers that satisfy the requirements. The feed formatted content may be compiled by the IAP system via a feed item provider interface, or by receiving faxed, emailed, instant messaged, or called in feed items from the feed item providers. Alternatively, the request is then sent to the plumbers and they can send a reply via their RDI to the IAP server, which then sends it on to the requester's IAP. The plumber's reply, for example, can include the plumber's phone number along with a cost estimate or typical range and when he could arrive. Alternatively, in one embodiment, the requestor can phone in the request to an IAP command center—where the call can be digitally recorded, interpreted and sent as a digital message or text message to the RDI. In another embodiment, the service provider is provided with contact information for the requester, enabling the provider and requester to communicate directly. In some embodiments, the contact information for the requester is only forwarded to the service provider if the requester gives permission for the IAP to forward the contact information.

In one embodiment, a retailer's inventory information can be sent from a retailer database, accessible via feed formatted content, to respond to a request. For example, a request might be received at the IAP server for a digital camera. The IAP server recognizes this as a request serviceable by Best Buy, and directs the query to the local Best Buy RDI. The Best Buy RDI interfaces with the store inventory database, requesting current inventory and pricing information on digital cameras. The response is then routed back to the IAP that originated the request for digital camera information. In one embodiment, the retailer may have a feed with set responses to send on to requesters. This database may be held on a computer maintained by the retailer or on the IAP server. Alternatively, the retailers product and pricing information can be part of a local electronic products or other subject matter feed that is updated periodically through a feed provider interface or any other communication means. An IAP user may subscribe to the electronics feed to have updated information on promotions of electronic products from local retailers.

Some users may be more comfortable getting a product from a local retailer. In one embodiment, the retailers inventory can be checked and a request to a wholesaler or manufacturer can be made in response to the request. So even if the retailer does not presently have the product available, the retailer can reply that a shipment will arrive on a certain date. In one embodiment, the retailer could send a product request to a wholesaler or manufacturer data interface MDI via the IAP server. The manufacturer can send a reply from the MDI to the RDI via the IAP server. In one embodiment, manufacturer inventory data can be integrated with the MDI to facilitate a response to the RDI.

In one embodiment, the IAP may be used for facilitating bulk purchases and associated savings. For example, a deal might be presented to the IAP whereby a local store is able to sell a set of golf clubs at fifteen percent below retail if it is able to purchase ten sets from the supplier. Invitations to take part in the fifteen percent savings are sent out via the IAP. Users may, in one embodiment commit to purchasing the set if nine other sets are sold. When the ten sets are all pre-sold the IAP may charge previously stored credit card accounts for each user and inform the local retailer that the bulk purchase may be made.

Alternatively, an IAP user may request a product. Based upon the product request the company managing the IAP may negotiate a potential bulk purchase, or a retailer may propose a bulk sale via their RDI. Again, as before, invitations to take part in the purchase are sent to likely candidates via the IAP.

Often times a person may be enticed into desiring a product or service through an ad, but may still want to purchase it locally. Based on a level of interest value, a request can be sent from an ad server to an IAP server. The IAP server can then, based on the product or service category, send a request to one or more geographically relevant RDIs.

In one embodiment, a RDI can publish a feed formatted content response, accessible to the IAP server, indicating that it sold a product or service to a requester, or the two parties may transmit the data in another manner as known in the art. The IAP can then post a request for recommendation to the requester IAP. The recommendation can be held in a recommendation database, which may also include a friends and acquaintances database indexed based on profile data entered by users. This profile data may be initial registration requested data or created based on activity of the requester or other IAP user, for example, when a requesters IAP is combined with as second IAP, or the reverse, it can be inferred that the requester and the second user of IAP are friends. Other methods of establishing relationship networks are known in the art and may be employed. In one embodiment, an IAP user can request a product or service and specify friends and/or general recommendations. The IAP server can directly send a reply from the recommendation database with general information. In one embodiment, the recommendations may be made accessible by link or provided directly with a reply from a retailer.

Figure 82:
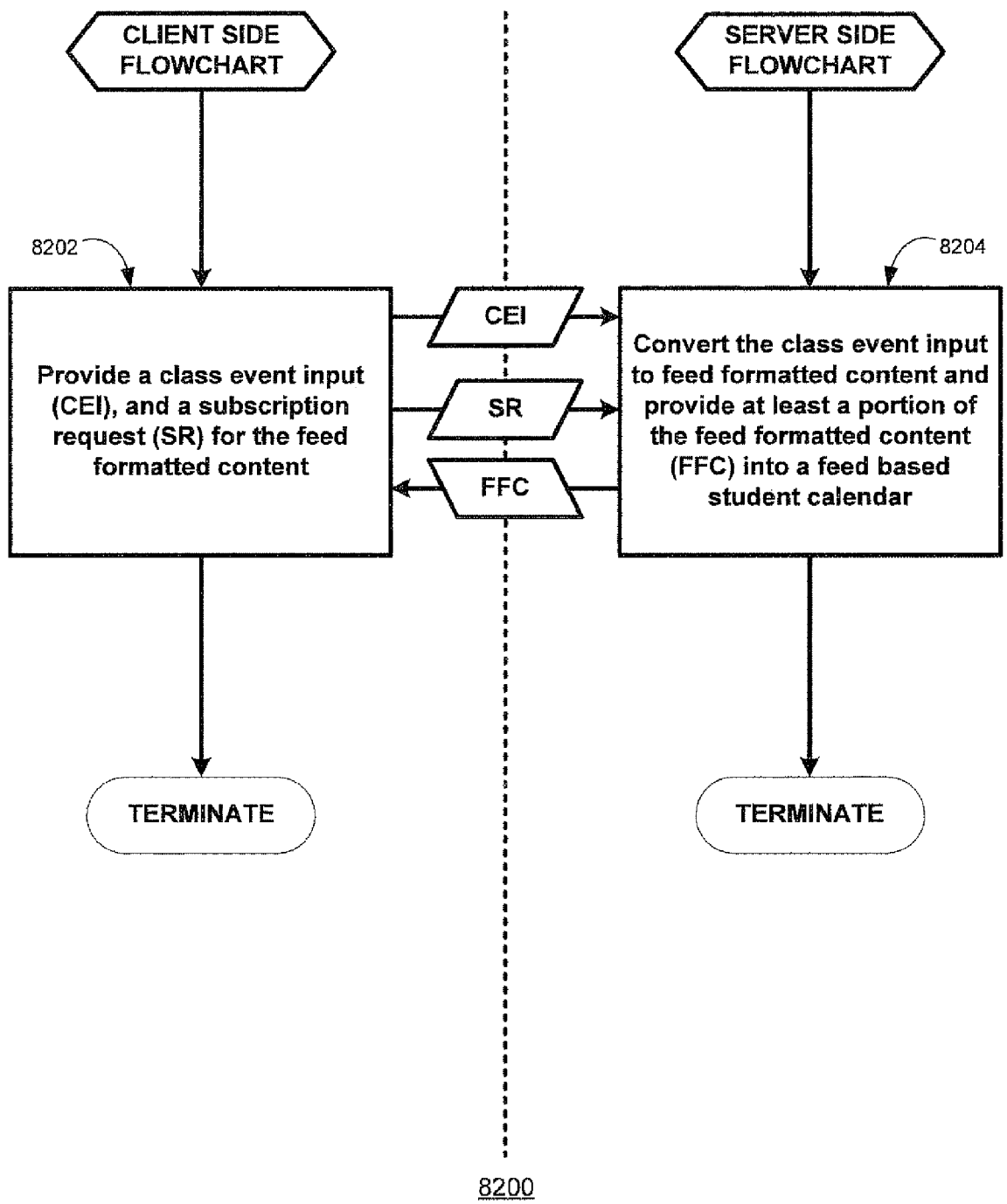
FIG. 82 illustrates a flowchart representative of one embodiment of a method for providing package tracking.

FIG. 82 illustrates a flowchart representative of one embodiment of a method for class management at 8200. The client side provides event input and a subscription request for feed formatted content at 8202. The server side converts the event input to feed formatted content and provides at least a portion of the feed formatted content into a feed based student calendar at 8204. In one embodiment, a time overlap may be determined, and the calendar appearance may be modified based on the determination. In one embodiment, a sponsor ad may be associated with the feed formatted content, and the ad may be displayed on the feed based student calendar. In one embodiment, a sponsor may request to place an ad in the feed formatted content, receive a reply to the request, and the ad may then be indexed to the feed formatted content. In one embodiment, the feed formatted content may be displayed in a sponsor or branded interface. In one embodiment, users may be subscribed to the feed formatted content based on class enrollment provided by a school database or other source.

In one embodiment, a feed can be established for school classes with event dates for all tests, papers, assignments, and other class events. For example, once a feed is established the teacher can insert additional class events or modify dates on existing class events. In one embodiment, the class events can each be an individual feed item. The title of each feed item can be inserted into a calendar at the users communication device in accordance with the event date markers. In one embodiment the teacher can create new feed items with new dates via a teacher interface. In one embodiment, the calendar can include a check-off box to allow students to check off when a particular class event is completed. In one embodiment, the teacher can mark some class events as mandatory events. The student may then have the option of viewing the calendar with only mandatory events. The student calendar can also display one or more class feeds at a time. In one embodiment when overlapping class events occur, the calendar can notify the student by modifying the color or appearance of the day box on the calendar. In one embodiment, the student can submit and monitor progress status for group projects on the calendar, which will be sent to other students in the group via a feed.

In one embodiment, sponsorships can be offered to local businesses to sponsor talent shows, science fairs, school dances, sporting events and other school events. In one embodiment, the sponsor's name or slogan can be displayed when a school or class event title is clicked on from the calendar. In one embodiment, sponsors can sponsor the class calendars. There can be different sponsors for the student calendars. In one embodiment, calendars for the lower grades may be accessed by parents or a separate parent calendar may be provided that may include, in addition to the child's school and class events, PTA and other parent/school, parent/teacher, or parent/student events. In one embodiment, the sponsor's ad can be displayed as a border of the calendar. In other embodiments it can be displayed on the click through event web page.

Figure 83:
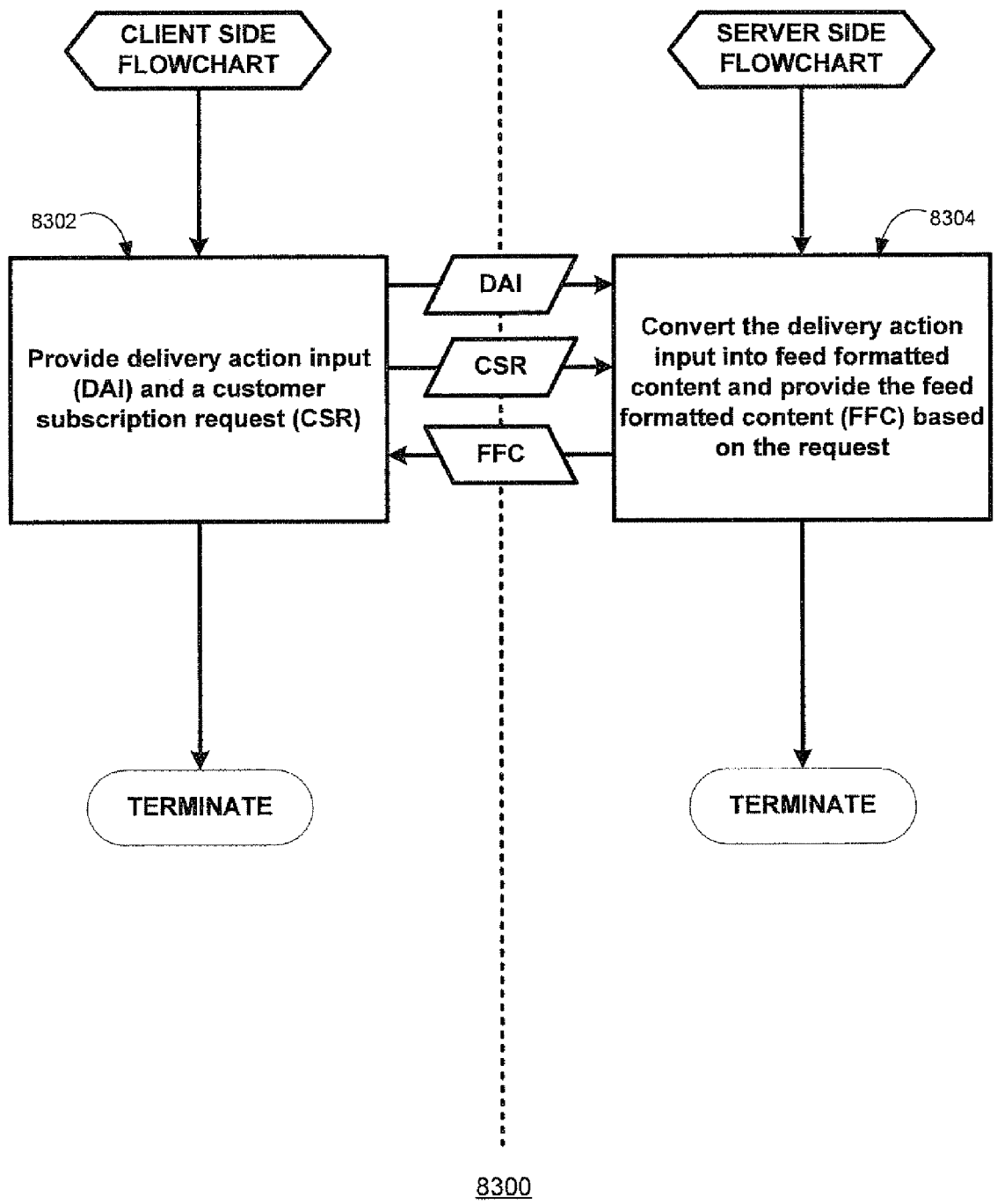
FIG. 83 illustrates a flowchart representative of one embodiment of a method for providing package tracking.

In one embodiment, a delivery company, or company that receives or sends deliveries, creates a feed associated with deliveries. FIG. 83 illustrates a flowchart representative of one embodiment of a method for providing package tracking at 8300. The client side provides delivery action input and a customer subscription request at 8302. The server side converts the delivery action request input into feed formatted content and provides the feed formatted content based on the request at 8304. In one embodiment, the delivery action input and customer subscription request may be a shipping account, a shipping address, a package identifier, or the like.

For example, a deliver company, such as FedEx®, may provide feed formatted content customized to each customer, or may provide feeds based on address. A customer may subscribe to a feed by providing their customer account number or by providing their address. As a delivery passes through the FedEx system, notifications regarding such actions as delivery receipt at a distribution center, or receipt of delivery signature may be posted as feed formatted content. Similarly, a company that ships or receives many deliveries may set up a feed for customers or associates to receive information regarding when deliveries are prepared or shipped. In one embodiment, a company may redistribute shipping information received from a shipping company in a feed to their own customers or associates. For example, the feed formatted content from the delivery company may include a package number marker that the company shipping the package may have associated with a particular client. When the company shipping the package receives the feed formatted content from the deliver company, the content may be scanned for package number marker, the package number marker associated with a particular client, and at least a portion of the content redistributed into that clients feed.

Figure 84:
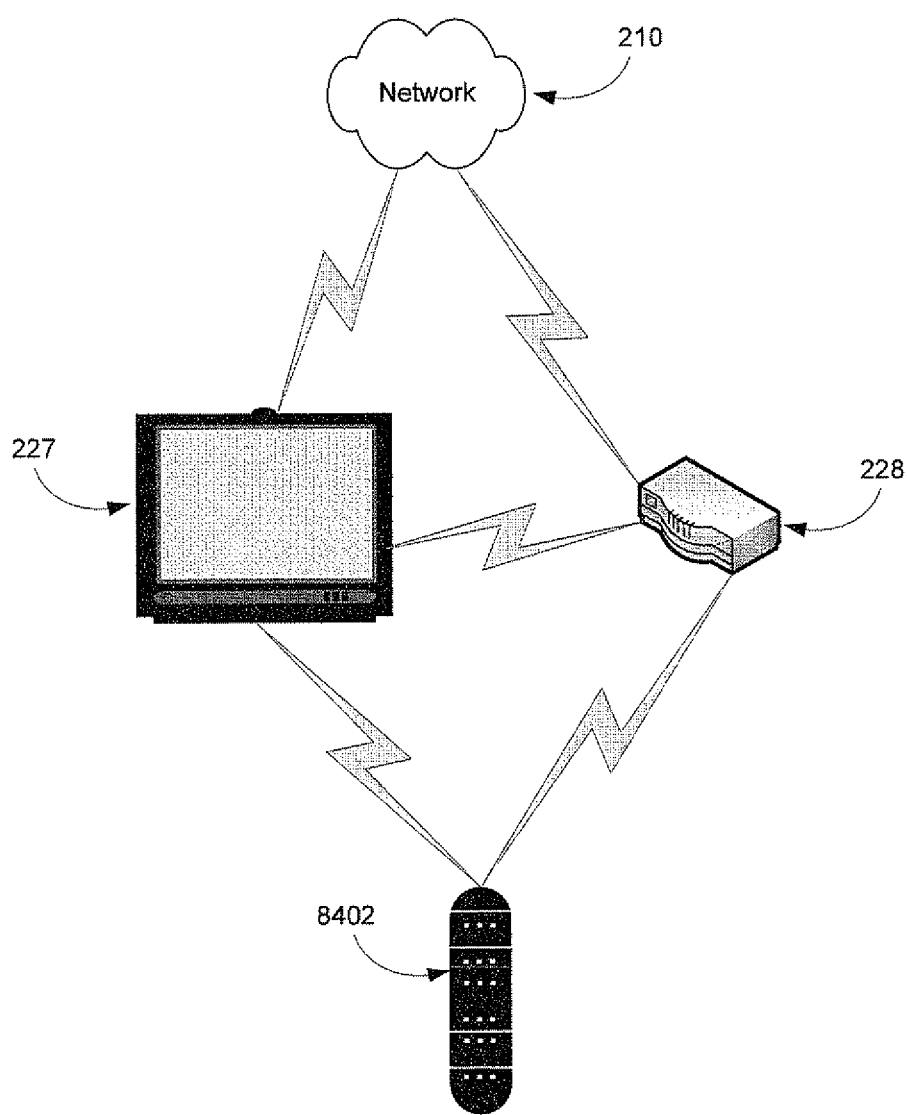
FIG. 84 illustrates a schematic diagram of one embodiment of a telecommunication system of the present invention.
Figure 85A:
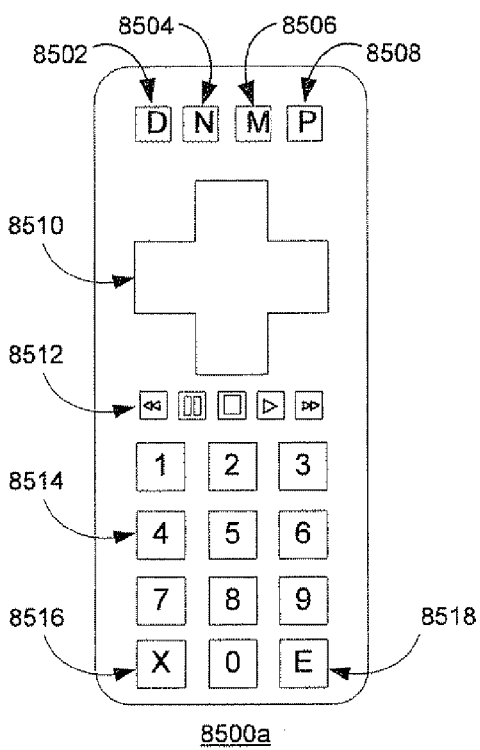
FIG. 85a-d illustrate embodiments of a remote control device in accordance with the present invention.
Figure 85B:
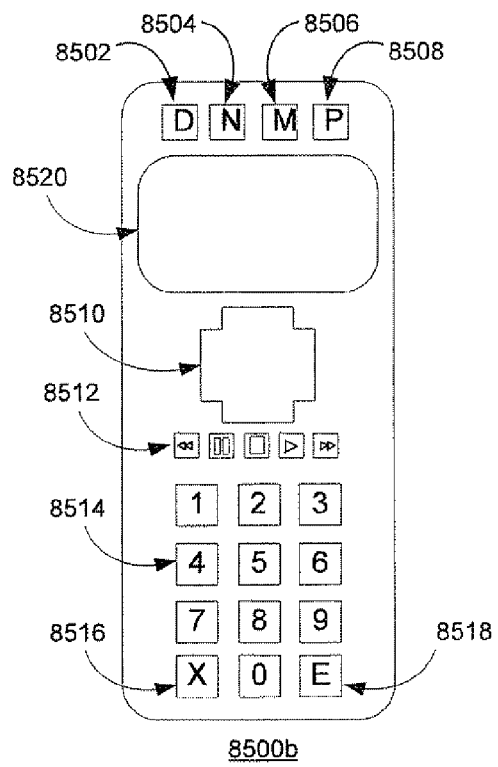
Figure 85C:
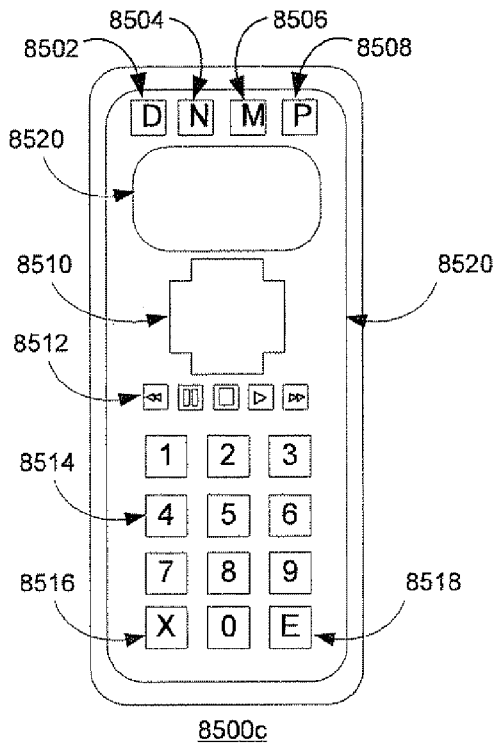
Figure 85D:
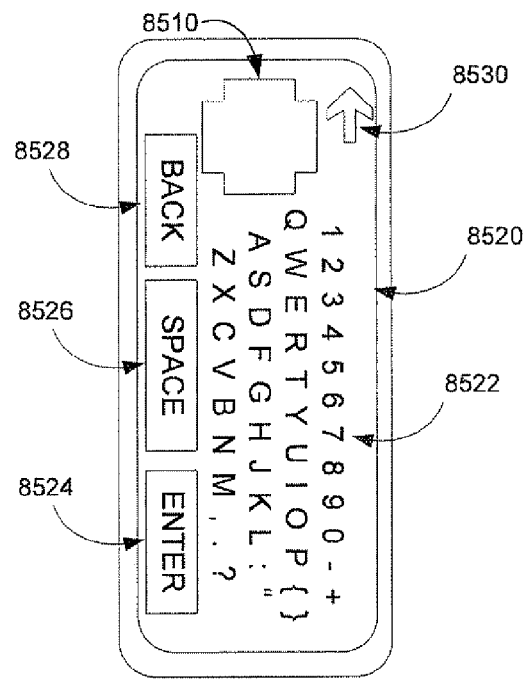

FIG. 84 illustrates one embodiment of interacting with the present system. Television 227 of FIG. 1 may serve to display to an end user information transmitted via network 210. Television 227 may be an analog or digital television, a projector and screen, or other such device for visual display. Network 210 may be a private network, such as a cable or satellite television service provider network, the public Internet, other public or private networks, or some combination thereof. In an alternate embodiment, the network may include broadcast electromagnetic signals. In one embodiment, an additional device may be used to provide additional features or facility to the television, for example STB 228 or gaming console 229. Such devices will generally be referred to as network decoders. A network decoder may include many features beyond signal decoding and tuning, such as, for example, gaming, media playback, and the abilities of a digital video recorder. Some televisions may include built in components that perform the decoding, tuning, and other features that might otherwise be performed by a network decoder. Also illustrated is remote control 8402. Remote control 8402 may communicate user input to television 227, a network decoder, both devices, and additional devices. In one embodiment, remote control 8402 may receive information as well, for example from a network decoder. Such communication to the remote control may be via blue tooth, or another type of wireless transmission. Information may be communicated back to network 210 by television 227 or a network decoder. Such upstream communication may be provided through the same communication channel, such as in the case of a network decoder attached to a coaxial cable on a digital cable network, or alternatively it may be provided in an alternate channel, such as through a phone line connected to the network decoder.

Satellite, coaxial cable, Ethernet, and telephone, including DSL, links may be used with televisions and network decoders to provide users with access to, and the ability to interact with, the described systems, features, and interfaces. In one embodiment, aspects of data storage or transfer, or aspects of GUI processing or display may be performed at a television, at a network decoder, or some combination thereof. Such services may generally be provided by a television service, such as, for example, a cable or satellite television provider. A user provided access to such as television service may be referred to as a subscriber, and specifically a subscriber to that particular service.

FIGS. 85a-d illustrate various remote controls that may be used independently, or in conjunction with television 227, STB 228 and gaming console 229. Remote control 8500a is a conventional remote control, including standard buttons for—demand services 8502, menu 8506, power 8508, exit 8516, and enter 8518, as well as navigation control 8510, playback controls 8512, and number buttons 8514. In addition to these standard buttons and controls, and not included in conventional remote controls, a news button 8504 is included. News button 8504 serves to initiate the display of a personalized television IAP (PTVIAP). In one embodiment, remote control 8500a communicates with STB 228, which holds the PTVIAP program and displays it on the television 227 in a manner similar to the display of a conventional cable menu guide, or cable on-demand service. Many telecommunications service providers and gaming systems hold user accounts at remote servers and methods exist that allow these services to identify end user devices such as STB 228 and gaming console 229 that are associated with each particular user account. In one embodiment, an IAP user account may be associated with such a device, and the device may display IAP information configured on the device, or on another user device such as computer 224. Information displayed on the television may then include any of the information, advertising or sponsorship opportunities from any variety of sources as previously described. For example, a list of aggregated news items from a list of feed sources selected by the user may be displayed on television 227 and navigated using, for example, navigation control 8510, enter button 8518 and exit button 8516.

Remote control 8500b includes the same buttons and features as remote control 8500a, but also includes display screen 8520. In one embodiment, display screen 8520 displays information received from the television or network decoder. For example, a programming guide could be navigated, and a channel selected, using display screen 8520. Any variety of information described as being displayed on a computer, television, or the like may be displayed on display screen 8520.

Remote control 8500c includes the same buttons and features as remote control 8500b, but in this embodiment all buttons and features are displayed on touchscreen panel 8520. Touchscreen panel 8520 may display buttons and features in a variety of configurations, for example switching based on the current television feature being used. One interface may be displayed for playing an on-demand video. A second interface may be displayed for viewing a programming guide. Remote control 8500d illustrates an alternate interface display on touchscreen panel 8520. This interface includes QWERTY keys 8522, enter button 8524, space button 8526, and back button 8528. Additionally, an interface return button 8530 may be included to switch the interface to a previous, or basic, remote interface.

In one embodiment, multiple IAP accounts may be indexed to a particular television or network decoder. For example, a household may have an account with a cable company, generally referred to as a master account, and that master account may include a master login username and password to a web site. On the website the user may create IAP accounts for each person in the household. Information stored with each IAP account may include first name, last name, user name, email address, and a personal identification number (PIN). In an alternate embodiment, IAP accounts may be created on the television or network decoder using conventional remote 8500ca, or touch screen remote 8500d. As another alternative, the IAP accounts may be created by the service provider at the request of the user.

After IAP accounts have been created, aspects of user interaction with the television and network decoder may be customized to each IAP account. For example, when news button 8504 is selected, the television or remote control may display the list of IAP accounts associated with the television or network decoder. Using navigation control 8510, the user may select their IAP account. In one embodiment, the user may be prompted to enter their PIN before their account is accessed. Based on the selected account, news or other information, such as a favorite channel list, may be displayed on the television or remote control.

In one embodiment, account lists and other news and information displayed on the television or remote control may be pulled directly, on request, from network 210. Alternatively, such information may be cached on the television or network decoder.

As previously described, IAP information may be displayed on a remote control or on a television. The display may cover all displayable area on the device, or may only cover a portion. For example, many cable television systems include the ability to scroll through a programming guide of available channels on the bottom half or third of the television screen. A similar amount of screen real estate may be utilized for IAP information display.

One example of IAP information that may be accessed via the PTVIAP is feed formatted content. In one embodiment, a user may specify the feed sources for display on the PTVIAP. Various methods may be utilized to specify these sources, including specifying an OPML file for import, selection via a feed selection interface, individual feed source entry, or the specification of one or more existing aggregator accounts, such as, for example, Gritwire or Bloglines.

Another example of IAP information that may be accessed via the PTVIAP is fantasy sports information. Examples of operational interaction with fantasy information include, but are not limited to, (1) off-season actions such as configuring the fantasy league, accessing pre-season rankings of fantasy players and conducting a draft of the fantasy players, (2) in-season, off-time actions such as managing a lineup prior to or subsequent to real-time performances by the fantasy players, and accessing reports of past performances by the fantasy players and commentaries on predicted future performances of the fantasy players, and (3) in-season, gameplay actions such as managing a lineup during real-time performances by the fantasy players, and accessing reports of real-time performances and real-time playing status of the fantasy players.

Sponsorship information may accompany fantasy sports information. Sponsorship information may include advertisement/promotion of good(s) and/or service(s) as designated to a fantasy player on an individual basis and/or a team basis, the term "individual basis" is broadly defined herein as a designation by a sponsor of an advertisement/promotion of good(s) and/or service(s) to a specific player (e.g., Indianapolis Star designates the promotion of its paper to Peyton Manning, quarterback of the Indianapolis Colts), and the term "team basis" is broadly defined herein as a designation by a sponsor of an advertisement/promotion of good(s) and/or service(s) to a specific team (e.g., Indianapolis Star designates the promotion of its paper to all of the team members of the Indianapolis Colts).

Television display of such fantasy sports information, including video clips of plays made by the actual teams and players, may particularly facilitate certain sponsorship opportunities. For example, a cable television account will generally be associated with a specific geographic location, often down to a specific mailing address. Local establishments may be provided the opportunity to provide individual or team basis sponsorships based on the location of the cable account accessing the fantasy sports information. For example, a bar located in a particular neighborhood of Chicago may be a popular bar for the Pittsburgh Steelers. That bar may sponsor fantasy sports information, including video clips, displayed on cable accounts in the area surrounding the bar on a team basis related to the Pittsburgh Steelers, or on an individual basis related to, for example, quarterback Ben Roethlisberger.

Figure 86:
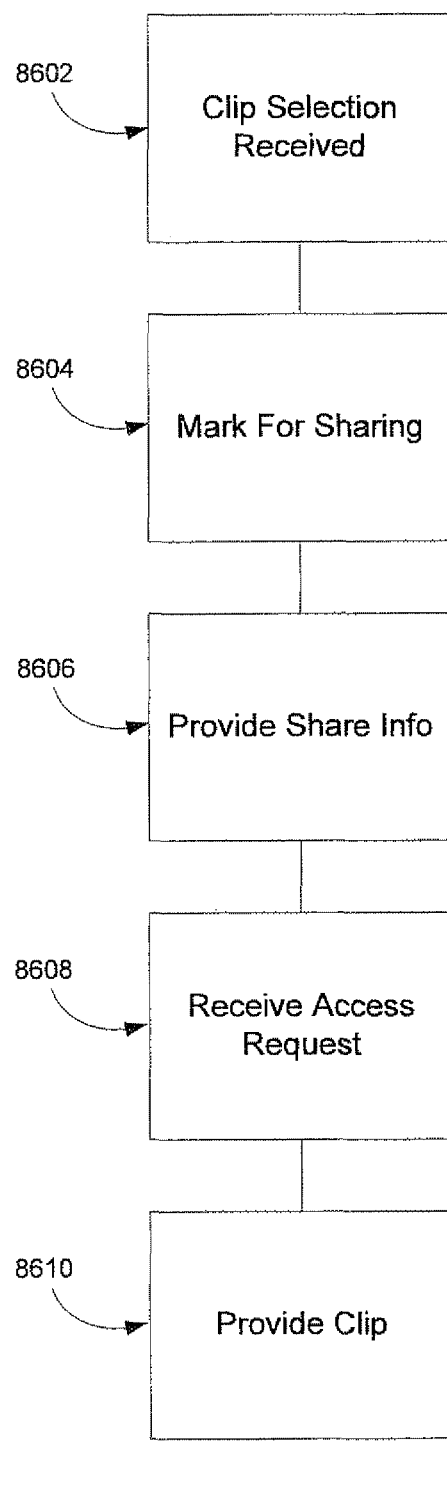
FIG. 86 illustrates a flowchart representative of one embodiment of clip sharing.

In one embodiment of the present invention, a user may elect to share video clips, including entire programs or multiple programs, from their television. FIG. 86 illustrates a flowchart representative of one embodiment of a method for sharing video content at 6100. A user of the system indicates a selected clip 8602. The selected clip is then marked for sharing 8604. Information related to this share is provided 8606 to other users of the system. One of these other users requests to view the share, and the access request is received 8608. The clip is then provided to the other user 8610.

The clip selection 8602 may be received from a variety of input methods. For example, a user may press a button on a remote indicating they wish to share an entire program. Alternatively, the user may be provided with an interface to select on a program timeline the beginning and end points of the clip. In another embodiment, a user may record a program or segment of a program to a digital video recorder (DVR) and mark this recorded clip for sharing.

Marking the clip for sharing 8604 may be performed in a variety of methods. For example, the share information may be recorded at a central IAP server indicating a master source for the program, for example a cable company server, or a server associated with the channel on which the program was originally broadcast. Such a marking may include a database recordation on the sharing user, the start time of the clip within a program, and the end time within the program. Alternatively, the recordation may be stored on a user device, such as a network decoder. In one embodiment, the stored reference to the shared clip may point to a recorded clip on a network decoder with DVR capabilities. Requests for the shared clip may pull the content directly from the user network decoder, or the clip may be transferred to a central server.

Figure 89:
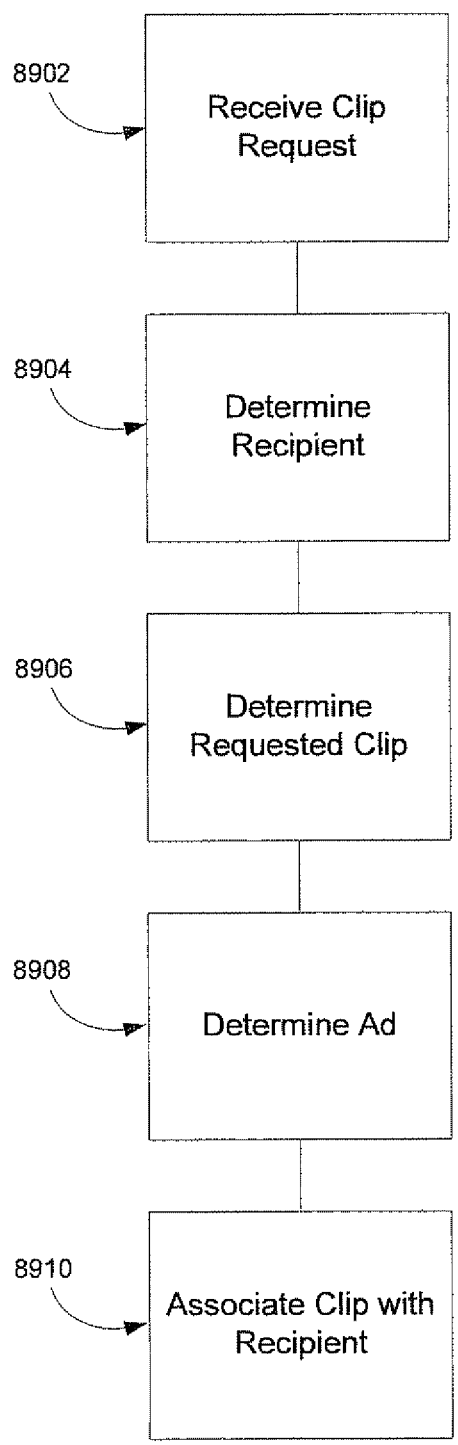
FIG. 89 illustrates a flowchart representative of one embodiment of operating a shared information system.

FIG. 89 illustrates a flowchart representative of one embodiment of a method of operating a shared information system at 8900. A recorded clip recommendation request is received from a recommendation source 8902. A recipient is determined based on the recommendation request, wherein the recipient is a user different from the recommendation source 8904. A recorded video clip is determined based on the recommendation request 8906. An ad based on a group or individual profile associated with the determined recipient is determined 8908. The determined clip and the determined ad are associated with the determined recipient 8910. Clip sharing may include a variety of advertising and sponsorship opportunities. For example, an ad may be associated with the delivery of a shared clip based on the determined recipient. This ad selection may be based on a user profile associated with the recipient, information such as the user's geographic location, or other such targeting methods. In one embodiment, a share or recommendation may be a channel specification. Such a recommendation may be sponsored or include an advertisement, and may be displayed on a channel recommendation system.

In one embodiment, interaction with a television may be recorded, for example at a service provider server. Information recorded may include actions such as turning the television on or off, browsing on-demand content, selecting or changing a channel, duration spent at a channel, instances of fast forward or rewind, or the like. As the television may be directly connected to a network, or connected to a network via a network decoder, such information may be quickly transmitted. As the information may be uploaded to the central server on each action, or soon thereafter, the information may be said to be recorded in real time. With such real time information collected, a variety of user specific or aggregate audience queries and services may be provided. Such information may be referred to as, or used to calculate real time viewership or real time audience information. In one embodiment, only a statistical sampling of real time user data may be recorded or used for the provision of such services. A user may elect to participate in real time television data collection, or alternatively, a user may elect not to participate. In one embodiment, electing not to participate may remove the user from reporting on an individual basis, or the receipt of personalized services, but their data may still be collected for aggregate presentations or services. Users may also elect to base participation on specific channels. For example a user may be willing to share their viewing of CNN, but may be more hesitant and elect not to share their viewing of Spike TV. Users may also elect to opt in or opt out of participation on an individual show basis. For example, a user may elect to participate in a personal or aggregate service while watching a presidential debate.

Figure 90:
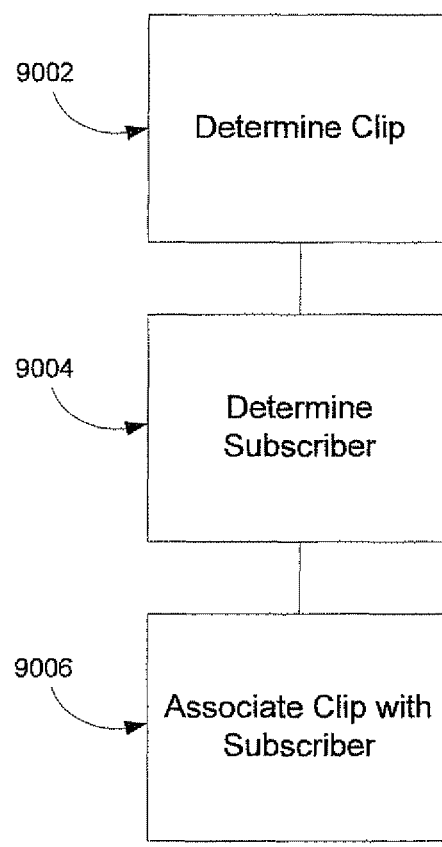
FIG. 90 illustrates a flowchart representative of one embodiment of operating a shared information system.

FIG. 90 illustrates a flowchart representative of one embodiment of a method of operating a shared information system at 9000. At least one video clip is determined based on real time viewership information 9002. At least one subscriber is determined based on a group or individual profile 9004. The determined video clip is associated with the determined subscriber 9006.

Figure 91:
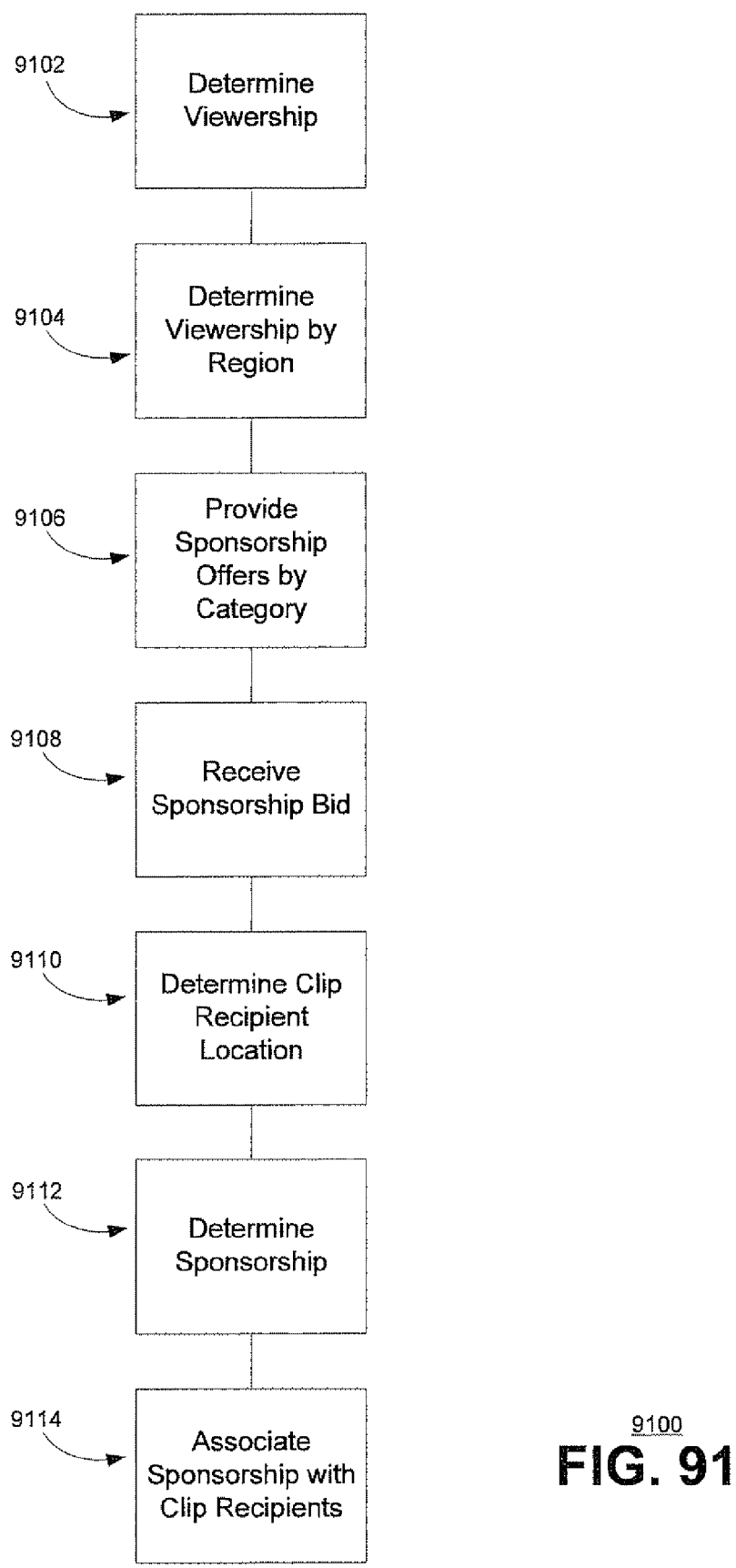
FIG. 91 illustrates a flowchart representative of one embodiment of operating a shared information system.

FIG. 91 illustrates a flowchart representative of one embodiment of a method of operating a shared information system 9100. Viewership of a plurality of channels is determined in real time 9102. The determined viewership is categorized by geographic regions 9104. A plurality of sponsorship offers are provided based on the geographic categories 9106. At least one sponsorship bid to at least one of the sponsorship offers is received from at least one advertiser 9108. A geographic location of video clip recommendation recipients is determined 9110. A sponsorship based on the received bid and the determined geographic location is determined 9112. The determined sponsorship is associated with at least one of the video clip recommendation recipients 9114.

One embodiment of the present invention includes a real time audience supplemented television programming guide. A user may select to display a programming guide on their television. Such programming guides conventionally display a particular time period, along with rows representing a channel and the shows on the channel during the particular time period. This conventional display may be enhanced by including the real time audience data associated with each channel. For example, while browsing the channels, a user may note that a particularly large number of people are watching the John Stewart Show. Based on this they may elect to view that channel, and thereby find that a particularly significant guest is on the show. Such an exploration and discovery might not take place without the popular suggestion based on real time audience data.

Real time audience supplemented television programming guides may break down and display viewership by geographic region or other demographic factors including age, gender, income, etc.

Real time audience supplemented television programming guides may additionally incorporate one or more friend networks. A friend network may be established for a particular television service, or alternatively the service may associate user accounts of the service with user accounts of a third-party friend network service, such as MySpace. Users may then elect to view filtered audience data based on what their friends are watching, or additionally they may elect to view audience statistics over relationships two, three or more degrees away.

Figure 87:
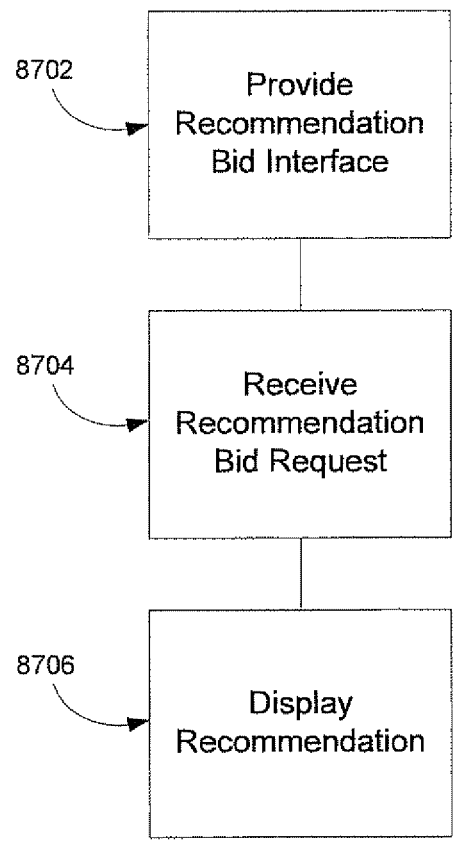
FIG. 87 illustrates a flowchart representative of one embodiment of operating a channel recommendation system.

FIG. 87 illustrates a flowchart representative of one embodiment of a method of operating a channel recommendation system at 8700. A channel recommendation bid interface is provided 8702. A channel recommendation bid request is received via the interface 8704. A recommendation link to the channel is displayed on at least one user recommendation display device based on the channel recommendation bid request 8706. When a user is reviewing possible channel selections for viewing, they may elect to use such a television programming guide provided on the television, or on a remote control associated with the television. In one embodiment, when multiple channels are listed on the programming guide, they may be prioritized in their display. For example, recommended channels may be displayed higher on a list, earlier in an ordered display, or in one or more featured positions on the programming guide. This may provide additional convenience to the user by recommending the best programming available. Prioritization can be based on various factors including total or segmented viewership data, sponsorship bid amounts, geographic location, or other profile or demographic data.

Figure 88:
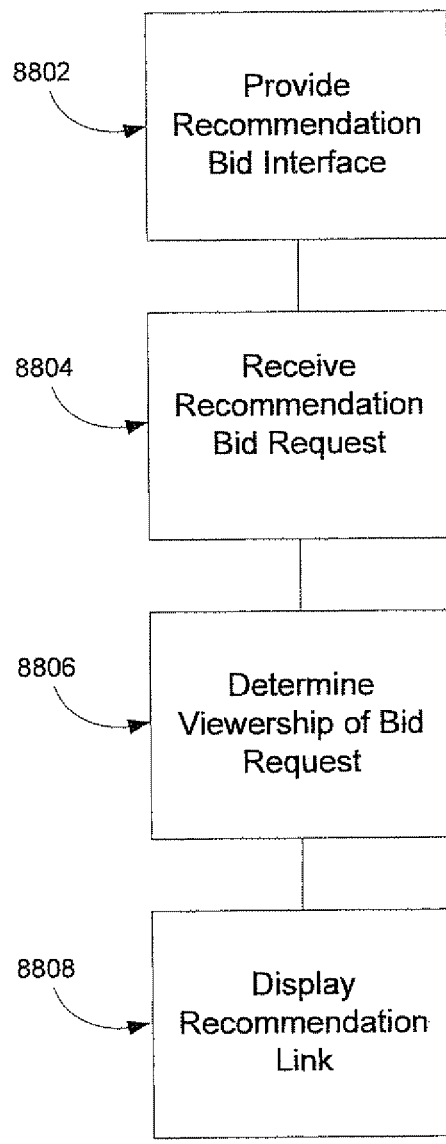
FIG. 88 illustrates a flowchart representative of one embodiment of operating a channel recommendation system.

FIG. 88 illustrates a flowchart representative of one embodiment of a method of operating a channel recommendation system at 8800. A channel recommendation bid interface is provided 8802. A channel recommendation bid request is received via the interface 8804. A real-time viewership of at least one channel is determined based on the bid request 8806. A recommendation link to the channel is displayed on at least one user recommendation display device based on the channel recommendation bid request and the determined real-time viewership 8808. Recommendation links on a programming guide may be based on a variety of factors. For example, real time audience numbers may impact the placement of a channel. Historical viewing of a channel, television series, or a particular episode may also impact the placement of a channel. Geographic location may provide another factor. Profile information, such as viewing history, location, demographics, behavioral data, and the like may also impact ordering. Profile information may be stored on individual users or for groups of users. A group or individual profile may be used for a variety of purposes such as recommendation provision, prioritization, advertisement or sponsorship targeting, or the like.

An individual user's profile may also impact a personalized ordering, for example based on past viewing history, based on the current show being viewed, age, gender, interactions with other services such as one or more websites, or other demographic or behavioral information. Recommendation links may be viewed on a user recommendation display device, such as a video display device. A video display device may include, for example, a television or remote control. Such a device may include a recommendation listing interface for the display of recommendation links.

In one embodiment, an interface may be provided to representatives of the channels in a programming guide. The channel recommendation bid interface may allow the representatives to enter placement bids for the channel recommendation system. One embodiment of a channel recommendation bid request includes the channel associated with the bid, a bid amount, and a transaction specification. A transaction specification may be fixed within the interface, or a variety of transaction specifications may be provided. The transaction specification indicates the action that causes the execution of the bid amount, or an associated amount, to be charged to the representative account. By way of an example, a representative for ESPN may enter a bid associated with ESPN, with a bid amount of fifty cents, to be paid based on a viewer of the programming guide selecting to change the channel to ESPN.

Many transaction specifications may be offered for bid. For example, changing to a particular channel, changing away from a particular channel, changing to a channel and viewing it for a specified time period, electing to record a show, electing to purchase access to a show, electing to purchase access to a channel, electing to record all episodes of a show (such as the Tivo® season pass), electing to specify the channel as a favorite channel, or the like. Bids may also be provided for aggregate transaction specification responses such as a specific number of people performing any of the above listed transaction specifications.

A further optional specification would be a particular placement slot on the programming guide. For example, a representative may elect to specify that their channel be listed third on the programming guide. Bid amounts, or another monetary commitment may be specified in order to attain this position. As other bids received in the system may affect placements of existing bids, the bid amount or monetary commitment for a position specification may vary over time. In one embodiment, a representative may specify a maximum bid, monetary commitment, or total budget for one or more channel placement bids.

In one embodiment, the ordering of a programming guide may be based upon placement bids received on the channel recommendation bid interface. Additional factors may be included in a channel placement bid. For example, the bid may be specified for a certain geographic specification, a conditional publishing rule, demographic targeting, profile group targets based on behavioral and historical viewing, or other such targeting. Another factor that may be included is a designation of specific portion of channel content, such as a time slot, a particular show, a particular series, a particular episode, or some combination of these. For example, a channel may encounter major drops in audience numbers when running up against a particularly strong show or set of shows on other channels, such as the standard time slot for American Idol. The channel representative may elect to place a bid for the time slot held by American Idol in an attempt to lure viewers.

In one embodiment, a channel representative may place a bid in conjunction with or associated with one or more advertisers. For example, an advertiser may provide some portion of a channel placement bid for channel, show, or episode that will contain a product placement, an advertisement for their product, or the like.

As discussed, the order of a programming guide may be based on the received bids. In one embodiment, the channel recommendations may incorporate other factors, such as those previously described. The placement in a programming guide may be based on a combination of one or more bid requests and real time viewership of one or more channels. For example, a channel representative may place a strong bid associated with a show that does not appeal to the targeted viewers, as reflected by the real time viewership of the show while the channel placement is high. The placement may then be lowered based on the poor response rate. Real time viewership measurements may include viewership activities as well, such as changing channels, fast forwarding, turning off the television, or the like. The channel placement may also incorporate past performance, or a particular viewer history.

In one embodiment, the channel recommendation system may be self-optimizing. Optimization metrics may include, for example, positive viewer interactions with the recommendation system, bid executions, income, a combination of these, or other factors. Using the previous example, the strong bid for the poor show may result in fewer converted bids, but the bid amount may compensate for some portion of the reduced conversions, helping maintain a higher placement.

Many other features may be implemented in a channel recommendation system that may provide additional methods for recommendation. For example, users may maintain a list of favorite channels or channels to ignore, or a user may select a category of show they are interested in viewing, such as sports or music. The system may also make use of information such as shows currently recorded on a user DVR, or the like.

In one embodiment, information displayed on a television may make use of similar encoding and transmission to closed captioning. Information may be encoded into Line 21 of a vertical blanking screen, or in the case of digital television, additional streams may be available. Information sent in such streams could indicate a wide variety of information such as channel recommendations, news, fantasy sports information, or other content including various markers. Information described as being sent via other methods may also be sent through such streams, and information here described as provided through streams may be provided through other communication methods. In one embodiment, a stream or a portion of a stream may be used to provide users or other systems with information about the current show, such as what song is playing in the background, what type of car a person is driving, actor or actress information, or the like. Markers included with such information may allow opportunities to look up additional information, the ability to purchase a product or service, or other interaction opportunities.

While this invention has described segments individually including communications network and node interaction, feed formatted content, feed publication and redistribution, profiled feed response tracking, IAP and feed consumption, unique feed item provision, enhanced feed provision, feed based calendar, geographically enhanced feeds, feed preference formatting, feed sponsorship, template feed opportunities, feed enhanced time relevant yellow pages, request for proposal system, class management system, package tracking system, IAP continued, affiliate feeds, branded IAP interface, feed based map, item window, single page multi-source configuration interface, feed list location standardization, intelligent thin client feed access remoting, channel recommendation, and video clip recommendation, in many cases there may be cooperative use among them.

For example, a wide variety of sponsorship and advertising opportunities may be presented with the described embodiments, including various targeting methods, recurrence patterns, conditional publishing rules, or the like. For example, information transmitted in streams may include sponsorship or advertisements. Information displayed on a remote control may include sponsorship or advertising. Recommended video clips may include accompanying sponsorship or advertising, for example stored on the user network decoder or added during transmission to the receiving user.

In one embodiment, the PTVIAP may include feed list location standardization, or branded interfaces. A feed enhanced time relevant yellow pages may be displayed on the PTVIAP, for example as part of an on-demand system. Feed based calendar features may be available on a television. Various services may be accessed in the same or varying interfaces based on user access devices such as televisions, gaming systems, mobile phones, computers, or other such devices.

These and other combination of the methods may be implemented in software using standard techniques.

These and other combinations of the methods and systems may also be contemplated by one skilled in the art, and as such are in the spirit of the invention.

The present invention may be embodied in other specific forms without departing from its spirit or essential characteristics. The described embodiments are to be considered in all respects only as illustrative and not restrictive.

The invention claimed is:

1. A computer implemented method of operating a shared information system, the method comprising:
   determining at a service provider server of a television service at least a first subscriber and the first subscriber's related group profile or individual profile;
   determining at the service provider server at least one video clip based on the determined profile and on real time viewership information of the television service, wherein the real time viewership information comprises real time interaction information from at least a second subscriber distinct from the first subscriber,
   wherein the second subscriber has a relationship with the first subscriber in a social network,
   wherein the social network comprises relationships between user accounts stored on a social network server, and
   wherein establishing a relationship between user accounts on the social network requires
   a request from a first user account to connect to a second user account;
   associating at the service provider server the determined video clip with the determined first subscriber; and
   providing from the service provider server to a subscriber display device of the first subscriber a recommendation link to the determined video clip.

2. The method of claim 1 further comprising: determining an ad based on a geographic location of the first subscriber; associating the ad with the associated video clip.

3. The method of claim 1 further comprising: determining an ad based on the determined group profile or individual profile of the first subscriber; associating the ad with the associated video clip.

4. The method of claim 1 further comprising: providing at least a portion of the real time viewership information to the first subscriber.

5. The method of claim 1 wherein the real time viewership information comprises real time interaction information from a plurality of subscribers.

6. The method of claim 1, wherein determining the video clip is based on a plurality of social network relationships of the first subscriber.

7. The method of claim 1 further comprising:
   receiving a channel recommendation bid request, wherein providing the recommendation link is based on the channel recommendation bid request.

8. The method of claim 1 wherein the real time viewership information comprises interaction by the first subscriber.

9. The method of claim 1 further comprising: receiving a reporting opt out request from the second subscriber, wherein the real time viewership information does not incorporate interaction by the second subscriber based on the reporting opt out request.

10. The method of claim 1 wherein the real time viewership information is selected from the group consisting of television turning on, television turning off, on-demand content browsing, channel selection, channel change, channel viewing duration, fast forward occurrence, and rewind occurrence.

11. The method of claim 1 further comprising: receiving at the service provider server a recorded clip recommendation request from a recommendation source, wherein the video clip is determined based on the recorded clip recommendation request.

12. The method of claim 1, wherein the recommendation source is the second subscriber.

13. The method of claim 1 wherein the real time viewership information comprises channel selection.

14. The method of claim 1, wherein the social network server is provided by a separate, independent and distinct service provider from the service provider server.

15. A computer program product for providing video clip recommendations over a network, the computer program product comprising a non-transitory computer-readable storage medium containing computer program code for:
determining at a service provider server of a television service at least a first subscriber and the first subscriber's related group profile or individual profile;
determining at the service provider server at least one video clip based on the determined profile and on real time viewership information of the television service, wherein the real time viewership information comprises real time interaction information from at least a second subscriber distinct from the first subscriber,
wherein the second subscriber has a relationship with the first subscriber in a social network,
wherein the social network comprises relationships between user accounts stored on a social network server, and
wherein establishing a relationship between user accounts on the social network requires
a request from a first user account to connect to a second user account;
associating at the service provider server the determined video clip with the determined first subscriber; and
providing from the service provider server to a subscriber display device of the first subscriber a recommendation link to the determined video clip.

16. The product of claim 15 wherein the computer-readable storage medium further contains computer program code for:
receiving a channel recommendation bid request, wherein providing the recommendation link is based on the channel recommendation bid request.

17. The product of claim 15 wherein the computer-readable storage medium further contains computer program code for:
receiving at the service provider server a recorded clip recommendation request from the second subscriber, wherein the video clip is determined based on the recorded clip recommendation request.

18. A system for providing video clip recommendations over a network, the system comprising: a processor and a memory coupled to the processor, the memory containing programming code to:
determine at a service provider server of a television service at least a first subscriber and the first subscriber's related group profile or individual profile;
determine at the service provider server at least one video clip based on the determined profile and on real time viewership information of the television service, wherein the real time viewership information comprises real time interaction information from at least a second subscriber distinct from the first subscriber,
wherein the second subscriber has a relationship with the first subscriber in a social network,
wherein the social network comprises relationships between user accounts stored on a social network server, and
wherein establishing a relationship between user accounts on the social network requires
a request from a first user account to connect to a second user account;
associate at the service provider server the determined video clip with the determined first subscriber; and
provide from the service provider server to a subscriber display device of the first subscriber a recommendation link to the determined video clip.

19. The system of claim 18 wherein the memory further contains programming code to receive a channel recommendation bid request, wherein providing the recommendation link is based on the channel recommendation bid request.

20. The system of claim 18 wherein the memory further contains programming code to receive at the service provider server a recorded clip recommendation request from the second subscriber, wherein the video clip is determined based on the recorded clip recommendation request.

* * * * *